US012799026B2

(12) United States Patent
Agnello et al.

(10) Patent No.: US 12,799,026 B2
(45) **Date of Patent: *Nov. 17, 2026**

(54) FOLDABLE SUBSTRATES, FOLDABLE APPARATUS, AND METHODS OF MAKING

(71) Applicant: CORNING INCORPORATED, Corning, NY (US)

(72) Inventors: Gabriel Pierce Agnello, Corning, NY (US); Joy Banerjee, Corning, NY (US); Vitor Marino Schneider, Painted Post, NY (US); Ian David Tracy, Oakdale, PA (US)

(73) Assignee: CORNING INCORPORATED, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 19/374,118

(22) Filed: Oct. 30, 2025

(65) Prior Publication Data

US 2026/0055022 A1 Feb. 26, 2026

Related U.S. Application Data

(63) Continuation of application No. 19/046,040, filed on Feb. 5, 2025, which is a continuation of application (Continued)

(51) Int. Cl.
*C03C 21/00* (2006.01)
*G02F 1/1333* (2006.01)
*G06F 1/16* (2006.01)

(52) U.S. Cl.
CPC ...... *C03C 21/002* (2013.01); *G02F 1/133305* (2013.01); *G02F 1/133331* (2021.01); *G06F 1/1652* (2013.01)

(58) Field of Classification Search
None
See application file for complete search history.

(56) References Cited

U.S. PATENT DOCUMENTS 3,287,201 A 11/1966 Chisholm et al.
3,410,673 A 11/1968 Marusak
(Continued)

FOREIGN PATENT DOCUMENTS

WO 2018/143991 A1 8/2018
WO 2019/014029 A1 1/2019

OTHER PUBLICATIONS

International Search Report and Written Opinion of the International Searching Authority; PCT/US2023/036084; dated Mar. 6, 2024; 8 pages; European Patent Office.

*Primary Examiner* — David Sample
(74) *Attorney, Agent, or Firm* — William M. Johnson

(57) ABSTRACT

In aspects, a concentration of lithium oxide at a surface is greater than a concentration of lithium oxide at a midpoint by from about 0.2 mol % to about 2 mol %. In aspects, a concentration of lithium oxide at a surface is from about 0.2 mol % to about 2 mol %. In aspects, a total concentration of potassium oxide, rubidium oxide, cesium oxide, and francium oxide at a surface is from about 5 mol % to about 15 mol %. In aspects, a ratio of the total concentration of potassium oxide, rubidium oxide, cesium oxide, and francium oxide at a surface to a concentration of lithium oxide at the surface is from about 1 to about 20. Methods include immersing a substrate in a molten salt bath at 380° C. or more for from about 1 minute to about 10 minutes or for from about 3 minutes to about 2 hours.

20 Claims, 33 Drawing Sheets

Related U.S. Application Data

No. 18/408,113, filed on Jan. 9, 2024, now Pat. No. 12,240,781, which is a continuation of application No. PCT/US2023/036084, filed on Oct. 27, 2023.

(60) Provisional application No. 63/443,846, filed on Feb. 7, 2023, provisional application No. 63/421,241, filed on Nov. 1, 2022.

(56) References Cited

U.S. PATENT DOCUMENTS

| | | | |
|---|---|---|---|
| 3,410,675 | A | 11/1968 | Dockerty |
| 3,630,704 | A | 12/1971 | Garfinkel et al. |
| 4,726,981 | A | 2/1988 | Pierson et al. |
| 8,854,623 | B2 | 10/2014 | Fontaine et al. |
| 10,189,743 | B2 | 1/2019 | Zadesky et al. |
| 10,781,135 | B2 | 9/2020 | Weber |
| 10,899,654 | B2 | 1/2021 | Li et al. |
| 11,053,162 | B2 | 7/2021 | Andrews et al. |
| 11,320,866 | B2 | 5/2022 | Sunwoo et al. |
| 11,322,054 | B2 | 5/2022 | Park et al. |
| 11,518,708 | B2 | 12/2022 | Weber |
| 11,565,969 | B2 | 1/2023 | Luzzato et al. |
| 11,639,307 | B2 | 5/2023 | Wilson et al. |
| 12,240,781 | B2 * | 3/2025 | Agnello .................. C03C 3/085 |
| 2013/0202715 | A1 | 8/2013 | Wang et al. |
| 2015/0110990 | A1 | 4/2015 | Chou et al. |
| 2019/0016627 | A1 | 1/2019 | Li et al. |
| 2019/0022979 | A1 | 1/2019 | Luzzato et al. |
| 2019/0023611 | A1 | 1/2019 | Luzzato et al. |
| 2019/0112220 | A1 | 4/2019 | Alder et al. |
| 2019/0375679 | A1 | 12/2019 | Gross et al. |
| 2019/0389764 | A1 * | 12/2019 | Andrews ................. C03C 3/097 |
| 2020/0002225 | A1 | 1/2020 | Schneider |
| 2020/0017406 | A1 | 1/2020 | Wilson et al. |
| 2020/0148590 | A1 | 5/2020 | Schneider |
| 2020/0148591 | A1 | 5/2020 | Andrews et al. |
| 2020/0308046 | A1 | 10/2020 | Amin et al. |
| 2020/0377408 | A1 | 12/2020 | Kim et al. |
| 2020/0392038 | A1 | 12/2020 | Park et al. |
| 2021/0080778 | A1 | 3/2021 | Hatano et al. |
| 2021/0107826 | A1 | 4/2021 | Hwang et al. |
| 2021/0384456 | A1 | 12/2021 | Kim et al. |
| 2022/0033299 | A1 | 2/2022 | Sekiya et al. |
| 2022/0106218 | A1 | 4/2022 | Cao et al. |
| 2022/0112119 | A1 | 4/2022 | Amin et al. |
| 2022/0135473 | A1 | 5/2022 | Sunwoo et al. |
| 2022/0194848 | A1 | 6/2022 | Park et al. |
| 2022/0242780 | A1 | 8/2022 | Hunt et al. |
| 2022/0281769 | A1 | 9/2022 | Sekiya et al. |
| 2022/0287195 | A1 | 9/2022 | Chen et al. |
| 2022/0289625 | A1 | 9/2022 | Kanehara et al. |
| 2022/0291712 | A1 | 9/2022 | Baby et al. |
| 2023/0023010 | A1 | 1/2023 | Hu et al. |
| 2023/0168719 | A1 | 6/2023 | Song et al. |
| 2023/0232558 | A1 | 7/2023 | Bartlow et al. |
| 2023/0391666 | A1 | 12/2023 | Sekiya et al. |
| 2024/0002282 | A1 | 1/2024 | Umada et al. |
| 2024/0300855 | A1 | 9/2024 | Chen et al. |
| 2024/0308901 | A1 | 9/2024 | Dietrich et al. |
| 2024/0368031 | A1 * | 11/2024 | Park ........................ C03C 15/00 |

* cited by examiner

FOLDABLE SUBSTRATES, FOLDABLE APPARATUS, AND METHODS OF MAKING

CROSS-REFERENCE TO RELATED APPLICATIONS

This application is a continuation of U.S. application Ser. No. 19/046,040, filed on Feb. 5, 2025, which is a continuation application of U.S. application Ser. No. 18/408,113, filed on Jan. 9, 2024, which is a continuation of International Patent Application Serial No. PCT/US2023/036084, filed on Oct. 27, 2023, which in turn, claims the benefit of priority under 35 U.S.C. § 119 of U.S. Provisional Application Ser. No. 63/443,846, filed on Feb. 7, 2023 and U.S. Provisional Application Ser. No. 63/421,241, filed on Nov. 1, 2022, the contents of each of which are relied upon and incorporated herein by reference in their entireties.

FIELD

The present disclosure relates generally to foldable substrates, foldable apparatus, and methods of making and, more particularly, to foldable substrates comprising a concentration profile of lithium oxide and/or a first central surface area recessed from a first major surface, foldable apparatus including foldable substrates, and methods of making foldable substrates comprising multiple ion-exchange baths.

BACKGROUND

Glass-based substrates are commonly used, for example, in display devices, for example, liquid crystal displays (LCDs), electrophoretic displays (EPD), organic light-emitting diode displays (OLEDs), plasma display panels (PDPs), or the like.

There is a desire to develop foldable versions of displays as well as foldable protective covers to mount on foldable displays. Foldable displays and covers should have good impact and puncture resistance. At the same time, foldable displays and covers should have a small parallel plate distance (e.g., about 10 millimeters (mm) or less). However, plastic displays and covers with a small parallel plate distance tend to have poor impact and/or puncture resistance. Furthermore, conventional wisdom suggests that ultra-thin glass-based sheets (e.g., about 75 micrometers (μm or microns) or less thick) with a small parallel plate distance tend to have poor impact and/or puncture resistance. Furthermore, thicker glass-based sheets (e.g., greater than 125 micrometers) with good impact and/or puncture resistance tend to have relatively large m parallel plate distance (e.g., about 50 millimeters or more). Consequently, there is a need to develop foldable apparatus that have low minimum parallel plate distance, good impact resistance, good puncture resistance, and free of buckling.

SUMMARY

There are set forth herein foldable apparatus comprising foldable substrates, foldable substrates, and methods of making foldable apparatus and foldable substrates comprising foldable substrates that comprise a first portion, a second portion, and a central portion positioned therebetween. The substrate and/or the portions can comprise glass-based and/or ceramic-based portions, which can provide good dimensional stability, reduced incidence of mechanical instabilities, good impact resistance, and/or good puncture resistance. The portions can comprise glass-based and/or ceramic-based portions comprising one or more compressive stress regions, which can further provide increased impact resistance and/or increased puncture resistance. By providing a substrate comprising a glass-based and/or ceramic-based substrate, the substrate can also provide increased impact resistance and/or puncture resistance while simultaneously facilitating good folding performance. In aspects, the substrate thickness can be sufficiently large (e.g., from about 50 micrometers (microns or μm) to about 2 millimeters) to further enhance impact resistance and puncture resistance. Providing foldable substrates comprising a central portion comprising a central thickness that is less than a substrate thickness (e.g., first thickness of the first portion and/or second thickness of the second portion) (e.g., by about 10 μm or more) can enable a small parallel plate distance (e.g., about 10 millimeters or less) based on the reduced thickness in the central portion, which can enable the foldability and/or rollability of the foldable substrate and/or foldable apparatus.

In aspects, the foldable apparatus and/or foldable substrates can comprise one or more recesses, for example, a first central surface area recessed from a first major surface by a first distance and/or a second central surface area recessed from a second major surface by a second distance. Providing a first recess opposite a second recess can provide the central thickness that is less than a substrate thickness. Further, providing a first recess opposite a second recess can reduce a maximum bend-induced strain of the foldable apparatus, for example, between a central portion and a first portion and/or second portion since the central portion comprising the central thickness can be closer to a neutral axis of the foldable apparatus and/or foldable substrates than if only a single recess was provided. Additionally, providing the first distance substantially equal to the second distance can reduce the incidence of mechanical instabilities in the central portion, for example, because the foldable substrate is symmetric about a plane comprising a midpoint in the substrate thickness and the central thickness. Alternatively, providing at least one recess on only one side of the foldable substrate can provide a smooth major surface that, for example, can be facing the user and/or provide a uniform tactile sensation. Likewise, providing at least one recess on only one side of the foldable substrate can be manufactured with only a single chemically strengthening process, reducing processing time, space, materials, and cost as well as potentially increasing throughput.

In aspects, the foldable apparatus and/or foldable substrates can comprise a first transition region attaching the central portion to the first portion and/or a second transition region attaching the central portion to the second portion. Providing transition regions with smoothly and/or monotonically decreasing (e.g., continuously decreasing) thicknesses can reduce stress concentration in the transition regions and/or avoid optical distortions. Providing a sufficient length of the transition region(s) (e.g., about 0.15 mm or more or about 0.3 mm or more) can avoid optical distortions that may otherwise exist from a sharp change in thickness of the foldable substrate. Providing an average transition angle of a first transition surface area of the first transition region relative to the first central surface area that is sufficiently large (e.g., about 167° or more or about 170° or more) can avoid optical distortions and/or reduce visibility of the transition region. Providing a sufficiently small average transition angle (e.g., about 179° or less or about 176° or less) can reduce the amount of the foldable apparatus and/or the foldable substrates having an intermediate thickness that may have reduced impact resistance and/or reduced puncture resistance.

The present disclosure unexpectedly demonstrates that an incidence of buckling and/or saddle warp can be reduced by providing a surface concentration of $Li_2O$ (e.g., as an absolute mol % and/or an amount that the surface concentration is elevated relative to a concentration at the midpoint) from about 0.2 mol % to about 2 mol %, for example, by treating the foldable substrate with a molten salt solution comprising from about 0.02 wt % to about 0.08 wt % of a lithium salt (e.g., for a foldable substrate with a first recess and a second recess opposite the first recess) or with a molten salt solution comprising from about 0.5 wt % to about 1.5 wt % (e.g., from about 0.75 wt % to about 1.25 wt %) of a lithium salt) (e.g., for a foldable substrate with a recess on only one side). The lithium (e.g., lithium salt, lithium oxide) can reduce a mismatch between a chemical strengthening induced expansion strain of the portions of the foldable substrate. Exchanging sodium or potassium (or larger alkali metals) in the foldable substrate with the smaller lithium from the molten salt bath ("reverse ion exchange") can counteract (e.g., decrease) an amount of chemical strengthening induced expansion caused by the simultaneous "forward ion exchange" of smaller ions (e.g., sodium) in the foldable substrate with larger ions (e.g., potassium, cesium, francium, rubidium) in the final molten salt bath. As demonstrated in the Examples discussed below, including a small amount (e.g., from about 0.02 wt % to about 0.08 wt % or from about 0.5 wt % to about 1.5 wt % depending on the geometry of the foldable substrate, as described herein) of a lithium salt in a final molten salt bath unexpectedly reduces an incidence of buckling and/or warp of the foldable substrate (e.g., central portion). However, providing larger amounts of lithium salt may cause large saddle warp, for example, by chemical strengthening induced contraction from the reverse ion exchange of lithium into the foldable substrate generating a different mismatch in chemical strengthening induced expansion strain of portions of the foldable substrate. Providing a high (e.g., about 5 mol % or more) concentration of $K_2O$ (e.g., as an absolute mol % and/or an amount that the surface concentration is elevated relative to a concentration at the midpoint) can provide a large (e.g., about 500 MPa) surface compressive stress that can enable increased fracture resistance.

The foldable substrate can function as a rollable substrate with a central width greater than a second width. Providing a second width of the second portion of about 15% or less of the length of the foldable substrate can provide sufficient width to handle the ends of the foldable substrate during processing, to secure the foldable substrate and/or foldable apparatus as part of an electronic device, and/or to maximize an amount of the foldable substrate and/or foldable apparatus that can be part of a display portion visible to the user. Providing a central portion from about 15% to about 50% of the length of the foldable substrate can enable a display portion of the foldable apparatus to be adjusted as a portion of the rollable substrate is moved into and/or out of view of a user without unnecessarily expanding a size of the corresponding apparatus when in a fully rolled configuration. Providing a first width of the first portion of about 35% or more of the length of the foldable substrate can provide a large display portion visible to the user while ensuring that substantially all of the rest of the foldable substrate (e.g., central portion and second portion) can be within a footprint of the first portion.

Some example aspects of the disclosure are described below with the understanding that any of the features of the various aspects may be used alone or in combination with one another.

Aspect 1. A foldable apparatus comprising a substrate comprising:

- a substrate thickness defined between a first major surface and a second major surface opposite the first major surface;
- a first portion comprising the substrate thickness, a first compressive stress region extending to a first depth of compression from the first major surface, a second compressive stress region extending to a second depth of compression from the second major surface;
- a second portion comprising the substrate thickness, a third compressive stress region extending to a third depth of compression from the first major surface, a fourth compressive stress region extending to a fourth depth of compression from the second major surface;
- a central portion positioned between the first portion and the second portion, the central portion comprising a central thickness defined between a first central surface area and a second central surface area opposite the first central surface area, a first central compressive stress region extending to a first central depth of compression from the first central surface area, a second central compressive stress region extending to a second central depth of compression from the second central surface area, the first central surface area is recessed from the first major surface by a first distance, and the central thickness is less than the substrate thickness; and
- a concentration of lithium oxide at the first central surface area is greater than a concentration of lithium oxide at a central midpoint by from about 0.2 mol % to about 2 mol %, wherein the first portion comprises:

- a midpoint midway between the first major surface and the second major surface;
- a concentration of lithium oxide at the first major surface;
- a total concentration of potassium oxide, rubidium oxide, cesium oxide, and francium oxide at the first major surface;
- a concentration of lithium oxide at the midpoint; and
- a total concentration of potassium oxide, rubidium oxide, cesium oxide, and francium oxide at the midpoint, and wherein the substrate is a glass-based substrate or a ceramic-based substrate, and the central midpoint is midway between the first central surface area and the second central surface area, the central portion comprises:

- a total concentration of potassium oxide, rubidium oxide, cesium oxide, and francium oxide at the first central surface area; and
- a total concentration of potassium oxide, rubidium oxide, cesium oxide, and francium oxide at the central midpoint.

Aspect 2. The foldable apparatus of aspect 1, wherein the total concentration of potassium oxide, rubidium oxide, cesium oxide, and francium oxide at the first major surface is greater than the total concentration of potassium oxide, rubidium oxide, cesium oxide, and francium oxide at the midpoint by from about 5 mol % to about 15 mol %.

Aspect 3. The foldable apparatus of any one of aspects 1-2, wherein the total concentration of potassium oxide, rubidium oxide, cesium oxide, and francium oxide at the first major surface is greater than a concentration of sodium oxide at the first major surface.

Aspect 4. The foldable apparatus of any one of aspects 1-3, wherein the total concentration of potassium oxide, rubidium oxide, cesium oxide, and francium oxide at the first central surface area is greater than a concentration of sodium oxide at the first central surface area.

Aspect 5. The foldable apparatus of any one of aspects 1-4, wherein a ratio of the total concentration of potassium oxide, rubidium oxide, cesium oxide, and francium oxide at the first major surface to the concentration of lithium oxide at the first major surface is from about 1 to about 20.

Aspect 6. The foldable apparatus of any one of aspects 1-5, wherein a ratio of the total concentration of potassium oxide, rubidium oxide, cesium oxide, and francium oxide at the first central surface area to the concentration of lithium oxide at the first central surface area is from about 1 to about 20.

Aspect 7. The foldable apparatus of any one of aspects 1-6, wherein a concentration of potassium oxide at the first major surface is from about 5 mol % to about 15 mol %.

Aspect 8. The foldable apparatus of any one of aspects 1-6, wherein a concentration of potassium oxide at the first central surface area is greater than a concentration of potassium oxide at the central midpoint by from about 5 mol % to about 15 mol %.

Aspect 9. The foldable apparatus of any one of aspects 1-6, wherein a concentration of potassium oxide at the first central surface area is from about 5 mol % to about 15 mol %.

Aspect 10. The foldable apparatus of any one of aspects 1-6, wherein a concentration of potassium oxide at the first central surface area is substantially equal to a concentration of potassium oxide at the first major surface.

Aspect 11. The foldable apparatus of any one of aspects 1-6, wherein a ratio of a concentration of potassium oxide at the first major surface to the concentration of lithium oxide at the first major surface is from about 1 to about 20.

Aspect 12. The foldable apparatus of any one of aspects 1-6, wherein a ratio of a concentration of potassium oxide at the first central surface area to the concentration of lithium oxide at the first central surface area is from about 1 to about 20.

Aspect 13. The foldable apparatus of any one of aspects 1-6, wherein a concentration profile of potassium oxide in the first portion is elevated relative to a concentration of potassium oxide at the midpoint to a depth from the first major surface of about 10% of the substrate thickness or more.

Aspect 14. The foldable apparatus of any one of aspects 1-6, wherein a concentration profile of potassium oxide in the first portion is elevated relative to a concentration of potassium oxide at the midpoint to a depth from the first major surface of about 10 micrometers or more.

Aspect 15. The foldable apparatus of any one of aspects 1-14, wherein the concentration of lithium oxide at the first major surface is greater than the concentration of lithium oxide at the midpoint of the first portion by from about 0.2 mol % to about 2 mol %.

Aspect 16. The foldable apparatus of any one of aspects 1-14, wherein the concentration of lithium oxide at the first major surface is greater than the concentration of lithium oxide at the midpoint of the first portion by from about 1 mol % to about 3 mol %.

Aspect 17. The foldable apparatus of any one of aspects 1-15, wherein the concentration of lithium oxide at the first major surface is from about 0.2 mol % to about 2 mol %.

Aspect 18. The foldable apparatus of any one of aspects 1-14 and 16 inclusive, wherein the concentration of lithium oxide at the first major surface is from about 1.5 mol % to about 2.5 mol %.

Aspect 19. The foldable apparatus of any one of aspects 1-18, wherein the concentration of lithium oxide at the first central surface area is from about 0.2 mol % to about 2 mol %.

Aspect 20. The foldable apparatus of any one of aspects 1-18, wherein the concentration of lithium oxide at the first central surface area is from about 0.75 mol % to about 1.5 mol %.

Aspect 21. The foldable apparatus of any one of aspects 1-20, wherein the concentration of lithium oxide at the first central surface area is substantially equal to the concentration of lithium oxide at the first major surface.

Aspect 22. The foldable apparatus of any one of aspects 1-21, wherein a concentration profile of the lithium oxide in the first portion is elevated relative to the concentration of lithium oxide at the midpoint to a depth from the first major surface of about 5% of the substrate thickness or more.

Aspect 23. The foldable apparatus of any one of aspects 1-21, wherein a concentration profile of the lithium oxide in the first portion is elevated relative to the concentration of lithium oxide at the midpoint to a depth from the first major surface from about 3 micrometers to about 15 micrometers.

Aspect 24. The foldable apparatus of any one of aspects 1-21, wherein a concentration profile of the lithium oxide in the central portion is elevated relative to the concentration of lithium oxide at the central midpoint to a depth from the first central surface area of about 5% of the central thickness or more.

Aspect 25. The foldable apparatus of any one of aspects 1-21, wherein a concentration profile of the lithium oxide in the central portion is elevated relative to the concentration of lithium oxide at the central midpoint to a depth from about 3 micrometers to about 15 micrometers.

Aspect 26. The foldable apparatus of any one of aspects 1-25, wherein a first maximum compressive stress at the first major surface is about 500 MPa or more.

Aspect 27. The foldable apparatus of aspect 26, wherein a second maximum compressive stress at the second major surface is substantially equal to the first maximum compressive stress.

Aspect 28. The foldable apparatus of any one of aspects 1-27, wherein a first central maximum compressive stress at the first central surface area is about 500 MPa or more.

Aspect 29. The foldable apparatus of aspect 28, wherein a second central maximum compressive stress at the second central surface area is substantially equal to the first central maximum compressive stress.

Aspect 30. The foldable apparatus of any one of aspects 1-29, wherein the substrate thickness is from about 50 micrometers to about 2 millimeters.

Aspect 31. The foldable apparatus of aspect 30, wherein the substrate thickness is from about 90 micrometers to about 200 micrometers.

Aspect 32. The foldable apparatus of any one of aspects 1-31, wherein the central thickness is from about 25 micrometers to about 120 micrometers.

Aspect 33. The foldable apparatus of aspect 32, wherein the central thickness is from about 25 micrometers to about 60 micrometers.

Aspect 34. The foldable apparatus of any one of aspects 1-33, wherein the first distance is from about 20% to about 45% of the substrate thickness.

Aspect 35. The foldable apparatus of any one of aspects 1-34, wherein the foldable apparatus achieves a parallel plate distance from 1 millimeter to 10 millimeters.

Aspect 36. The foldable apparatus of any one of aspects 1-34, wherein the foldable apparatus achieves a parallel plate distance of 5 millimeters.

Aspect 37. The foldable apparatus of any one of aspects 1-36, wherein the second central surface area is recessed from the second major surface by a second distance, the second distance is from about 20% to about 45% of the substrate thickness.

Aspect 38. The foldable apparatus of aspect 37, wherein the first distance is substantially equal to the second distance.

Aspect 39. The foldable apparatus of any one of aspects 1-36, wherein the second major surface is coplanar with the second central surface area.

Aspect 40. The foldable apparatus of any one of aspects 1-36, wherein the second major surface further comprises the second central surface area.

Aspect 41. The foldable apparatus of any one of aspects 37-40, wherein a concentration of lithium oxide at the second central surface area is substantially equal to the concentration of lithium oxide at the first central surface area.

Aspect 42. The foldable apparatus of any one of aspects 37-40, wherein a concentration of potassium oxide at the second central surface area is substantially equal to the concentration of potassium oxide at the first central surface area.

Aspect 43. The foldable apparatus of any one of aspects 1-42, wherein a surface profile of the first central surface area along a midline midway between the first portion and the second portion exhibits a warp of 1 millimeter or less.

Aspect 44. The foldable apparatus of any one of aspects 1-42, wherein a surface profile of the first central surface area along a midline midway between the first portion and the second portion exhibits a warp of 600 micrometers or less.

Aspect 45. The foldable apparatus of any one of aspects 1-44, wherein a surface profile of the first central surface area has an average gradient of about 0.018 mm/mm or less.

Aspect 46. The foldable apparatus of any one of aspects 1-44, wherein a surface profile of the first central surface area has an average gradient of about 0.015 mm/mm or less.

Aspect 47. The foldable apparatus of any one of aspects 1-46, wherein a width of the first portion, a width of the central portion, and a width of the second portion are measured in a direction corresponding to a dimension of the substrate, the width of the central portion as a percentage of the dimension of the substrate is about 15% or more.

Aspect 48. The foldable apparatus of aspect 47, wherein the width of the second portion is less than the width of central portion.

Aspect 49. The foldable apparatus of any one of aspects 47-48, wherein the width of central portion as a percentage of the dimension of the substrate is from about 15% to about 50%.

Aspect 50. A consumer electronic product, comprising:

a housing comprising a front surface, a back surface, and side surfaces;

electrical components at least partially within the housing, the electrical components comprising a controller, a memory, and a display, the display at or adjacent the front surface of the housing; and a cover substrate disposed over the display, wherein at least one of a portion of the housing or the cover substrate comprises the foldable apparatus of any one of aspects 1-49.

Aspect 51. A substrate comprising:

a substrate thickness defined between a first major surface and a second major surface opposite the first major surface;

a first compressive stress region extending to a first depth of compression from the first major surface, a second compressive stress region extending to a second depth of compression from the second major surface;

a concentration of lithium oxide at the first major surface is greater than a concentration of lithium oxide at a midpoint midway between the first major surface and the second major surface by from about 0.2 mol % to about 2 mol %; and a total concentration of potassium oxide, rubidium oxide, cesium oxide, and francium oxide at the first major surface is greater than a total concentration of potassium oxide, rubidium oxide, cesium oxide, and francium oxide at the midpoint by from about 5 mol % to about 15 mol %.

Aspect 52. A substrate comprising:

a substrate thickness defined between a first major surface and a second major surface opposite the first major surface;

a first compressive stress region extending to a first depth of compression from the first major surface, a second compressive stress region extending to a second depth of compression from the second major surface;

a concentration of lithium oxide at the first major surface is greater than a concentration of lithium oxide at a midpoint midway between the first major surface and the second major surface by from about 1 mol % to about 3 mol %; and a total concentration of potassium oxide, rubidium oxide, cesium oxide, and francium oxide at the first major surface is greater than a total concentration of potassium oxide, rubidium oxide, cesium oxide, and francium oxide at the midpoint by from about 5 mol % to about 15 mol %.

Aspect 53. A substrate comprising:

a substrate thickness defined between a first major surface and a second major surface opposite the first major surface;

a first compressive stress region extending to a first depth of compression from the first major surface, a second compressive stress region extending to a second depth of compression from the second major surface;

a concentration of lithium oxide at the first major surface is greater than a concentration of lithium oxide at a midpoint midway between the first major surface and the second major surface by from about 0.2 mol % to about 2 mol %; and a total concentration of potassium oxide, rubidium oxide, cesium oxide, and francium oxide at the first major surface is from about 5 mol % to about 15 mol %.

Aspect 54. The substrate of any one of aspects 51-53, wherein a concentration of potassium oxide at the first major surface is from about 5 mol % to about 15 mol %.

Aspect 55. The substrate of any one of aspects 51-53, wherein a concentration of potassium oxide at the first major surface is greater than a concentration of potassium oxide at the midpoint by from about 5 mol % to about 15 mol %.

Aspect 56. The substrate of any one of aspects 54-55, wherein a ratio of the concentration of potassium oxide at the first major surface to the concentration of lithium oxide at the first major surface is in a range from about 1 to about 20.

Aspect 57. The substrate of any one of aspects 51-56, wherein a ratio of total concentration of potassium oxide, rubidium oxide, cesium oxide, and francium oxide at the first major surface to the concentration of lithium oxide at the first major surface is in a range from about 1 to about 20.

Aspect 58. A substrate comprising:

a substrate thickness defined between a first major surface and a second major surface opposite the first major surface;

a first compressive stress region extending to a first depth of compression from the first major surface, a second compressive stress region extending to a second depth of compression from the second major surface, wherein a ratio of a total concentration of potassium oxide, rubidium oxide, cesium oxide, and francium oxide at the first major surface to the concentration of lithium oxide at the first major surface is in a range from about 1 to about 20.

Aspect 59. The substrate of aspect 58, wherein a concentration of lithium oxide at the first major surface is greater than a concentration of lithium oxide at a midpoint midway between the first major surface and the second major surface by from about 0.2 mol % to about 2 mol %.

Aspect 60. The foldable apparatus of aspects 58, wherein the concentration of lithium oxide at the first major surface is greater than the concentration of lithium oxide at the midpoint of the first portion by from about 1 mol % to about 3 mol %.

Aspect 61. The substrate of any one of aspects 51-57 and 59-60 inclusive, wherein a concentration profile of lithium oxide in the first portion is elevated relative to the concentration of lithium oxide at the midpoint to a depth from the first major surface of about 5% of the substrate thickness or more.

Aspect 62. The substrate of any one of aspects 51-57 and 59-60 inclusive, wherein a concentration profile of lithium oxide in the first portion is elevated relative to the concentration of lithium oxide at the midpoint to a depth from the first major surface from about 3 micrometers to about 15 micrometers.

Aspect 63. The substrate of any one of aspects 51-57 and 59-62 inclusive, wherein a concentration profile of the total concentration of potassium oxide, rubidium oxide, cesium oxide, and francium oxide in the first portion is elevated relative to the total concentration of potassium oxide, rubidium oxide, cesium oxide, and francium oxide at the midpoint to a depth from the first major surface of about 10% of the substrate thickness or more.

Aspect 64. The substrate of any one of aspects 51-57 and 59-63 inclusive, wherein a concentration profile of the total concentration of potassium oxide, rubidium oxide, cesium oxide, and francium oxide in the first portion is elevated relative to the total concentration of potassium oxide, rubidium oxide, cesium oxide, and francium oxide at the midpoint to a depth from the first major surface of about 10 micrometers or more.

Aspect 65. The substrate of any one of aspects 51-57 and 59-64 inclusive, wherein a concentration of lithium oxide at the second major surface is greater than the concentration of lithium oxide at the midpoint by from about 0.2 mol % to about 2 mol %.

Aspect 66. The substrate of aspect 65, wherein the concentration of lithium oxide at the second major surface is substantially equal to the concentration of lithium oxide at the first major surface.

Aspect 67. The substrate of any one of aspects 51-57 and 59-66 inclusive, wherein a total concentration of potassium oxide, rubidium oxide, cesium oxide, and francium oxide at the second major surface is from about 5 mol % to about 15 mol %.

Aspect 68. The substrate of any one of aspects 51-57 and 59-66 inclusive, wherein a total concentration of potassium oxide, rubidium oxide, cesium oxide, and francium oxide at the second major surface is substantially equal to the total concentration of potassium oxide, rubidium oxide, cesium oxide, and francium oxide at the first major surface.

Aspect 69. The substrate of any one of aspects 51-57 and 59-68 inclusive, wherein 95% or more of lithium oxide in the substrate is located within 10 micrometers of the first major surface or within 10 micrometers of the second major surface.

Aspect 70. The substrate of any one of aspects 51-57 and 59-69 inclusive, wherein the total concentration of potassium oxide, rubidium oxide, cesium oxide, and francium oxide at the first major surface is greater than a concentration of sodium oxide at the first major surface.

Aspect 71. The substrate of any one of aspects 51-53 and 58-70 inclusive, wherein a concentration of potassium oxide at the first major surface to the concentration of lithium oxide at the first major surface is in a range from about 1 to about 20.

Aspect 72. The substrate of any one of aspects 51-53 and 58-70 inclusive, wherein a concentration profile of potassium oxide in the first portion is elevated relative to a concentration of potassium oxide at the midpoint to a depth from the first major surface of about 10% of the substrate thickness or more.

Aspect 73. The substrate of any one of aspects 51-53 and 58-70 inclusive, wherein a concentration profile of potassium oxide in the first portion is elevated relative to a concentration of potassium oxide at the midpoint to a depth from the first major surface of about 10 micrometers or more.

Aspect 74. The substrate of any one of aspects 51-53 and 58-70 inclusive, wherein a concentration of potassium oxide at the second major surface is from about 5 mol % to about 15 mol %.

Aspect 75. The substrate of any one of aspects 51-53 and 58-70 inclusive, wherein a concentration of potassium oxide at the second major surface is substantially equal to a concentration of potassium oxide at the first major surface.

Aspect 76. The substrate of any one of aspects 51-53 and 58-70 inclusive, wherein a concentration of potassium oxide at the first major surface is greater than a concentration of sodium oxide at the first major surface.

Aspect 77. The substrate of any one of aspects 51-76, wherein a first maximum compressive stress at the first major surface is about 500 MPa or more.

Aspect 78. The substrate of aspect 77, wherein a second maximum compressive stress at the second major surface is about 500 MPa or more.

Aspect 79. The substrate of aspect 78, wherein the second maximum compressive stress is substantially equal to the first maximum compressive stress.

Aspect 80. The substrate of any one of aspects 51-79, wherein the substrate thickness is from about 50 micrometers to about 2 millimeters.

Aspect 81. The substrate of aspect 80, wherein the substrate thickness is from about 90 micrometers to about 200 micrometers.

Aspect 82. The substrate of any one of aspects 51-81, wherein the substrate is a glass-based substrate or a ceramic-based substrate.

Aspect 83. The substrate of any one of aspects 42-72, further comprising:

a first portion comprising the substrate thickness;

a second portion comprising the substrate thickness; and a central portion positioned between the first portion and the second portion, the central portion comprising a central thickness defined between a first central surface area and a second central surface area opposite the first central surface area, a first central compressive stress region extending to a first central depth of compression from the first central surface area, a second central compressive stress region extending to a second central depth of compression from the second central surface area, the first central surface area is recessed from the first major surface by a first distance, and the central thickness is less than the substrate thickness, wherein the central portion comprises a concentration of lithium at the first central surface area, a total concentration of potassium oxide, rubidium oxide, cesium oxide, and francium oxide at the first central surface area, and a central midpoint midway between the first central surface area and the second central surface area.

Aspect 84. The substrate of aspect 73, wherein the concentration of lithium oxide at the first central surface area is greater than a concentration of lithium oxide at the central midpoint by from about 0.2 mol % to about 2 mol %.

Aspect 85. The foldable apparatus of aspect 83, wherein the concentration of lithium oxide at the first central surface area is from about 0.75 mol % to about 1.5 mol %.

Aspect 86. The substrate of any one of aspects 83-85, wherein a concentration profile of lithium oxide in the central portion is elevated relative to the concentration of lithium oxide at the central midpoint to a depth from the first central surface area of about 5% of the central thickness or more.

Aspect 87. The substrate of any one of aspects 83-85, wherein a concentration profile of lithium oxide in the central portion is elevated relative to the concentration of lithium oxide at the central midpoint to a depth from the first central surface area from about 3 micrometers to about 15 micrometers.

Aspect 88. The substrate of any one of aspects 83-87, wherein the total concentration of potassium oxide, rubidium oxide, cesium oxide, and francium oxide at the first central surface area is greater than a total concentration of potassium oxide, rubidium oxide, cesium oxide, and francium oxide at the central midpoint by from about 5 mol % to about 15 mol %.

Aspect 89. The substrate of aspect 88, wherein a concentration profile of the total concentration of potassium oxide, rubidium oxide, cesium oxide, and francium oxide in the central portion is elevated relative to the total concentration of potassium oxide, rubidium oxide, cesium oxide, and francium oxide at the central midpoint to a depth from the first central surface area of about 10% of the central thickness or more.

Aspect 90. The substrate of aspect 88, wherein a concentration profile of the total concentration of potassium oxide, rubidium oxide, cesium oxide, and francium oxide in the central portion is elevated relative to the total concentration of potassium oxide, rubidium oxide, cesium oxide, and francium oxide at the central midpoint to a depth from the first central surface area of about 10 micrometers or more.

Aspect 91. The substrate of any one of aspects 83-90, wherein a ratio of the total concentration of potassium oxide, rubidium oxide, cesium oxide, and francium oxide at the first central surface area to the concentration of lithium oxide at the first central surface area is in a range from about 1 to about 20.

Aspect 92. The substrate of any one of aspects 83-91, wherein the concentration of lithium oxide at the first major surface is substantially equal to the concentration of lithium oxide at the first central surface area.

Aspect 93. The substrate of any one of aspects 83-91, wherein the total concentration of potassium oxide, rubidium oxide, cesium oxide, and francium oxide at the first major surface is substantially equal to the total concentration of potassium oxide, rubidium oxide, cesium oxide, and francium oxide at the first central surface area.

Aspect 94. The substrate of any one of aspects 83-93, wherein a concentration of potassium oxide at the first central surface area is greater than a concentration of potassium oxide at the central midpoint by from about 5 mol % to about 15 mol %.

Aspect 95. The substrate of aspect 94, wherein a concentration profile of potassium oxide in the central portion is elevated relative to the concentration of potassium oxide at the central midpoint to a depth from the first central surface area of about 10% of the central thickness or more.

Aspect 96. The substrate of aspect 94, wherein a concentration profile of potassium oxide in the central portion is elevated relative to the concentration of potassium oxide at the central midpoint to a depth from the first central surface area of about 10 micrometers or more.

Aspect 97. The substrate of any one of aspects 94-96, wherein a ratio of the concentration of potassium oxide at the first central surface area to the concentration of lithium oxide at the first central surface area is in a range from about 1 to about 20.

Aspect 98. The substrate of any one of aspects 94-97, wherein the concentration of potassium oxide at the first major surface is substantially equal to the concentration of potassium oxide at the first central surface area.

Aspect 99. The substrate of any one of aspects 84-98, wherein the central thickness is from about 25 micrometers to about 120 micrometers.

Aspect 100. The substrate of aspect 99, wherein the central thickness is from about 25 micrometers to about 60 micrometers.

Aspect 101. The substrate of any one of aspects 84-100, wherein the first distance is from about 20% to about 45% of the substrate thickness.

Aspect 102. The substrate of any one of aspects 84-101, wherein the substrate achieves a parallel plate distance from 1 millimeter to 10 millimeters.

Aspect 103. The substrate of any one of aspects 84-101, wherein the substrate achieves a parallel plate distance of 5 millimeters.

Aspect 104. The substrate of any one of aspects 73-92, wherein the second central surface area is recessed from the second major surface by a second distance, the second distance is from about 20% to about 45% of the substrate thickness.

Aspect 105. The substrate of aspect 93, wherein the first distance is substantially equal to the second distance.

Aspect 106. The foldable apparatus of any one of aspects 73-103, wherein the second major surface is coplanar with the second central surface area.

Aspect 107. The foldable apparatus of any one of aspects 73-103, wherein the second major surface further comprises the second central surface area.

Aspect 108. The substrate of any one of aspects 104-107, wherein a concentration of lithium oxide at the second central surface area is substantially equal to the concentration of lithium oxide at the first central surface area.

Aspect 109. The substrate of any one of aspects 104-108, wherein a total concentration of potassium oxide, rubidium oxide, cesium oxide, and francium oxide at the second central surface area is substantially equal to total concentration of potassium oxide, rubidium oxide, cesium oxide, and francium oxide at the first central surface area.

Aspect 110. The foldable apparatus of any one of aspects 73-109, wherein a surface profile of the first central surface area along a midline midway between the first portion and the second portion exhibits a warp of 1 millimeter or less.

Aspect 111. The substrate of any one of aspects 73-109, wherein a surface profile of the first central surface area along a midline midway between the first portion and the second portion exhibits a warp of 600 micrometers or less.

Aspect 112. The foldable apparatus of any one of aspects 73-111, wherein a surface profile of the first central surface area has an average gradient of about 0.018 mm/mm or less.

Aspect 113. The substrate of any one of aspects 73-111, wherein a surface profile of the first central surface area has an average gradient of about 0.015 mm/mm or less.

Aspect 114. The foldable apparatus of any one of aspects 73-113, wherein a width of the first portion, a width of the central portion, and a width of the second portion are measured in a direction corresponding to a dimension of the substrate, the width of the central portion as a percentage of the dimension of the substrate is about 15% or more.

Aspect 115. The foldable apparatus of aspect 114, wherein the width of the second portion is less than the width of central portion.

Aspect 116. The foldable apparatus of any one of aspects 114-115, wherein the width of central portion as a percentage of the dimension of the substrate is from about 15% to about 50%.

Aspect 117. A consumer electronic product, comprising:

a housing comprising a front surface, a back surface, and side surfaces;

electrical components at least partially within the housing, the electrical components comprising a controller, a memory, and a display, the display at or adjacent the front surface of the housing; and a cover substrate disposed over the display, wherein at least one of a portion of the housing or the cover substrate comprises the substrate of any one of aspects 51-116.

Aspect 118. A method of forming a foldable apparatus comprising: chemically strengthening a substrate in a first molten salt bath maintained at from about 380° C. to about 530° C. for a first period of time from about 20 minutes to about 8 hours; and then immersing the substrate in a second molten salt bath maintained at from about 380° C. to about 480° C. for a second period of time from about 1 minute to about 10 minutes, wherein the second molten salt bath comprises a higher concentration of a lithium salt than the first molten salt bath, the second molten salt bath comprises less than 0.4 wt % of the lithium salt, the substrate comprising a substrate thickness defined between a first major surface and a second major surface opposite the first major surface, and the substrate comprises a glass-based substrate or a ceramic-based substrate.

Aspect 119. The method of aspect 118, further comprising, after the chemically strengthening the substrate and before the immersing the substrate, forming at least one recess in a central portion of the substrate to form a substrate, a first recess defined between a first central surface area and a first plane defined by the first major surface, the first central surface area recessed from the first major surface by a first distance, the central portion comprising a central thickness defined between the first central surface area and a second central surface area opposite the first central surface area, the central portion comprising a central midpoint midway between the first central surface area and the second central surface area, and the substrate comprising a midpoint midway between the first major surface and the second major surface.

Aspect 120. The method of aspect 119, wherein the first distance is from about 20% to about 45% of the substrate thickness.

Aspect 121. The method of any one of aspects 119-120, wherein the forming the at least one recess in the central portion further comprises forming a second recess defined between the second central surface area and a second plane defined by the second major surface, and the second central surface area recessed from the second major surface by a second distance.

Aspect 122. The method of aspect 121, wherein the first distance is substantially equal to the second distance.

Aspect 123. The method of any one of aspects 119-122, wherein the substrate thickness is from about 50 micrometers to about 2 millimeters.

Aspect 124. The method of any one of aspects 119-123, wherein the central thickness is from about 25 micrometers to about 120 micrometers.

Aspect 125. The method of any one of aspects 119-124, wherein, after the immersing the substrate, a concentration of lithium oxide at the first central surface area is greater than a concentration of lithium oxide at the central midpoint by from about 0.2 mol % to about 2 mol %.

Aspect 126. The method of any one of aspects 119-124, wherein the concentration of lithium oxide at the first central surface area is from about 0.2 mol % to about 2 mol %.

Aspect 127. The method of any one of aspects 125-126, wherein, after the immersing the substrate, a concentration of lithium oxide at the second central surface area is substantially equal to the concentration of lithium oxide at the first major surface.

Aspect 128. The method of any one of aspects 125-127, wherein the concentration of lithium oxide at the first central surface area is substantially equal to the concentration of lithium oxide at the first major surface.

Aspect 129. The method of any one of aspects 125-128, wherein, after the immersing the substrate, a concentration profile of lithium oxide in the central portion is elevated relative to the concentration of lithium oxide at the central midpoint to a depth from the first central surface area of about 5% of the central thickness or more.

Aspect 130. The method of any one of aspects 125-128, wherein, after the immersing the substrate, a concentration profile of lithium oxide in the central portion is elevated relative to the concentration of lithium oxide at the midpoint to a depth from the first central surface area from about 3 micrometers to about 15 micrometers.

Aspect 131. The method of any one of aspects 119-130, wherein, after the immersing the substrate, a concentration of potassium oxide at the first central surface area is greater than the concentration of potassium oxide at the central midpoint by from about 5 mol % to about 15 mol %.

Aspect 132. The method of any one of aspects 119-130, wherein the concentration of potassium oxide at the first central surface area is from about 5 mol % to about 15 mol %.

Aspect 133. The method of any one of aspects 131-132, wherein, after the immersing the substrate, a concentration of potassium oxide at the second central surface area is substantially equal to the concentration of potassium oxide at the first central surface area.

Aspect 134. The method of any one of aspects 119-133, wherein the concentration of potassium oxide at the first central surface area is greater than a concentration of sodium oxide at the first central surface area.

Aspect 135. The method of any one of aspects 119-134, wherein, after the immersing the substrate, a first central maximum compressive stress at the first central surface area is about 500 MPa or more.

Aspect 136. The method of aspect 135, wherein a second central maximum compressive stress at the second central surface area is substantially equal to the first central maximum compressive stress.

Aspect 137. The method of any one of aspects 119-136, wherein, after the immersing the substrate, a surface profile of the first central surface area along a midline of the central portion exhibits a warp of 600 micrometers or less.

Aspect 138. The method of any one of aspects 119-136, wherein, after the immersing the substrate, a surface profile of the first central surface area has an average gradient of about 0.015 mm/mm or less.

Aspect 139. The method of any one of aspects 118-138, wherein the second molten salt bath comprises from about 0.02 wt % to about 0.08 wt % of the lithium salt.

Aspect 140. The method of any one of aspects 118-139, wherein the second molten salt bath comprises:

from 0.02 wt % to about 0.08 wt % of the lithium salt;
from 70 wt % to about 99.98 wt % of a potassium salt;
from 0 wt % to about 29.98 wt % of a sodium salt; and
from 0 wt % to about 1 wt % silicic acid.

Aspect 141. The method of any one of aspects 118-140, wherein the first molten salt bath is free of lithium.

Aspect 142. The method of any one of aspects 118-141, wherein, after the immersing the substrate, a concentration of lithium oxide at the first major surface is greater than the concentration of lithium oxide at the midpoint by from about 0.2 mol % to about 2 mol %, and the midpoint is midway between the first major surface and the second major surface.

Aspect 143. The method of any one of aspects 118-141, wherein, after the immersing the substrate, a concentration of lithium oxide at the first major surface is from about 0.2 mol % to about 2 mol %.

Aspect 144. The method of any one of aspects 118-143, wherein, after the immersing the substrate, a concentration profile of lithium oxide in the first portion is elevated relative to the concentration of lithium oxide at the midpoint to a depth from the first major surface of about 5% of the substrate thickness or more.

Aspect 145. The method of any one of aspects 118-144, wherein, after the immersing the substrate, a concentration profile of lithium oxide in the first portion is elevated relative to the concentration of lithium oxide at the midpoint to a depth from the from the first major surface from about 3 micrometers to about 15 micrometers.

Aspect 146. The method of any one of aspects 118-145, wherein, after the immersing the substrate, a concentration of potassium oxide at the first major surface is greater than the concentration of potassium oxide at the midpoint by from about 5 mol % to about 15 mol %.

Aspect 147. The method of any one of aspects 118-145, wherein, after the immersing the substrate, a concentration of potassium oxide at the first major surface is from about 5 mol % to about 15 mol %.

Aspect 148. The method of any one of aspects 146-147, wherein, after the immersing the substrate, the concentration of potassium oxide at the first central surface area is substantially equal to the concentration of potassium oxide at the first major surface.

Aspect 149. The method of any one of aspects 146-148, wherein, after the immersing the substrate, the concentration of potassium oxide at the first major surface is greater than a concentration of sodium oxide at the first major surface.

Aspect 150. The method of any one of aspects 118-149, wherein, after the immersing the substrate, a concentration profile of potassium oxide in the first portion is elevated relative to the concentration of potassium oxide at the midpoint to a depth from the first major surface of about 10% of the substrate thickness or more.

Aspect 151. The method of any one of aspects 118-149, wherein, after the immersing the substrate, a concentration profile of potassium oxide in the first portion is elevated relative to the concentration of potassium oxide at the midpoint to a depth from the first major surface of about 10 micrometers or more.

Aspect 152. The method of any one of aspects 118-151, further comprising, after the immersing the substrate, removing from about 100 nanometers to about 2 micrometers from the first major surface.

Aspect 153. The method of any one of aspects 118-152, wherein the substrate achieves a parallel plate distance from 1 millimeter to 10 millimeters.

Aspect 154. The method of any one of aspects 118-152, wherein the substrate achieves a parallel plate distance of 5 millimeters.

Aspect 155. A method of forming a foldable apparatus comprising:

immersing a substrate in a molten salt bath maintained at from about 380° C. to about 480° C. for a period of time from about 1 minute to about 10 minutes, the molten salt bath comprising:
from 0.02 wt % to about 0.08 wt % of a lithium salt; and
from 70 wt % to about 99.98 wt % of a potassium salt,
wherein the substrate comprises a substrate thickness defined between a first major surface and a second major surface opposite the first major surface.

Aspect 156. The method of aspect 155, wherein the molten salt bath further comprises:

from 0 wt % to about 29.98 wt % of a sodium salt; and
from 0 wt % to about 1 wt % silicic acid.

Aspect 157. The method of aspect 156, wherein the molten salt bath consists of the lithium salt, the potassium salt, and optionally silicic acid.

Aspect 158. The method of any one of aspects 155-157, wherein after the immersing the substrate, a concentration of lithium oxide at the first major surface is greater than the concentration of lithium oxide at the midpoint by from about 0.2 mol % to about 2 mol %, and the midpoint is midway between the first major surface and the second major surface.

Aspect 159. The method of any one of aspects 155-157, wherein, after the immersing the substrate, a concentration of lithium oxide at the first major surface is from about 0.2 mol % to about 2 mol %.

Aspect 160. The method of any one of aspects 155-159, wherein, after the immersing the substrate, a concentration profile of lithium oxide in the first portion is elevated relative to the concentration of lithium oxide at the midpoint to a depth from the first major surface of about 5% of the substrate thickness or more.

Aspect 161. The method of any one of aspects 155-159, wherein, after the immersing the substrate, a concentration profile of lithium oxide in the first portion is elevated relative to the concentration of lithium oxide at the midpoint to a depth from the first major surface of about 3 micrometers to about 15 micrometers.

Aspect 162. The method of any one of aspects 155-161, wherein, after the immersing the substrate, a concentration of potassium oxide at the first major surface is greater than the concentration of potassium oxide at the midpoint by from about 5 mol % to about 15 mol %

Aspect 163. The method of any one of aspects 155-161, wherein, after the immersing the substrate, a concentration of potassium oxide at the first major surface is from about 5 mol % to about 15 mol %.

Aspect 164. The method of any one of aspects 162-163, wherein, after the immersing the substrate, the concentration of potassium oxide at the first central surface area is substantially equal to the concentration of potassium oxide at the first major surface.

Aspect 165. The method of any one of aspects 162-164, wherein, after the immersing the substrate, the concentration of potassium oxide at the first major surface is greater than a concentration of sodium oxide at the first major surface.

Aspect 166. The method of any one of aspects 155-165, wherein, after the immersing the substrate, a concentration profile of potassium oxide in the first portion is elevated relative to the concentration of potassium oxide at the midpoint to a depth from the first major surface of about 10% of the substrate thickness or more.

Aspect 167. The method of any one of aspects 155-165, wherein, after the immersing the substrate, a concentration profile of potassium oxide in the first portion is elevated relative to the concentration of potassium oxide at the midpoint to a depth from the first major surface of about 10 micrometers or more.

Aspect 168. The method of any one of aspects 155-167, further comprising, after the immersing the substrate, removing from about 100 nanometers to about 2 micrometers from the first major surface and from about 100 nanometers to about 2 micrometers from the second major surface.

Aspect 169. The method of any one of aspects 155-168, wherein the substrate thickness is from about 50 micrometers to about 2 millimeters.

Aspect 170. The method of any one of aspects 155-169, wherein the substrate achieves a parallel plate distance from 1 millimeter to 10 millimeters.

Aspect 171. The method of any one of aspects 155-169, wherein the substrate achieves a parallel plate distance of 5 millimeters.

Aspect 172. The method of any one of aspects 155-171, wherein the substrate comprises a glass-based substrate or a ceramic-based substrate.

Aspect 173. The method of any one of aspects 155-172, wherein the substrate comprises at least one recess in a central portion, a first recess defined between a first central surface area and a first plane defined by the first major surface, the first central surface area recessed from the first major surface by a first distance, and the central portion comprising a central thickness defined between the first central surface area and a second central surface area opposite the first central surface area.

Aspect 174. The method of aspect 173, wherein the first distance is from about 20% to about 45% of the substrate thickness.

Aspect 175. The method of any one of aspects 173-174, wherein the second central surface area is recessed from the second major surface by a second distance.

Aspect 176. The method of aspect 175, wherein the first distance is substantially equal to the second distance.

Aspect 177. The method of any one of aspects 173-176, wherein the central thickness is from about 25 micrometers to about 120 micrometers.

Aspect 178. A method of forming a foldable apparatus comprising:

chemically strengthening a substrate in a molten salt bath maintained at from about 380° C. to about 430° C. for a period of time from about 3 minutes to about 2 hours, wherein the molten salt bath comprises from about 0.5 wt % to about 1.5 wt % of a lithium salt, the substrate comprising a substrate thickness defined between a first major surface and a second major surface opposite the first major surface, and the substrate comprises a glass-based substrate or a ceramic-based substrate.

Aspect 179. The method of aspect 178, wherein the substrate is substantially unstrengthened before the chemically strengthening the substrate.

Aspect 180. The method of any one of aspects 178-179, further comprising, before the chemically strengthening the substrate, forming at least one recess in a central portion of the substrate to form a substrate, a first recess defined between a first central surface area and a first plane defined by the first major surface, the first central surface area recessed from the first major surface by a first distance, the central portion comprising a central thickness defined between the first central surface area and a second central surface area opposite the first central surface area, the central portion comprising a central midpoint midway between the first central surface area and the second central surface area, and the substrate comprising a midpoint midway between the first major surface and the second major surface.

Aspect 181. The method of aspect 180, wherein the second major surface further comprises the second central surface area.

Aspect 182. The method of any one of aspects 180-181, wherein the first distance is from about 20% to about 45% of the substrate thickness.

Aspect 183. The method of any one of aspects 180-182, wherein the substrate thickness is from about 50 micrometers to about 2 millimeters.

Aspect 184. The method of any one of aspects 180-183, wherein the central thickness is from about 25 micrometers to about 120 micrometers.

Aspect 185. The method of any one of aspects 180-184, wherein, after the chemically strengthening the substrate, a concentration of lithium oxide at the first central surface area is greater than a concentration of lithium oxide at the central midpoint by from about 0.5 mol % to about 2 mol %.

Aspect 186. The method of aspect 185, wherein the concentration of lithium oxide at the first central surface area is greater than the concentration of lithium oxide at the central midpoint by from about 0.75 mol % to about 1.5 mol %.

Aspect 187. The method of any one of aspects 180-184, wherein the concentration of lithium oxide at the first central surface area is from about 0.5 mol % to about 2 mol %.

Aspect 188. The method of aspect 187, wherein the concentration of lithium oxide at the first central surface area is from about 0.75 mol % to about 1.5 mol %.

Aspect 189. The method of any one of aspects 185-188, wherein a concentration of lithium oxide at the second central surface area is substantially equal to the concentration of lithium oxide at the first central surface area.

Aspect 190. The method of any one of aspects 180-189, wherein, after the chemically strengthening the substrate, a concentration of lithium oxide at the first major surface is greater than a concentration of lithium oxide at the midpoint by from about 1 mol % to about 3 mol %.

Aspect 191. The method of aspect 190, wherein the concentration of lithium oxide at the first major surface is greater than a concentration of lithium oxide at the midpoint by from about 1.5 mol % to about 2.5 mol %.

Aspect 192. The method of any one of aspects 180-189, wherein, after the chemically strengthening the substrate, a concentration of lithium oxide at the first major surface is from about 1 mol % to about 3 mol %.

Aspect 193. The method of aspect 192, wherein the concentration of lithium oxide at the first major surface is from about 1.5 mol % to about 2.5 mol %.

Aspect 194. The method of any one of aspects 190-193, wherein, after the chemically strengthening the substrate, a concentration of lithium oxide at the second central surface area is substantially equal to a concentration of lithium oxide at the first major surface.

Aspect 195. The method of any one of aspects 180-194, wherein, after the chemically strengthening the substrate, a concentration profile of lithium oxide in the central portion is elevated relative to the concentration of lithium oxide at the central midpoint to a depth from the first central surface area of about 5% of the central thickness or more.

Aspect 196. The method of any one of aspects 180-194, wherein, after the chemically strengthening the substrate, a concentration profile of lithium oxide in the central portion is elevated relative to the concentration of lithium oxide at the midpoint to a depth from the first central surface area from about 3 micrometers to about 15 micrometers.

Aspect 197. The method of any one of aspects 180-196, wherein, after the chemically strengthening the substrate, a total concentration of potassium oxide, rubidium oxide, cesium oxide, and francium oxide at the first central surface area is greater than the concentration of potassium oxide at the central midpoint by from about 5 mol % to about 15 mol %.

Aspect 198. The method of any one of aspects 180-196, wherein a total concentration of potassium oxide, rubidium oxide, cesium oxide, and francium oxide at the first central surface area is from about 5 mol % to about 15 mol %.

Aspect 199. The method of any one of aspects 180-196, wherein, after the chemically strengthening the substrate, a concentration of potassium oxide at the first central surface area is greater than the concentration of potassium oxide at the central midpoint by from about 5 mol % to about 15 mol %.

Aspect 200. The method of any one of aspects 180-196, wherein a concentration of potassium oxide of potassium oxide at the first central surface area is from about 5 mol % to about 15 mol %.

Aspect 201. The method of any one of aspects 180-200, wherein, after the chemically strengthening the substrate, a concentration of potassium oxide at the first major surface is greater than the concentration of potassium oxide at the midpoint by from about 5 mol % to about 15 mol %.

Aspect 202. The method of any one of aspects 180-200, wherein, after the chemically strengthening the substrate, a concentration of potassium oxide at the first major surface is from about 5 mol % to about 15 mol %.

Aspect 203. The method of any one of aspects 180-202, wherein, after the chemically strengthening the substrate, a concentration profile of potassium oxide in the first portion is elevated relative to the concentration of potassium oxide at the midpoint to a depth from the first major surface of about 10% of the substrate thickness or more.

Aspect 204. The method of any one of aspects 180-202, wherein, after the chemically strengthening the substrate, a concentration profile of potassium oxide in the first portion is elevated relative to the concentration of potassium oxide at the midpoint to a depth from the first major surface of about 10 micrometers or more.

Aspect 205. The method of any one of aspects 180-204, wherein, after the chemically strengthening the substrate, a first central maximum compressive stress at the first central surface area is about 500 MPa or more.

Aspect 206. The method of aspect 205, wherein a second central maximum compressive stress at the second central surface area is substantially equal to the first central maximum compressive stress.

Aspect 207. The method of any one of aspects 180-206, wherein a surface profile of the first central surface area along a midline midway between the first portion and the second portion exhibits a warp of 1 millimeter or less.

Aspect 208. The method of any one of aspect 207, wherein, the warp is 600 micrometers or less.

Aspect 209. The method of any one of aspects 180-208, wherein, after the chemically strengthening the substrate, a surface profile of the first central surface area has an average gradient of about 0.018 mm/mm or less.

Aspect 210. The method of aspect 209, wherein, the average gradient is about 0.015 mm/mm or less.

Aspect 211. The method of any one of aspects 180-210, wherein the period of time is from about 0.004 min/μm2 to about 0.007 min/μm2 times a square of the central thickness in micrometers.

Aspect 212. The method of any one of aspects 180-211, wherein the molten salt bath comprises from about 0.5 wt % to about 1.3 wt % of the lithium salt.

Aspect 213. The method of any one of aspects 180-211, wherein the molten salt bath comprises:

from 0.5 wt % to about 1.3 wt % of the lithium salt;
from 70 wt % to about 99.5 wt % of a potassium salt;
from 0 wt % to about 29.5 wt % of a sodium salt; and
from 0 wt % to about 1 wt % silicic acid.

Aspect 214. The method of any one of aspects 180-213, further comprising, after the immersing the substrate, removing from about 100 nanometers to about 2 micrometers from the first major surface and from about 100 nanometers to about 2 micrometers from the second major surface.

Aspect 215. The method of any one of aspects 180-214, wherein a width of the first portion, a width of the central portion, and a width of the second portion are measured in a direction corresponding to a dimension of the substrate, the width of the central portion as a percentage of the dimension of the substrate is about 15% or more.

Aspect 216. The method of aspect 215, wherein the width of the second portion is less than the width of central portion.

Aspect 217. The method of any one of aspects 215-216, wherein the width of central portion as a percentage of the dimension of the substrate is from about 15% to about 50%.

Aspect 218. The method of any one of aspects 180-217, wherein the substrate achieves a parallel plate distance from 1 millimeter to 10 millimeters.

Aspect 219. The method of any one of aspects 180-217, wherein the substrate achieves a parallel plate distance of 5 millimeters.

BRIEF DESCRIPTION OF THE DRAWINGS

The above and other features and advantages of aspects of the present disclosure are better understood when the following detailed description is read with reference to the accompanying drawings, in which.

Figure 1:
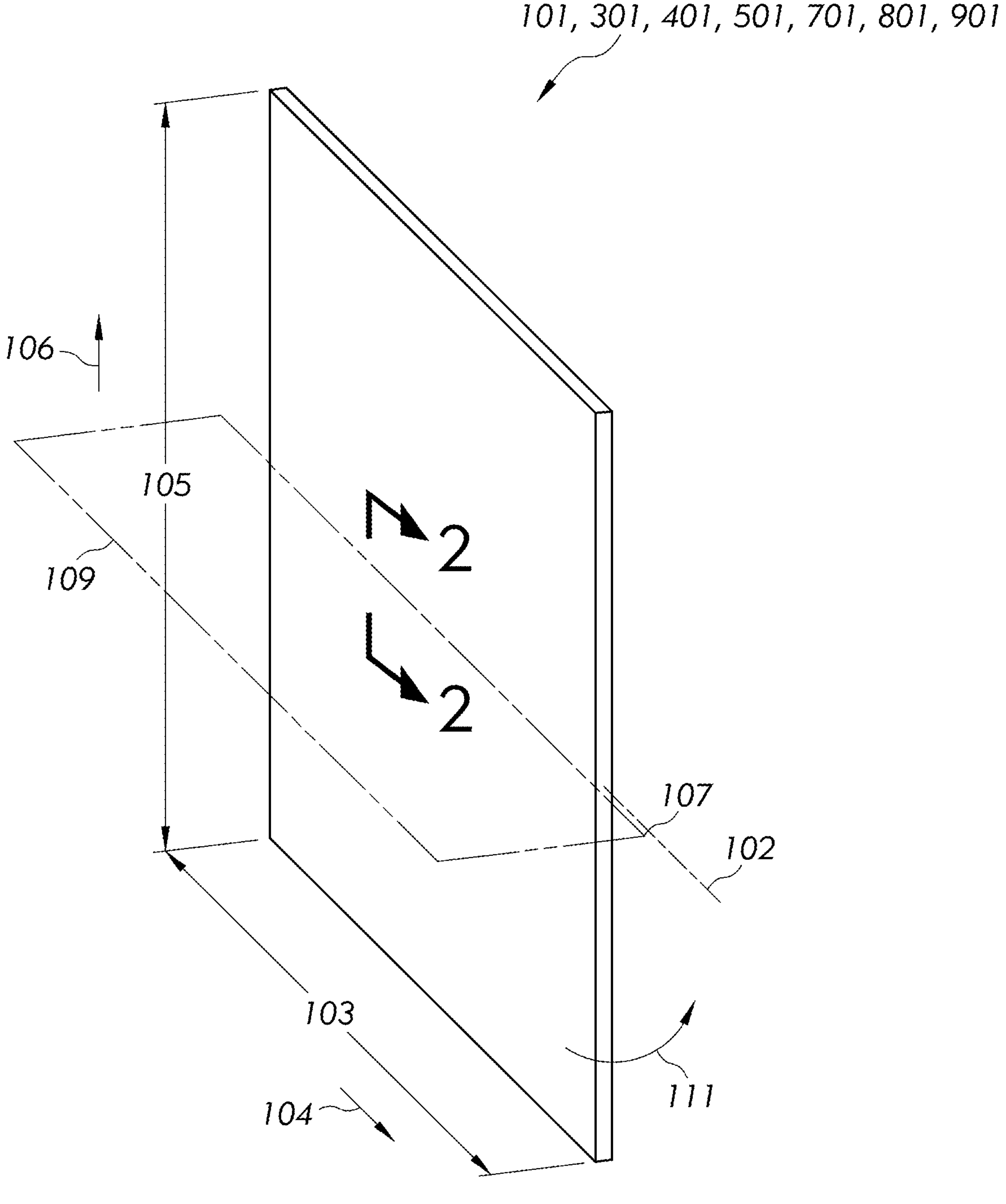
FIG. 1 is a schematic view of an example foldable apparatus in a flat configuration according to aspects, wherein a schematic view of the folded configuration may appear as shown in FIG. 5.

Throughout the disclosure, the drawings are used to emphasize certain aspects. As such, it should not be assumed that the relative size of different regions, portions, and substrates shown in the drawings are proportional to its actual relative size, unless explicitly indicated otherwise.

DETAILED DESCRIPTION

Aspects will now be described more fully hereinafter with reference to the accompanying drawings in which example aspects are shown. Whenever possible, the same reference numerals are used throughout the drawings to refer to the same or like parts. FIGS. 1-4 and 6-9 illustrate views of foldable apparatus 101, 301, 401, 501, 701, 801, and 901 comprising a foldable substrate 201 in accordance with aspects of the disclosure. Unless otherwise noted, a discussion of features of aspects of one foldable apparatus can apply equally to corresponding features of any aspects of the disclosure. For example, identical part numbers throughout the disclosure can indicate that, in some aspects, the identified features are identical to one another and that the discussion of the identified feature of one aspect, unless otherwise noted, can apply equally to the identified feature of any of the other aspects of the disclosure.

Figure 2:
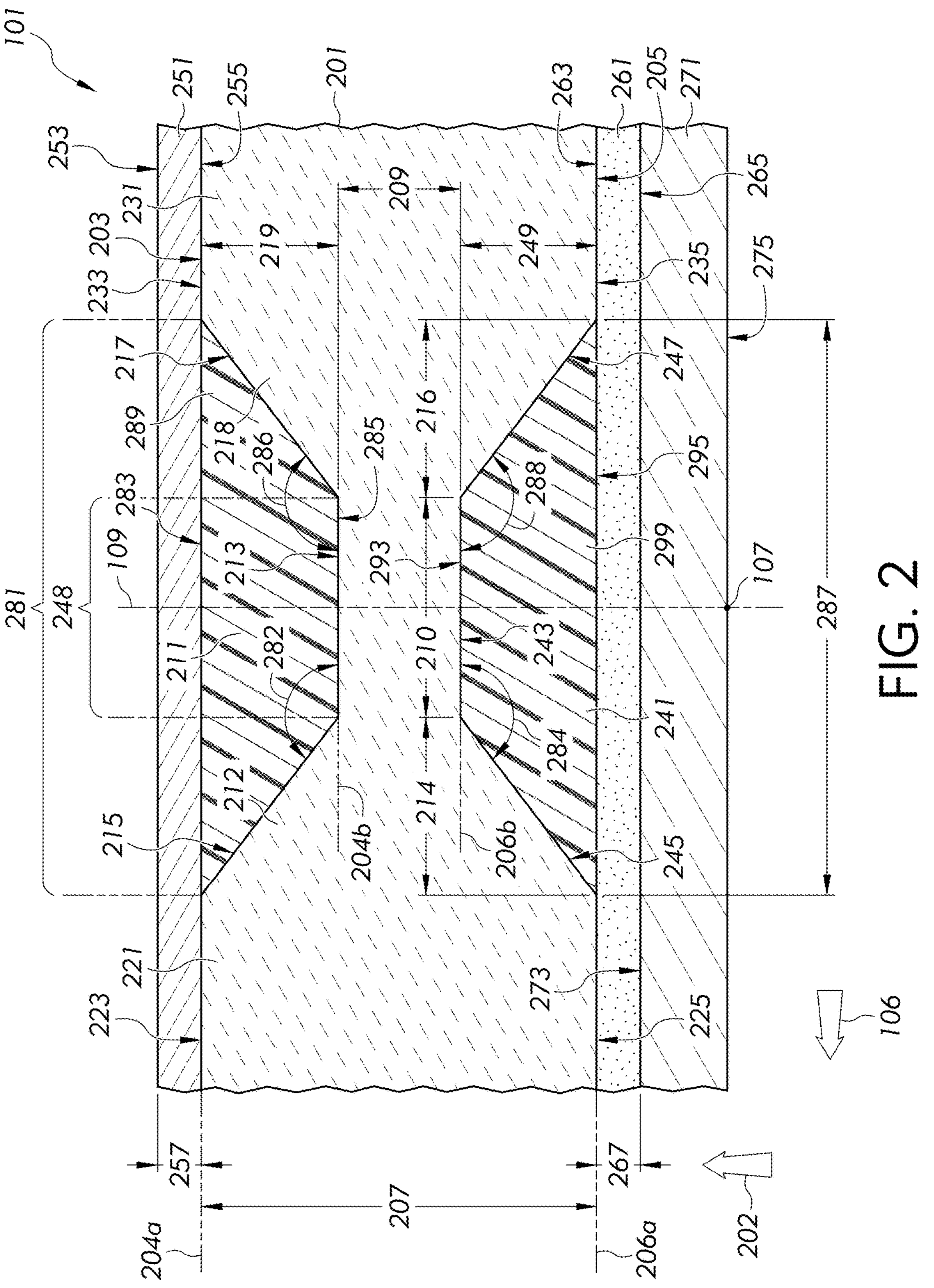
FIGS. 2-4 are cross-sectional views of the foldable apparatus along line 2-2 of FIG. 1 including a foldable substrate according to aspects.
Figure 3:
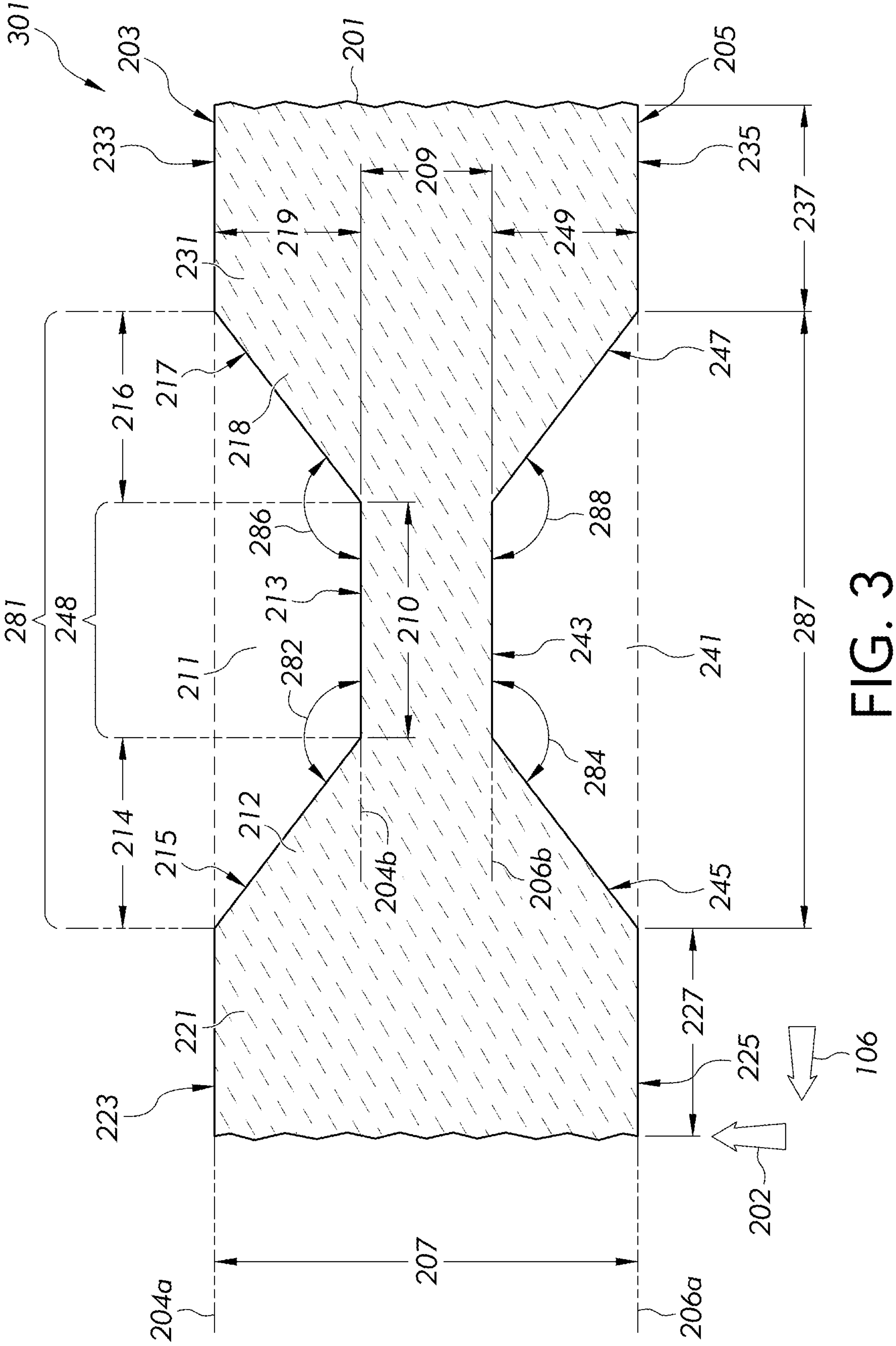
Figure 4:
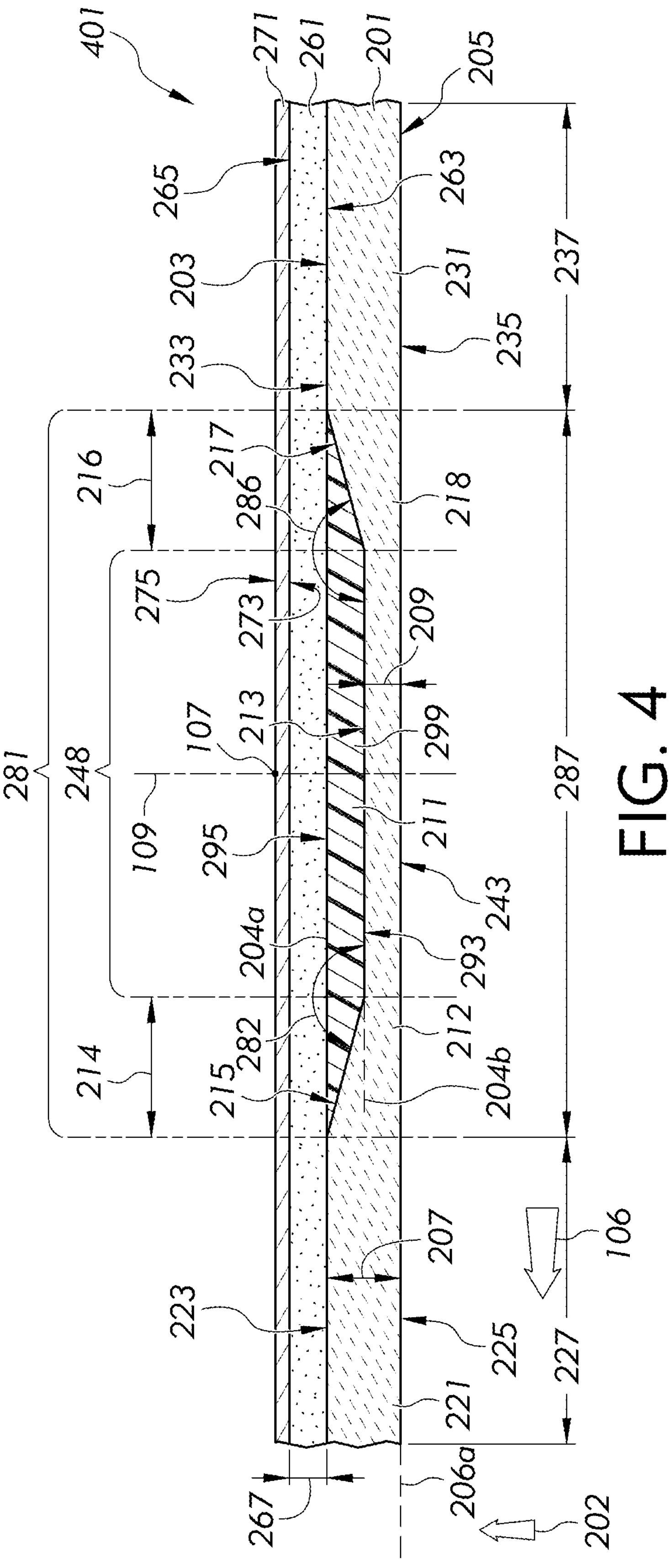
Figure 6:
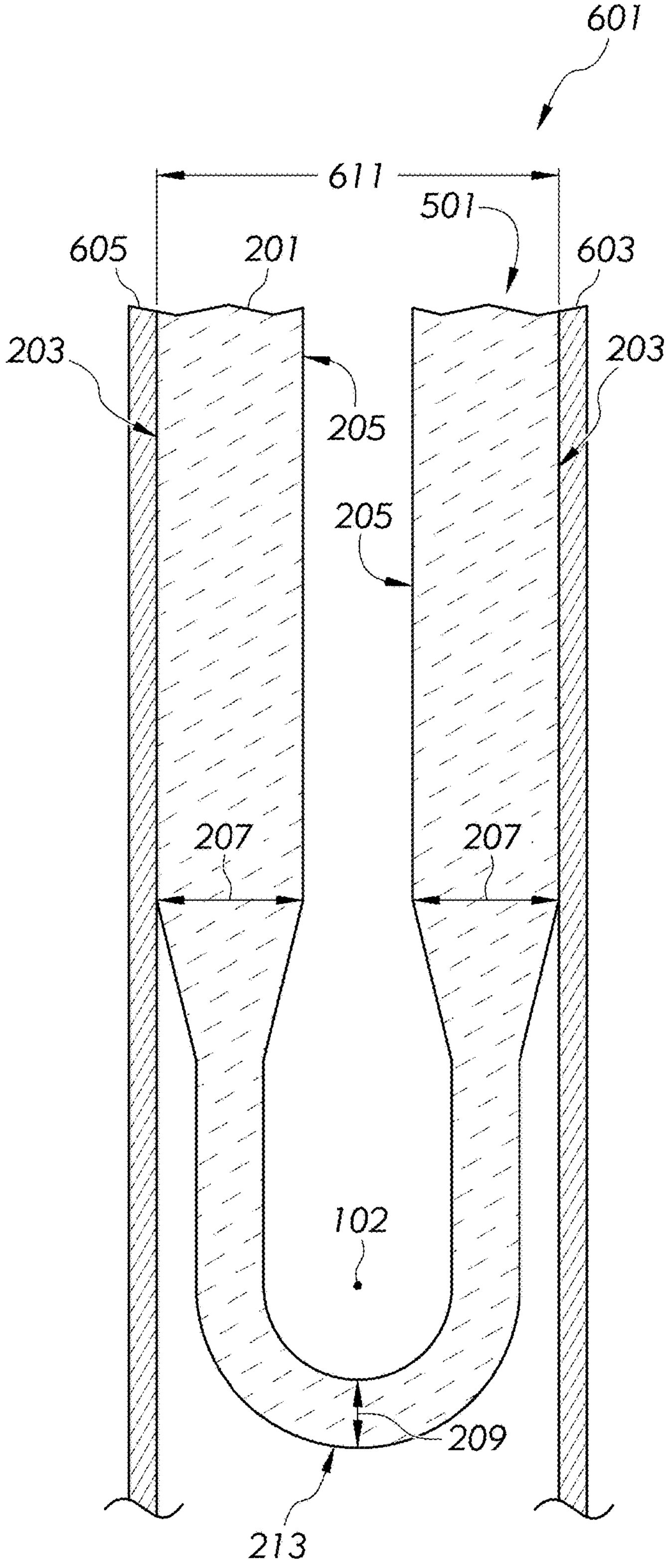
FIG. 6 is a cross-sectional view of a testing apparatus to determine the minimum parallel plate distance of an example foldable substrate along line 7-7 of FIG. 5.
Figure 7:
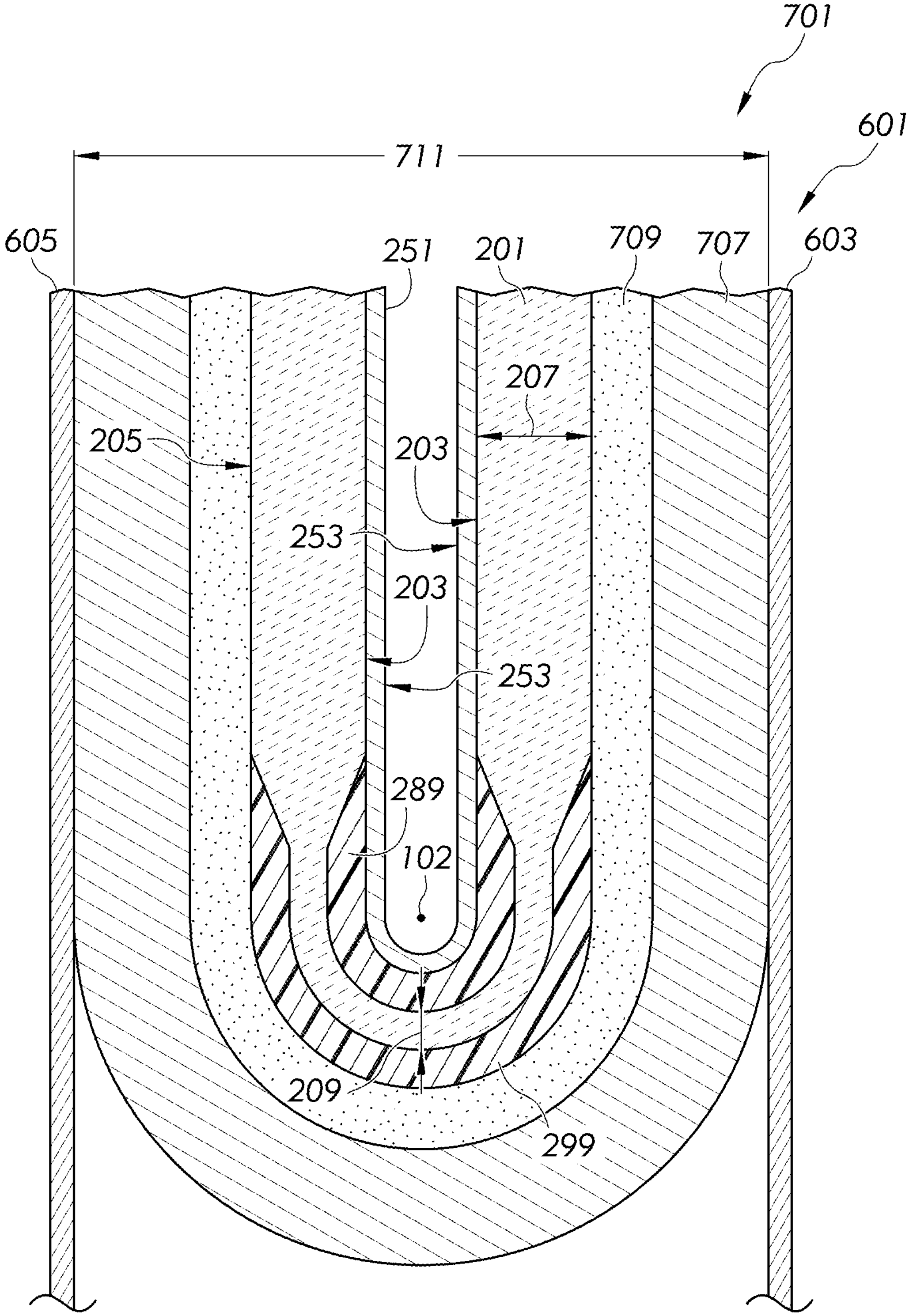
FIG. 7 is a cross-sectional views of another testing apparatus to determine the minimum parallel plate distance of an example modified foldable apparatus along line 7-7 of FIG. 5.

FIGS. 2-4 schematically illustrate example aspects of foldable apparatus 101, 301, and 401 comprising the foldable substrate 201 in accordance with aspects of the disclosure in an unfolded (e.g., flat) configuration while FIGS. 6-9 illustrates an example aspect of a foldable apparatus 501, 701, 801, and 901 comprising the foldable substrate 201 in accordance with aspects of the disclosure in a folded configuration. FIG. 3 schematically illustrate example aspects of foldable apparatus 301 consisting of the foldable substrate 201 in accordance with aspects of the disclosure in an unfolded (e.g., flat) configuration. The foldable apparatus 101, 301, and 401 and the foldable substrate 201 comprise a first portion 221, a second portion 231, and a central portion 281 positioned between the first portion 221 and the second portion 231. In aspects, as shown in FIGS. 2 and 4, the foldable apparatus 101 and 401 can comprise a release liner 271 although other substrates (e.g., a glass-based substrate and/or a ceramic-based substrate discussed throughout the application) may be used in further aspects rather than with the illustrated release liner 271. In aspects, as shown in FIGS. 2 and 7, the foldable apparatus 101 and 701 can comprise a coating 251. In aspects, as shown in FIGS. 2 and 4, the foldable apparatus 101 can comprise an adhesive layer 261. In aspects, as shown in FIGS. 2 and 7, foldable apparatus 101 and 701 can comprise a polymer-based portion 289 and/or 299. As shown in FIGS. 2-4, the foldable substrate 201 can comprise a first recess 211. In aspects, as shown in FIGS. 2-3, the foldable substrate 201 can further comprise a second recess 241. It is to be understood that any of the foldable apparatus of the disclosure can comprise a second substrate (e.g., a glass-based substrate and/or a ceramic-based substrate), a release liner 271, a display device, a coating 251, an adhesive layer 261, and/or a polymer-based portion 289 and/or 299.

Figure 5:
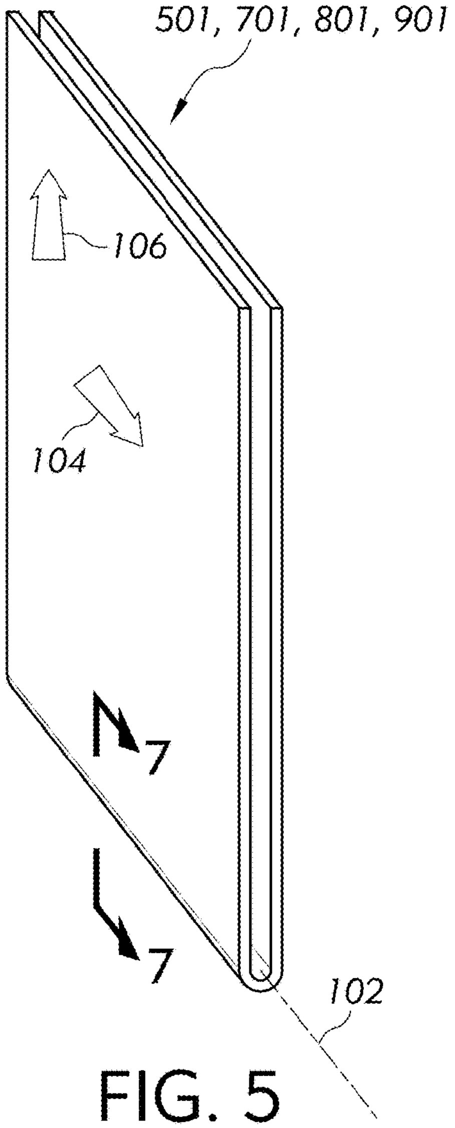
FIG. 5 is a schematic view of example foldable apparatus of aspects of the disclosure in a folded configuration wherein a schematic view of the flat configuration may appear as shown in FIG. 1.

Throughout the disclosure, with reference to FIG. 1, the width 103 of the foldable apparatus 101, 301, 401, 501, 701, 801, and/or 901 is considered the dimension of the foldable apparatus taken between opposed edges of the foldable apparatus in a direction 104 of a fold axis 102 of the foldable apparatus, wherein the direction 104 also comprises the direction of the width 103. Furthermore, throughout the disclosure, the length 105 of the foldable apparatus is considered the dimension of the foldable apparatus taken between opposed edges of the foldable apparatus in a direction 106 perpendicular to the fold axis 102 of the foldable apparatus. It is to be understood that the direction 104 of the width 103 and/or the direction 106 of the length 105 can correspond to corresponding directions in the foldable substrate 201. In aspects, as shown in FIGS. 1-2, the foldable apparatus of any aspects of the disclosure can comprise a fold plane 109 that includes the fold axis 102 when the foldable apparatus is in the flat configuration (see FIG. 2). In further aspects, as shown in FIG. 2, the fold plane 109 can extend along the fold axis 102 and in a direction of the substrate thickness 207 when the foldable apparatus is in the flat configuration (see FIG. 2). The fold plane 109 may comprise a central axis 107 of the foldable apparatus. In aspects, the foldable apparatus can be folded in a direction 111 (see FIG. 1) about the fold axis 102 extending in the direction 104 of the width 103 to form a folded configuration (see FIGS. 5, 7, and 9). Likewise, folding the foldable substrate 201 (see FIG. 3) about the fold axis can form a folded configuration (see FIGS. 6 and 8). As shown, the foldable apparatus and/or the foldable substrate may include a single fold axis to allow the foldable apparatus and/or the foldable substrate to comprise a bifold wherein, for example, the foldable apparatus and/or the foldable substrate may be folded in half. In further aspects, the foldable apparatus and/or the foldable substrate may include two or more fold axes with each fold axis including a corresponding central portion similar or identical to the central portion 281 discussed herein. For example, providing two fold axes can allow the foldable apparatus and/or the foldable substrate to comprise a trifold wherein, for example, the foldable apparatus and/or the foldable substrate may be folded with the first portion 221, the second portion 231, and a third portion similar or identical to the first portion or second portion with the central portion 281 and another central portion similar to or identical to the central portion positioned between the first portion and the second portion and between the second portion and the third portion, respectively.

The foldable substrate 201 can comprise a glass-based substrate and/or a ceramic-based substrate having a pencil hardness of 8H or more, for example, 9H or more. As used herein, pencil hardness is measured using ASTM D 3363-20 with standard lead graded pencils. Providing a glass-based foldable substrate and/or a ceramic-based foldable substrate can enhance puncture resistance and/or impact resistance. Throughout the disclosure, an elastic modulus (e.g., Young's modulus) is measured using ISO 527-1:2019. In aspects, the foldable substrate 201 can comprise an elastic modulus in a range from about 10 GPa to about 150 GPa, from about 40 GPa to about 100 GPa, from about 60 GPa to about 80 GPa, or any range or subrange therebetween.

In aspects, the foldable substrate 201 can comprise a glass-based substrate. As used herein, "glass-based" includes both glasses and glass-ceramics, wherein glass-ceramics have one or more crystalline phases and an amorphous, residual glass phase. A glass-based material (e.g., glass-based substrate) may comprise an amorphous material (e.g., glass) and optionally one or more crystalline materials (e.g., ceramic). Amorphous materials and glass-based materials may be strengthened. As used herein, the term "strengthened" may refer to a material that has been chemically strengthened, for example, through ion exchange of larger ions for smaller ions in the surface of the substrate, as discussed below. However, other strengthening methods, for example, thermal tempering, or utilizing a mismatch of the coefficient of thermal expansion between portions of the substrate to create compressive stress and central tension regions, may be utilized to form strengthened substrates. Exemplary glass-based materials, which may be free of lithia or not, comprise soda lime glass, alkali aluminosilicate glass, alkali-containing borosilicate glass, alkali-containing aluminoborosilicate glass, alkali-containing phosphosilicate glass, and alkali-containing aluminophosphosilicate glass. In aspects, glass-based material can comprise an alkali-containing glass or an alkali-free glass, either of which may be free of lithia or not. In aspects, the glass material can be alkali-free and/or comprise a low content of alkali metals (e.g., $R_2O$ of about 10 mol % or less, wherein $R_2O$ comprises $Li_2O$ $Na_2O$, $K_2O$, or the more expansive list provided below). In one or more aspects, a glass-based material may comprise, in mole percent (mol %): $SiO_2$ in a range from about 40 mol % to about 80%, $Al_2O_3$ in a range from about 5 mol % to about 30 mol %, $B_2O_3$ in a range from 0 mol % to about 10 mol %, $ZrO_2$ in a range from 0 mol % to about 5 mol %, $P_2O_5$ in a range from 0 mol % to about 15 mol %, $TiO_2$ in a range from 0 mol % to about 2 mol %, $R_2O$ in a range from 0 mol % to about 20 mol %, and RO in a range from 0 mol % to about 15 mol %. As used herein, $R_2O$ can refer to an alkali-metal oxide, for example, $Li_2O$, $Na_2O$, $K_2O$, $Rb_2O$, and $Cs_2O$. As used herein, RO can refer to MgO, CaO, SrO, BaO, and ZnO. "Glass-ceramics" include materials produced through controlled crystallization of glass. In aspects, glass-ceramics have about 1% to about 99% crystallinity. Examples of suitable glass-ceramics may include $Li_2O$—$Al_2O_3$—$SiO_2$ system (i.e., LAS-System) glass-ceramics, MgO—$Al_2O_3$—$SiO_2$ system (i.e., MAS-System) glass-ceramics, ZnO×$Al_2O_3$×n$SiO_2$ (i.e., ZAS system), and/or glass-ceramics that include a predominant crystal phase including β-quartz solid solution, β-spodumene, cordierite, petalite, and/or lithium disilicate. The glass-ceramic substrates may be strengthened using the chemical strengthening processes. In one or more aspects, MAS-System glass-ceramic substrates may be strengthened in $Li_2SO_4$ molten salt, whereby an exchange of $2Li^+$ for $Mg^{2+}$ can occur.

In aspects, the foldable substrate 201 can comprise a ceramic-based substrate. As used herein, "ceramic-based" includes both ceramics and glass-ceramics, wherein glass-ceramics have one or more crystalline phases and an amorphous, residual glass phase. Ceramic-based materials may be strengthened (e.g., chemically strengthened). In aspects, a ceramic-based material can be formed by heating a glass-based material to form ceramic (e.g., crystalline) portions. In further aspects, ceramic-based materials may comprise one or more nucleating agents that can facilitate the formation of crystalline phase(s). In aspects, ceramic-based materials can comprise one or more oxides, nitrides, oxynitrides, carbides, borides, and/or silicides. Example aspects of ceramic oxides include zirconia ($ZrO_2$), zircon ($ZrSiO_4$), titania ($TiO_2$), hafnium oxide ($Hf_2O$), yttrium oxide ($Y_2O_3$), iron oxides, beryllium oxides, vanadium oxide ($VO_2$), fused quartz, cristobalite, mullite (a mineral comprising a combination of aluminum oxide and silicon dioxide), and spinel ($MgAl_2O_4$). Example aspects of ceramic nitrides include silicon nitride ($Si_3N_4$), aluminum nitride (AlN), gallium nitride (GaN), beryllium nitride ($Be_3N_2$), boron nitride (BN), tungsten nitride (WN), vanadium nitride, alkali earth metal nitrides (e.g., magnesium nitride ($Mg_3N_2$)), nickel nitride, and tantalum nitride. Example aspects of oxynitride ceramics include silicon oxynitride, aluminum oxynitride, and a SiAlON (a combination of alumina and silicon nitride and can have a chemical formula, for example, $Si_{12-m-n}Al_{m-n}O_nN_{16-n}$, $Si_{6-n}Al_nO_nN_{8-n}$, or $Si_{2-n}Al_nO_{1-n}N_{2-n}$, where m, n, and the resulting subscripts are all non-negative integers).

In aspects, the foldable substrate 201 can be optically transparent. As used herein, "optically transparent" or "optically clear" means an average transmittance of 70% or more in the wavelength range of 400 nm to 700 nm through a 1.0 mm thick piece of a material. In aspects, the foldable substrate 201 may have an average transmittance of 75% or more, 80% or more, 85% or more, or 90% or more, 92% or more, 94% or more, 96% or more in the wavelength range of 400 nm to 700 nm through a 1.0 mm thick piece of the material. The average transmittance in the wavelength range of 400 nm to 700 nm is calculated by measuring the transmittance of whole number wavelengths from about 400 nm to about 700 nm and averaging the measurements.

As shown in FIGS. 2-4, the foldable apparatus 101, 301, and 401 comprise the foldable substrate 201 comprising a first major surface 203 and a second major surface 205 opposite the first major surface 203. As shown in FIGS. 2-4, the first major surface 203 can extend along a first plane 204*a*. The second major surface 205 can extend along a second plane 206*a*. In aspects, as shown, the second plane 206*a* can be parallel to the first plane 204*a*. As used herein, a substrate thickness 207 can be defined between the first major surface 203 and the second major surface 205 as a distance between the first plane 204*a* and the second plane 206*a*. In aspects, the substrate thickness 207 can be about 10 micrometers (μm) or more, about 25 μm or more, about 50 μm or more, about 70 μm or more, about 80 μm or more, about 90 μm or more, about 100 μm or more, about 125 μm or more, about 150 μm or more, about 200 μm or more, about 300 μm or more, about 2 millimeters (mm) or less, about 1 mm or less, about 800 μm or less, about 500 μm or less, about 300 μm or less, about 200 μm or less, about 180 μm or less, or about 160 μm or less. In aspects, the substrate thickness 207 can range from about 10 μm to about 2 mm, from about 25 μm to about 2 mm, from about 50 μm to about 2 mm, from about 70 μm to about 2 mm, from about 70 μm to about 1 mm, from about 70 μm to about 800 μm, from about 80 μm to about 500 μm, from about 90 μm 500 μm, from about 100 μm to about 200 μm, from about 125 μm to about 200 μm, from about 150 μm to about 200 μm, or any range or subrange therebetween.

As shown in FIGS. 2-4, the first portion 221 of the foldable substrate 201 can comprise a first surface area 223 and a second surface area 225 opposite the first surface area 223. The first portion 221 will now be described with reference to the foldable apparatus 101 of FIG. 2 with the understanding that such description of the first portion 221, unless otherwise stated, can also apply to any aspects of the disclosure, for example, the foldable apparatus 301, 401, 501, 701, 801, and/or 901 illustrated in FIGS. 3-4 and 6-9. In aspects, as shown, the first surface area 223 can comprise a planar surface, and/or the second surface area 225 of the first portion 221 can comprise a planar surface. In further aspects, as shown, the second surface area 225 can be parallel to the first surface area 223. In aspects, as shown, the first major surface 203 can comprise the first surface area 223 and the second major surface 205 can comprise the second surface area 225. In further aspects, the first surface area 223 can extend along the first plane 204*a*. In further aspects, the second surface area 225 can extend along the second plane 206*a*. In aspects, the substrate thickness 207 can correspond to the distance between the first surface area 223 of the first portion 221 and the second surface area 225 of the first portion 221. In aspects, the substrate thickness 207 can be substantially uniform across the first surface area 223. In aspects, a first thickness defined between the first surface area 223 and the second surface area 225 can be within one or more of the ranges discussed above with regards to the substrate thickness 207. In further aspects, the first thickness can comprise the substrate thickness 207. In further aspects, the first thickness of the first portion 221 may be substantially uniform between the first surface area 223 and the second surface area 225 across its corresponding length (i.e., in the direction 106 of the length 105 of the foldable apparatus) and/or its corresponding width (i.e., in the direction 104 of the width 103 of the foldable apparatus).

As shown in FIGS. 2-4, the second portion 231 of the foldable substrate 201 can comprise a third surface area 233 and a fourth surface area 235 opposite the third surface area 233. The second portion 231 will now be described with reference to the foldable apparatus 101 of FIG. 2 with the understanding that such description of the second portion 231, unless otherwise stated, can also apply to any aspects of the disclosure, for example, the foldable apparatus 301, 401, 501, 701, 801, and/or 901 illustrated in FIGS. 3-4 and 6-9. In aspects, as shown, the third surface area 233 of the second portion 231 can comprise a planar surface, and/or the fourth surface area 235 of the second portion 231 can comprise a planar surface. In further aspects, the third surface area 233 of the second portion 231 can be in a common plane with the first surface area 223 of the first portion 221. In further aspects, as shown, the fourth surface area 235 can be parallel to the third surface area 233. In further aspects, the fourth surface area 235 of the second portion 231 can be in a common plane with the second surface area 225 of the first portion 221. A second thickness can be defined between the third surface area 233 of the second portion 231 and the fourth surface area 235 of the second portion 231. In aspects, the second thickness can be within the range discussed above with regards to the substrate thickness 207. In further aspects, the second thickness can comprise the substrate thickness 207 and/or be substantially equal to the substrate thickness 207 (e.g., first thickness). In aspects, the second thickness of the second portion 231 may be substantially uniform between the third surface area 233 and the fourth surface area 235.

As shown in FIGS. 2-4, the foldable substrate 201 can comprise a central portion 281 positioned between the first portion 221 and the second portion 231. The central portion 281 comprises a first central surface area 213 and a second central surface area 243 opposite the first central surface area 213. As shown, the first central surface area 213 can be positioned between the first surface area 223 and the third surface area 233. In further aspects, the first central surface area 213 can correspond to a central region 248 of the central portion 281. In further aspects, as shown, the first central surface area 213 can extend along a third plane 204*b* when the foldable apparatus 101, 301, and/or 401 is in a flat configuration. A first recess 211 can be defined between the first central surface area 213 (e.g., third plane 204*b*) and the first plane 204*a*.

In aspects, the third plane 204*b* can be substantially parallel to the first plane 204*a* and/or the second plane 206*a*. In further aspects, as shown in FIGS. 2-3, the first central surface area 213 can be recessed from the first major surface 203 by a first distance 219. In further aspects, the first distance 219 that the first central surface area 213 is recessed from the first plane 204*a* can be about 5 μm or more, about 10 μm or more, about 25 μm or more, about 40 μm or more, about 80 μm or more, about 100 μm or more, about 125 μm or more, about 150 μm or more, about 1 mm or less, about 800 μm or less, about 500 μm or less, about 300 μm or less, about 200 μm or less, about 180 μm or less, or about 150 μm or less. In further aspects, the first distance 219 can range from about 5 μm to about 1 mm, from about 5 μm to about 500 μm, from about 10 μm to about 300 μm, from about 25 μm to about 200 μm, from about 40 μm to about 200 μm, from about 80 μm to about 200 μm, from about 100 μm to about 180 μm, from about 125 μm to about 150 μm, or any range or subrange therebetween. In further aspects, the first distance 219, as a percentage of the substrate thickness 207, can be about 1% or more, about 5% or more, about 10% or more, about 15% or more, about 20% or more, about 25% or more, about 75% or less, about 60% or less, about 50% or less, about 40% or less, about 35% or less, or about 30% or less. In further aspects, the first distance 219, as a percentage of the substrate thickness 207, can range from about 1% to about 75%, from about 1% to about 60%, from about 5% to about 60%, from about 10% to about 50%, from about 15% to about 45%, from about 20% to about 35%, from about 25% to about 30%, or any range or subrange therebetween.

As shown in FIGS. 2-4, the second central surface area 243 of the central portion 281 is positioned between the second surface area 225 and the fourth surface area 235. In aspects, as shown in FIG. 4, the second central surface area 243 can extend along the second plane 206*a*. In further aspects, as shown, the second central surface area 243 can be coplanar with the second major surface 205 (i.e., extend along the second plane 206*a*). In further aspects, as shown, the second major surface 205 can comprise the second central surface area 243 in addition to the second surface area 225 and the fourth surface area 235. Alternatively, in aspects, as shown in FIGS. 2-3, the second central surface area 243 can extend along a fourth plane 206*b* (e.g., different than the second plane 206*a*) when the foldable apparatus 101 and/or 301 is in a flat configuration. In further aspects, a second recess 241 is defined between the second central surface area 243 (e.g., fourth plane 206*b*) and the second plane 206*a*.

In aspects, as shown in FIGS. 2-3, the second central surface area 243 can be recessed from the second major surface 205 by a second distance 249. In further aspects, the second distance 249 can be within one or more of the ranges discussed above for the first distance 219. In further aspects, the first distance can be greater than the second distance. In even further aspects, the second distance 249 that the second central surface area 243 is recessed from the second plane 206*a*, as a percentage of the substrate thickness 207, can be about 1% or more, about 2% or more, about 5% or more, about 10% or more, about 12% or more, about 30% or less, about 25% or less, about 20% or less, about 18% or less, or about 15% or less. In even further aspects, the second distance 249, as a percentage of the substrate thickness 207, can range from about 1% to about 30%, from about 2% to about 25%, from about 5% to about 20%, from about 10% to about 18%, from about 12% to about 15%, or any range or subrange therebetween. In further aspects, as shown in FIG. 2, the first distance 219 can be substantially equal to the second distance 249. Providing the first distance substantially equal to the second distance can further reduce the incidence of mechanical instabilities in the central portion, for example, because the foldable substrate is symmetric about a plane comprising a midpoint in the substrate thickness and the central thickness. In further aspects, as shown in FIG. 4, the second central surface area 243 can be coplanar with the second surface area 225 and/or the fourth surface area 235, for example, forming a planar second major surface 205 extending along the second plane 206*a*.

A central thickness 209 can be defined between the first central surface area 213 and the second central surface area 243 as the distance between the third plane 204*b* and the fourth plane 206*b*. In aspects, the central thickness 209 can be about 10 μm or more, about 25 μm or more, about 40 μm or more, about 200 μm or less, about 120 μm or less, about 100 μm or less, about 80 μm or less, about 60 μm or less, or about 50 μm or less. In aspects, the central thickness 209 can range from about 10 μm to about 200 μm, from about 25 μm to about 120 μm, from about 25 μm to about 100 μm, from about 25 μm to about 80 μm, from about 40 μm to about 60 μm, or any range or subrange therebetween. In aspects, the central thickness 209 can be less than the substrate thickness 207 by about 10 μm or more, about 20 μm or more, about 30 μm or more, about 40 μm or more, about 50 μm or more, or about 60 μm or more. In aspects, the central thickness 209 as a percentage of the substrate thickness 207 can be about 0.5% or more, about 1% or more, about 2% or more, about 5% or more, about 40% or less, about 30% or less, about 20% or less, about 13% or less, about 10% or less, or about 8% or less. In aspects, the central thickness 209 as a percentage of the substrate thickness 207 can range from about 0.5% to about 40%, from about 0.5% to about 20%, from about 1% to about 13%, from about 2% to about 10%, from about 5% to about 8%, or any range or subrange therebetween. In aspects, the central region 248 of the central portion 281 can correspond to a region comprising the central thickness 209. By providing the first central surface area 213 of the central portion 281 extending along the third plane 204*b* parallel to the second central surface area 243 of the central portion 281 extending along the fourth plane 206*b*, a uniform central thickness 209 may extend across the central portion 281 that can provide enhanced folding performance at a predetermined thickness for the central thickness 209. A uniform central thickness 209 across the central portion 281 can improve folding performance by preventing stress concentrations that would occur if a portion of the central portion 281 was thinner than the rest of the central portion 281.

In aspects, as shown in FIGS. 2-4, the central portion 281 of the foldable substrate 201 can comprise a first transition region 212 comprising a first transition surface area 215 extending between the first surface area 223 and the first central surface area 213. In further aspects, as shown, a width (e.g., first transition width 214) of the first transition region 212 corresponding to the minimum distance in a direction 106 of the length 105 (see FIG. 1) between a portion of the first central surface area 213 extending along the third plane 204*b* and a portion of the first surface area 223. In even further aspects, the first transition width 214 of the first transition region 212 can be about 0.15 mm or more, about 0.3 mm or more, about 0.5 mm or more, about 0.6 mm or more, about 0.7 mm or more, about 0.8 mm or more, about 2 mm or less, about 1.8 mm or less, about 1.5 mm or less, about 1.2 mm or less, about 1 mm or less, about 0.8 mm or less, about 0.7 mm or less, or about 0.5 mm or less. In even further aspects, the first transition width 214 of the first transition region 212 can range from about 0.15 mm to about 2 mm, from about 0.3 mm to about 2 mm, from about 0.5 mm to about 1.8 mm, from about 0.6 mm to about 1.5 mm, from about 0.7 mm to about 1.2 mm, from about 0.8 mm to about 1 mm, or any range or subrange therebetween. In aspects, as shown in FIGS. 2-3, the first transition region 212 can comprise a second transition surface area 245 extending between the second surface area 225 and the second central surface area 243. A width of the second transition surface area 245 corresponding to the minimum distance in a direction 106 of the length 105 (see FIG. 1) between a portion of the second central surface area 243 extending along the fourth plane **206*b* and a portion of the second surface area 225 can be within one or more of the ranges discussed above for the first transition width 214 and/or substantially equal to the first transition width 214**.

In aspects, as shown in FIGS. 2-4, a thickness of the first transition region 212 can decrease between the substrate thickness 207 of the first portion 221 and the central thickness 209 of the central portion 281. In further aspects, as shown, a thickness of the first transition region 212 can smoothly decrease, monotonically decrease, and/or smoothly and monotonically decrease between the substrate thickness 207 of the first portion 221 and the central thickness 209 of the central portion 281. As used herein, a thickness decreases smoothly if changes in the cross-sectional area are smooth (e.g., gradual) rather than abrupt (e.g., step) changes in thickness. As used herein, a thickness decreases monotonically in a direction if the thickness decreases for a portion and for the rest of the time either stays the same, decreases, or a combination thereof (i.e., the thickness decreases but never increases in the direction). A smooth shape of the first transition region and/or the second transition region can reduce optical distortions.

In aspects, as shown in FIGS. 2-4, the first transition surface area 215 can comprise a linearly inclined surface extending between the first central surface area 213 and the first surface area 223. In aspects, although not shown, the first transition surface area can comprise a concave up shape, for example, with a local slope of the first transition surface area smoothly transitioning to a slope of the first central surface area 213 while a local slope of the first transition surface area is substantially different from a slope of the first surface area 223. In aspects, although not shown, the first transition surface area can comprise a sigmoid shape. In aspects, although not shown, a local slope of the first transition surface area can be greater at a midpoint of the first transition surface area than where the first transition surface area meets the first central surface area 213 and where the first transition surface area meets the first surface area 223. In aspects, although not shown, the first transition surface area can comprise a convex up shape, for example, with a local slope of the first transition surface area smoothly transitioning to a slope of the first surface area 223 while a local slope of the first transition surface area is substantially different from a slope of the first central surface area 213. In aspects, the second transition surface area can comprise one of the shapes or properties discussed above in this paragraph for the first transition surface area. For example, as shown in FIG. 2, the second transition surface area 245 can comprise a linearly inclined surface extending between the second central surface area 243 and the second surface area 225.

In aspects, as shown in FIGS. 2-4, a thickness of the first transition region 212 can decrease at a constant rate (e.g., linearly change) from the substrate thickness 207 to the central thickness 209. In aspects, although not shown, a thickness of the first transition region can decrease slower where the first transition surface area meets the first central surface area 213 than at a midpoint of the first transition region and/or than where the first transition surface area meets the first surface area 223 (e.g., first portion 221). In aspects, although not shown, a thickness of the first transition region can decrease faster where the first transition surface area meets the first central surface area 213 than at a midpoint of the first transition region and/or than where the first transition surface area meets the first surface area 223. Providing a non-uniform slope of a surface area of the first transition region and/or the second transition region can reduce an amount of the corresponding transition region comprising intermediate thicknesses, for example, comprising a chemical strengthening induced expansion strain less than a portion of the corresponding transition region closer to the first central surface area and/or the second central surface area and/or than the first central surface area and/or the second central surface area.

Throughout the disclosure, an average angle of a transition surface area relative to a central surface area is measured as an angle between a transition surface area and a central surface area. An angle is calculated for a location on the corresponding transition surface area relative to the corresponding central surface area with the location of the corresponding central surface area approximated as a plane fitted from measurements at 20 locations evenly spaced over the corresponding central surface area in the direction 106 of the length 105. The angle measured is an external angle for the foldable substrate, meaning that it extends from the plane fitted to the corresponding central surface area to the location on the corresponding transition surface area without passing through the material of the foldable substrate other than an incidental amount at the endpoints. The average angle is calculated from 10 locations on the corresponding transition surface area that are located in a region comprising 80% of a distance that the corresponding central surface area is recessed from the corresponding major surface with the region centered at the midpoint between the corresponding central surface area and the corresponding major surface in the direction 202 of the thickness (e.g., substrate thickness 207, central thickness 209). In aspects, as shown in FIGS. 2-4, the first transition surface area 215 of the first transition region 212 extends between the first surface area 223 and the first central surface area 213 with a first average angle 282 relative to the first central surface area 213. As described above, the first average angle 282 is an external angle because it does not pass through the material of the foldable substrate 201 other than an incidental amount at the endpoints. In further aspects, the first average angle 282 can be about 160° or more, about 162° or more, about 165° or more, about 167° or more, about 170° or more, about 171° or more, about 172° or more, about 179° or less, about 176° or less, about 175° or less, about 174° or less, or about 173° or less. In further aspects, the first average angle 282 can range from about 160° to about 179°, from about 162° to about 176°, from about 165° to about 176°, from about 167° to about 175°, from about 170° to about 175°, from about 171° to about 174°, from about 172° to about 173°, or any range or subrange therebetween. For example, a first transition surface comprising a linear (e.g., planar) surface area with a first transition width of 500 μm and height (i.e., a difference between the first central surface area 213 and the first major surface 203 corresponding to the first distance 219) of 30 μm corresponds to a first average angle of about 176.6°.

In aspects, as shown in FIGS. 2-4, the third transition surface area 217 of the second transition region 218 extends between the third surface area 233 and the first central surface area 213 with a third average angle 286 relative to the first central surface area 213. In further aspects, the third average angle 286 can be within one or more of the ranges discussed above for the first average angle 282. In further aspects, the first average angle 282 can be substantially equal to the third average angle 286.

In aspects, as shown in FIGS. 2-4, the central portion 281 of the foldable substrate 201 can comprise a second transition region 218 comprising a third transition surface area 217 extending between the third surface area 233 and the first central surface area 213. In further aspects, as shown, a width (e.g., second transition width 216) of the second transition region 218 can be measured as the minimum distance in a direction 106 of the length 105 (see FIG. 1) between a portion of the first central surface area 213 extending along the third plane 204*b* and a portion of the third surface area 233. In even further aspects, the second transition width 216 of the second transition region 218 can be within one or more of the ranges discussed above for the first transition width 214. In still further aspects, the second transition width 216 of the second transition region 218 can be substantially equal to (e.g., equal to) the first transition width 214.

In aspects, as shown in FIGS. 2-3, the second transition region 218 can comprise a fourth transition surface area 247 extending between the fourth surface area 235 and the second central surface area 243. In further aspects, a width of the fourth transition surface area 247 can be measured as the minimum distance in a direction 106 of the length 105 (see FIG. 1) between a portion of the second central surface area 243 extending along the fourth plane 206*b* and a portion of the fourth surface area 235. In even further aspects, the width of the fourth transition surface area 247 can be substantially equal to (e.g., equal to) the second transition width 216. In aspects, as shown in FIGS. 2-3, a thickness of the second transition region 218 can decrease between the substrate thickness 207 of the second portion 231 and the central thickness 209 of the central portion 281. In further aspects, as shown, a thickness of the first transition region 212 can smoothly decrease, monotonically decrease, or smoothly and monotonically decrease between the substrate thickness 207 of the second portion 231 and the central thickness 209 of the central portion 281. In aspects, as shown in FIG. 4, the portion of the second transition region 218 extending between the fourth surface area 235 and the second central surface area 243 can be coplanar with one or both surface areas.

In aspects, as shown in FIGS. 2-4, the third transition surface area 217 can comprise a linearly inclined surface extending between the first central surface area 213 and the third surface area 233. In aspects, the third transition surface area 217 and/or the fourth transition surface area 247 can comprise one of the shapes or properties discussed above with reference to the first transition surface area. In aspects, the fourth transition surface area 247 can comprise one of the shapes or properties discussed above in this paragraph for the first transition surface area. For example, as shown in FIGS. 2-4, the fourth transition surface area 247 can comprise a linearly inclined surface extending between the second central surface area 243 and the fourth surface area 235. In aspects, as shown in FIGS. 2-4, a thickness of the second transition region 218 can decrease at a constant rate (e.g., linearly change) from the substrate thickness 207 to the central thickness 209. In aspects, although not shown, a thickness of the second transition region can decrease slower where the third transition surface area meets the first central surface area 213 than at a midpoint of the second transition region and/or than where the third transition surface area meets the third surface area 233 (e.g., first portion 221). In aspects, although not shown, a thickness of the second transition region can decrease faster where the third transition surface area meets the first central surface area 213 than at a midpoint of the second transition region and/or than where the third transition surface area meets the third surface area 233.

In aspects, as shown in FIGS. 2-3, the second transition surface area 245 of the first transition region 212 extends between the second surface area 225 and the second central surface area 243 with a second average angle 284 relative to the second central surface area 243. In further aspects, the second average angle 284 can be within one or more of the ranges discussed above for the first average angle 282 and/or substantially equal to the first average angle 282. Providing an average angle within one of the above-mentioned ranges can provide reduced visibility of the transition region. In aspects, as shown in FIGS. 2-3, the fourth transition surface area 247 of the second transition region 218 extends between the fourth surface area 235 and the second central surface area 243 with a fourth average angle 288 relative to the second central surface area 243. In further aspects, the fourth average angle 288 can be within one or more of the ranges discussed above for the second average angle 284. In further aspects, the second average angle 284 can be substantially equal to the fourth average angle 288. In further aspects, the first average angle 282 and/or the third average angle 286 can be substantially equal to the fourth average angle 288.

As used herein, if a first layer and/or component is described as "disposed over" a second layer and/or component, other layers may or may not be present between the first layer and/or component and the second layer and/or component. Furthermore, as used herein, "disposed over" does not refer to a relative position with reference to gravity. For example, a first layer and/or component can be considered "disposed over" a second layer and/or component, for example, when the first layer and/or component is positioned underneath, above, or to one side of a second layer and/or component. As used herein, a first layer and/or component described as "bonded to" a second layer and/or component means that the layers and/or components are bonded to each other, either by direct contact and/or bonding between the two layers and/or components or via an adhesive layer. As used herein, a first layer and/or component described as "contacting" or "in contact with" a second layer and/or components refers to direct contact and includes the situations where the layers and/or components are bonded to each other.

As shown in FIGS. 2 and 4, the foldable apparatus 101 can comprise an adhesive layer 261. As shown, the adhesive layer 261 can comprise a first contact surface 263 and a second contact surface 265 that can be opposite the first contact surface 263. In aspects, as shown in FIGS. 2 and 4, the second contact surface 265 of the adhesive layer 261 can comprise a planar surface. In aspects, as shown in FIGS. 2 and 4, the first contact surface 263 of the adhesive layer 261 can comprise a planar surface. An adhesive thickness 267 of the adhesive layer 261 can be defined as a minimum distance between the first contact surface 263 and the second contact surface 265. In aspects, the adhesive thickness 267 of the adhesive layer 261 can be about 1 μm or more, about 5 μm or more, about 10 μm or more, about 100 μm or less, about 60 μm or less, about 30 μm or less, or about 20 μm or less. In aspects, the adhesive thickness 267 of the adhesive layer 261 can range from about 1 μm to about 100 μm, from about 5 μm to about 60 μm, from about 10 μm to about 30 μm, from about 10 μm to about 20 μm, or any range or subrange therebetween.

In aspects, as shown in FIGS. 2 and 4, the second contact surface 265 of the adhesive layer 261 can face and/or contact the first major surface 273 of a release liner 271 (described below). In aspects, as shown in FIG. 2, the first contact surface 263 of the adhesive layer 261 can face and/or contact the second surface area 225 of the first portion 221. In aspects, as shown in FIG. 2, the first contact surface 263 of the adhesive layer 261 can face and/or contact the fourth surface area 235 of the second portion 231. In aspects, as shown in FIG. 2, the first contact surface 263 of the adhesive layer 261 can face the second central surface area 243 of the central portion 281. In aspects, as shown in FIG. 4, the first contact surface 263 of the adhesive layer 261 can face and/or contact the first surface area 223 of the first portion 221. In aspects, as shown in FIG. 4, the first contact surface 263 of the adhesive layer 261 can face and/or contact the third surface area 233 of the second portion 231. In aspects, as shown in FIG. 4, the first contact surface 263 of the adhesive layer 261 can face the first central surface area 213 of the central portion 281. In aspects, as shown in FIG. 2, the first contact surface 263 of the adhesive layer 261 can face the second central surface area 243 of the central portion 281. In further aspects, although not shown, the first contact surface 263 of the adhesive layer 261 can contact the second central surface area 243 of the central portion 281, for example by filling the region (e.g., second recess 241) indicated as occupied by the second polymer-based portion 299 in FIG. 2. In aspects, although not shown, the second recess may not be totally filled, for example, to leave room for electronic devices and/or mechanical devices. In aspects, although not shown, the foldable substrate 201 of FIG. 4 can be configured with the adhesive layer 261 contacting the second major surface 205 rather than the first major surface 203 while the second polymer-based portion 299 or a coating 251 in place of the second polymer-based portion 299 can be positioned at least partially in the first recess 211.

In aspects, the adhesive layer 261 can comprise one or more of a polyolefin, a polyamide, a halide-containing polymer (e.g., polyvinylchloride or a fluorine-containing polymer), an elastomer, a urethane, phenolic resin, parylene, polyethylene terephthalate (PET), and polyether ether ketone (PEEK). Example aspects of polyolefins include low molecular weight polyethylene (LDPE), high molecular weight polyethylene (HDPE), ultrahigh molecular weight polyethylene (UHMWPE), and polypropylene (PP). Example aspects of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers. Example aspects of elastomers include rubbers (e.g., polybutadiene, polyisoprene, chloroprene rubber, butyl rubber, nitrile rubber) and block copolymers (e.g., styrene-butadiene, high-impact polystyrene, poly(dichlorophosphazene)). In further aspects, the adhesive layer 261 can comprise an optically clear adhesive. In even further aspects, the optically clear adhesive can comprise one or more optically transparent polymers: an acrylic (e.g., polymethylmethacrylate (PMMA)), an epoxy, silicone, and/or a polyurethane. Examples of epoxies include bisphenol-based epoxy resins, novolac-based epoxies, cycloaliphatic-based epoxies, and glycidylamine-based epoxies. In even further aspects, the optically clear adhesive can comprise, but is not limited to, acrylic adhesives, for example, 3M 8212 adhesive, or an optically transparent liquid adhesive, for example, a LOCTITE optically transparent liquid adhesive. Exemplary aspects of optically clear adhesives comprise transparent acrylics, epoxies, silicones, and polyurethanes. For example, the optically transparent liquid adhesive could comprise one or more of LOCTITE AD 8650, LOCTITE AA 3922, LOCTITE EA E-05MR, LOCTITE UK U-09LV, which are all available from Henkel.

Throughout the disclosure, a tensile strength, ultimate elongation (e.g., strain at failure), and yield point of a polymeric material (e.g., adhesive, polymer-based portion) is determined using ASTM D638 using a tensile testing machine, for example, an Instron 3400 or Instron 6800, at 23° C. and 50% relative humidity with a type I dogbone shaped sample. In aspects, the adhesive layer 261 can comprise an elastic modulus of about 0.001 MegaPascals (MPa) or more, about 0.01 MPa or more, about 0.1 MPa or more, about 1 MPa or less, about 0.5 MPa or less, about 0.1 MPa or less, or about 0.05 MPa or less. In aspects, the adhesive layer 261 can comprise an elastic modulus in a range from about 0.001 MPa to about 1 MPa, from about 0.01 MPa to about 0.5 MPa, from about 0.1 MPa to about 0.5 MPa, or any range or subrange therebetween. In aspects, the adhesive layer can comprise an elastic modulus within one or more of the ranges discussed below for the elastic modulus of the polymer-based portions 289 and/or 299.

As shown in FIGS. 2 and 4, the polymer-based portion 289 and/or 299 of the foldable apparatus 101 can be positioned between the first portion 221 and the second portion 231. In aspects, as shown, the polymer-based portion can comprise a first polymer-based portion 289 at least partially positioned in and/or filling the first recess 211. In aspects, as shown in FIG. 2, the polymer-based portion can comprise a second polymer-based portion 299 at least partially positioned in and/or filling the second recess 241. In aspects, as shown in FIG. 4, the polymer-based portion can comprise a second polymer-based portion 299 at least partially positioned in and/or filling the first recess 211. In aspects, although not shown, the second recess may not be totally filled, for example, to leave room for electronic devices and/or mechanical devices.

As shown in FIG. 2, the first polymer-based portion 289 can comprise a fourth contact surface 285 opposite the third contact surface 283. In aspects, as shown, the third contact surface 283 can comprise a planar surface, for example, substantially coplanar (e.g., extend along a common plane, first plane 204*a*) with the first surface area 223 and the third surface area 233. In aspects, as shown in FIG. 2, the fourth major surface 255 of the coating 251 can face and/or contact the third contact surface 283 of the first polymer-based portion 289. In aspects, the fourth contact surface 285 can comprise a planar surface, for example, substantially coplanar (e.g., extend along a common plane, third plane 204*b*) with the first central surface area 213. In further aspects, the fourth contact surface 285 can contact the first central surface area 213, the first transition surface area 215, and/or the third transition surface area 217.

As shown in FIGS. 2 and 4, the second polymer-based portion 299 can comprise a fourth contact surface 295 opposite the third contact surface 293. In further aspects, as shown in FIG. 2, the third contact surface 293 can contact the second central surface area 243, the second transition surface area 245, and/or the fourth transition surface area 247. In aspects, as shown in FIG. 2, the third contact surface 293 can comprise a planar surface, for example, being substantially coplanar (e.g., extend along a common plane with the fourth plane 206*b*) with the second central surface area 243. In aspects, as shown in FIG. 2, the fourth contact surface 295 can comprise a planar surface, for example, being substantially coplanar (e.g., extend along a common plane with the second plane 206*a*) with the second surface area 225 and the fourth surface area 235.

In aspects, as shown in FIG. 4, the third contact surface 293 can contact the first central surface area 213, the first transition surface area 215, and/or the third transition surface area 217. In aspects, as shown in FIG. 4, the third contact surface 293 can comprise a planar surface, for example, being substantially coplanar (e.g., extend along a common plane with the third plane 204*b*) with the first central surface area 213. In aspects, as shown, the third contact surface 293 can comprise a planar surface, for example, substantially coplanar (e.g., extend along a common plane with the third plane 204*b*) with the first central surface area 213. In aspects, as shown in FIG. 4, the fourth contact surface 295 can be coplanar (e.g., extend along a common plane with the first plane 204*a*) with the first surface area 223 and the third surface area 233. In aspects, as shown in FIGS. 2 and 4, the first contact surface 263 of the adhesive layer 261 can face and/or contact the fourth contact surface 295 of the second polymer-based portion 299.

In aspects, the polymer-based portion 289 and/or 299 comprises a polymer (e.g., optically transparent polymer). In further aspects, the polymer-based portion 289 and/or 299 can comprise one or more of an optically transparent: an acrylic (e.g., polymethylmethacrylate (PMMA)), an epoxy, a silicone, and/or a polyurethane. Examples of epoxies include bisphenol-based epoxy resins, novolac-based epoxies, cycloaliphatic-based epoxies, and glycidylamine-based epoxies. In further aspects, the polymer-based portion 289 and/or 299 comprise one or more of a polyolefin, a polyamide, a halide-containing polymer (e.g., polyvinylchloride or a fluorine-containing polymer), an elastomer, a urethane, phenolic resin, parylene, polyethylene terephthalate (PET), and polyether ether ketone (PEEK). Example aspects of elastomers include rubbers and block copolymers, for example, comprising one or more of polystyrene, polydichlorophosphazene, and poly(5-ethylidene-2-norbornene). In aspects, the polymer-based portion can comprise a sol-gel material. Example aspects of polyurethanes comprise thermoset polyurethanes, for example, Dispurez 102 available from Incorez and thermoplastic polyurethanes, for example, KrystalFlex PE505 available from Huntsman. In even further aspects, the second portion can comprise an ethylene acid copolymer. An exemplary aspect of an ethylene acid copolymer includes SURLYN available from Dow (e.g., Surlyn PC-2000, Surlyn 8940, Surlyn 8150). An additional exemplary aspect for the second portion comprises Eleglass w802-GL044 available from Axalta with from 1 wt % to 2 wt % cross-linker. In aspects, the polymer-based portion 289 and/or 299 can further comprise nanoparticles, for example, carbon black, carbon nanotubes, silica nanoparticles, or nanoparticles comprising a polymer. In aspects, the polymer-based portion can further comprise fibers to form a polymer-fiber composite.

In aspects, the polymer-based portion 289 and/or 299 can comprise an elastic modulus of about 0.001 MegaPascals (MPa) or more, about 0.01 MPa or more, about 1 MPa or more, about 10 MPa or more, about 20 MPa or more, about 100 MPa or more, about 200 MPa or more, about 1,000 MPa or more, about 5,000 MPa or less, about 3,000 MPa or less, about 1,000 MPa or less, about 500 MPa or less, or about 200 MPa or less. In aspects, the polymer-based portion 289 and/or 299 can comprise an elastic modulus in a range from about 0.001 MPa to about 5,000 MPa, from about 0.01 MPa to about 3,000 MPa, from about 0.01 MPa to about 1,000 MPa, from about 1 MPa to about 200 MPa, from about 10 MPa to about 200 MPa, from about 100 MPa to about 200 MPa, or any range or subrange therebetween. In aspects, the adhesive layer 261 comprises an elastic modulus greater than the elastic modulus of the polymer-based portion 289 and/or 299, which arrangement provides improved performance in puncture resistance. In aspects, the elastic modulus of the polymer-based portion 289 and/or 299 can be less than the elastic modulus of the foldable substrate 201. In aspects, the adhesive layer 261 may comprise an elastic modulus within the ranges listed above in this paragraph. In further aspects, the adhesive layer 261 may comprise substantially the same elastic modulus as the elastic modulus of the polymer-based portion 289 and/or 299. In aspects, the elastic modulus of the polymer-based portion 289 and/or 299 can be less than the elastic modulus of the foldable substrate 201.

In aspects, as shown in FIG. 2, a coating 251 can be disposed over the first major surface 203 of the foldable substrate 201. In further aspects, the coating 251 can be disposed over the first portion 221, the second portion 231, and the central portion 281. In aspects, the coating 251 can comprise a third major surface 253 and a fourth major surface 255 opposite the third major surface 253. In further aspects, the coating 251 (e.g., fourth major surface 255) can contact the foldable substrate 201 (e.g., first major surface 203). In further aspects, at least a part of the coating 251 can be positioned in the first recess 211. In even further aspects, the coating 251 can fill the first recess 211. In further aspects, the coating 251 can comprise a coating thickness 257 defined between the third major surface 253 and the fourth major surface 255. In further aspects, the coating thickness 257 can be about 0.1 μm or more, about 1 μm or more, about 5 μm or more, about 10 μm or more, about 20 μm or more, about 25 μm or more, about 40 μm or more, about 80 μm or more, about 200 μm or less, about 100 μm or less, or about 50 μm or less, about 25 μm or less, about 20 μm or less, about 20 μm or less, about 15 μm or less, or about 10 μm or less. In aspects, the coating thickness 257 can range from about 0.1 μm to about 200 μm, from about 1 μm to about 100 μm, from about 10 μm to about 50 μm, from about 20 μm to about 50 μm, or any range or subrange therebetween.

In aspects, the coating 251 can comprise a polymeric hard coating. In further aspects, the polymeric hard coating can comprise one or more of an ethylene-acid copolymer, a polyurethane-based polymer, an acrylate resin, and a mercapto-ester resin. Example aspects of ethylene-acid copolymers include ethylene-acrylic acid copolymers, ethylene-methacrylic acid copolymers, and ethylene-acrylic-methacrylic acid terpolymers (e.g., Nucrel, manufactured by DuPont), ionomers of ethylene acid copolymers (e.g., Surlyn, manufactured by DuPont), and ethylene-acrylic acid copolymer amine dispersions (e.g., Aquacer, manufactured by BYK). Example aspects of polyurethane-based polymers include aqueous modified polyurethane dispersions (e.g., Eleglas®, manufactured by Axalta). Example aspects of acrylate resins that can be UV curable include acrylate resins (e.g., Uvekol® resin, manufactured by Allinex), cyanoacrylate adhesives (e.g., Permabond® UV620, manufactured by Krayden), and UV radical acrylic resins (e.g., Ultrabond windshield repair resin, for example, Ultrabond (45CPS)).

Example aspects of mercapto-ester resins include mercapto-ester triallyl isocyanurates (e.g., Norland optical adhesive NOA 61). In further aspects, the polymeric hard coating can comprise ethylene-acrylic acid copolymers and ethylene-methacrylic acid copolymers, which may be ionomerized to form ionomer resins through neutralization of the carboxylic acid residue with typically alkali-metal ions, for example, sodium and potassium, and also zinc. Such ethylene-acrylic acid and ethylene-methacrylic acid ionomers may be dispersed in water and coated onto the substrate to form an ionomer coating. Alternatively, such acid copolymers may be neutralized with ammonia which, after coating and drying liberates the ammonia to reform the acid copolymer as the coating. By providing a coating comprising a polymeric coating, the foldable apparatus can comprise low energy fracture.

In aspects, the coating can comprise a polymeric hard coating comprising an optically transparent polymeric hard-coat layer. Suitable materials for an optically transparent polymeric hard-coat layer include but are not limited to a cured acrylate resin material, an inorganic-organic hybrid polymeric material, an aliphatic or aromatic hexafunctional urethane acrylate, a siloxane-based hybrid material, and a nanocomposite material, for example, an epoxy and urethane material with nanosilicate. In aspects, an optically transparent polymeric hard-coat layer may consist essentially of one or more of these materials. In aspects, an optically transparent polymeric hard-coat layer may consist of one or more of these materials. As used herein, "inorganic-organic hybrid polymeric material" means a polymeric material comprising monomers with inorganic and organic components. An inorganic-organic hybrid polymer is obtained by a polymerization reaction between monomers having an inorganic group and an organic group. An inorganic-organic hybrid polymer is not a nanocomposite material comprising separate inorganic and organic constituents or phases, for example, inorganic particulates dispersed within an organic matrix. More specifically, suitable materials for an optically transparent polymeric (OTP) hard-coat layer include, but are not limited to, a polyimide, a polyethylene terephthalate (PET), a polycarbonate (PC), a poly methyl methacrylate (PMMA), organic polymer materials, inorganic-organic hybrid polymeric materials, and aliphatic or aromatic hexafunctional urethane acrylates. In aspects, an OTP hard-coat layer may consist essentially of an organic polymer material, an inorganic-organic hybrid polymeric material, or aliphatic or aromatic hexafunctional urethane acrylate. In aspects, an OTP hard-coat layer may consist of a polyimide, an organic polymer material, an inorganic-organic hybrid polymeric material, or aliphatic or aromatic hexafunctional urethane acrylate. In aspects, an OTP hard-coat layer may include a nanocomposite material. In aspects, an OTP hard-coat layer may include a nano-silicate at least one of epoxy and urethane materials. Suitable compositions for such an OTP hard-coat layer are described in U.S. Pat. Pub. No. 2015/0110990, which is hereby incorporated by reference in its entirety by reference thereto. As used herein, "organic polymer material" means a polymeric material comprising monomers with only organic components. In aspects, an OTP hard-coat layer may comprise an organic polymer material manufactured by Gunze Limited and having a hardness of 9H, for example Gunze's "Highly Durable Transparent Film." As used herein, "inorganic-organic hybrid polymeric material" means a polymeric material comprising monomers with inorganic and organic components. An inorganic-organic hybrid polymer is obtained by a polymerization reaction between monomers having an inorganic group and an organic group. An inorganic-organic hybrid polymer is not a nanocomposite material comprising separate inorganic and organic constituents or phases, for example, inorganic particulates dispersed within an organic matrix. In aspects, the inorganic-organic hybrid polymeric material may include polymerized monomers comprising an inorganic silicon-based group, for example, a silsesquioxane polymer. A silsesquioxane polymer may be, for example, an alkyl-silsesquioxane, an aryl-silsesquioxane, or an aryl alkyl-silsesquioxane having the following chemical structure: $(RSiO_{1.5})_n$, where R is an organic group for example, but not limited to, methyl or phenyl. In aspects, an OTP hard-coat layer may comprise a silsesquioxane polymer combined with an organic matrix, for example, SILPLUS manufactured by Nippon Steel Chemical Co., Ltd. In aspects, an OTP hard-coat layer may comprise 90 wt % to 95 wt % aromatic hexafunctional urethane acrylate (e.g., PU662NT (Aromatic hexafunctional urethane acrylate) manufactured by Miwon Specialty Chemical Co.) and 10 wt % to 5 wt % photo-initiator (e.g., Darocur 1173 manufactured by Ciba Specialty Chemicals Corporation) with a hardness of 8H or more. In aspects, an OTP hard-coat layer composed of an aliphatic or aromatic hexafunctional urethane acrylate may be formed as a stand-alone layer by spin-coating the layer on a polyethylene terephthalate (PET) substrate, curing the urethane acrylate, and removing the urethane acrylate layer from the PET substrate. In aspects, an OTP hard-coat layer may be an aliphatic or aromatic hexafunctional urethane acrylate material layer having a thickness within one or more of the thickness ranges discussed above for the coating thickness 257.

In aspects, the coating 251, if provided, may also comprise one or more of an easy-to-clean coating, a low-friction coating, an oleophobic coating, a diamond-like coating, a scratch-resistant coating, or an abrasion-resistant coating. A scratch-resistant coating may comprise an oxynitride, for example, aluminum oxynitride or silicon oxynitride with a thickness of about 500 micrometers or more. In such aspects, the abrasion-resistant layer may comprise the same material as the scratch-resistant layer. In aspects, a low friction coating may comprise a highly fluorinated silane coupling agent, for example, an alkyl fluorosilane with oxymethyl groups pendant on the silicon atom. In such aspects, an easy-to-clean coating may comprise the same material as the low friction coating. In other aspects, the easy-to-clean coating may comprise a protonatable group, for example an amine, for example, an alkyl aminosilane with oxymethyl groups pendant on the silicon atom. In such aspects, the oleophobic coating may comprise the same material as the easy-to-clean coating. In aspects, a diamond-like coating comprises carbon and may be created by applying a high voltage potential in the presence of a hydrocarbon plasma.

In aspects, as shown in FIGS. 2 and 4, the foldable apparatus 101 can comprise the release liner 271 although other substrates (e.g., glass-based substrate and/or ceramic-based substrate discussed throughout the application) may be used in further aspects rather than the illustrated release liner 271. In further aspects, as shown, the release liner 271, or another substrate, can be disposed over the adhesive layer 261. In even further aspects, as shown, the release liner 271, or another substrate, can directly contact the second contact surface 265 of the adhesive layer 261. The release liner 271, or another substrate, can comprise a first major surface 273 and a second major surface 275 opposite the first major surface 273. As shown, the release liner 271, or another substrate, can be disposed on the adhesive layer 261 by attaching the second contact surface 265 of the adhesive layer 261 to the first major surface 273 of the release liner 271, or another substrate. In aspects, as shown, the first major surface 273 of the release liner 271, or another substrate, can comprise a planar surface. In aspects, as shown, the second major surface 275 of the release liner 271, or another substrate, can comprise a planar surface. A substrate comprising the release liner 271 can comprise a paper and/or a polymer, for example polyesters (e.g., polyethylene terephthalate (PET)) and polyolefins.

Aspects of the disclosure can comprise a consumer electronic product. The consumer electronic product can comprise a front surface, a back surface, and side surfaces. The consumer electronic product can further comprise electrical components at least partially within the housing. The electrical components can comprise a controller, a memory, and a display. The display can be at or adjacent to the front surface of the housing. The display can comprise liquid crystal display (LCD), an electrophoretic displays (EPD), an organic light-emitting diode (OLED) display, or a plasma display panel (PDP). The consumer electronic product can comprise a cover substrate disposed over the display. In aspects, at least one of a portion of the housing or the cover substrate comprises the foldable apparatus discussed throughout the disclosure. The consumer electronic product can comprise a portable electronic device, for example, a smartphone, a tablet, a wearable device, or a laptop.

Figure 10:
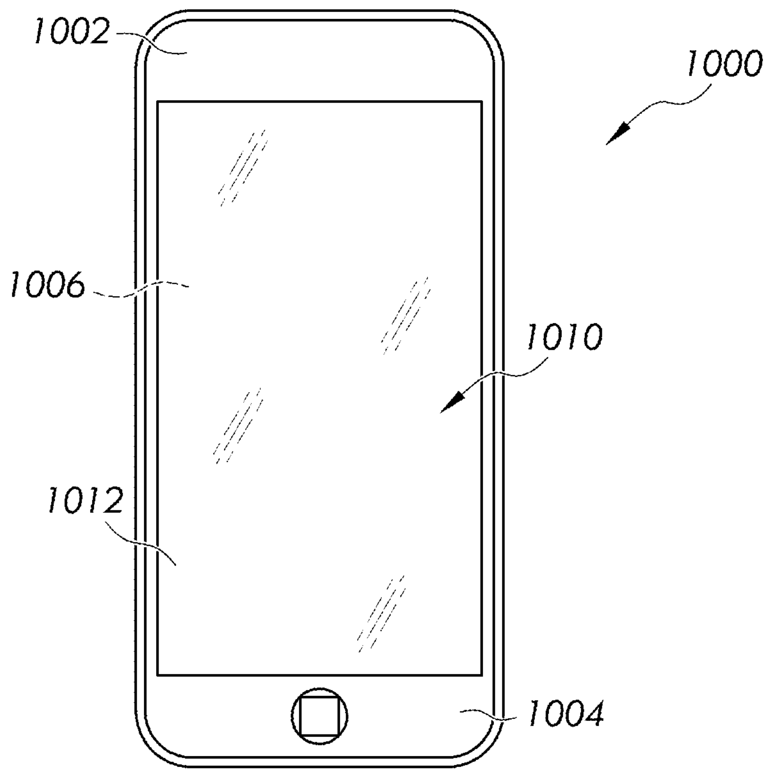
FIG. 10 is a schematic plan view of an example consumer electronic device according to aspects.
Figure 11:
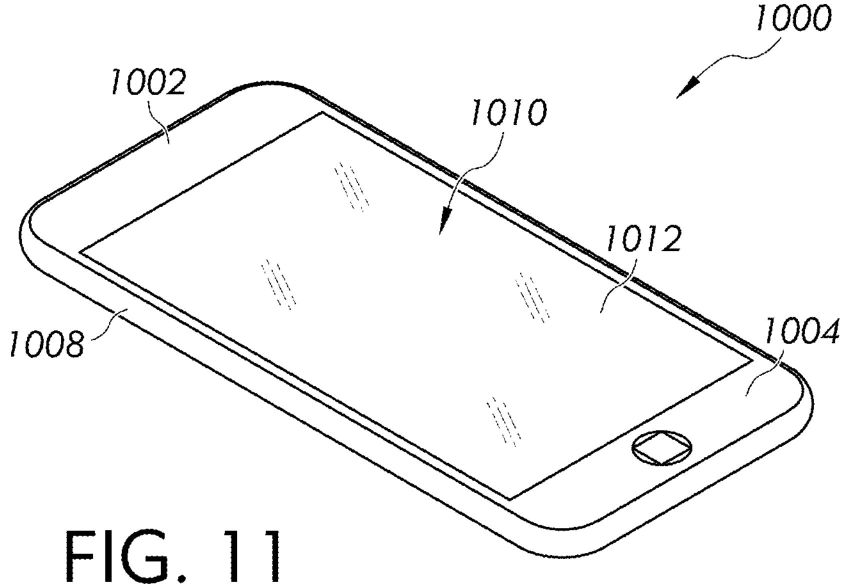
FIG. 11 is a schematic perspective view of the example consumer electronic device of FIG. 10.

The foldable apparatus disclosed herein may be incorporated into another article, for example, an article with a display (or display articles) (e.g., consumer electronics, including mobile phones, tablets, computers, navigation systems, wearable devices (e.g., watches), and the like), architectural articles, transportation articles (e.g., automotive, trains, aircraft, sea craft, etc.), appliance articles, or any article that may benefit from some transparency, scratch-resistance, abrasion resistance or a combination thereof. An exemplary article incorporating any of the foldable apparatus disclosed herein is shown in FIGS. 10-11. Specifically, FIGS. 10-11 show a consumer electronic device 1000 including a housing 1002 having front 1004, back 1006, and side surfaces 1008. Although not shown, the consumer electronic device can comprise electrical components that are at least partially inside or entirely within the housing. For example, electrical components include at least a controller, a memory, and a display. As shown in FIGS. 10-11, the display 1010 can be at or adjacent to the front surface of the housing 1002. The consumer electronic device can comprise a cover substrate 1012 at or over the front surface of the housing 1002 such that it is over the display 1010. In aspects, at least one of the cover substrate 1012 or a portion of housing 1002 may include any of the foldable apparatus disclosed herein, for example, the foldable substrate.

In aspects, the foldable substrate 201 comprising a glass-based substrate and/or a ceramic-based substrate, and the first portion 221, the second portion 231, and/or the central portion 281 can comprise one or more compressive stress regions. In aspects, a compressive stress region may be created by chemically strengthening. Chemically strengthening may comprise an ion exchange process, where ions in a surface layer are replaced by—or exchanged with—larger ions having the same valence or oxidation state. Methods of chemically strengthening will be discussed later. Without wishing to be bound by theory, chemically strengthening the first portion 221, the second portion 231, and/or the central portion 281 can enable good impact and/or puncture resistance (e.g., resists failure for a pen drop height of about 15 centimeters (cm) or more, about 20 cm or more, about 50 cm or more). Without wishing to be bound by theory, chemically strengthening the first portion 221, the second portion 231, and/or the central portion 281 can enable small (e.g., smaller than about 10 mm or less) parallel plate distance because the compressive stress from the chemical strengthening can counteract the bend-induced tensile stress on the outermost surface of the substrate. A compressive stress region may extend into a portion of the first portion and/or the second portion for a depth called the depth of compression (DOC). As used herein, depth of compression means the depth at which the stress in the chemically strengthened substrates and/or portions described herein changes from compressive stress to tensile stress. Depth of compression may be measured by a surface stress meter or a scattered light polariscope (SCALP, wherein values reported herein were made using SCALP-5 made by Glasstress Co., Estonia) depending on the ion exchange treatment and the thickness of the article being measured. Where the stress in the substrate and/or portion is generated by exchanging potassium ions into the substrate, a surface stress meter, for example, the FSM-6000 (Orihara Industrial Co., Ltd. (Japan)), is used to measure depth of compression. Unless specified otherwise, compressive stress (including surface CS) is measured by surface stress meter (FSM) using commercially available instruments, for example the FSM-6000, manufactured by Orihara. Surface stress measurements rely upon the accurate measurement of the stress optical coefficient (SOC), which is related to the birefringence of the glass. Unless specified otherwise, SOC is measured according to Procedure C (Glass Disc Method) described in ASTM standard C770-16, entitled "Standard Test Method for Measurement of Glass Stress-Optical Coefficient," the contents of which are incorporated herein by reference in their entirety. Where the stress is generated by exchanging sodium ions into the substrate, and the article being measured is thicker than about 400 μm, SCALP is used to measure the depth of compression and central tension (CT). Where the stress in the substrate and/or portion is generated by exchanging both potassium and sodium ions into the substrate and/or portion, and the article being measured is thicker than about 400 μm, the depth of compression and CT are measured by SCALP. Without wishing to be bound by theory, the exchange depth of sodium may indicate the depth of compression while the exchange depth of potassium ions may indicate a change in the magnitude of the compressive stress (but not the change in stress from compressive to tensile). The refracted near-field (RNF; the RNF method is described in U.S. Pat. No. 8,854,623, entitled "Systems and methods for measuring a profile characteristic of a glass sample", which is incorporated herein by reference in its entirety) method also may be used to derive a graphical representation of the stress profile. When the RNF method is utilized to derive a graphical representation of the stress profile, the maximum central tension value provided by SCALP is utilized in the RNF method. The graphical representation of the stress profile derived by RNF is force balanced and calibrated to the maximum central tension value provided by a SCALP measurement. As used herein, "depth of layer" (DOL) means the depth that the ions have exchanged into the substrate and/or portion (e.g., sodium, potassium). Throughout the disclosure, DOL is measured in accordance with ASTM C-1422. Without wishing to be bound by theory, a DOL is usually greater than or equal to the corresponding DOC. Through the disclosure, when the maximum central tension cannot be measured directly by SCALP (as when the article being measured is thinner than about 400 μm) the maximum central tension can be approximated by a product of a maximum compressive stress and a depth of compression divided by the difference between the thickness of the substrate and twice the depth of compression, wherein the compressive stress and depth of compression are measured by FSM.

In aspects, the first portion 221 may comprise a first compressive stress region at the first surface area 223 extending to a first depth of compression from the first surface area 223 and/or a second compressive stress region at the second surface area 225 extending to a second depth of compression from the second surface area 225. In aspects, the first depth of compression and/or the second depth of compression, as a percentage of the substrate thickness 207, can be about 5% or more, about 10% or more, about 12% or more, about 15% or more, about 30% or less, about 25% or less, about 22% or less, about 20% or less, about 17% or less, or about 15% or less. In aspects, the first depth of compression and/or the second depth of compression, as a percentage of the substrate thickness 207, can range from about 5% to about 30%, from about 10% to about 25%, from about 10% to about 22%, from about 12% to about 20%, from about 15% to about 17%, or any range or subrange therebetween. In aspects, the first depth of compression and/or the second depth of compression can be about 1 μm or more, about 10 μm or more, about 15 μm or more, about 20 μm or more, about 25 μm or more, about 30 μm or more, about 200 μm or less, about 150 μm or less, about 100 μm or less, about 60 μm or less, about 45 μm or less, about 30 μm or less, or about 20 μm or less. In aspects, the first depth of compression and/or the second depth of compression can range from about 1 μm to about 200 μm, from about 1 μm to about 150 μm, from about 10 μm to about 100 μm, from about 15 μm to about 60 μm, from about 20 μm to about 45 μm, from about 20 μm to about 30 μm, or any range or subrange therebetween. By providing a first portion comprising a first glass-based and/or ceramic-based portion comprising a first depth of compression and/or a second depth of compression in a range from about 1% to about 30% of the first thickness, good impact and/or puncture resistance can be enabled.

In aspects, the first compressive stress region can comprise a first maximum compressive stress, and/or the second compressive stress region can comprise a second maximum compressive stress. In further aspects, the first maximum compressive stress and/or the second maximum compressive stress can be about 100 MegaPascals (MPa) or more, about 300 MPa or more, 400 MPa or more, about 500 MPa or more, about 600 MPa or more, about 700 MPa or more, about 1,500 MPa or less, about 1,200 MPa or less, about 1,000 MPa or less, or about 800 MPa or less. In further aspects, the first maximum compressive stress and/or the second maximum compressive stress can range from about 100 MPa to about 1,500 MPa, from about 300 MPa to about 1,200 MPa, from about 400 MPa to about 1,000 MPa, from about 500 MPa to about 900 MPa, from about 600 MPa to about 900 MPa, from about 700 MPa to about 800 MPa, or any range or subrange therebetween. By providing a first maximum compressive stress and/or a second maximum compressive stress in a range from about 100 MPa to about 1,500 MPa, good impact and/or puncture resistance can be enabled.

The first portion 221 may comprise a first tensile stress region positioned between the first compressive stress region and the second compressive stress region. In aspects, the first tensile stress region can comprise a first maximum tensile stress of about 10 MPa or more, about 20 MPa or more, about 30 MPa or more, about 100 MPa or less, about 80 MPa or less, or about 60 MPa or less. In further aspects, the first maximum tensile stress can range from about 10 MPa to about 100 MPa, from about 20 MPa to about 80 MPa, from about 30 MPa to about 60 MPa, or any range or subrange therebetween. Providing a first maximum tensile stress in a range from about 10 MPa to about 100 MPa can enable good impact and/or puncture resistance while providing low energy fractures, as discussed below.

In aspects, the second portion 231 may comprise a third compressive stress region at the third surface area 233 extending to a third depth of compression from the third surface area 233, and/or the second portion 231 may comprise a fourth compressive stress region at the fourth surface area 235 extending to a fourth depth of compression from the fourth surface area 235. In aspects, the third depth of compression and/or the fourth depth of compression, as a percentage of the substrate thickness 207, can be within one or more of the ranges discussed above for the first depth of compression and/or the second depth of compression. In further aspects, the third depth of compression can be substantially equal to the fourth depth of compression. The third compressive stress region can comprise a third maximum compressive stress, and/or the fourth compressive stress region can comprise a fourth maximum compressive stress. In aspects, the third maximum compressive stress and/or the fourth maximum compressive stress can be within one or more of the ranges discussed above for the first maximum compressive stress and/or the second maximum compressive stress. The second portion 231 may comprise a second tensile stress region positioned between the third compressive stress region and the fourth compressive stress region. In aspects, the second tensile stress region can comprise a second maximum tensile stress that can be within one or more of the ranges discussed above for the first maximum tensile stress. In further aspects, the first maximum tensile stress can be substantially equal to the second maximum tensile stress.

In aspects, the first depth of compression can be substantially equal to the third depth of compression. In aspects, the second depth of compression can be substantially equal to the fourth depth of compression. In aspects, the first maximum compressive stress can be substantially equal to the third maximum compressive stress. In aspects, the second maximum compressive stress can be substantially equal to the fourth maximum compressive stress. In aspects, the first depth of layer of one or more alkali-metal ions can be substantially equal to the third depth of layer of one or more alkali-metal ions. In aspects, the second depth of layer of one or more alkali-metal ions can be substantially equal to the fourth depth of layer of one or more alkali-metal ions.

In aspects, the central portion 281 can comprise a first central compressive stress region at the first central surface area 213 extending to a first central depth of compression from the first central surface area 213, and/or the central portion 281 can comprise a second central compressive stress region at the second central surface area 243 extending to a second central depth of compression from the second central surface area 243. In further aspects, the first central depth of compression and/or the second central depth of compression, as a percentage of the central thickness 209, can be within one or more of the ranges discussed above for the first depth of compression and/or the second depth of compression, as a percentage of the substrate thickness 207. In further aspects, the first central depth of compression and/or the second central depth of compression as a percentage of the central thickness 209 can be about 1% or more, about 2% or more, about 5% or more, about 8% or more, about 10% or more, about 12% or more, about 25% or less, about 20% or less, about 17% or less, about 15% or less, about 12% or less, about 10% or less, about 7% or less, or about 5% or less. For example, the first central depth of compression and/or the second central depth of compression as a percentage of the central thickness 209 can range from about 1% to about 25%, from about 2% to about 20%, from about 5% to about 17%, from about 7% to about 12%, or any range or subrange therebetween. In further aspects, the first central depth of compression can be substantially equal to the second central depth of compression. In further aspects, the first central depth of compression and/or the second central depth of compression can be within one or more of the ranges discussed above for the first depth of compression and/or the second depth of compression. In further aspects, the first central depth of compression and/or the second central depth of compression can be about 1 μm or more about 2 μm or more, about 4 μm or more, about 6 μm or more, about 20 μm or less, about 15 μm or less, about 10 μm or less, or about 8 μm or less. For example, the first central depth of compression and/or the second central depth of compression can range from about 1 μm to about 20 μm, from about 2 μm to about 15 μm, from about 4 μm to about 10 μm, from about 6 μm to about 8 μm, or any range or subrange therebetween. By providing a central portion comprising a glass-based and/or ceramic-based portion comprising a first central depth of compression and/or a second central depth of compression in a range from about 1% to about 25% of the central thickness, good impact and/or puncture resistance can be enabled.

The first central compressive stress region can comprise a first central maximum compressive stress, and/or the second central compressive stress region can comprise a second central maximum compressive stress. In aspects, the first central maximum compressive stress and/or the second central maximum compressive stress can be within one or more of the ranges discussed above for the first maximum compressive stress and/or the second maximum compressive stress. By providing a first central maximum compressive stress and/or a second central maximum compressive stress in a range from about 100 MPa to about 1,500 MPa, good impact and/or puncture resistance can be enabled.

The central portion 281 may comprise a central tensile stress region positioned between the first central compressive stress region and the second central compressive stress region. In aspects, the central tensile stress region can comprise a central maximum tensile stress of about 125 MPa or more, about 150 MPa or more, about 200 MPa or more, about 375 MPa or less, about 300 MPa or less, or about 250 MPa or less. In further aspects, the central maximum tensile stress can range from about 125 MPa to about 375 MPa, from about 125 MPa to about 300 MPa, from about 125 MPa to about 250 MPa, from about 150 MPa to about 375 MPa, from about 150 MPa to about 300 MPa, from about 150 MPa to about 250 MPa, from about 200 MPa to about 375 MPa, from about 200 MPa to about 300 MPa, from about 200 MPa to about 250 MPa, or any range or subrange therebetween. Providing a central maximum tensile stress in a range from about 125 MPa to about 375 MPa can enable low minimum parallel plate distance.

Figure 23:
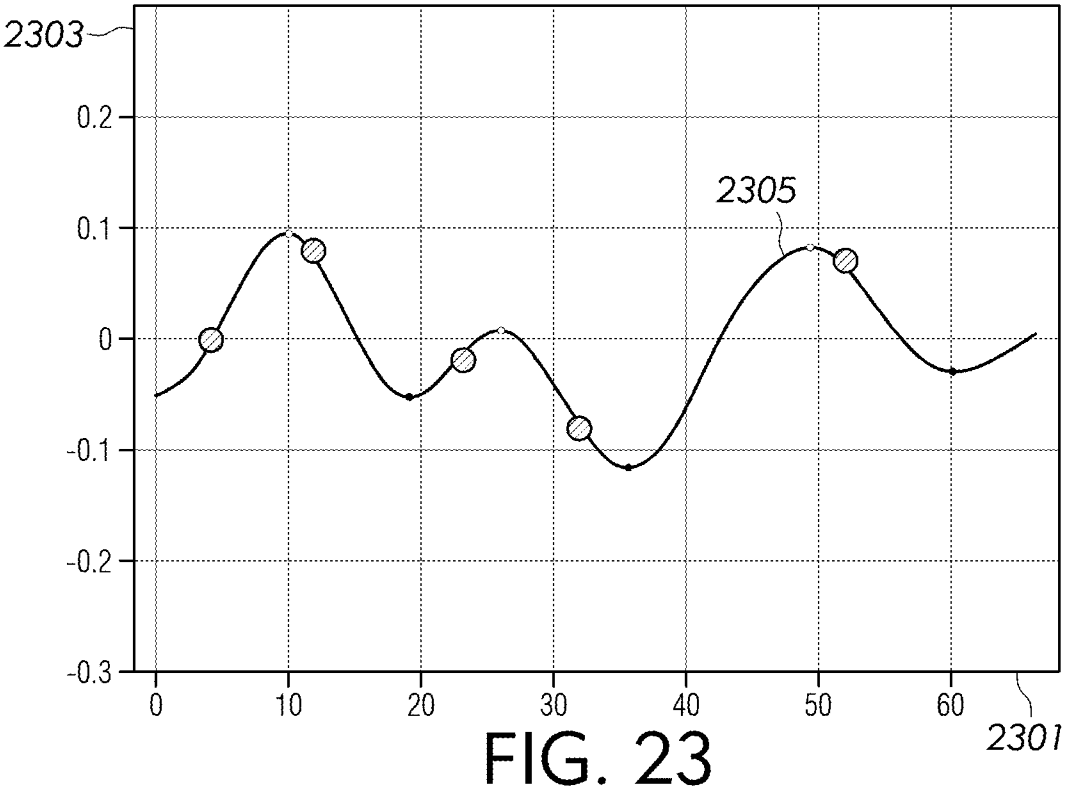
FIGS. 23-27 schematically illustrate surface profiles of foldable apparatus described in the Examples.
Figure 24:
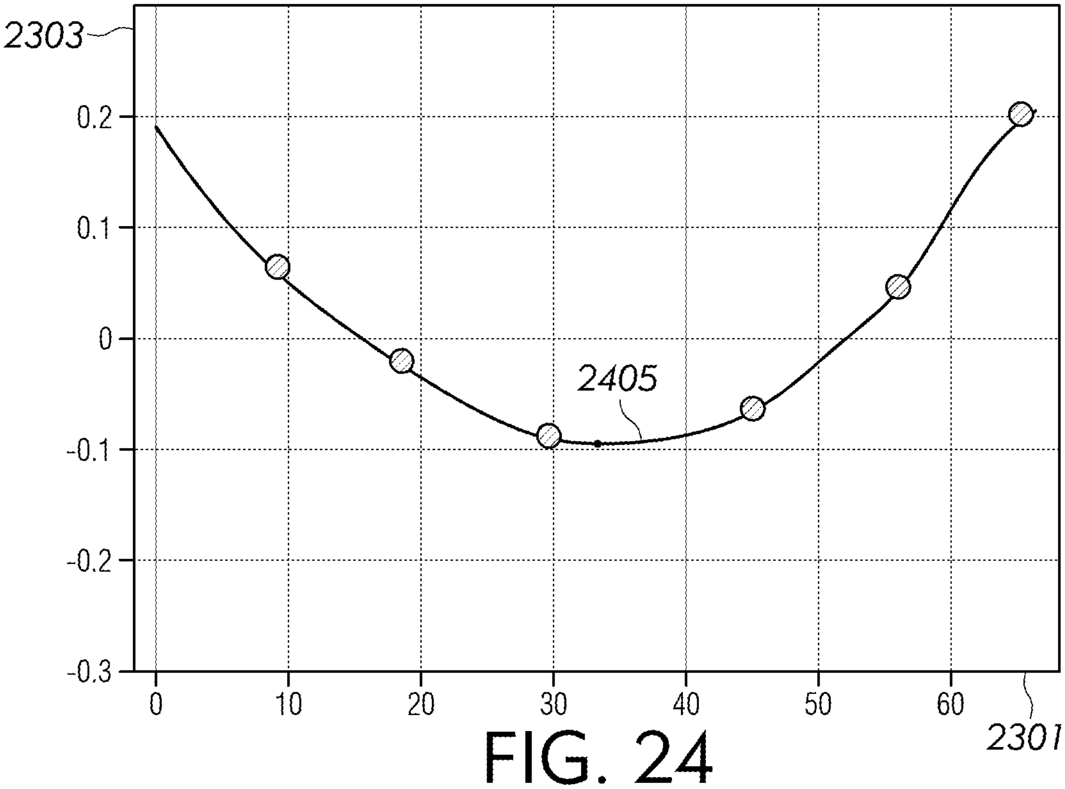
Figure 25:
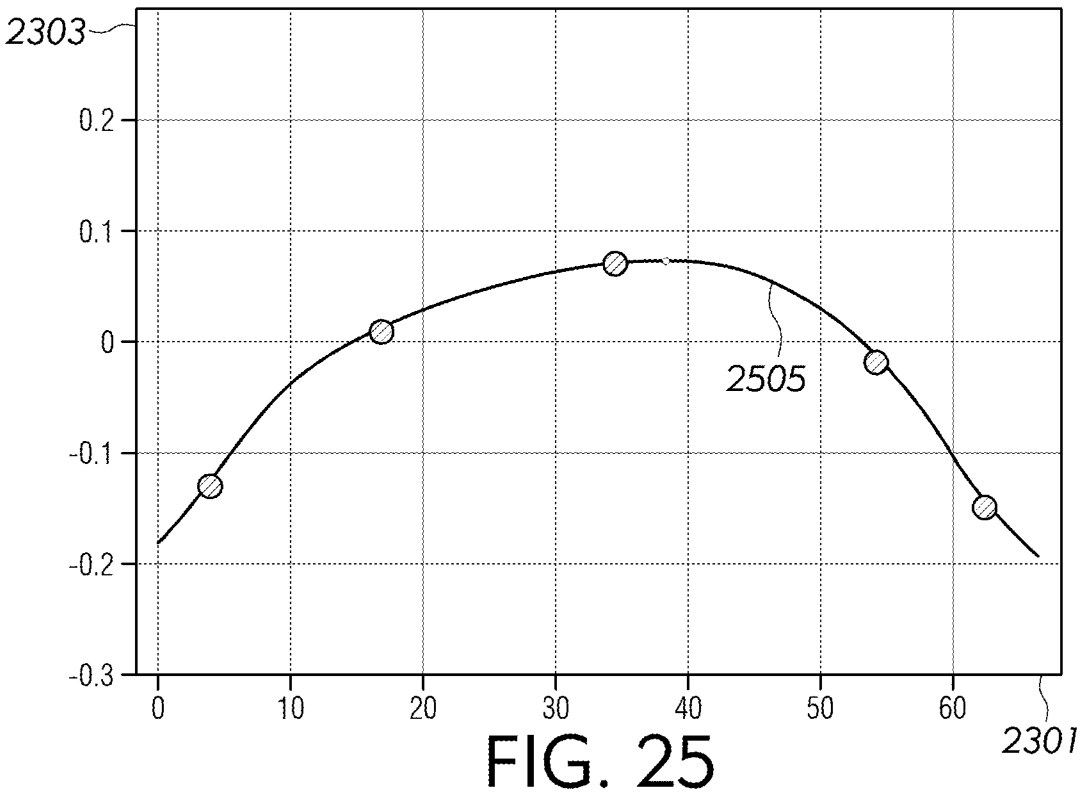
Figure 26:
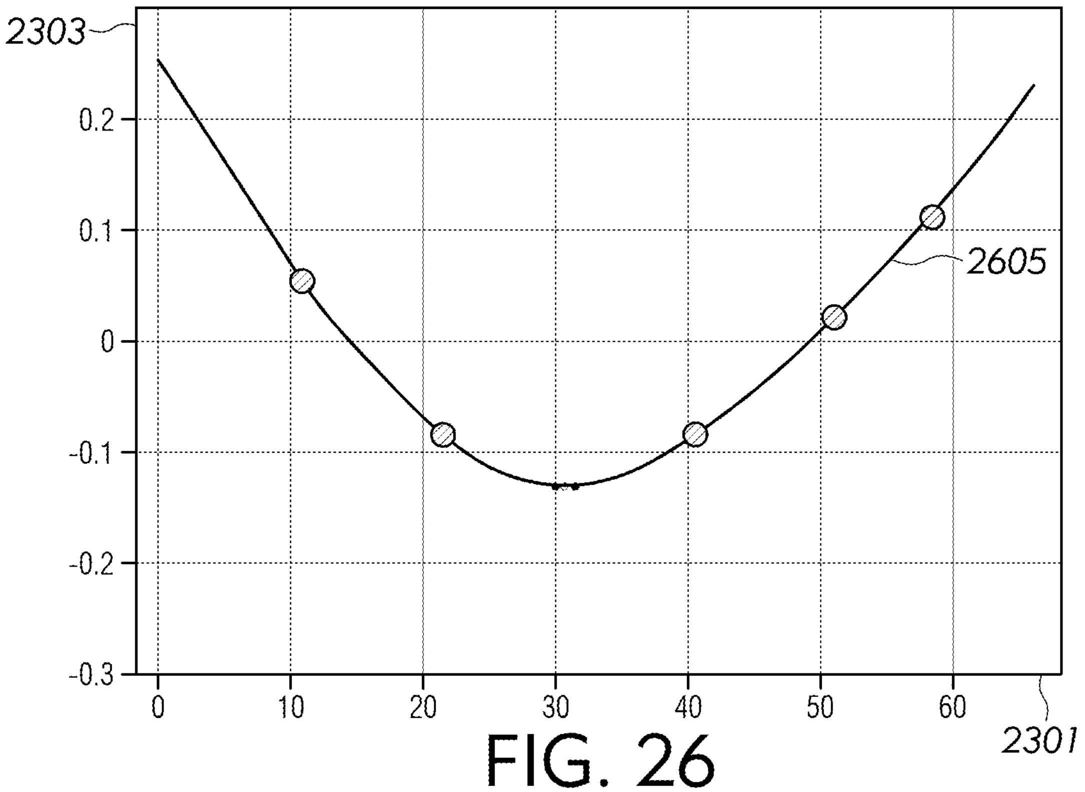
Figure 27:
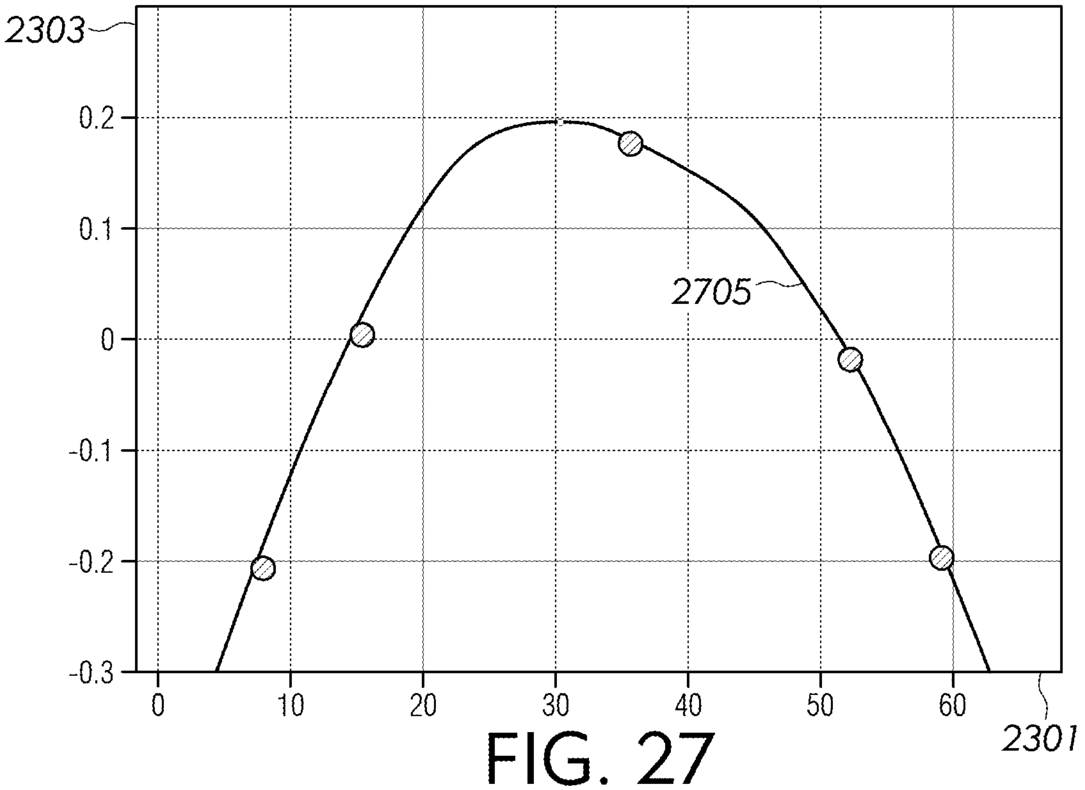

In aspects, the foldable apparatus 101, 301, 401, 501, 701, 801, and/or 901 and/or the foldable substrate 201 can be free from buckling in the central portion 281 and/or the central region 248. A foldable apparatus and/or a foldable substrate can be buckled when a surface profile of the first central surface area taken along a midline of the central portion equally spaced from the first portion and the second portion using a deflectometer comprises non-parabolic shape. As used herein, the deflectometer profile is measured using a SpecGAGE3D available from Irsa Vision using the default settings. The raw deflectometry measurements correspond to an array of gradients over the measured area. The measured gradients are integrated by the software provided with the SpecGAGE3D to produce a 3D surface. A zero-point of the 3D surface is set so that the average height of the entire 3D surface is 0. A line profile corresponding to the midline of the central portion (i.e., midway between the first portion and the second portion) is extracted from this 3D surface is used as the surface profile (i.e., deflectometer profile). For example, FIG. 23 shows a surface profile 2305 that is buckled and has multiple peaks with a non-parabolic profile; in contrast, the surface profile 2505 or 2605 shown in FIGS. 25-26 are non-buckled and have a parabolic-like surface profile. However, the general shape of the surface profile may not be precise enough to define whether a sample is buckled or non-buckled. As discussed below with reference to FIG. 28, it has been found that an average of an absolute value of the gradient of the surface profile (i.e., "average gradient") can distinguish between buckled and non-buckled sample with buckled samples having a larger average gradient than non-buckled samples. As used herein, the average gradient is calculated by averaging all gradient measurements, where each gradient measurement is calculated between adjacent extrema (e.g., a local maximum and adjacent local minimum). In aspects, the surface profile of the first central surface area 213 taken along a midline of the central region 248 can comprise an average gradient of about 0.018 mm/mm or less, about 0.017 mm/mm or less, about 0.016 mm/mm or less, about 0.015 mm/mm or less, about 0.013 mm/mm or less, about 0.12 mm/mm or less, about 0.011 mm/mm or less, or about 0.010 mm/mm or less. In aspects, the surface profile of the first central surface area 213 taken along a midline of the central region 248 can comprise an average gradient from about 0.001 mm/mm to about 0.018 mm/mm, from about 0.002 mm/mm to about 0.017 mm/mm, from about 0.003 mm/mm to about 0.016 mm/mm, from about 0.005 to about 0.015 mm/mm, from about 0.008 mm/mm to about 0.013 mm/mm, from about 0.010 mm/mm to about 0.012 mm/mm, or any range or subrange therebetween. For samples that are not buckled, the central portion and/or the central region can exhibit a warp that can be tolerated for most applications. The warp was taken as the largest difference in height (vertical axis) of the surface profile along width along the midline excluding the measurements within 1 mm of the edge of the surface profile. In aspects, the surface profile of the first central surface area 213 taken along a midline of the central region 248 can comprise a tolerable warp of about 1,000 μm or less, about 700 μm or less, about 600 μm or less, about 500 μm or less, about 400 μm or less, about 350 μm or less, about 320 μm or less, about 300 μm or less, about 280 μm or less, about 250 μm or less, or about 200 μm or less. In aspects, a warp of the surface profile per length of the midline (μm/mm) can be about 10 μm/mm or less, about 9 μm/mm or less, about 8 μm/mm or less, about 7 μm/mm or less, about 6 μm or less, or about 5 μm/mm or less.

Buckling is a type of mechanical instability. Without wishing to be bound by theory, buckling can occur when a portion of a foldable substrate is subjected to greater than a critical buckling strain for that portion. Critical buckling strain increases with thickness; so, the central portion may be the most susceptible to buckling. When the central portion is subjected to increasing strain less than the critical buckling strain, the central portion can exhibit increasing saddle warp. One source of strain on the central portion is chemical strengthening induced expansion strain caused by expansion when larger ions replace existing, smaller ions in the foldable substrate. Specifically, a mismatch between a chemical strengthening induced expansion strain of the central portion and the first portion and the second portion can arise due to the different thicknesses (e.g., volume) of the these portions (central portion, first portion, and second portion) and potentially different amounts of chemical strengthening that these portions are subjected to.

The present disclosure demonstrates that a mismatch between a chemical strengthening induced expansion strain of the portions of the foldable substrate can be reduced by including a small amount (e.g., from about 0.02 wt % to about 0.08 wt % when making a foldable substrate 201 with two recesses opposite one another in foldable substrate-see FIGS. 2-3, or from about 0.5 wt % to about 1.5 wt % when making a foldable substrate 201 with a recess on only one side of the central portion-see FIG. 4) of a lithium salt in a final molten salt bath, which increases a surface concentration of lithium oxide in the foldable substrate. Exchanging sodium or potassium in the foldable substrate with the smaller lithium from the molten salt bath ("reverse ion exchange") can counteract (e.g., decrease) an amount of chemical strengthening induced expansion caused by the simultaneous "forward ion exchange" of smaller ions (e.g., sodium) in the foldable substrate with larger ions (e.g., potassium, cesium) in the final molten salt bath. As demonstrated in the Examples discussed below, including a small amount (e.g., from about 0.02 wt % to about 0.08 wt %) of a lithium salt in a final molten salt bath unexpectedly reduces an incidence of buckling and/or warp of the foldable substrate (e.g., central portion). However, providing larger amounts of lithium salt may cause large saddle warp, for example, by chemical strengthening induced contraction from the reverse ion exchange of lithium into the foldable substrate generating a different mismatch in chemical strengthening induced expansion strain of portions of the foldable substrate.

Throughout the disclosure, concentration profiles of lithium oxide ($Li_2O$), sodium oxide ($Na_2O$), and potassium oxide ($K_2O$) are measured using glow discharge optical emission spectroscopy (GDOES). While surface concentrations can be measured using secondary-ion mass spectroscopy (SIMS), surface concentrations discussed herein will use measurements from GDOES; however, the "surface concentration" or "concentration at the surface" from GDOES measurements is taken as the concentration at a depth of 1 μm from the surface to avoid any spurious readings or surface contamination during the start of the GDOES measurement. As used herein, concentrations in mol % reported in the concentration profiles from GDOES refer to the amount of the given compound at a certain depth from the surface relative to other compounds detected at that same, certain depth from the surface. As discussed below, FIGS. 29-33 and 46-51 show concentration profiles for $Li_2O$, $Na_2O$, and $K_2O$ measured using GDOES.

In aspects, a concentration of $Li_2O$ at the first major surface 203 (e.g., first surface area 223 in the first portion 221, third surface area 233 in the second portion 231) can be about 0.1 mol % or more, about 0.2 mol % or more, about 0.3 mol % or more, about 0.4 mol % or more, about 0.5 mol % or more, about 0.75 mol % or more, about 1 mol % or more, about 2 mol % or less, about 1.8 mol % or less, about 1.5 mol % or less, about 1.2 mol % or less, or about 1 mol % or less. In aspects, a concentration of $Li_2O$ at the first major surface 203 (e.g., first surface area 223 in the first portion 221, third surface area 233 in the second portion 231) can range from about 0.1 mol % to about 2 mol %, from about 0.2 mol % to about 2 mol %, from about 0.2 mol % to about 2 mol %, from about 0.3 mol % to about 1.8 mol %, from about 0.4 mol % to about 1.5 mol %, from about 0.5 mol % to about 1.2 mol %, from about 0.75 mol % to about 1 mol %, or any range or subrange therebetween. In aspects, a concentration of $Li_2O$ at the first major surface 203 can be from about 0.2 mol % to about 2 mol %, from about 0.5 mol % to about 1.8 mol %, from about 0.75 mol % to about 1.5 mol %, or any range or subrange therebetween. In aspects, a concentration of $Li_2O$ at the second major surface 205 (e.g., second surface area 225 in the first portion 221, fourth surface area 235 in the second portion 231) can be within one or more of the ranges discussed above in this paragraph and/or substantially equal to the concentration of $Li_2O$ at the first major surface 203. In aspects, a concentration of $Li_2O$ at the first central surface area 213 and/or the second central surface area 243 can be within one or more of the ranges discussed above in this paragraph. In further aspects, the concentration of $Li_2O$ at the first central surface area 213 and/or the second central surface area 243 can be substantially equal to the concentration of $Li_2O$ at the first major surface 203 and/or at the second major surface 205. Providing a surface concentration of $Li_2O$ (e.g., as an absolute mol % and/or an amount that the surface concentration is elevated relative to a concentration at the midpoint) from about 0.2 mol % to about 2 mol % can reduce (e.g., mitigate, counteract) a chemical strengthening induced expansion and resulting strain in the foldable substrate.

In aspects, a concentration of $K_2O$ at the first major surface 203 (e.g., first surface area 223 in the first portion 221, third surface area 233 in the second portion 231) can be about 5 mol % or more, about 6 mol % or more, about 7 mol % or more, about 8 mol % or more, about 9 mol % or more, about 10 mol % or more, about 15 mol % or less, about 14 mol % or less, about 13 mol % or less, about 12 mol % or less, about 11 mol % or less, or about 10 mol % or less. In aspects, a concentration of $K_2O$ at the first major surface 203 (e.g., first surface area 223 in the first portion 221, third surface area 233 in the second portion 231) can range from about 5 mol % to about 15 mol %, from about 6 mol % to about 14 mol %, from about 7 mol % to about 13 mol %, from about 8 mol % to about 12 mol %, from about 9 mol % to about 11 mol %, from about 9 mol % to about 10 mol %, or any range or subrange therebetween. In aspects, a concentration of $K_2O$ at the second major surface 205 (e.g., second surface area 225 in the first portion 221, fourth surface area 235 in the second portion 231) can be within one or more of the ranges discussed above in this paragraph and/or substantially equal to the concentration of $K_2O$ at the first major surface 203. In aspects, a concentration of $K_2O$ at the first central surface area 213 and/or the second central surface area 243 can be within one or more of the ranges discussed above in this paragraph. In further aspects, the concentration of $K_2O$ at the first central surface area 213 and/or the second central surface area 243 can be substantially equal to the concentration of $K_2O$ at the first major surface 203 and/or at the second major surface 205. Alternatively or additionally, a total concentration of potassium oxide ($K_2O$), rubidium oxide ($Rb_2O$), cesium oxide ($Cs_2O$), and francium oxide ($Fr_2O$) at the first major surface (e.g., first surface area 223 in the first portion 221, third surface area 233 in the second portion 231), the second major surface 205 (e.g., second surface area 225 in the first portion 221, fourth surface area 235 in the second portion 231), the first central surface area 213, and/or the second central surface area 243 can be within one or more of the ranges discussed above in the paragraph for the concentration of $K_2O$. Providing a high (e.g., about 5 mol % or more) concentration of $K_2O$ (e.g., as an absolute mol % and/or an amount that the surface concentration is elevated relative to a concentration at the midpoint) can provide a large (e.g., about 500 MPa) surface compressive stress that can enable increased fracture resistance.

In aspects, a concentration of $K_2O$ at the first major surface 203 (e.g., first surface area 223 in the first portion 221, third surface area 233 in the second portion 231) can be greater than the concentration of $Na_2O$ at the first major surface 203. In further aspects, a ratio of the concentration of $K_2O$ at the first major surface 203 to the concentration of $Na_2O$ at the first major surface 203 can be about 1 or more, about 2 or more, about 3 or more, about 4 or more, about 5 or more, about 20 or less, about 15 or less, about 12 or less, or about 10 or less. In further aspects, a ratio of the concentration of $K_2O$ at the first major surface 203 to the concentration of $Na_2O$ at the first major surface 203 can range from about 1 to about 20, from about 2 to about 15, from about 3 to about 12, from about 4 to about 10, from about 5 to about 10, or any range or subrange therebetween. In aspects, a concentration of $Na_2O$ at the second major surface 205 (e.g., second surface area 225 in the first portion 221, fourth surface area 235 in the second portion 231) can be less than the concentration of $K_2O$ at the second major surface 205 (e.g., second surface area 225 in the first portion 221, fourth surface area 235 in the second portion 231). In further aspects, a ratio of the concentration of $K_2O$ at the second major surface 205 to the concentration of $Na_2O$ at the second major surface 205 can be within one or more of the ranges discussed above in this paragraph. In aspects, the concentration of $K_2O$ at the first central surface area 213 and/or the second central surface area 243 can be greater than the concentration of $Na_2O$ at the corresponding surface. In further aspects, a ratio of the concentration of $Na_2O$ at the surface to the concentration of $K_2O$ at the surface, where the surface is the first central surface area 213 and/or the second central surface area 243, can be within one or more of the ranges discussed above in this paragraph. Alternatively or additionally, a total concentration of potassium oxide ($K_2O$), rubidium oxide ($Rb_2O$), cesium oxide ($Cs_2O$), and francium oxide ($Fr_2O$) at the first major surface 203 can be greater than the concentration of $Na_2O$ at the first major surface. Similarly, a ratio of the total concentration $K_2O$, $Rb_2O$, $Cs_2O$, and $Fr_2O$ at the first major surface to the concentration of $Na_2O$ at the first major surface can be within one more of the corresponding ranges discussed above in this paragraph. Providing more potassium oxide than sodium oxide at the surface (or a ratio within one or more of the ranges discussed in this paragraph) can provide a large (e.g., about 500 MPa) surface compressive stress that can enable increased fracture resistance since a majority of smaller alkali metal in the substrate will have been exchanged with potassium.

In aspects, a concentration of $K_2O$ at the first major surface 203 can be greater than the concentration of $Li_2O$ at the first major surface 203. In further aspects, a ratio of the concentration of $K_2O$ at the first major surface 203 to the concentration of $Li_2O$ at the first major surface 203 can be about 5 or more, about 7 or more, about 8 or more, about 9 or more, about 10 or more, about 12 or more, about 20 or less, about 15 or less, about 12 or less, or about 10 or less. In further aspects, a ratio of the concentration of $K_2O$ at the first major surface 203 to the concentration of $Li_2O$ at the first major surface 203 can range from about 5 to about 20, from about 7 to about 20, from about 8 to about 20, from about 9 to about 15, from about 10 to about 12, or any range or subrange therebetween. Alternatively or additionally, a total concentration of potassium oxide ($K_2O$), rubidium oxide ($Rb_2O$), cesium oxide ($Cs_2O$), and francium oxide ($Fr_2O$) at the first major surface 203 can be greater than the concentration of $Li_2O$ at the first major surface. Similarly, a ratio of the total concentration $K_2O$, $Rb_2O$, $Cs_2O$, and $Fr_2O$ at the first major surface to the concentration of $Li_2O$ at the first major surface can be within one more of the corresponding ranges discussed above in this paragraph. Providing more potassium oxide than lithium oxide at the surface (or a ratio within one or more of the ranges discussed in this paragraph) can provide a large (e.g., about 500 MPa) surface compressive stress that can enable increased fracture resistance since a majority of smaller alkali metal in the substrate will have been exchanged with potassium.

As used herein, a total amount of an alkali metal is determined by integrating a concentration profile obtained from GDOES, as discussed herein, over half of the thickness. In aspects, a ratio of a total amount of $K_2O$ to a total amount of $Li_2O$ can be about 100 or more, about 120 or more, about 150 or more, about 170 or more, about 180 or more, about 300 or less, about 250 or less, about 200 or less, about 190 or less, or 180 or less. In aspects, a ratio of a total amount of $K_2O$ to a total amount of $Li_2O$ can range from about 100 to about 300, from about 120 to about 250, from about 150 to about 200, from about 170 to about 200, from about 180 to about 190, or any range or subrange therebetween. Alternatively or additionally, a ratio of a total amount of potassium oxide ($K_2O$), rubidium oxide ($Rb_2O$), cesium oxide ($Cs_2O$), and francium oxide ($Fr_2O$) to the total amount of $Li_2O$ can be within one more of the corresponding ranges discussed above in this paragraph.

As used herein, a midpoint of the foldable substrate 201 (e.g., first portion 221, second portion 231) is defined as a location midway between the first major surface 203 and the second major surface 205. For example, if the substrate thickness 207 is 100 μm, then the midpoint (e.g., in the first portion) is located 50 μm from the first major surface 203 and 50 μm from the second major surface 205. Likewise, as used herein, a midpoint of the central portion 281 (e.g., central region 248) is defined as a location midway between the first central surface area 213 and the second central surface area 243. For example, if the central thickness 209 is 30 μm, then the central midpoint (e.g., in the central region) is located 15 μm from the first central surface area 213 and 15 μm from the second central surface area 243. In aspects, when the first distance 219 is equal to the second distance 249, the midpoint of the foldable substrate 201 in the first portion 221 and in the second portion 231 can be coplanar with the central midpoint.

In aspects, a concentration of $Li_2O$ at the first major surface 203 (e.g., first surface area 223 in the first portion 221, third surface area 233 in the second portion 231) can be greater than a concentration of $Li_2O$ at the midpoint (e.g., in the first portion, in the second portion) by about 0.1 mol % or more, about 0.2 mol % or more, about 0.3 mol % or more, about 0.4 mol % or more, about 0.5 mol % or more, about 0.75 mol % or more, about 1 mol % or more, about 2 mol % or less, about 1.8 mol % or less, about 1.5 mol % or less, about 1.2 mol % or less, or about 1 mol % or less. In aspects, a concentration of $Li_2O$ at the first major surface 203 (e.g., first surface area 223 in the first portion 221, third surface area 233 in the second portion 231) can be greater than a concentration of $Li_2O$ at the midpoint (e.g., in the first portion, in the second portion) by from about 0.1 mol % to about 2 mol %, from about 0.2 mol % to about 2 mol %, from about 0.2 mol % to about 2 mol %, from about 0.3 mol % to about 1.8 mol %, from about 0.4 mol % to about 1.5 mol %, from about 0.5 mol % to about 1.2 mol %, from about 0.75 mol % to about 1 mol %, or any range or subrange therebetween. In aspects, a concentration of $Li_2O$ at the first major surface 203 can be greater than a concentration of $Li_2O$ at the midpoint by from about 0.2 mol % to about 2 mol %, from about 0.5 mol % to about 1.8 mol %, from about 0.75 mol % to about 1.5 mol %, or any range or subrange therebetween. In aspects, an amount that a concentration of $Li_2O$ at the second major surface 205 (e.g., second surface area 225 in the first portion 221, fourth surface area 235 in the second portion 231) is greater than the concentration of $Li_2O$ at the midpoint (e.g., in the first portion, in the second portion) can be within one or more of the ranges discussed above in this paragraph and/or substantially equal to the amount that the concentration of $Li_2O$ at the first major surface 203 is greater than the concentration at the midpoint. In aspects, a concentration of $Li_2O$ at the first central surface area 213 and/or the second central surface area 243 can be greater than a concentration of $Li_2O$ at the central midpoint by an amount within one or more of the ranges discussed above in this paragraph. In aspects, an amount that the concentration of $Li_2O$ at the first central surface area 213 and/or the second central surface area 243 is greater than a concentration of $Li_2O$ at the central midpoint can be substantially equal to the amount that the concentration of $Li_2O$ at the first major surface 203 is greater than the concentration of $Li_2O$ at the midpoint. Providing a surface concentration of $Li_2O$ (e.g., as an absolute mol % and/or an amount that the surface concentration is elevated relative to a concentration at the midpoint) from about 0.2 mol % to about 2 mol % can reduce (e.g., mitigate, counteract) a chemical strengthening induced expansion and resulting strain in the foldable substrate.

As used herein, a concentration profile is "elevated" relative to a reference concentration if the concentration is greater than the reference concentration by at least one of (1) 10% of a difference between the concentration at the surface and the reference value or (2) 0.1 mol %. In aspects, a distance that the concentration profile of $Li_2O$ in the first portion 221 is elevated relative to the concentration of $Li_2O$ at the midpoint, as a percentage of the substrate thickness 207, can be about 5% or more, about 7% or more, about 10% or more, about 12% or more, about 15% or more, about 30% or less, about 25% or less, about 23% or less, about 20% or less, about 18% or less, or about 15% or less. In aspects, a distance that the concentration profile of $Li_2O$ in the first portion 221 is elevated relative to the concentration of $Li_2O$ at the midpoint, as a percentage of the substrate thickness 207, can range from about 5% to about 30%, from about 7% to about 25%, from about 10% to about 22%, from about 12% to about 20%, from about 15% to about 17%, or any range or subrange therebetween. In aspects, a distance that the concentration profile of $Li_2O$ in the first portion 221 is elevated relative to the concentration of $Li_2O$ at the midpoint can be about 3 μm or more, about 4 μm or more, about 5 μm or more, about 6 μm or more, about 15 μm or less, about 12 μm or less, about 10 μm or less, or about 8 μm or less. In aspects, a distance that the concentration profile of $Li_2O$ in the first portion 221 is elevated relative to the concentration of $Li_2O$ at the midpoint can range from about 3 μm to about 15 μm, from about 4 μm to about 12 μm, from about 5 μm to about 10 μm, from about 6 μm to about 9 μm, or any range or subrange therebetween. In aspects, a distance that the concentration profile of $Li_2O$ in the central region 248 is elevated relative to the concentration of $Li_2O$ at the central midpoint either as a percentage of the central thickness 209 or as an absolute distance can be within one or more of the ranges discussed above for the distance that the concentration profile of $Li_2O$ can be elevated relative to the concentration at the midpoint for in the first portion either as a percentage of the substrate thickness or as an absolute distance, respectively.

In aspects, a concentration of $K_2O$ at the first major surface 203 (e.g., first surface area 223 in the first portion 221, third surface area 233 in the second portion 231) can be greater than a concentration of $K_2O$ at the midpoint (e.g., in the first portion, in the second portion) by about 5 mol % or more, about 6 mol % or more, about 7 mol % or more, about 8 mol % or more, about 9 mol % or more, about 10 mol % or more, about 15 mol % or less, about 14 mol % or less, about 13 mol % or less, about 12 mol % or less, about 11 mol % or less, or about 10 mol % or less. In aspects, a concentration of $K_2O$ at the first major surface 203 (e.g., first surface area 223 in the first portion 221, third surface area 233 in the second portion 231) be greater than a concentration of $K_2O$ at the midpoint (e.g., in the first portion, in the second portion) by from about 5 mol % to about 15 mol %, from about 6 mol % to about 14 mol %, from about 7 mol % to about 13 mol %, from about 8 mol % to about 12 mol %, from about 9 mol % to about 11 mol %, from about 9 mol % to about 10 mol %, or any range or subrange therebetween. In aspects, an amount that a concentration of $K_2O$ at the second major surface 205 (e.g., second surface area 225 in the first portion 221, fourth surface area 235 in the second portion 231) is greater than the concentration of $K_2O$ at the midpoint (e.g., in the first portion, in the second portion) can be within one or more of the ranges discussed above in this paragraph and/or substantially equal to the amount that the concentration of $K_2O$ at the first major surface 203 is greater than the concentration at the midpoint. In aspects, a concentration of $K_2O$ at the first central surface area 213 and/or the second central surface area 243 can be greater than a concentration of $K_2O$ at the central midpoint by an amount within one or more of the ranges discussed above in this paragraph. In aspects, an amount that the concentration of $K_2O$ at the first central surface area 213 and/or the second central surface area 243 is greater than a concentration of $K_2O$ at the central midpoint can be substantially equal to the amount that the concentration of $K_2O$ at the first major surface 203 is greater than the concentration of $K_2O$ at the midpoint. Providing a high (e.g., about 5 mol % or more) concentration of $K_2O$ (e.g., as an absolute mol % and/or an amount that the surface concentration is elevated relative to a concentration at the midpoint) can provide a large (e.g., about 500 MPa) surface compressive stress that can enable increased fracture resistance. Alternatively or additionally, a total concentration of potassium oxide ($K_2O$), rubidium oxide ($Rb_2O$), cesium oxide ($Cs_2O$), and francium oxide ($Fr_2O$) at the first major surface (e.g., first surface area 223 in the first portion 221, third surface area 233 in the second portion 231) can be greater than the total concentration of $K_2O$, $Rb_2O$, $Cs_2O$, and $Fr_2O$ at the midpoint by an amount within one or more of the ranges discussed above in this paragraph. Alternatively or additionally, a total concentration of potassium oxide ($K_2O$), rubidium oxide ($Rb_2O$), cesium oxide ($Cs_2O$), and francium oxide ($Fr_2O$) at the first central surface area 213 can be greater than the total concentration of $K_2O$, $Rb_2O$, $Cs_2O$, and $Fr_2O$ at the central midpoint by an amount within one or more of the ranges discussed above in this paragraph.

In aspects, a distance that the concentration profile of $K_2O$ in the first portion 221 is elevated relative to the concentration of $K_2O$ at the midpoint, as a percentage of the substrate thickness 207, can be about 10% or more, about 12% or more, about 14% or more, about 15% or more, about 25% or less, about 23% or less, about 20% or less, about 18% or less, or about 15% or less. In aspects, a distance that the concentration profile of $K_2O$ in the first portion 221 is elevated relative to the concentration of $K_2O$ at the midpoint, as a percentage of the substrate thickness 207, can range from about 10% to about 25%, from about 12% to about 23%, from about 14% to about 20%, from about 15% to about 18%, or any range or subrange therebetween. In aspects, a distance that the concentration profile of $K_2O$ in the first portion 221 is elevated relative to the concentration of $K_2O$ at the midpoint can be about 10 μm or more, about 12 μm or more, about 15 μm or more, about 30 μm or less, about 25 μm or less, about 20 μm or less, or about 18 μm or less. In aspects, a distance that the concentration profile of $K_2O$ in the first portion 221 is elevated relative to the concentration of $K_2O$ at the midpoint can range from about 10 μm to about 30 μm, from about 12 μm to about 25 μm, from about 15 μm to about 20 μm, or any range or subrange therebetween. In aspects, a distance that the concentration profile of $K_2O$ in the central region 248 is elevated relative to the concentration of $K_2O$ at the central midpoint, as a percentage of the central thickness 209, can be within one or more of the ranges discussed above for the distance that the concentration profile of $K_2O$ can be elevated relative to the concentration at the midpoint for in the first portion, as a percentage of the substrate thickness. In aspects, a distance that the concentration profile of $K_2O$ in the central region 248 is elevated relative to the concentration of $K_2O$ at the central midpoint can be about 5 μm or more, about 7 μm or more, about 10 μm or more, about 12 μm or more, about 15 μm or more, about 20 μm or less, about 18 μm or less, or about 15 μm or less. In aspects, a distance that the concentration profile of $K_2O$ in the central region 248 is elevated relative to the concentration of $K_2O$ at the central midpoint can range from about 5 μm to about 20 μm, from about 7 μm to about 18 μm, from about 10 μm to about 15 μm, or any range or subrange therebetween. Alternatively or additionally, a total concentration of potassium oxide ($K_2O$), rubidium oxide ($Rb_2O$), cesium oxide ($Cs_2O$), and francium oxide ($Fr_2O$) at the first major surface (e.g., first surface area 223 in the first portion 221, third surface area 233 in the second portion 231) can be elevated relative to the total concentration of $K_2O$, $Rb_2O$, $Cs_2O$, and $Fr_2O$ at the midpoint for a distance that is within one or more of the range discussed above in this paragraph in terms of absolute distance or as a percentage of the substrate thickness 207. Similarly, the total concentration of $K_2O$, $Rb_2O$, $Cs_2O$, and $Fr_2O$ at the first central surface area 213 can be elevated relative to the total concentration of $K_2O$, $Rb_2O$, $Cs_2O$, and $Fr_2O$ at the central midpoint for a distance that is within one or more of the range discussed above in this paragraph in terms of absolute distance or as a percentage of the central thickness 209.

In aspects, the foldable substrate 201 (e.g., foldable apparatus 101 or 301) with a first recess 211 and a second recess 241 opposite the first recess 211 can have the surface concentration of (1) $Li_2O$, (2) $Na_2O$, (3) $K_2O$, and/or (4) the total concentration of $K_2O$, $Rb_2O$, $Cs_2O$, and $Fr_2O$ at the first major surface 203 and/or the first central surface area 213 that can be within one or more of the corresponding ranges discussed in the preceding set of paragraphs. In aspects, the foldable substrate 201 (e.g., foldable apparatus 101 or 301) with a first recess 211 and a second recess 241 opposite the first recess 211 can have a difference between the concentration at the first major surface 203 or the first central surface area 213 and the corresponding concentration at the midpoint or central midpoint, respectively, of (1) $Li_2O$, (2) $Na_2O$, (3) $K_2O$, and/or (4) the total concentration of $K_2O$, $Rb_2O$, $Cs_2O$, and $Fr_2O$ can be within one or more of the corresponding ranges discussed in the preceding set of paragraphs. In aspects, the foldable substrate 201 (e.g., foldable apparatus 101 or 301) with a first recess 211 and a second recess 241 opposite the first recess 211 can comprise a concentration profile of (1) $Li_2O$, (2) $Na_2O$, (3) $K_2O$, and/or (4) the total concentration of $K_2O$, $Rb_2O$, $Cs_2O$, and $Fr_2O$ in the first portion 221 or the central portion 281 can be elevated relative to the corresponding concentration at the midpoint or central midpoint, respectively, for a depth that can be within one or more of the corresponding ranges discussed in the preceding set of paragraphs. Alternatively, the foldable substrate 201 (e.g., foldable apparatus 401) with a first recess 211 without a second recess opposite the first recess (e.g., the second major surface 205 comprises the second central surface area 243) can have the surface concentration of (1) $Li_2O$, (2) $Na_2O$, (3) $K_2O$, and/or (4) the total concentration of $K_2O$, $Rb_2O$, $Cs_2O$, and $Fr_2O$ at the first major surface 203 and/or the first central surface area 213 that can be within one or more of the corresponding ranges discussed in the following set of paragraphs. In aspects, the foldable substrate 201 (e.g., foldable apparatus 401) with a first recess 211 without a second recess opposite the first recess (e.g., the second major surface 205 comprises the second central surface area 243) can have a difference between the concentration at the first major surface 203 or the first central surface area 213 and the corresponding concentration at the midpoint or central midpoint, respectively, of (1) $Li_2O$, (2) $Na_2O$, (3) $K_2O$, and/or (4) the total concentration of $K_2O$, $Rb_2O$, $Cs_2O$, and $Fr_2O$ can be within one or more of the corresponding ranges discussed in the following set of paragraphs. In aspects, the foldable substrate 201 (e.g., foldable apparatus 401) with a first recess 211 without a second recess opposite the first recess (e.g., the second major surface 205 comprises the second central surface area 243) can comprise a concentration profile of (1) $Li_2O$, (2) $Na_2O$, (3) $K_2O$, and/or (4) the total concentration of $K_2O$, $Rb_2O$, $Cs_2O$, and $Fr_2O$ in the first portion 221 or the central portion 281 can be elevated relative to the corresponding concentration at the midpoint or central midpoint, respectively, for a depth that can be within one or more of the corresponding ranges discussed in the preceding set of paragraphs. Due to the differences in geometry, the surface concentrations or differences in concentration for foldable substrates with two recesses opposite one another are different from those of foldable substrates with at least one recess on only one side of the foldable substrate. Also, as discussed below, methods of making the foldable apparatus 401 shown in FIG. 4 can be made with a single chemical strengthening process, which can result in different concentrations in the first portion and/or second portion versus the central portion between the surface and the corresponding midpoint due to differences in the thickness in the respective portions, although a process with multiple chemical strengthening processes could achieve similar concentrations for the first portion, the second portion, and/or the central portion.

In aspects, a concentration of $Li_2O$ at the first major surface 203 (e.g., first surface area 223 in the first portion 221, third surface area 233 in the second portion 231) can be about 0.8 mol % or more, about 1.0 mol % or more, about 1.25 mol % or more, about 1.5 mol % or more, about 1.75 mol % or more, about 2 mol % or more, about 2.1 mol % or more, about 2.2 mol % or more, about 3.5 mol % or less, about 3.0 mol % or less, about 2.75 mol % or less, about 2.5 mol % or less, about 2.4 mol % or less, or about 2.3 mol % or less. In aspects, a concentration of $Li_2O$ at the first major surface 203 (e.g., first surface area 223 in the first portion 221, third surface area 233 in the second portion 231) can range from about 0.8 mol % to about 3.5 mol %, from about 1 mol % to about 3 mol %, from about 1.25 mol % to about 2.75 mol %, from about 1.5 mol % to about 2.5 mol %, from about 1.75 mol % to about 2.4 mol %, from about 2 mol % to about 2.3 mol %, from about 2.2 mol % to about 2.3 mol %, or any range or subrange therebetween. In aspects, a concentration of $Li_2O$ at the second major surface 205 (e.g., second surface area 225 in the first portion 221, fourth surface area 235 in the second portion 231) can be within one or more of the ranges discussed above in this paragraph and/or substantially equal to the concentration of $Li_2O$ at the first major surface 203. In aspects, a concentration of $Li_2O$ at the first central surface area 213 and/or the second central surface area 243 can be within one or more of the ranges discussed above in this paragraph. In further aspects, the concentration of $Li_2O$ at the first central surface area 213 and/or the second central surface area 243 can be substantially equal to the concentration of $Li_2O$ at the first major surface 203 and/or at the second major surface 205. Providing a surface concentration of $Li_2O$ (e.g., as an absolute mol % and/or an amount that the surface concentration is elevated relative to a concentration at the midpoint) from about 1 mol % to about 3 mol % can reduce (e.g., mitigate, counteract) a chemical strengthening induced expansion and resulting strain in the foldable substrate.

In aspects, a concentration of $K_2O$ at the first major surface 203 (e.g., first surface area 223 in the first portion 221, third surface area 233 in the second portion 231) can be about 5 mol % or more, about 6 mol % or more, about 7 mol % or more, about 8 mol % or more, about 9 mol % or more, about 10 mol % or more, about 15 mol % or less, about 14 mol % or less, about 13 mol % or less, about 12 mol % or less, about 11 mol % or less, or about 10 mol % or less. In aspects, a concentration of $K_2O$ at the first major surface 203 (e.g., first surface area 223 in the first portion 221, third surface area 233 in the second portion 231) can range from about 5 mol % to about 15 mol %, from about 6 mol % to about 14 mol %, from about 7 mol % to about 13 mol %, from about 8 mol % to about 12 mol %, from about 8 mol % to about 11 mol %, from about 8 mol % to about 10 mol %, from about 9 mol % to about 10 mol %, or any range or subrange therebetween. In aspects, a concentration of $K_2O$ at the second major surface 205 (e.g., second surface area 225 in the first portion 221, fourth surface area 235 in the second portion 231) can be within one or more of the ranges discussed above in this paragraph and/or substantially equal to the concentration of $K_2O$ at the first major surface 203. In aspects, a concentration of $K_2O$ at the first central surface area 213 and/or the second central surface area 243 can be within one or more of the ranges discussed above in this paragraph. In further aspects, the concentration of $K_2O$ at the first central surface area 213 and/or the second central surface area 243 can be substantially equal to the concentration of $K_2O$ at the first major surface 203 and/or at the second major surface 205. Alternatively or additionally, a total concentration of potassium oxide ($K_2O$), rubidium oxide ($Rb_2O$), cesium oxide ($Cs_2O$), and francium oxide ($Fr_2O$) at the first major surface (e.g., first surface area 223 in the first portion 221, third surface area 233 in the second portion 231), the second major surface 205 (e.g., second surface area 225 in the first portion 221, fourth surface area 235 in the second portion 231), the first central surface area 213, and/or the second central surface area 243 can be within one or more of the ranges discussed above in the paragraph for the concentration of $K_2O$. Providing a high (e.g., about 5 mol % or more) concentration of $K_2O$ (e.g., as an absolute mol % and/or an amount that the surface concentration is elevated relative to a concentration at the midpoint) can provide a large (e.g., about 500 MPa) surface compressive stress that can enable increased fracture resistance.

In aspects, a concentration of $K_2O$ at the first major surface 203 (e.g., first surface area 223 in the first portion 221, third surface area 233 in the second portion 231) can be greater than the concentration of $Na_2O$ at the first major surface 203. In further aspects, a ratio of the concentration of $K_2O$ at the first major surface 203 to the concentration of $Na_2O$ at the first major surface 203 can be about 1 or more, about 1.2 or more, about 1.4 or more, about 1.5 or more, about 1.7 or more, about 2 or more, about 3 or more, about 4 or more, about 5 or more, about 20 or less, about 15 or less, about 12 or less, about 10 or less, about 5 or less, about 3 or less, about 2.5 or less, about 2.2 or less, or about 2 or less. In further aspects, a ratio of the concentration of $K_2O$ at the first major surface 203 to the concentration of $Na_2O$ at the first major surface 203 can range from about 1 to about 20, from about 1 to about 15, from about 1.2 to about 12, from about 1.2 to about 10, from about 1.5 to about 10, from about 1.5 to about 5, from about 1.5 to about 3, from about 1.5 to about 2.5, from about 1.7 to about 2.2, from about 2 to about 2.2, or any range or subrange therebetween. or any range or subrange therebetween. In aspects, a concentration of $Na_2O$ at the second major surface 205 (e.g., second surface area 225 in the first portion 221, fourth surface area 235 in the second portion 231) can be less than the concentration of $K_2O$ at the second major surface 205 (e.g., second surface area 225 in the first portion 221, fourth surface area 235 in the second portion 231). In further aspects, a ratio of the concentration of $K_2O$ at the second major surface 205 to the concentration of $Na_2O$ at the second major surface 205 can be within one or more of the ranges discussed above in this paragraph. In aspects, the concentration of $K_2O$ at the first central surface area 213 and/or the second central surface area 243 can be greater than the concentration of $Na_2O$ at the corresponding surface. In further aspects, a ratio of the concentration of $Na_2O$ at the surface to the concentration of $K_2O$ at the surface, where the surface is the first central surface area 213 and/or the second central surface area 243, can be within one or more of the ranges discussed above in this paragraph. Providing more potassium oxide than sodium oxide at the surface (or a ratio within one or more of the ranges discussed in this paragraph) can provide a large (e.g., about 500 MPa) surface compressive stress that can enable increased fracture resistance since a majority of smaller alkali metal in the substrate will have been exchanged with potassium. Alternatively or additionally, a total concentration of potassium oxide ($K_2O$), rubidium oxide ($Rb_2O$), cesium oxide ($Cs_2O$), and francium oxide ($Fr_2O$) at the first major surface 203 can be greater than the concentration of $Na_2O$ at the first major surface. Similarly, a ratio of the total concentration $K_2O$, $Rb_2O$, $Cs_2O$, and $Fr_2O$ at the first major surface to the concentration of $Na_2O$ at the first major surface can be within one more of the corresponding ranges discussed above in this paragraph.

In aspects, a concentration of $K_2O$ at the first major surface 203 can be greater than the concentration of $Li_2O$ at the first major surface 203. In further aspects, a ratio of the concentration of $K_2O$ at the first major surface 203 to the concentration of $Li_2O$ at the first major surface 203 can be about 5 or more, about 7 or more, about 8 or more, about 9 or more, about 10 or more, about 12 or more, about 20 or less, about 15 or less, about 12 or less, or about 10 or less. In further aspects, a ratio of the concentration of $K_2O$ at the first major surface 203 to the concentration of $Li_2O$ at the first major surface 203 can range from about 5 to about 20, from about 7 to about 20, from about 8 to about 20, from about 9 to about 15, from about 10 to about 12, or any range or subrange therebetween. Alternatively or additionally, a total concentration of potassium oxide ($K_2O$), rubidium oxide ($Rb_2O$), cesium oxide ($Cs_2O$), and francium oxide ($Fr_2O$) at the first major surface 203 can be greater than the concentration of $Li_2O$ at the first major surface. Similarly, a ratio of the total concentration $K_2O$, $Rb_2O$, $Cs_2O$, and $Fr_2O$ at the first major surface to the concentration of $Li_2O$ at the first major surface can be within one more of the corresponding ranges discussed above in this paragraph. Providing more potassium oxide than lithium oxide at the surface (or a ratio within one or more of the ranges discussed in this paragraph) can provide a large (e.g., about 500 MPa) surface compressive stress that can enable increased fracture resistance since a majority of smaller alkali metal in the substrate will have been exchanged with potassium.

As used herein, a total amount of an alkali metal is determined by integrating a concentration profile obtained from GDOES, as discussed herein, over half the thickness. In aspects, a ratio of a total amount of $K_2O$ to a total amount of $Li_2O$ can be about 100 or more, about 120 or more, about 150 or more, about 170 or more, about 180 or more, about 300 or less, about 250 or less, about 200 or less, about 190 or less, or 180 or less. In aspects, a ratio of a total amount of $K_2O$ to a total amount of $Li_2O$ can range from about 100 to about 300, from about 120 to about 250, from about 150 to about 200, from about 170 to about 200, from about 180 to about 190, or any range or subrange therebetween. Alternatively or additionally, a ratio of a total amount of potassium oxide ($K_2O$), rubidium oxide ($Rb_2O$), cesium oxide ($Cs_2O$), and francium oxide ($Fr_2O$) to the total amount of $Li_2O$ can be within one more of the corresponding ranges discussed above in this paragraph.

In aspects, a concentration of $Li_2O$ at the first major surface 203 (e.g., first surface area 223 in the first portion 221, third surface area 233 in the second portion 231) can be greater than a concentration of $Li_2O$ at the midpoint (e.g., in the first portion, in the second portion) by about 0.8 mol % or more, about 1.0 mol % or more, about 1.25 mol % or more, about 1.5 mol % or more, about 1.75 mol % or more, about 2 mol % or more, about 2.1 mol % or more, about 2.2 mol % or more, about 3.5 mol % or less, about 3.0 mol % or less, about 2.75 mol % or less, about 2.5 mol % or less, about 2.4 mol % or less, or about 2.3 mol % or less. In aspects, a concentration of $Li_2O$ at the first major surface 203 (e.g., first surface area 223 in the first portion 221, third surface area 233 in the second portion 231) can be greater than a concentration of $Li_2O$ at the midpoint (e.g., in the first portion, in the second portion) by from about 0.8 mol % to about 3.5 mol %, from about 1 mol % to about 3 mol %, from about 1.25 mol % to about 2.75 mol %, from about 1.5 mol % to about 2.5 mol %, from about 1.75 mol % to about 2.4 mol %, from about 2 mol % to about 2.3 mol %, from about 2.2 mol % to about 2.3 mol %, or any range or subrange therebetween. In aspects, an amount that a concentration of $Li_2O$ at the second major surface 205 (e.g., second surface area 225 in the first portion 221, fourth surface area 235 in the second portion 231) is greater than the concentration of $Li_2O$ at the midpoint (e.g., in the first portion, in the second portion) can be within one or more of the ranges discussed above in this paragraph and/or substantially equal to the amount that the concentration of $Li_2O$ at the first major surface 203 is greater than the concentration at the midpoint. In aspects, a concentration of $Li_2O$ at the first central surface area 213 and/or the second central surface area 243 can be greater than a concentration of $Li_2O$ at the central midpoint by an amount within one or more of the ranges discussed above in this paragraph. In aspects, an amount that the concentration of $Li_2O$ at the first central surface area 213 and/or the second central surface area 243 is greater than a concentration of $Li_2O$ at the central midpoint can be substantially equal to the amount that the concentration of $Li_2O$ at the first major surface 203 is greater than the concentration of $Li_2O$ at the midpoint. Alternatively, an amount that the concentration of $Li_2O$ at the first central surface area 213 and/or the second central surface area 243 is greater than a concentration of $Li_2O$ at the central midpoint can be less than the amount that the concentration of $Li_2O$ at the first major surface 203 is greater than the concentration of $Li_2O$ at the midpoint, for example, if the chemical strengthening increases the concentration of $Li_2O$ at the central midpoint by more than the corresponding concentration at the midpoint. Providing a surface concentration of $Li_2O$ (e.g., as an absolute mol % and/or an amount that the surface concentration is elevated relative to a concentration at the midpoint) from about 1 mol % to about 3 mol % can reduce (e.g., mitigate, counteract) a chemical strengthening induced expansion and resulting strain in the foldable substrate.

In aspects, a distance that the concentration profile of $Li_2O$ in the first portion 221 is elevated relative to the concentration of $Li_2O$ at the midpoint, as a percentage of the substrate thickness 207, can be about 5% or more, about 7% or more, about 10% or more, about 12% or more, about 15% or more, about 20% or more, about 25% or more, about 30% or more, about 35% or less, about 34% or less, about 33% or less, about 32% or less, about 31% or less, about 30% or less, about 25% or less, about 23% or less, about 20% or less, about 18% or less, or about 15% or less. In aspects, a distance that the concentration profile of $Li_2O$ in the first portion 221 is elevated relative to the concentration of $Li_2O$ at the midpoint, as a percentage of the substrate thickness 207, can range from about 5% to about 35%, from about 7% to about 35%, from about 10% to about 34%, from about 12% to about 34%, from about 15% to about 33%, from about 20% to about 33%, from about 25% to about 32%, from about 30% to about 32%, or any range or subrange therebetween. In aspects, a distance that the concentration profile of $Li_2O$ in the first portion 221 is elevated relative to the concentration of $Li_2O$ at the midpoint can be about 3 μm or more, about 5 μm or more, about 8 μm or more, about 10 μm or more, about 15 μm or more, about 20 μm or more, about 25 μm or more, about 30 μm or more, about 40 μm or less, about 38 μm or less, about 36 μm or less, about 35 μm or less, about 34 μm or less, about 33 μm or less, about 32 μm or less, about 30 μm or less, about 25 μm or less, or about 20 μm or less. In aspects, a distance that the concentration profile of $Li_2O$ in the first portion 221 is elevated relative to the concentration of $Li_2O$ at the midpoint can range from about 3 μm to about 40 μm, from about 5 μm to about 40 μm, from about 8 μm to about 38 μm, from about 10 μm to about 36 μm, from about 15 μm to about 35 μm, from about 20 μm to about 34 μm, from about 25 μm to about 33 μm, from about 30 μm to about 32 μm, or any range or subrange therebetween. In aspects, a distance that the concentration profile of $Li_2O$ in the central region 248 is elevated relative to the concentration of $Li_2O$ at the central midpoint either as a percentage of the central thickness 209 or as an absolute distance can be within one or more of the ranges discussed above for the distance that the concentration profile of $Li_2O$ can be elevated relative to the concentration at the midpoint for in the first portion either as a percentage of the substrate thickness or as an absolute distance, respectively.

In aspects, a concentration of $K_2O$ at the first major surface 203 (e.g., first surface area 223 in the first portion 221, third surface area 233 in the second portion 231) can be greater than a concentration of $K_2O$ at the midpoint (e.g., in the first portion, in the second portion) by about 5 mol % or more, about 6 mol % or more, about 7 mol % or more, about 8 mol % or more, about 9 mol % or more, about 10 mol % or more, about 15 mol % or less, about 14 mol % or less, about 13 mol % or less, about 12 mol % or less, about 11 mol % or less, or about 10 mol % or less. In aspects, a concentration of $K_2O$ at the first major surface 203 (e.g., first surface area 223 in the first portion 221, third surface area 233 in the second portion 231) be greater than a concentration of $K_2O$ at the midpoint (e.g., in the first portion, in the second portion) by from about 5 mol % to about 15 mol %, from about 6 mol % to about 14 mol %, from about 7 mol % to about 13 mol %, from about 8 mol % to about 12 mol %, from about 9 mol % to about 11 mol %, from about 9 mol % to about 10 mol %, or any range or subrange therebetween. In aspects, an amount that a concentration of $K_2O$ at the second major surface 205 (e.g., second surface area 225 in the first portion 221, fourth surface area 235 in the second portion 231) is greater than the concentration of $K_2O$ at the midpoint (e.g., in the first portion, in the second portion) can be within one or more of the ranges discussed above in this paragraph and/or substantially equal to the amount that the concentration of $K_2O$ at the first major surface 203 is greater than the concentration at the midpoint. In aspects, a concentration of $K_2O$ at the first central surface area 213 and/or the second central surface area 243 can be greater than a concentration of $K_2O$ at the central midpoint by an amount within one or more of the ranges discussed above in this paragraph. In aspects, an amount that the concentration of $K_2O$ at the first central surface area 213 and/or the second central surface area 243 is greater than a concentration of $K_2O$ at the central midpoint can be substantially equal to the amount that the concentration of $K_2O$ at the first major surface 203 is greater than the concentration of $K_2O$ at the midpoint. Alternatively or additionally, a total concentration of potassium oxide ($K_2O$), rubidium oxide ($Rb_2O$), cesium oxide ($Cs_2O$), and francium oxide ($Fr_2O$) at the first major surface (e.g., first surface area 223 in the first portion 221, third surface area 233 in the second portion 231) can be greater than the total concentration of $K_2O$, $Rb_2O$, $Cs_2O$, and $Fr_2O$ at the midpoint by an amount within one or more of the ranges discussed above in this paragraph. Alternatively or additionally, a total concentration of potassium oxide ($K_2O$), rubidium oxide ($Rb_2O$), cesium oxide ($Cs_2O$), and francium oxide ($Fr_2O$) at the first central surface area 213 can be greater than the total concentration of $K_2O$, $Rb_2O$, $Cs_2O$, and $Fr_2O$ at the central midpoint by an amount within one or more of the ranges discussed above in this paragraph. Providing a high (e.g., about 5 mol % or more) concentration of $K_2O$ (e.g., as an absolute mol % and/or an amount that the surface concentration is elevated relative to a concentration at the midpoint) can provide a large (e.g., about 500 MPa) surface compressive stress that can enable increased fracture resistance.

In aspects, a distance that the concentration profile of $K_2O$ in the first portion 221 is elevated relative to the concentration of $K_2O$ at the midpoint, as a percentage of the substrate thickness 207, can be about 5% or more, about 6% or more, about 7% or more, about 8% or more, about 9% or more, 10% or more, about 12% or more, about 14% or more, about 15% or more, about 25% or less, about 23% or less, about 20% or less, about 18% or less, about 15% or less, about 12% or less, about 10% or less, or about 9% or less. In aspects, a distance that the concentration profile of $K_2O$ in the first portion 221 is elevated relative to the concentration of $K_2O$ at the midpoint, as a percentage of the substrate thickness 207, can range from about 5% to about 25%, from about 5% to about 23%, from about 6% to about 20%, from about 6% to about 18%, from about 7% to about 15%, from about 7% to about 12%, from about 8% to about 10%, from about 9% to about 10%, or any range or subrange therebetween. In aspects, a distance that the concentration profile of $K_2O$ in the first portion 221 is elevated relative to the concentration of $K_2O$ at the midpoint can be about 5 μm or more, about 6 μm or more, about 7 μm or more, about 8 μm or more, about 9 μm or more, about 10 μm or more, about 12 μm or more, about 15 μm or more, about 30 μm or less, about 25 μm or less, about 20 μm or less, or about 18 μm or less, about 15 μm or less, about 12 μm or less, or about 10 μm or less. In aspects, a distance that the concentration profile of $K_2O$ in the first portion 221 is elevated relative to the concentration of $K_2O$ at the midpoint can range from about 5 μm to about 30 μm, from about 5 μm to about 25 μm, from about 6 μm to about 20 μm, from about 6 μm to about 18 μm, from about 7 μm to about 15 μm, from about 7 μm to about 12 μm, from about 8 μm to about 10 μm, from about 9 μm to about 10 μm, or any range or subrange therebetween. In aspects, a distance that the concentration profile of $K_2O$ in the central region 248 is elevated relative to the concentration of $K_2O$ at the central midpoint, as a percentage of the central thickness 209, can be within one or more of the ranges discussed above for the distance that the concentration profile of $K_2O$ can be elevated relative to the concentration at the midpoint for in the first portion, as a percentage of the substrate thickness. In aspects, a distance that the concentration profile of $K_2O$ in the central region 248 is elevated relative to the concentration of $K_2O$ at the central midpoint can be about 5 μm or more, about 7 μm or more, about 10 μm or more, about 12 μm or more, about 15 μm or more, about 20 μm or less, about 18 μm or less, or about 15 μm or less. In aspects, a distance that the concentration profile of $K_2O$ in the central region 248 is elevated relative to the concentration of $K_2O$ at the central midpoint can range from about 5 μm to about 20 μm, from about 7 μm to about 18 μm, from about 10 μm to about 15 μm, or any range or subrange therebetween. Alternatively or additionally, a total concentration of potassium oxide ($K_2O$), rubidium oxide ($Rb_2O$), cesium oxide ($Cs_2O$), and francium oxide ($Fr_2O$) at the first major surface (e.g., first surface area 223 in the first portion 221, third surface area 233 in the second portion 231) can be elevated relative to the total concentration of $K_2O$, $Rb_2O$, $Cs_2O$, and $Fr_2O$ at the midpoint for a distance that is within one or more of the range discussed above in this paragraph in terms of absolute distance or as a percentage of the substrate thickness 207. Similarly, the total concentration of $K_2O$, $Rb_2O$, $Cs_2O$, and $Fr_2O$ at the first central surface area 213 can be elevated relative to the total concentration of $K_2O$, $Rb_2O$, $Cs_2O$, and $Fr_2O$ at the central midpoint for a distance that is within one or more of the range discussed above in this paragraph in terms of absolute distance or as a percentage of the central thickness 209.

As used herein, a "total thickness variation" (TTV) of the central portion refers to the absolute value of the difference between the minimum thickness of the central portion 281 (e.g., central region 248) and the maximum thickness of the central portion 281 (e.g., central region 248). The maximum thickness and minimum thickness are measured by combining the 3D surfaces measured for each surface of the region (e.g., central portion 281, central region 248) using SpecGAGE3D, as described above. In aspects, the central portion 281 and/or the central region 248 can comprise a TTV of about 6 μm or less, about 5 μm or less, about 4 μm or less, about 3.8 μm or less, about 3.6 μm or less, or about 3.4 μm or less. In aspects, the central portion 281 and/or the central region 248 can comprise a TTV in a range from about 0.5 μm to about 6 μm, from about 1 μm to about 5 μm, from about 1.5 μm to about 4 μm, from about 2 μm to about 3.8 μm, from about 2.5 μm to about 3.6 μm, from about 3 μm to about 3.4 μm, or any range or subrange therebetween. Providing a low TTV (e.g., about 6 μm or less) can further decrease an incidence of buckling by reducing variation in chemically-strengthening induced strain associated with the expansion or contraction due to ion-exchange.

As used herein, refractive index is measured in accordance with ASTM E1967-19 at a wavelength of 589 nm. In aspects, the polymer-based portion 289 and/or 299 can be optically clear and/or comprise a first index of refraction. In aspects, the first refractive index of the polymer-based portion 289 and/or 299 may be about 1.3 or more, about 1.4 or more, about 1.45 or more, about 1.49 or more, about 2 or less, or about 1.7 or less, about 1.6 or less, or about 1.55 or less. In aspects, the first refractive index of the polymer-based portion 289 and/or 299 can range from about 1 to about 2, from about 1.3 to about 1.7, from about 1.4 to about 1.6, from about 1.45 to about 1.55, from about 1.49 to about 1.55, or any range or subrange therebetween.

In aspects, the foldable substrate 201 can comprise a second index of refraction. In aspects, the second refractive index of the foldable substrate 201 may be about 1.4 or more, about 1.45 or more, about 1.49 or more, about 1.7 or less, about 1.6 or less, or about 1.55 or less. In aspects, the second refractive index of the foldable substrate 201 can range from about 1.4 to about 1.7, from about 1.4 to about 1.6, from about 1.45 to about 1.55, from about 1.49 to about 1.55, or any range or subrange therebetween. In aspects, a differential equal to the absolute value of the difference between the second index of refraction of the foldable substrate 201 and the first index of refraction of the polymer-based portion 289 and/or 299 can be about 0.1 or less, about 0.07 or less, about 0.05 or less, about 0.001 or more, about 0.01 or more, or about 0.02 or more. In aspects, the differential is in a range from about 0.001 to about 0.1, from about 0.01 to about 0.07, from about 0.02 to about 0.05, or any range or subrange therebetween. In aspects, the second index of refraction of the foldable substrate 201 may be greater than the first index of refraction of the polymer-based portion 289 and/or 299. In aspects, the second index of refraction of the foldable substrate 201 may be less than the first index of refraction of the polymer-based portion 289 and/or 299.

In aspects, the adhesive layer 261 can comprise a third index of refraction. In aspects, the third index of refraction of the adhesive layer 261 can be within one or more of the ranges discussed above with regards to the first index of refraction of the polymer-based portion 289 and/or 299. In aspects, a differential equal to the absolute value of the difference between the third index of refraction of the adhesive layer 261 and the first index of refraction of the polymer-based portion 289 and/or 299 can be within one or more of the ranges discussed above for the differential between the second index of refraction and the first index of refraction. In aspects, the third index of refraction of the adhesive layer 261 may be greater than the first index of refraction of the polymer-based portion 289 and/or 299. In aspects, the third index of refraction of the adhesive layer 261 may be less than the first index of refraction of the polymer-based portion 289 and/or 299. In aspects, a differential equal to the absolute value of the difference between the third index of refraction of the adhesive layer 261 and the second index of refraction of the foldable substrate 201 can be within one or more of the ranges discussed above for the differential between the second index of refraction and the first index of refraction. In aspects, the third index of refraction of the adhesive layer 261 may be greater than the second index of refraction of the foldable substrate 201. In aspects, the third index of refraction of the adhesive layer 261 may be less than the second index of refraction of the foldable substrate 201.

In aspects, the coating 251 can comprise a fourth index of refraction. In aspects, the fourth index of refraction of the coating 251 can be within one or more of the ranges discussed above with regards to the first index of refraction of the polymer-based portion 289 and/or 299. In aspects, a differential equal to the absolute value of the difference between the fourth index of refraction of the coating 251 and the first index of refraction of the polymer-based portion 289 and/or 299 can be within one or more of the ranges discussed above for the differential between the second index of refraction and the first index of refraction. In aspects, the fourth index of refraction of the coating 251 may be greater than the first index of refraction of the polymer-based portion 289 and/or 299. In aspects, the fourth index of refraction of the coating 251 may be less than the first index of refraction of the polymer-based portion 289 and/or 299. In aspects, a differential equal to the absolute value of the difference between the fourth index of refraction of the coating 251 and the second index of refraction of the foldable substrate 201 can be within one or more of the ranges discussed above for the differential between the second index of refraction and the first index of refraction. In aspects, the fourth index of refraction of the coating 251 may be greater than the second index of refraction of the foldable substrate 201. In aspects, the fourth index of refraction of the coating 251 may be less than the second index of refraction of the foldable substrate 201. In aspects, a differential equal to the absolute value of the difference between the fourth index of refraction of the coating 251 and the third index of refraction of the adhesive layer 261 can be within one or more of the ranges discussed above for the differential between the second index of refraction and the first index of refraction. In aspects, the fourth index of refraction of the coating 251 may be greater than the third index of refraction of the adhesive layer 261. In aspects, the fourth index of refraction of the coating 251 may be less than the third index of refraction of the adhesive layer 261.

Figure 8:
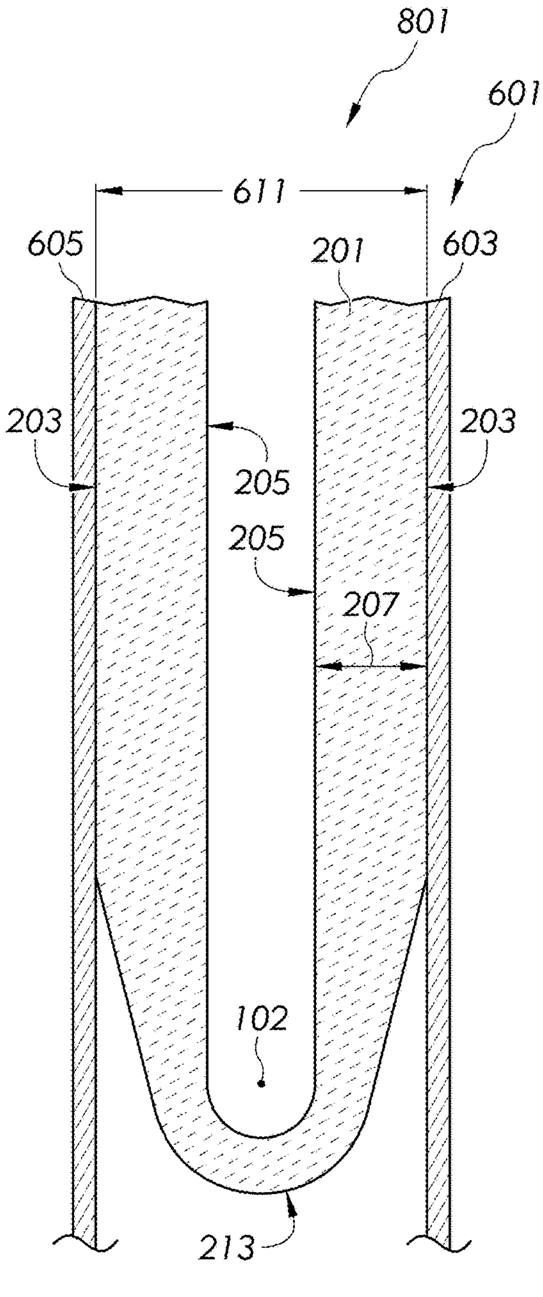
FIG. 8 is a cross-sectional view of a testing apparatus to determine the minimum parallel plate distance of an example foldable substrate along line 7-7 of FIG. 5.

FIGS. 6-9 schematically illustrate aspects of a foldable apparatus 501, 701, 801, and/or 901 in accordance with aspects of the disclosure in a folded configuration. As shown in FIG. 6, the foldable apparatus 501 is folded such that the second major surface 205 of the foldable substrate 201 is on the inside of the folded foldable apparatus 501, for example, foldable apparatus 301 can be folded to form foldable apparatus 501. For example, a display could be located on the side of the second major surface 205, and a viewer would view the display from the side of the first major surface 203. Alternatively, a display could be located on the side of the first major surface 203, and a viewer would view the display from the side of the second major surface 205. As shown in FIG. 8, the foldable apparatus 801 is folded such that the second major surface 205 of the foldable substrate 201 is on the inside of the folded foldable apparatus 501. For example, a display could be located on the side of the second major surface 205, and a viewer would view the display from the side of the first major surface 203. Alternatively, a display could be located on the side of the first major surface 203, and a viewer would view the display from the side of the second major surface 205.

Figure 9:
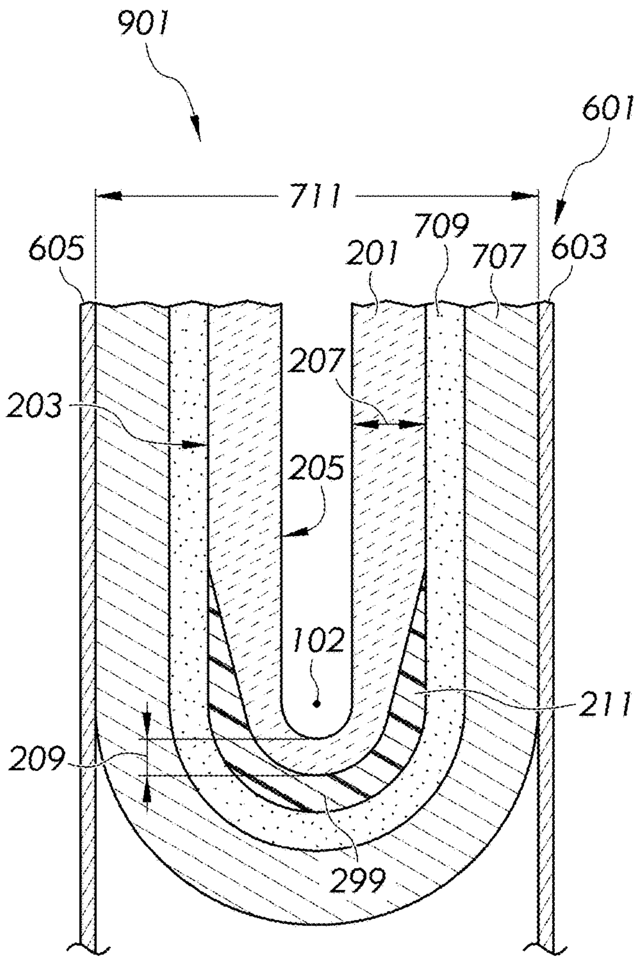
FIG. 9 is a cross-sectional views of another testing apparatus to determine the minimum parallel plate distance of an example modified foldable apparatus along line 7-7 of FIG. 5.

As shown in FIG. 7, the foldable apparatus 101 shown in FIG. 1 (modified as described in the Parallel Plate Test below) is folded to form folded foldable apparatus 701 such that the first major surface 203 of the foldable substrate 201 is on the inside of the folded foldable apparatus 701. In FIG. 7, a user would view a display device in place of the PET sheet 707 through the foldable substrate 201 and, thus, would be positioned on the side of the first major surface 203. In aspects, as shown in FIG. 7, the foldable apparatus 701 can comprise a coating 251 disposed over the foldable apparatus 701 (e.g., second major surface 205). In further aspects, a user would view a display device in place of the PET sheet 707 through the coating 251. In aspects, as shown in FIG. 7, the polymer-based portion 289 and/or 299 can be disposed over the foldable substrate 201. In further aspects, although not shown, an additional substrate (e.g., glass-based substrate and/or ceramic-based substrate in place of release liner 271 or PET sheet 707), and the additional substrate can be disposed over a display device. As shown in FIG. 9, the foldable apparatus 401 shown in FIG. 4 (modified as described in the Parallel Plate Test below) is folded to form folded foldable apparatus 901 such that the first major surface 203 of the foldable substrate 201 is on the inside of the folded foldable apparatus 901. In FIG. 9, a user would view a display device in place of the PET sheet 707 through the foldable substrate 201 and, thus, would be positioned on the side of the first major surface 203. In aspects, as shown in FIG. 9, the second polymer-based portion 299 can be disposed over the foldable substrate 201 (e.g., in the first recess 211). In further aspects, although not shown, an additional substrate (e.g., glass-based substrate and/or ceramic-based substrate in place of release liner 271 or PET sheet 707), and the additional substrate can be disposed over a display device. It is to be understood that the foldable apparatus can be designed to fold such that the display device is on the inside of the bend, on the outside of the bend, or such that the foldable apparatus can be folded in either direction.

As used herein, "foldable" includes complete folding, partial folding, bending, flexing, or multiple capabilities. As used herein, the terms "fail," "failure" and the like refer to breakage, destruction, delamination, or crack propagation. Likewise, a foldable apparatus achieves a parallel plate distance of "X," or has a parallel plate distance of "X," or comprises a parallel plate distance of "X" if it resists failure when the foldable apparatus is held at a parallel plate distance of "X" for 24 hours at about 85° C. and about 85% relative humidity.

As used herein, the "parallel plate distance" of a foldable apparatus and/or foldable substrate is measured with the following test configuration and process using a parallel plate apparatus 601 (see FIGS. 6-9) that comprises a pair of parallel rigid stainless-steel plates 603, 605 comprising a first rigid stainless-steel plate 603 and a second rigid stainless-steel plate 605. When measuring the "parallel plate distance" for the foldable substrate 201 (e.g., the foldable apparatus 301 shown in FIG. 3 consisting of foldable substrate 201), as shown in FIGS. 6 and 8, the foldable substrate 201 is placed between the pair of plates 603 and 605 such that the first major surface 203 is in contact with the pair of plates 603 and 605. When measuring the "parallel plate distance" for a foldable apparatus resembling the foldable apparatus 101 and 401 shown in FIGS. 2 and 4, respectively, the adhesive layer 261 is removed and is replaced by a test adhesive layer 709 comprises a thickness of 50 μm. Further, the test is conducted with a 100 μm thick polyethylene terephthalate (PET) sheet 707 rather than with the release liner 271 of FIGS. 2 and 4. Thus, during the test to determine the "parallel plate distance" of a configuration of a foldable apparatus, the foldable apparatus 701 is produced by using the 100 μm thick PET sheet 707 rather than with the release liner 271 of FIGS. 2 and 4.

When preparing the foldable apparatus 701, the 100 μm thick PET sheet 707 is attached to the test adhesive layer 709 in an identical manner that the release liner 271 is attached to the second contact surface 265 of the adhesive layer 261 as shown in FIG. 2. To test the foldable apparatus 701 of FIG. 7, the test adhesive layer 709 and the PET sheet 707 can likewise be installed as shown in the configuration of FIG. 7 to conduct the test on the foldable apparatus 701. The foldable apparatus 701 is placed between the pair of parallel rigid stainless-steel plates 603 and 605 such that the foldable substrate 201 will be on the inside of the bend, similar to the configuration shown in FIG. 7. Similarly, when preparing the foldable apparatus 901, the foldable apparatus 401 shown in FIG. 4 is prepared for testing by replacing the adhesive layer 261 and the release liner 271 with the test adhesive layer 709 and the 100 μm thick PET sheet 707. For determining a "parallel plate distance", the distance between the parallel plates is reduced at a rate of 50 μm/second until the parallel plate distance 611 or 711 is equal to the "parallel plate distance" to be tested. Then, the parallel plates are held at the "parallel plate distance" to be tested for 24 hours at about 85° C. and about 85% relative humidity. As used herein, the "minimum parallel plate distance" is the smallest parallel plate distance that the foldable apparatus can withstand without failure under the conditions and configuration described above.

In aspects, the foldable apparatus 101, 301, 401, 501, 701, 801, and/or 901 and/or foldable substrate 201 can achieve a parallel plate distance of 100 mm or less, 50 mm or less, 20 mm or less, 10 mm or less, 5 mm or less, or 3 mm or less. In further aspects, the foldable apparatus and/or foldable substrate can achieve a parallel plate distance of 50 millimeters (mm), or 20 mm, or 10 mm, of 5 mm, or 3 mm. In aspects, the foldable apparatus and/or foldable substrate can comprise a minimum parallel plate distance of about 40 mm or less, about 20 mm or less, about 10 mm or less, about 5 mm or less, about 3 mm or less, about 1 mm or less, about 1 mm or more, about 3 mm or more, about 5 mm or more, or about 10 mm or more. In aspects, the foldable apparatus and/or foldable substrate can comprise a minimum parallel plate distance in a range from about 1 mm to about 40 mm, from about 1 mm to about 20 mm, from about 1 mm to about 10 mm, from about 1 mm to about 5 mm, from about 1 mm to about 3 mm. In aspects, the foldable apparatus and/or foldable substrate can achieve a minimum parallel plate distance in a range from about 2 mm to about 40 mm, from about 2 mm to about 20 mm, from about 3 mm to about 10 mm, from about 3 mm to about 5 mm, or any range or subrange therebetween.

A central width 287 of the central portion 281 of the foldable substrate 201 is defined between the first portion 221 and the second portion 231 in the direction 106 of the length 105. In aspects, the central width 287 of the central portion 281 of the foldable substrate 201 can extend from the first portion 221 to the second portion 231. A width 210 of the first central surface area 213 and the second central surface area 243 of the foldable substrate 201 is defined between the first transition region 212 and the second transition region 218, for example, as the portion comprising the central thickness 209, in the direction 106 of the length 105. In aspects, the central width 287 of the central portion 281 of the foldable substrate 201 and/or the width 210 of the first central surface area 213 of the foldable substrate 201 can be about 1.4 times or more, about 1.6 times or more, about 2 times or more, about 2.2 times or more, about 3 times or less, or about 2.5 times or less the minimum parallel plate distance. In aspects, the central width 287 of the central portion 281 of the foldable substrate 201 and/or the width 210 of the first central surface area 213 of the foldable substrate 201 as a multiple of the minimum parallel plate distance can range from about 1.4 times to about 3 times, from about 1.6 times to about 2.5 times, from about 2 times to about 2.5 times, from about 2.2 times to about 2.5 times, or any range or subrange therebetween. Without wishing to be bound by theory, the length of a bent portion in a circular configuration between parallel plates can be about 1.6 times the parallel plate distance. Without wishing to be bound by theory, the length of a bend portion in an elliptical configuration between parallel plates can be about 2.2 times the parallel plate distance. In aspects, the central width 287 of the central portion 281 of the foldable substrate 201 and/or the width 210 of the first central surface area 213 of the foldable substrate 201 can be about 1 mm or more, about 3 mm or more, about 5 mm or more, about 8 mm or more, about 10 mm or more, about 15 mm or more, about 20 mm or more, about 60 mm or less, about 50 mm or less, about 40 mm or less, about 35 mm or less, about 30 mm or less, or about 25 mm or less. In aspects, the central width 287 of the central portion 281 of the foldable substrate 201 and/or the width 210 of the first central surface area 213 of the foldable substrate 201 can range from about 1 mm to about 100 mm, from about 3 mm to about 60 mm, from about 5 mm to about 50 mm, from about 8 mm to about 40 mm, from about 10 mm to about 40 mm, from about 15 mm to about 35 mm, from about 20 mm to about 30 mm, or any range of subrange therebetween. In aspects, the central width 287 of the central portion 281 of the foldable substrate 201 and/or the width 210 of the first central surface area 213 of the foldable substrate 201 can be about 2.8 mm or more, about 6 mm or more, about 9 mm or more, about 60 mm or less, about 40 mm, or less, or about 24 mm or less. In aspects, the central width 287 of the central portion 281 of the foldable substrate 201 and/or the width 210 of the first central surface area 213 of the foldable substrate 201 can range from about 2.8 mm to about 40 mm, from about 6 mm to about 24 mm, or any range of subrange therebetween. In aspects, the first central surface area 213, the central portion 281 (e.g., centerline of the central portion 281), and/or the fold plane 109 can correspond to a midpoint between opposing ends of the foldable substrate and/or the foldable apparatus in the direction 106 of the length 105. By providing a width within the above-noted ranges for the central portion, folding of the foldable apparatus without failure can be facilitated.

In aspects, the foldable substrate and/or the foldable apparatus can be rollable. As used herein, a foldable substrate or a foldable apparatus is "rollable" if it can achieve a threshold parallel plate distance over a length of the corresponding foldable substrate and/or foldable apparatus that is the greater of 10 mm or 10% of the length of the corresponding foldable substrate and/or foldable apparatus. For example, as shown in FIGS. 3-4, the foldable substrate 201 is considered "rollable" when the central width 287 of the central portion 281 is greater than 10% of the length 105 (see FIG. 1) extending in the direction 106 of the length 105. In aspects, as shown in FIGS. 3-4, the foldable substrate 201 can comprise a first width 227, the central width 287, and a second width 237 in the direction 106 of the length 105. A sum of the first width 227, the central width 287, and the second width 237 can be substantially equal to and/or equal to the length of the foldable substrate 201 (e.g., length 105 of the foldable apparatus 101 shown in FIG. 1).

In further aspects, the second width 237, as a percentage of the length of the foldable substrate 201 and/or the foldable apparatus 101, can be about 15% or less, about 12% or less, about 10% or less, about 8% or less, about 6% or less, about 5% or less, about 4.5% or less, about 4% or less, about 1% or more, about 1.5% or more, about 2% or more, about 2.5% or more, about 3% or more, or about 3.5% or more. In further aspects, the second width 237, as a percentage of the length of the foldable substrate 201 and/or the foldable apparatus 101, can range from about 1% to about 15%, from about 1% to about 12%, from about 1.5% to about 10%, from about 1.5% to about 8%, from about 2% to about 6%, from about 2.5% to about 5%, from about 3% to about 4.5%, from about 3.5% to about 4%, or any range or subrange therebetween. Providing the second width within one or more of the ranges mentioned above in this paragraph can provide sufficient width to handle the ends of the foldable substrate during processing, to secure the foldable substrate and/or foldable apparatus as part of an electronic device, and/or to maximize an amount of the foldable substrate and/or foldable apparatus that can be part of a display portion visible to the user. As used herein, a "display portion" refers to a portion of the foldable apparatus corresponding to where an image can be displayed by a display device and viewed by a viewer through the foldable substrate (e.g., rollable substrate).

In further aspects, the first width 227, as a percentage of the length of the foldable substrate 201 and/or the foldable apparatus 101, can be 35% or more, about 40% or more, about 45% or more, about 50% or more, about 75% or less, about 70% or less, about 65% or less, about 60% or less, or about 55% or less. In further aspects, the first width 227, as a percentage of the length of the foldable substrate 201 and/or the foldable apparatus 101, can range from about 35% to about 75%, from about 40% to about 70%, from about 45% to about 65%, from about 50% to about 60%, from about 50% to about 55%, or any range or subrange therebetween. In further aspects, the first width 227 can be about 35 mm or more, about 40 mm or more, about 45 mm or more, about 50 mm or more, about 75 mm or less, about 70 mm or less, about 65 mm or less, about 60 mm or less, or about 55 or less. In aspects, the first width 227 can range from about 35 mm to about 75 mm, from about 40 mm to about 70 mm, from about 45 mm to about 65 mm, from about 50 mm to about 60 mm, from about 50 mm to about 55 mm, or any range or subrange therebetween. Providing the first width within one or more of the ranges mentioned above in this paragraph can provide a large display portion visible to the user while ensuring that substantially all of the rest of the foldable substrate (e.g., central portion and second portion) can be within a footprint of the first portion.

Additionally or alternatively, the central width 287 can be greater than the second width 237. In aspects, the central width 287, as a percentage of the length of the foldable substrate 201 and/or the foldable apparatus 101, can be about 15% or more, about 20% or more, about 25% or more, about 30% or more, about 35% or more, about 40% or more, about 42% or more, about 44% or more, about 45% or more, about 50% or less, about 49% or less, about 48% or less, about 47% or less, about 46% or less, about 45% or less, about 38% or less, or about 32% or less. In aspects, the central width 287, as a percentage of the length of the foldable substrate 201 and/or the foldable apparatus 101, can range from about 15% to about 50%, from about 20% to about 50%, from about 25% to about 49%, from about 30% to about 49%, from about 35% to about 48%, from about 40% to about 48%, from about 42% to about 47%, from about 43% to about 46%, from about 44% to about 45%, or any range or subrange therebetween. In further aspects, the second width 237 can be less than the central width 287. Providing a central width within one or more of the ranges mentioned above in this paragraph can enable a display portion of the foldable apparatus to be adjusted as a portion of the rollable substrate is moved into and/or out of view of a user without unnecessarily expanding a size of the corresponding apparatus when in a fully rolled configuration.

The foldable apparatus 101, 301, 401, 501, 701, 801, and/or 901 may have an impact resistance defined by the capability of a region of the foldable apparatus (e.g., a region comprising the first portion 221, a region comprising the second portion 231, a region comprising the polymer-based portion 289 and/or 299 and/or central portion 281) to avoid failure at a pen drop height (e.g., 5 centimeters (cm) or more, 10 centimeters or more, 20 cm or more), when measured according to the "Pen Drop Test." As used herein, the "Pen Drop Test" is conducted such that samples of foldable apparatus are tested with the load (i.e., from a pen dropped from a certain height) imparted to an outer major surface (e.g., first major surface 203 of the foldable substrate 201 for foldable apparatus 101 or 301 shown in FIGS. 2-3, second major surface 205 of the foldable substrate 201 for foldable apparatus 301 or 401 shown in FIGS. 3-4) with the foldable apparatus configured as in the parallel plate test with 100 μm thick PET sheet 707 attached to the test adhesive layer 709 having a thickness of 50 μm instead of the release liner 271 shown in FIG. 2. As such, the PET layer in the Pen Drop Test is meant to simulate a foldable electronic display device (e.g., an OLED device). During testing, the foldable apparatus bonded to the PET layer is placed on an aluminum plate (6063 aluminum alloy, as polished to a surface roughness with 400 grit paper) with the PET layer in contact with the aluminum plate. No tape is used on the side of the sample resting on the aluminum plate.

A tube is used for the Pen Drop Test to guide a pen to an outer surface of the foldable apparatus. For the foldable apparatus 101, 301, 401, 501, 701, 801, and/or 901 in FIGS. 2-4 and 6-9, the pen is guided to the outer major surface (e.g., first major surface 203 of the foldable substrate 201 for foldable apparatus 101 or 301 shown in FIGS. 2-3, second major surface 205 of the foldable substrate 201 for foldable apparatus 301 or 401 shown in FIGS. 3-4), and the tube is placed in contact with the outer major surface 205 of the foldable substrate 201 so that the longitudinal axis of the tube is substantially perpendicular to the outer major surface with the longitudinal axis of the tube extending in the direction of gravity. The tube has an outside diameter of 1 inch (2.54 cm), an inside diameter of nine-sixteenths of an inch (1.4 cm), and a length of 90 cm. An acrylonitrile butadiene (ABS) shim is employed to hold the pen at a predetermined height for each test. After each drop, the tube is relocated relative to the sample to guide the pen to a different impact location on the sample. The pen employed in Pen Drop Test is a BIC Easy Glide Pen, Fine, having a tungsten carbide ballpoint tip of 0.7 mm (0.68 mm) diameter, and a weight of 5.73 grams (g) including the cap.

For the Pen Drop Test, the pen is dropped with the cap attached to the top end (i.e., the end opposite the tip) so that the ballpoint can interact with the test sample. In a drop sequence according to the Pen Drop Test, one pen drop is conducted at an initial height of 1 cm, followed by successive drops in 0.5 cm increments up to 20 cm, and then after 20 cm, 2 cm increments until failure of the test sample. After each drop is conducted, the presence of any observable fracture, failure, or other evidence of damage to the sample is recorded along with the particular pen drop height. Using the Pen Drop Test, multiple samples can be tested according to the same drop sequence to generate a population with improved statistical accuracy. For the Pen Drop Test, the pen is to be changed to a new pen after every 5 drops, and for each new sample tested. In addition, all pen drops are conducted at random locations on the sample at or near the center of the sample, with no pen drops near or on the edge of the samples.

For purposes of the Pen Drop Test, "failure" means the formation of a visible mechanical defect in a laminate. The mechanical defect may be a crack or plastic deformation (e.g., surface indentation). The crack may be a surface crack or a through crack. The crack may be formed on an interior or exterior surface of a laminate. The crack may extend through all or a portion of the foldable substrate 201 and/or coating. A visible mechanical defect has a minimum dimension of 0.2 mm or more.

In aspects, the foldable apparatus can resist failure for a pen drop in a region comprising the first portion 221 or the second portion 231 at a pen drop height of 10 centimeters (cm), 12 cm, 14 cm, 16 cm, or 20 cm. In aspects, a maximum pen drop height that the foldable apparatus can withstand without failure over a region comprising the first portion 221 or the second portion 231 may be about 10 cm or more, about 12 cm or more, about 14 cm or more, about 16 cm or more, about 40 cm or less, or about 30 cm or less, about 20 cm or less, about 18 cm or less. In aspects, a maximum pen drop height that the foldable apparatus can withstand without failure over a region comprising the first portion 221 or the second portion 231 can range from about 10 cm to about 40 cm, from about 12 cm to about 30 cm, from about 14 cm to about 20 cm, from about 16 cm to about 20 cm, from about 18 cm to about 20 cm, or any range or subrange therebetween.

In aspects, the foldable apparatus can resist failure for a pen drop in a region (e.g., central portion 281) comprising the polymer-based portion 289 and/or 299 between the first portion 221 and the second portion 231 at a pen drop height of 1 cm, 2 cm, 3 cm, 4 cm, 5 cm, or more. In aspects, a maximum pen drop height that the foldable apparatus can withstand without failure over a region comprising the polymer-based portion 289 and/or 299 between the first portion 221 and the second portion 231 may be about 1 cm or more, about 2 cm or more, about 3 cm or more, about 4 cm or more, about 20 cm or less, about 10 cm or less, about 8 cm or less, or about 6 cm or less. In aspects, a maximum pen drop height that the foldable apparatus can withstand without failure over a region comprising the polymer-based portion 289 and/or 299 between the first portion 221 and the second portion 231 can range from about 1 cm to about 20 cm, from about 2 cm to about 10 cm, from about 3 cm to about 8 cm, from about 4 cm to about 8 cm, from about 4 cm to about 6 cm, or any range or subrange therebetween. In aspects, a maximum pen drop height that the foldable apparatus can withstand without failure of a region comprising the polymer-based portion 289 and/or 299 between the first portion 221 and the second portion 231 can range from about 1 cm to about 10 cm, from about 1 cm to about 8 cm, from about 2 cm to about 5 cm, from about 3 cm to about 5 cm, from about 4 cm to about 5 cm, or any range or subrange therebetween.

Figure 12:
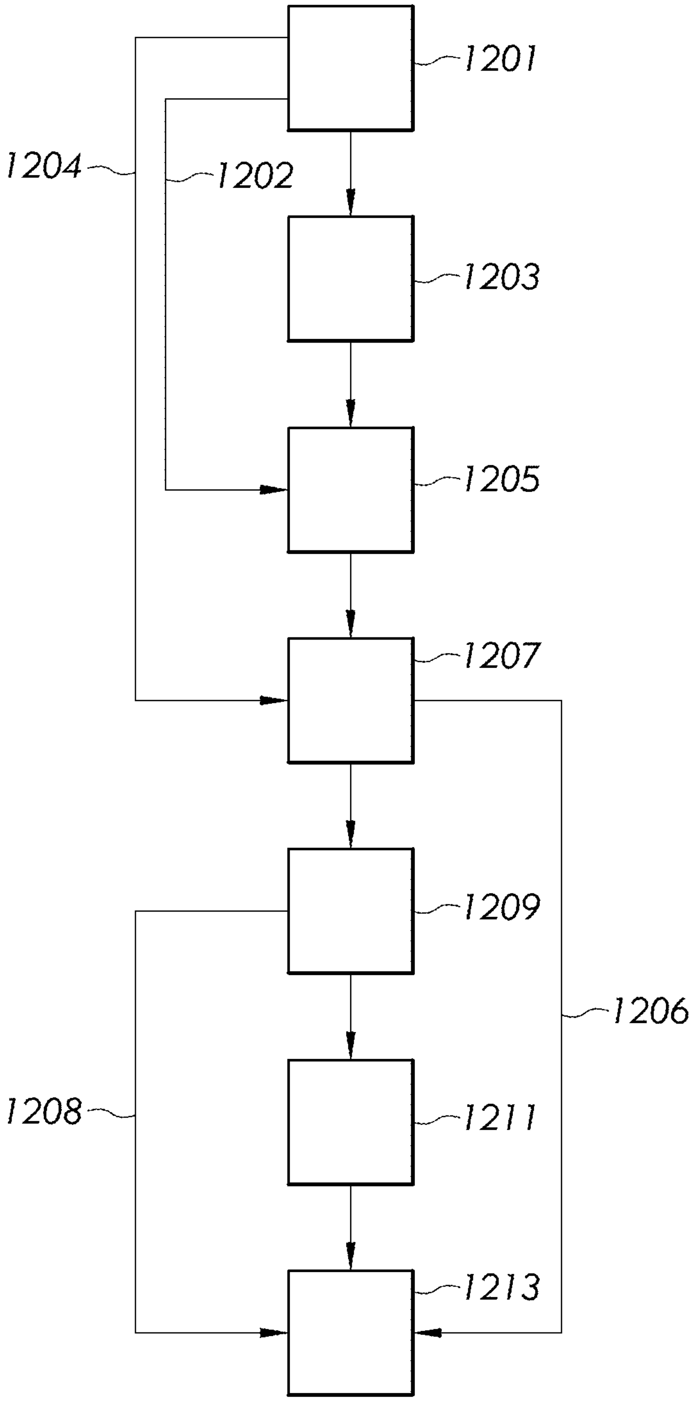
FIG. 12 is a flow chart illustrating example methods making foldable apparatus in accordance with aspects of the disclosure.

Aspects of methods of making the foldable apparatus and/or foldable substrate in accordance with aspects of the disclosure will be discussed with reference to the flow charts in FIGS. 12 and 34 and example method steps illustrated in FIGS. 13, 15-17, 19-22, 35-36, and 38-41 and cross-sectional views illustrated in FIGS. 14, 18, and 37.

Figure 13:
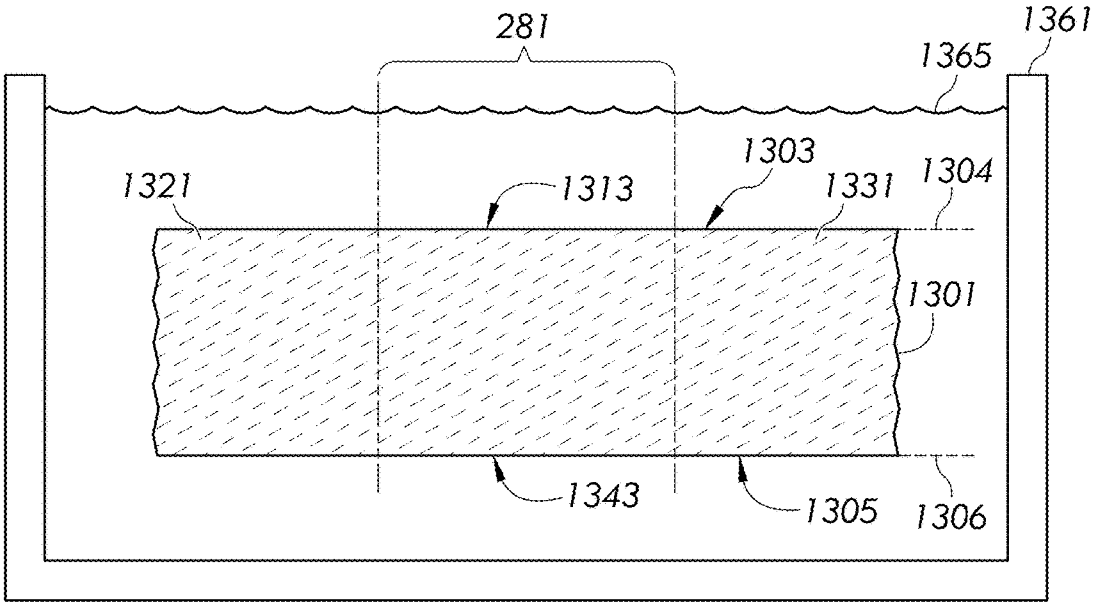
FIG. 13 schematically illustrate a step in methods of making a foldable apparatus.

Example aspects of making the foldable apparatus 101, 301, 501, and/or 701 and/or foldable substrate 201 illustrated in FIGS. 2-3 and 6-7 will now be discussed with reference to the flow chart in FIG. 12 and example method steps illustrated in FIGS. 13, 15-17, and 19-22 and cross-sectional views illustrated in FIGS. 14 and 18. In a first step 1201 of methods of the disclosure, methods can start with obtaining a foldable substrate 1301 (see FIGS. 13-14). In aspects, the foldable substrate 1301 may be provided by purchase or otherwise obtaining a substrate or by forming the foldable substrate. In aspects, the foldable substrate 1301 can comprise a glass-based substrate and/or a ceramic-based substrate. In further aspects, glass-based substrates and/or ceramic-based substrates can be provided by forming them with a variety of ribbon forming processes, for example, slot draw, down-draw, fusion down-draw, up-draw, press roll, redraw, or float. In further aspects, ceramic-based substrates can be provided by heating a glass-based substrate to crystallize one or more ceramic crystals. The foldable substrate 1301 may comprise an existing first major surface 1303 that can extend along a first plane 1304. The foldable substrate 1301 may comprise an existing second major surface 1305 that can extend along a second plane 1306. In aspects, as shown in FIG. 13, in step 1201, the foldable substrate 1301 can comprise an existing first central surface area 1313 that is coplanar with the existing first major surface 1303, for example, the existing first major surface 1303 comprising the existing first central surface area 1313. In aspects, as shown in FIG. 13, in step 1201, the foldable substrate 1301 can comprise an existing second central surface area 1343 that is coplanar with the existing second major surface 1305, for example, the existing second major surface 1305 comprising the existing second central surface area 1343. A central portion 281 comprises the existing first central surface area 1313 and the existing second central surface area 1343. Alternatively, in aspects, as shown in FIG. 17-18, the central portion 281 can comprise a first central surface area 1613 recessed from the existing first major surface 1303 and/or a second central surface area 1643 recessed from the existing second major surface 1305 at the end of step 1201. In aspects, as shown in FIGS. 14 and 18, the foldable substrate 201 may comprise one or more compressive stress regions at the end of step 1201.

After step 1201, as shown in FIG. 13, methods can proceed to step 1203 comprising initially chemically strengthening the foldable substrate 1301. In aspects, the foldable substrate 1301 can be substantially unstrengthened before the chemically strengthening of step 1203. As used herein, substantially unstrengthened refers to a substrate comprising either no depth of layer, no depth of compression, a depth of layer in a range from 0% to about 5% of the substrate thickness, or a depth of compression in a range from 0% to about 5% of the substrate thickness. In aspects, as shown in FIG. 13, chemically strengthening the foldable substrate 1301 can comprise contacting at least a portion of a foldable substrate 1301 comprising lithium cations and/or sodium cations with a first molten salt bath 1361 comprising a first molten salt solution 1365. Chemically strengthening a foldable substrate 1301 (e.g., glass-based substrate, ceramic-based substrate) by ion exchange can occur when a first cation within a depth of a surface of a foldable substrate 1301 is exchanged with a second cation within a first molten salt solution 1365 that has a larger radius than the first cation. For example, a lithium cation within the depth of the surface of the foldable substrate 1301 can be exchanged with a sodium cation or potassium cation within a first molten salt solution 1365. Consequently, the surface of the foldable substrate 1301 is placed in compression and thereby chemically strengthened by the ion exchange process since the lithium cation has a smaller radius than the radius of the exchanged sodium cation or potassium cation within the first molten salt solution 1365. Chemically strengthening the foldable substrate 1301 can comprise contacting at least a portion of a foldable substrate 1301 comprising lithium cations and/or sodium cations with a first molten salt bath 1361 comprising a first molten salt solution 1365 comprising potassium nitrate, potassium phosphate, potassium chloride, potassium sulfate, sodium chloride, sodium sulfate, sodium nitrate, and/or sodium phosphate, whereby lithium cations and/or sodium cations diffuse from the foldable substrate 1301 to the first molten salt solution 1365 contained in the first molten salt bath 1361. In aspects, the first molten In aspects, the first molten salt solution can be free of lithium before the foldable substrate 1301 is immersed therein and/or during step 1203. In aspects, the first molten salt solution 1365 can further comprise silicic acid, for example, within one or more of the ranges discussed below for the amount of silicic acid in the second molten salt solution 1703. In aspects, the molten salt solution can consist of a potassium salt and optionally silicic acid.

In aspects, the temperature of the first molten salt solution 1365 can be about 380° C. or more, about 400° C. or more, about 420° C. or more, about 430° C. or less, about 530° C. or less, about 500° C. or less, about 480° C. or less, or about 450° C. or less. In aspects, the temperature of the first molten salt solution 1365 can range from about 380° C. to about 530° C., from about 400° C. to about 500° C., from about 420° C. to about 480° C., from about 430° C. to about 450° C., or any range or subrange therebetween. In aspects, the foldable substrate 1301 can be in contact with the first molten salt solution 1365 for about 30 minutes or more, about 20 minutes or more, 30 minutes or more, about 45 minutes or more, about 1 hour or more, about 8 hours or less, about 4 hours or less, about 2 hours or less, or about 1.5 hours or less. In aspects, the foldable substrate 1301 can be in contact with the first molten salt solution 1365 for a time in a range from about 20 minutes to about 8 hours, from about 30 minutes to about 4 hours, from about 45 minutes to about 2 hours, from about 1 hour to about 1.5 hours, or any range or subrange therebetween.

Figure 14:
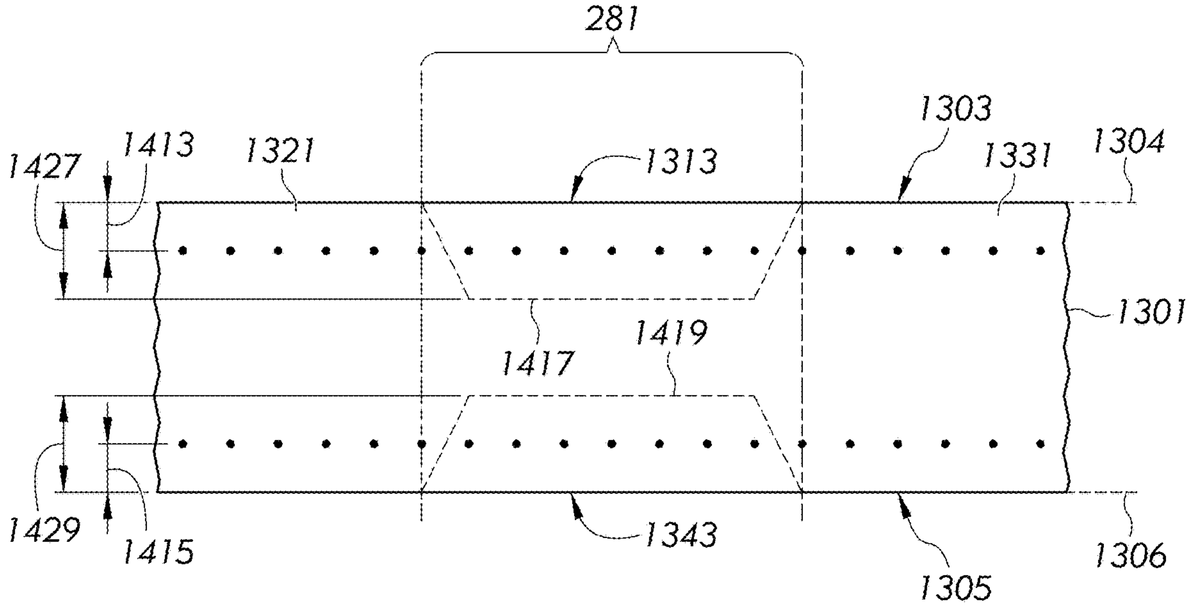
FIG. 14 is a cross-sectional view of a foldable apparatus after the step shown in FIG. 13 or 16 and/or before the step shown in FIG. 17.

In aspects, as shown in FIG. 14, initially chemically strengthening the foldable substrate 1301 in step 1203 can comprise chemically strengthening the existing first major surface 1303 in the first portion 1321 and the second portion 1331 to form an initial first compressive stress region extending to an initial first depth of compression 1413 from the existing first major surface 1303. In aspects, as shown in FIG. 14, chemically strengthening the foldable substrate 1301 in step 1205 can form an initial second compressive stress region extending to an initial second depth of compression 1415 from the existing second major surface 1305. As indicated in FIG. 14, any chemical strengthening at the existing first central surface area 1313 will be removed in forming the first recess (indicated by the dashed lines 1417) and/or the second recess (indicated by the dashed lines 1419) in step 1205 (discussed below) since a first distance 1427 and/or a second distance 1429 of the recess(es) will be greater than the initial first depth of compression 1413. In aspects, the initial first depth of compression 1413 and/or the initial second depth of compression 1415, as a percentage of an initial substrate thickness, can be about 10% or more, about 11% or more, about 12% or more, about 13% or more, about 20% or less, about 18% or less, about 16% or less, or about 14% or less. In aspects, the initial first depth of compression 1413 and/or the initial second depth of compression 1415, as a percentage of an initial substrate thickness, can range from about 10% to about 20%, from about 11% to about 18%, from about 12% to about 16%, from about 13% to about 14%, or any range or subrange therebetween.

Figure 15:
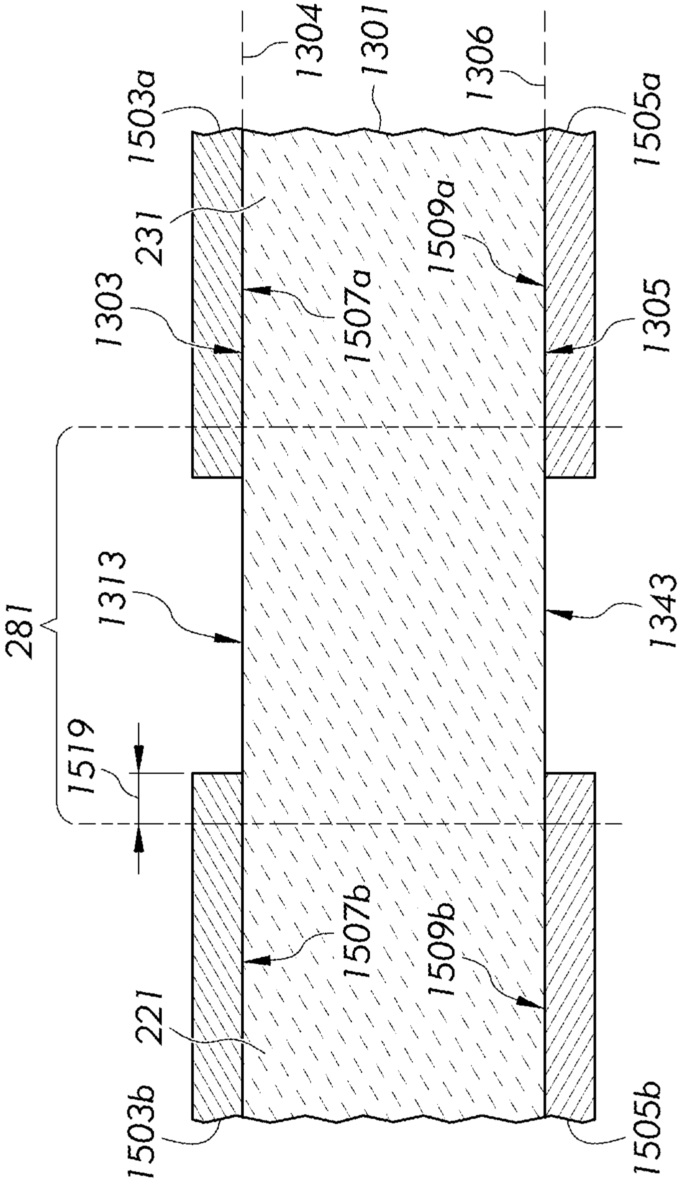
FIGS. 15-17 schematically illustrate steps in methods of making a foldable apparatus.
Figure 16:
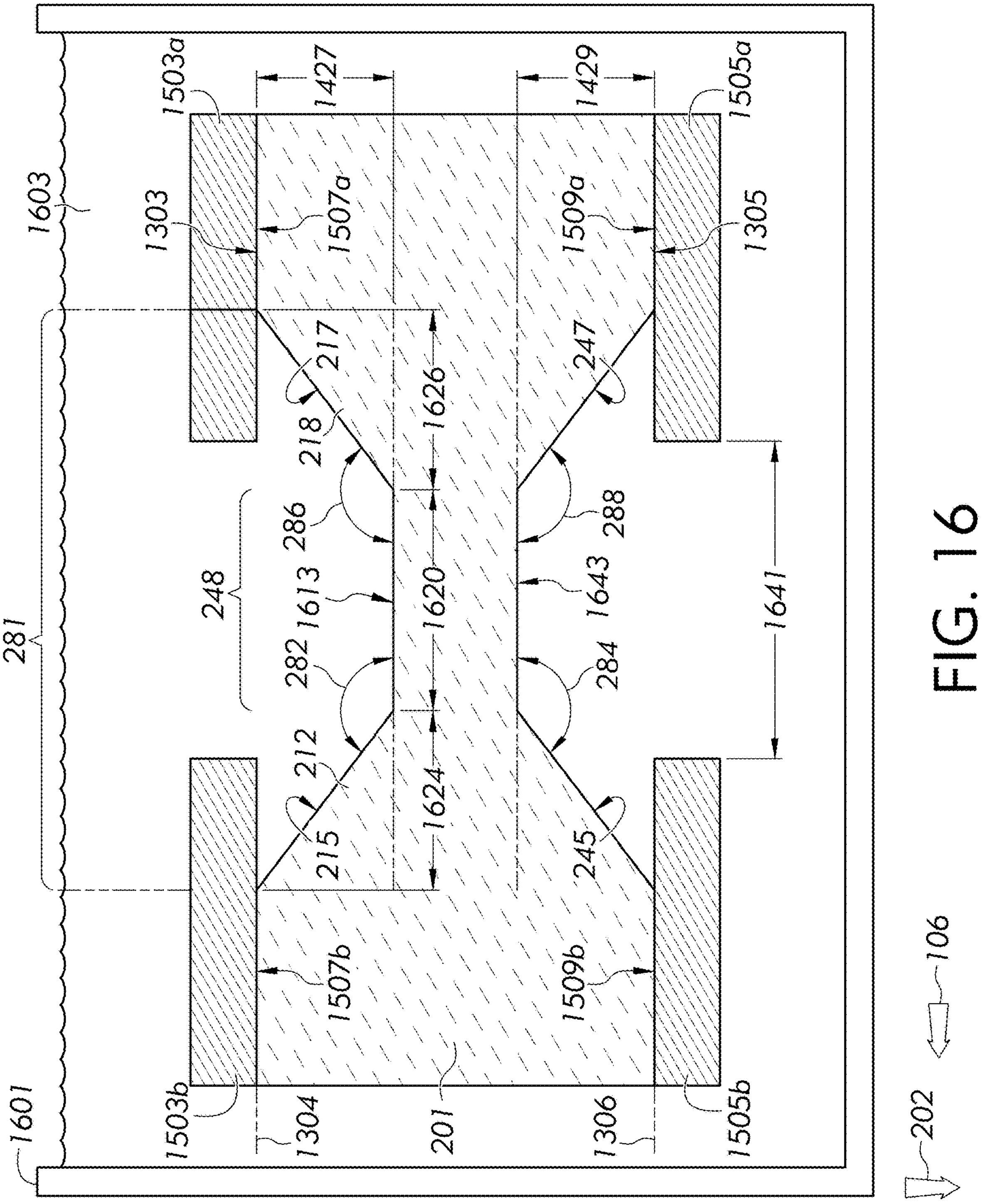
Figure 17:
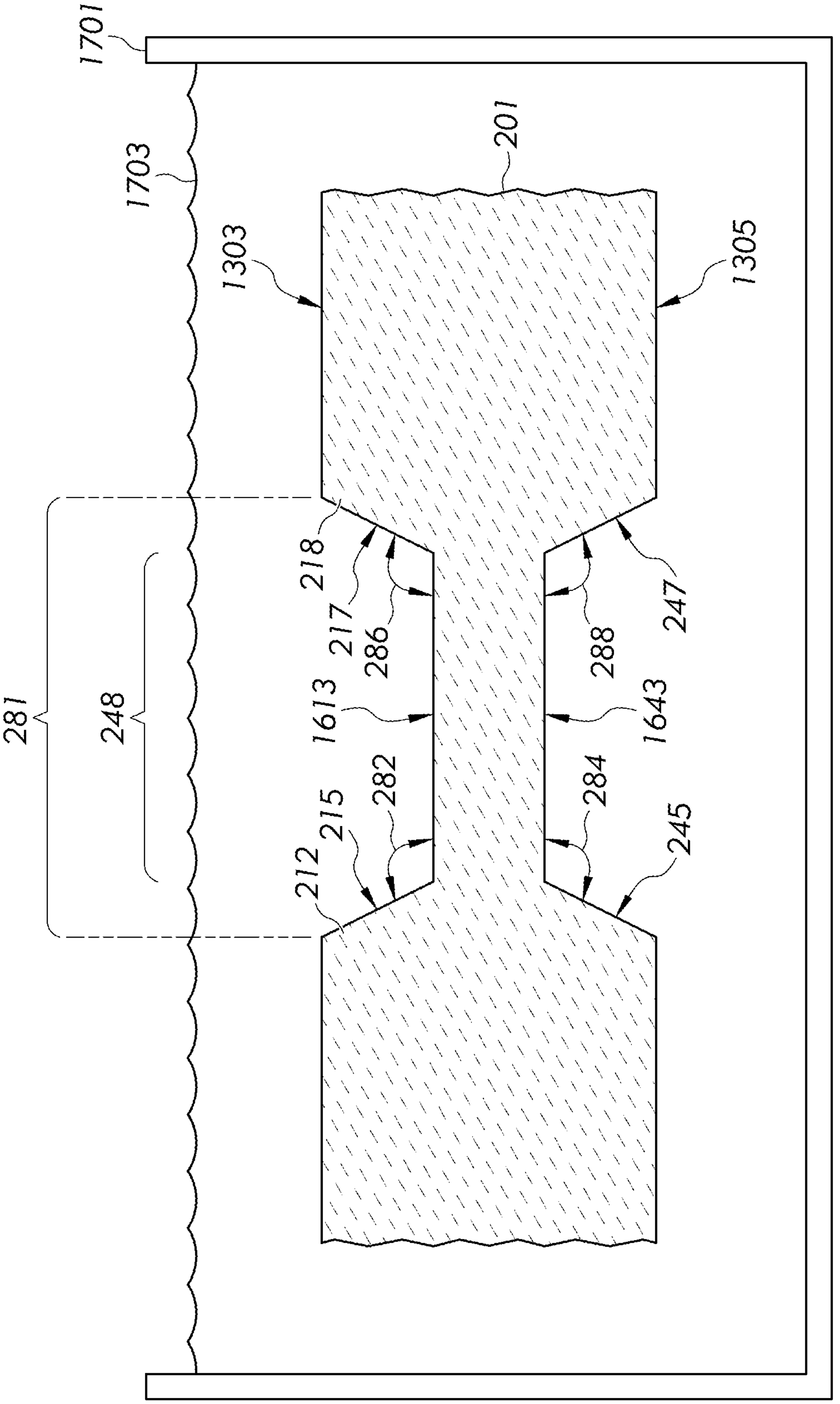

After step 1201 or 1203, as shown in FIG. 16, methods can proceed to step 1205 comprising etching at least the existing first central surface area 1313 to form the first central surface area 1613. In aspects, step 1205 can comprise disposing an etch mask on the foldable substrate 1301 without covering the entire existing first central surface area 1313. In aspects, as shown in FIG. 18, a first portion 1503*b* can be disposed on the first portion 221 (e.g., first surface area 1507*b* of the first portion 1503*b* can contact the existing first major surface 1303 in the first portion 221). In further aspects, as shown in FIG. 15, the first portion 1503*b* can extend for a length 1519 into the central portion 281 (relative to the dimensions of the resulting foldable substrate), which can allow for the predetermined dimension of the resulting foldable substrate, for example, by accounting for undercutting during etching. In aspects, as shown in FIG. 15, a second portion 1503*a* can be disposed on the second portion 231 (e.g., second surface area 1507*a* of the second portion 1503*a* can contact the existing first major surface 1303 in the second portion 231). In further aspects, as shown in FIG. 15, the second portion 1503*a* can extend into the central portion 281, for example, for a length equal to the length 1519. In aspects, as shown in FIG. 15, a third portion 1505*b* can be disposed on the existing second major surface 1305 (e.g., first portion 221, with the third surface area 1509*b* of the third portion 1505*b* contacting the existing second major surface 1305 in the first portion 221), and/or a fourth portion 1505*a* can be disposed on the existing second major surface 1305 (e.g., second portion 231, with the fourth surface area 1509*a* of the fourth portion 1505*a* contacting the existing second major surface 1305 in the second portion 231). In aspects, the etch mask (e.g., first portion 1503*b*, second portion 1503*a*, third portion 1505*b*, fourth portion 1505*a*) can comprise a polymer (e.g., acid-resistant polymer), or an inorganic material. Exemplary aspects of polymers include a polyolefin, a polyamide, a halide-containing polymer (e.g., polyvinylchloride or a fluorine-containing polymer), an elastomer, a urethane, phenolic resin, parylene, polyethylene terephthalate (PET), and polyether ether ketone (PEEK). Exemplary aspects of inorganic materials for the etch mask include titanium dioxide ($TiO_2$), zirconia ($ZrO_2$), tin oxide ($SnO_2$), alumina ($Al_2O_3$), silica ($SiO_2$), silicon nitride ($Si_3N_4$), and/or combinations thereof, although other materials for masks can be used in other aspects. In aspects the etch mask can be disposed by curing a precursor dispensed from a container onto the foldable substrate or by attaching a tape comprising the acid-resistant polymer and an adhesive. Alternatively, another method (e.g., chemical vapor deposition (CVD) (e.g., low-pressure CVD, plasma-enhanced CVD), physical vapor deposition (PVD) (e.g., evaporation, molecular beam epitaxy, ion plating), atomic layer deposition (ALD), sputtering, spray pyrolysis, chemical bath deposition, sol-gel deposition) may be used to form the etch mask.

As shown by comparing FIGS. 14-15 with FIG. 16, step 1205 comprises etching the existing first central surface area 1313 (see FIGS. 14-15) by contacting the existing first central surface area 1313 with an etchant 1603 to form a first central surface area 1613. For example, the foldable substrate 1301 or 201 can be immersed in an etchant bath 1601 containing the etchant 1603. In further aspects, the etchant 1603 can comprise one or more acids (e.g., HCl, HF, $H_2SO_4$, $HNO_3$). In aspects, the etchant 1603 can undercut the first portion 1503*b* and/or the second portion 1503*a* of the etch mask, for example by the length 1519 (see FIG. 15). Step 1205 can form the first central surface area 1613 that can be recessed from the first plane 1304 by the first distance 1427. In aspects, as shown in FIGS. 16-17, step 1205 can further form the first transition region 212 comprising the first transition surface area 215 and/or the second transition region 218 comprising the third transition surface area 217. In further aspects, as shown, an angle between the first transition surface area 215 and the first central surface area 1613 can be substantially equal to the first average angle 282, and/or an angle between the third transition surface area 217 and the first central surface area 213 can be substantially equal to the third average angle 286. Step 1205 can form the second central surface area 1643 that can be recessed from the second plane 1306 by the second distance 1429. In further aspects, as shown, an angle between the second transition surface area 245 and the second central surface area 1643 can be substantially equal to the second average angle 284, and/or an angle between the fourth transition surface area 247 and the second central surface area 243 can be substantially equal to the fourth average angle 288. In aspects, as shown, a minimum distance 1641 between the portions of the etch mask (e.g., between the first portion 1503*b* and the second portion 1503*a*, between the third portion 1505*b* and the fourth portion 1505*a*) can be less than the width of the central portion 281 (e.g., the sum of widths 1620, 1624, and 1626) due to undercutting. In further aspects, the width 1620 of the first central surface area 1613 can be less than the minimum distance 1641. In further aspects, the widths 1624 and 1626 of the transition regions 212 and 218 can be substantially equal to the corresponding first transition width 214 and/or second transition width 216, for example, as shown in FIGS. 2-3. Likewise, the width 1620 of the first central surface area 1613 can be substantially equal to the width 210.

After forming the first central surface area 1613 and/or the second central surface area 1643, as shown in FIG. 17, step 1205 can further comprise removing the one or more etch masks. In aspects, removing the etch mask(s) can be done using a tool (e.g., grinding, sweeping, scraping, pushing, etc.), washing the foldable substrate (e.g., using a detergent solution, using an alkaline solution), or a combination thereof.

Figure 18:
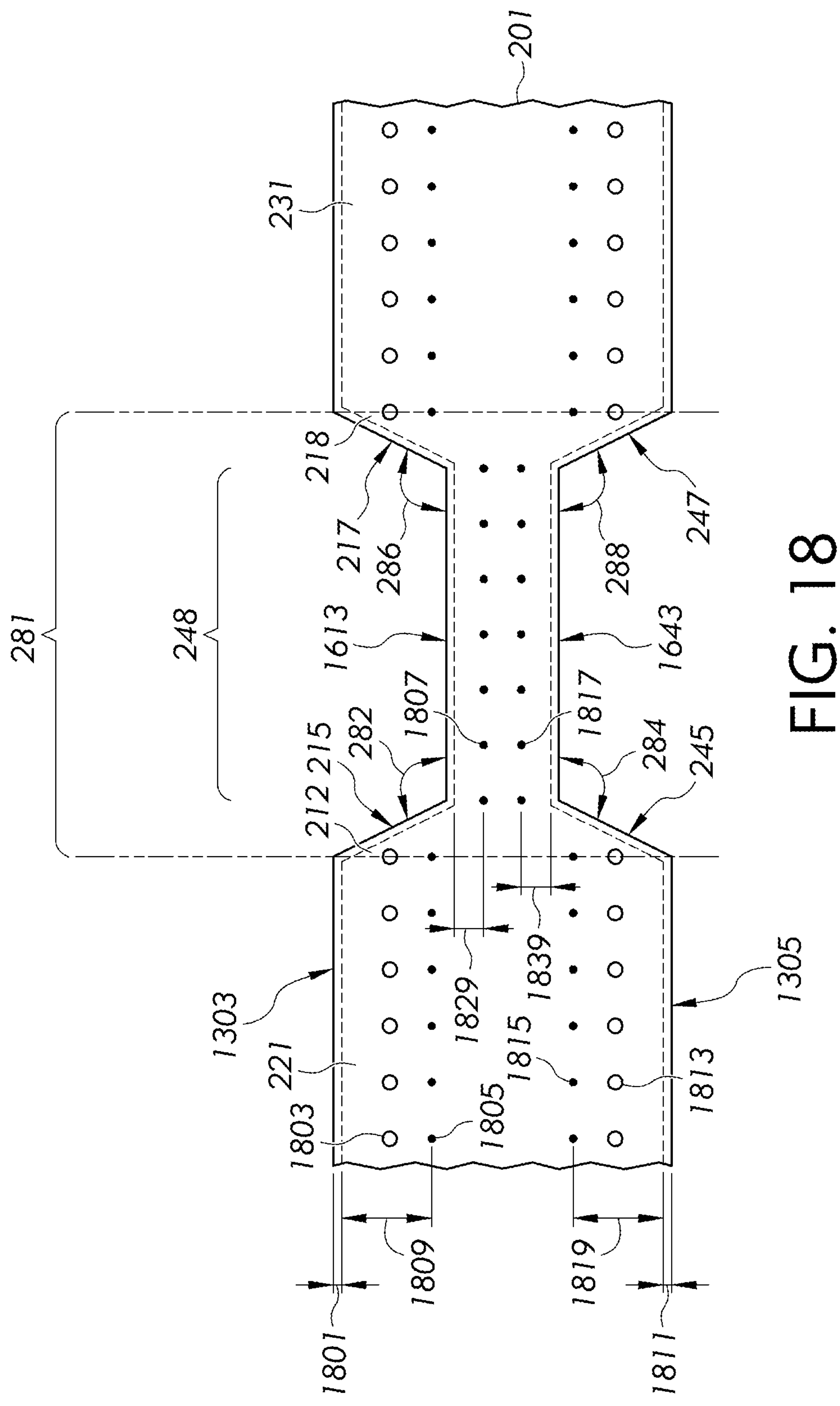
FIG. 18 is a cross-sectional view of a foldable substrate after the step shown in FIG. 17 and/or before the step shown in FIG. 19.

After step 1201 or 1205, as shown in FIGS. 17-18, methods can proceed to step 1207 comprising further chemically strengthening the foldable substrate 201. In aspects, as shown, step 1207 can comprise contacting the foldable substrate 201 with a second molten salt solution 1703 for a second period of time. In further aspects, as shown, step 1207 can comprise immersing the foldable substrate 201 in a second molten salt bath 1701 containing the second molten salt solution 1703. The second molten salt solution 1703 contains from greater than 0 wt % to less than about 0.4 wt % of a lithium salt. In aspects, the second molten salt solution 1703 can comprise the lithium salt in an amount of about 0.01 wt % or more, about 0.02 wt % or more, about 0.03 wt % or more, about 0.04 wt % or more, about 0.05 wt % or more, about 0.2 wt % or less, about 0.1 wt % or less, about 0.08 wt % or less, about 0.07 wt % or less, or about 0.06 wt % or less, or about 0.05 wt % or less. In aspects, the second molten salt solution 1703 can comprise the lithium salt from about 0.01 wt % to about 0.2 wt %, from about 0.01 wt % to about 0.1 wt %, from about 0.02 wt % to about 0.08 wt %, from about 0.03 wt % to about 0.07 wt %, from about 0.04 wt % to about 0.06 wt %, or any range or subrange therebetween. In aspects, the second molten salt solution 1703 comprise potassium ions in an amount of about 70 wt % or more, about 80 wt % or more, about 85 wt % or more, about 90 wt % or more, about 95 wt % or more, about 97 wt % or more, about 98 wt % or more, about 99 wt % or more, about 99.92 wt % or more, about 99.98 wt % or less, about 99.92 wt % or less, about 98.98 wt % or less, about 98.92 or less, about 97.98 wt % or less, about 97.92 wt % or less, about 96.98 wt % or less, about 96.92 wt % or less, about 95.98 wt % or less, about 95.92 wt % or less, about 94.98 wt % or less, about 94.92 wt % or less, about 89.98 wt % or less, about 89.92 wt % or less, about 84.98 wt % or less, about 84.92 wt % or less. In aspects, the second molten salt solution 1703 can comprise potassium ions from about 70 wt % to about 99.98 wt %, from about 80 wt % to about 99.92 wt %, from about 85 wt % to about 98.98 wt %, from about 90 wt % to about 97.98 wt %, from about 95 wt % to about 96.98 wt %, or any range or subrange therebetween. In aspects, the second molten salt solution 1703 can optionally comprise a sodium salt in an amount from greater than 0 wt %, about 1 wt % or more, about 2 wt % or more, about 3 wt % or more, about 29.98 wt % or less, about 28.98 wt % or less, about 27.98 wt % or less, about 24.98 wt % or less, about 19.98 wt % or less, about 14.98 wt % or less, about 9.98 wt % or less, or about 5 wt % or less. In aspects, the second molten salt solution 1703 can optionally comprise a sodium salt in an amount ranging from greater than 0 wt % to about 29.98 wt %, from about 1 wt % to about 28.98 wt %, from about 2 wt % to about 24.98 wt %, from about 3 wt % to about 19.98 wt %, from about 4 wt % to about 9.98 wt % or less, from about 4 wt % to about 5 wt %, or any range or subrange therebetween. In aspects, the second molten salt solution 1703 can optionally comprise silicic acid in an amount from greater than 0 wt % to about 0.1 wt % or more, about 0.2 wt % or more, about 0.3 wt % or more, about 0.4 wt % or more, about 1 wt % or less, about 0.9 wt % or less, about 0.8 wt % or less, about 0.7 wt % or less, or about 0.6 wt % or less. In aspects, the second molten salt solution 1703 can optionally comprise silicic acid in an amount in a range from greater than 0 wt % to 1 wt %, from about 0.1 wt % to about 0.9 wt %, from about 0.2 wt % to about 0.8 wt %, from about 0.3 wt % to about 0.7 wt %, from about 0.4 wt % to about 0.6 wt %, or any range or subrange therebetween. An exemplary aspect of an anion for the lithium salt, potassium salt, and/or sodium salt is nitrate, although other anions (as discussed above for the first molten salt solution) can be used in other aspects. Alternatively, a total concentration of a potassium salt, cesium salt, francium salt, and rubidium salt can be within one or more of the ranges discussed above for the potassium salt.

In aspects, the second molten salt solution 1703 can be maintained at a temperature of about 380° C. or more, about 400° C. or more, about 410° C. or more, about 480° C. or less, about 460° C. or less, or about 440° C. or less. In aspects, the second molten salt solution 1703 can be maintained at a temperature in a range from about 380° C. to about 480° C., from about 400° C. to about 460° C., from about 410° C. to about 440° C., or any range or subrange therebetween. In aspects, the second period of time that the second molten salt solution 1703 contacts the foldable substrate 201 can be less than the first period of time. In further aspects, the second period of time can be about 1 minute or more, about 2 minutes or more, about 4 minutes or more, about 10 minutes or less, about 8 minutes or less, or about 6 minutes or less. In aspects, the second period of time can range from about 1 minute to about 10 minutes, from about 2 minutes to about 8 minutes, from about 4 minutes to about 6 minutes, or any range or subrange therebetween.

At the end of step 1207, as shown in FIG. 18, the compressive stress region(s) extending from the existing first major surface 1303 can be increased from the initial first depth of compression (as indicated by open circles 1803) to about the first depth of compression 1809 (as indicated by solid dots 1805). At the end of step 1207 or at the end of step 1209 (discussed below), the first compressive stress region in the first portion 221 can extend to the first depth of compression 1809 and/or the third compressive stress region in the second portion 231 can extend to the first depth of compression 1809. At the end of step 1207, the compressive stress region(s) extending from the existing second major surface 1305 can be increased from the initial second depth of compression (as indicated by open circles 1813) to the second depth of compression 1819 (as indicated by solid dots 1815). At the end of step 1207 or at the end of step 1209 (discussed below), the second compressive stress region in the first portion 221 can extend to the second depth of compression 1819 and/or the fourth compressive stress region in the second portion 231 can extend to the second depth of compression 1819. At the end of step 1207, a first central compressive stress region (as indicated by solid dots 1807) in the central portion 281 extending from the first central surface area 1613 can extend to the first central depth of compression 1829, and/or a second central compressive stress region (as indicated by solid dots 1817) in the central portion 281 extending from the second central surface area 1643 can extend to the second central depth of compression 1839.

As shown in FIG. 18, a first surface layer 1801 and/or a second surface layer 1811 can be removed in step 1209 (discussed below). In aspects, the first surface layer 1801 can be substantially uniform across the existing first major surface 1303, the first transition surface area 215, the third transition surface area 217, and/or the first central surface area 1613. In aspects, the second surface layer 1811 can be substantially uniform across the existing second major surface 1305 (e.g., including the second central surface area 1643). In further aspects, the second surface layer 1811 can be substantially equal to the first surface layer 1801. After step 1209, the foldable substrate can correspond to the foldable substrate shown in FIGS. 2-3.

Figure 19:
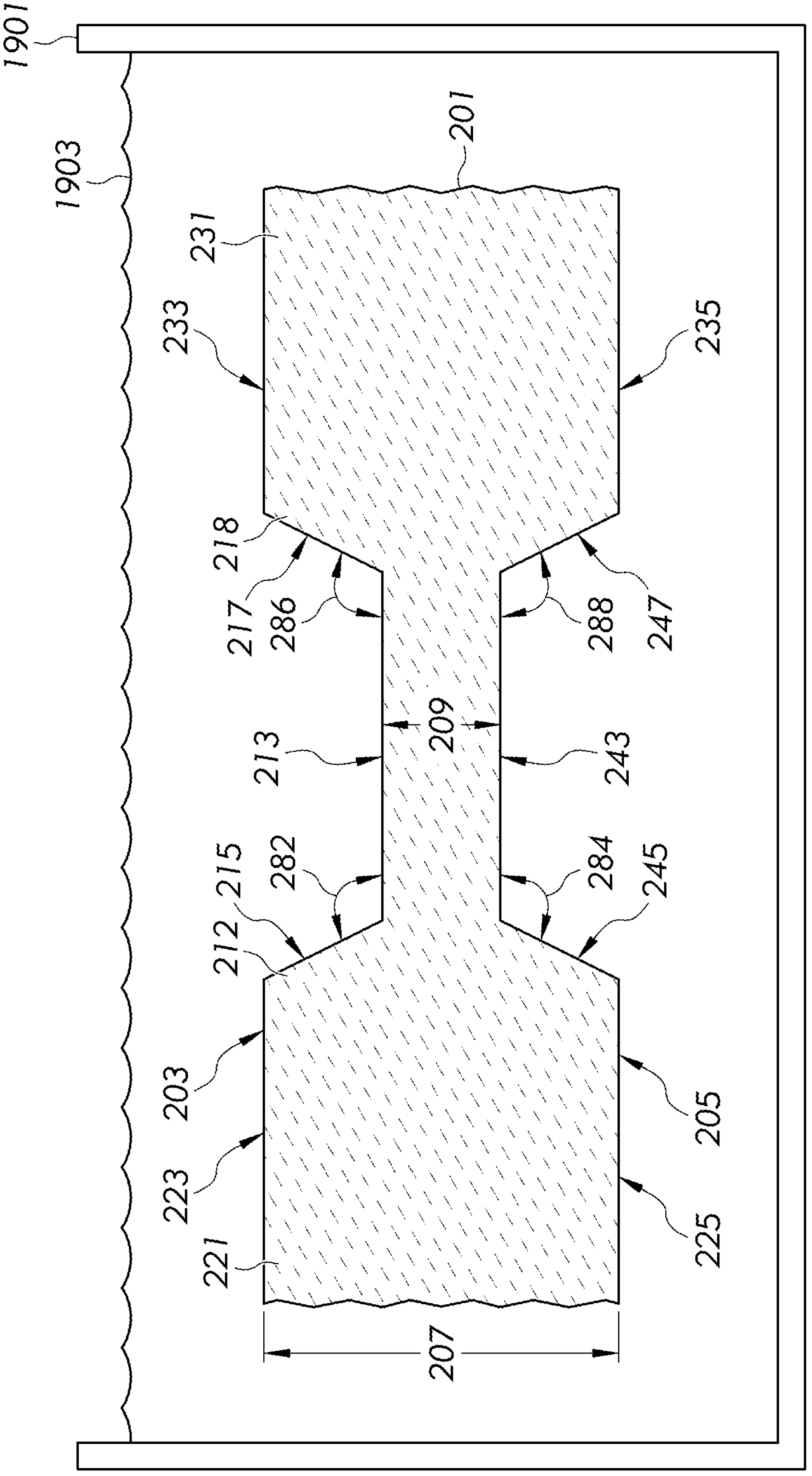
FIG. 19 schematically illustrates a step in methods of making a foldable substrate and/or foldable apparatus.

After step 1207, as shown in FIG. 19, methods can proceed to step 1209 comprising etching a uniform thickness substantially uniformly from the foldable substrate 201. In aspects, as shown, step 1209 can comprise contacting the foldable substrate 201 with an etchant 1903. In further aspects, as shown, step 1209 can comprise immersing the foldable substrate 201 in an etchant bath 1901 containing the etchant 1903. In aspects, the etchant 1903 can be the same as the etchant 1603 discussed above with reference to step 1205. In aspects, the etchant 1903 can comprise a lower concentration (e.g., molarity) than the etchant 1603. In aspects, the thickness removed substantially uniformly from the foldable substrate 201 in step 1209 can be about 0.1 μm or more, about 0.2 μm or more, about 0.5 μm or more, about 5 μm or less, about 2 μm or less, about 1 μm or less, or about 0.8 μm or less. In aspects, the thickness removed substantially uniformly from the foldable substrate 201 in step 1209 can range from about 0.1 μm to about 5 μm, from about 0.1 μm to about 2 μm, from about 0.2 μm to about 1 μm, from about 0.5 μm to about 0.8 μm, or any range or subrange therebetween. Etching the substrate in step 1209 (after the further chemically strengthening the foldable substrate in step 1207) can remove flaws near or at the surface of the foldable substrate 201, which can increase a strength (e.g., pen drop height) and/or flexibility (e.g., ability to achieve a particular parallel plate distance) of the foldable substrate 201. In aspects, as shown, at the end of step 1209, the etching can produce a foldable substrate with the substrate thickness 207 and the central thickness 209. In aspects, as shown, at the end of step 1209, the etching can form the first surface area 223, the second surface area 225, the third surface area 233, the fourth surface area 235, the first central surface area 213, and/or the second central surface area 243 with the properties discussed above with reference to FIGS. 2-3.

Figures 20, 21, 22:
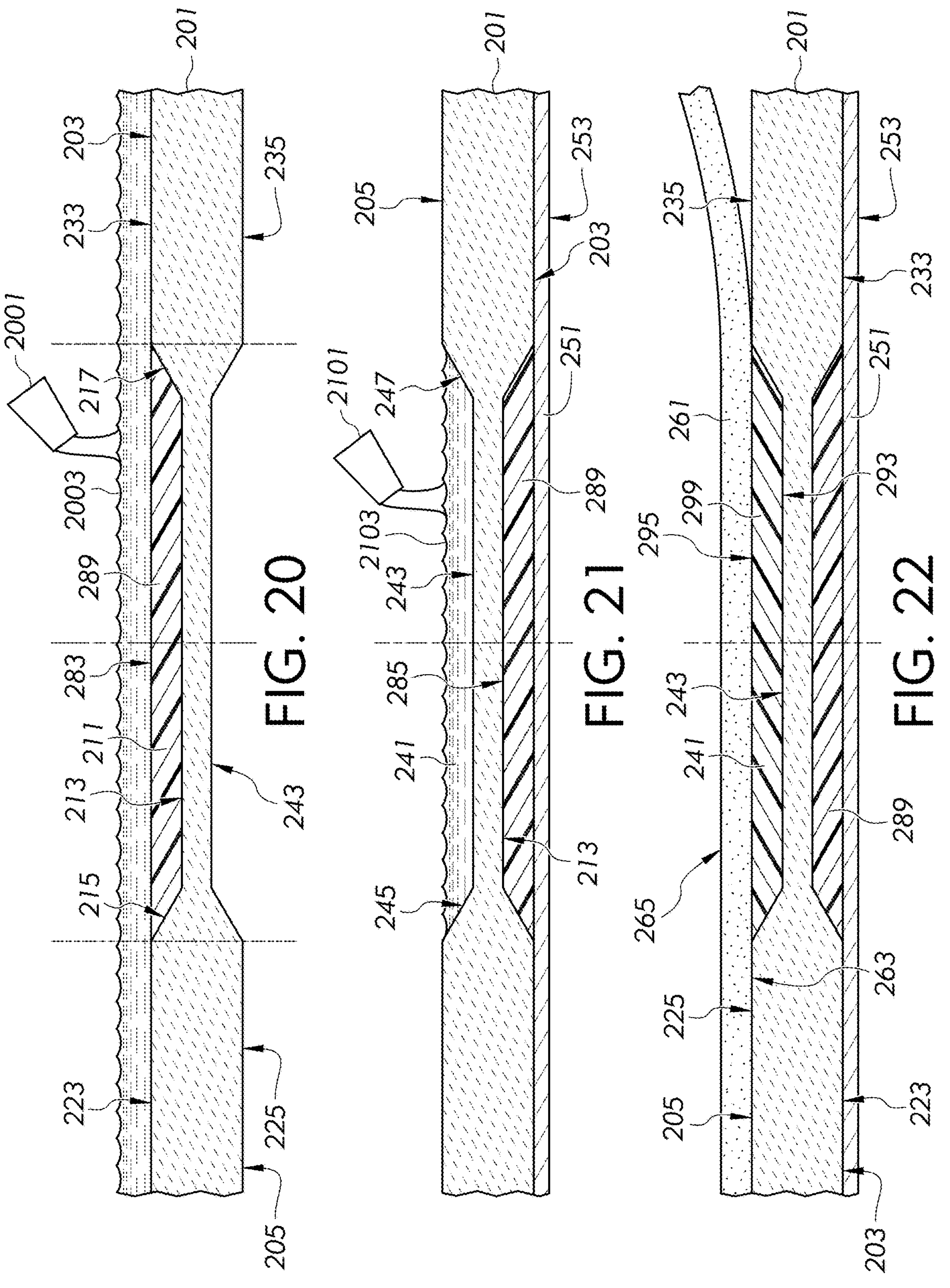
FIGS. 20-22 schematically illustrates a step in methods of making a foldable apparatus.

After step 1209, as shown in FIGS. 20-22, methods can proceed to step 1211 comprising assembling a foldable apparatus comprising the foldable substrate. In aspects, as shown in FIGS. 20-22, step 1209 can comprise assembling the foldable apparatus by disposing a polymer-based portion (e.g., first polymer-based portion 289, second polymer-based portion 299), an adhesive layer 261, and/or a coating 251 over the foldable substrate 201. In further aspects, as shown in FIG. 20, a first polymer-based portion 289 can be disposed in the first recess 211 and/or over the first central surface area 213. In further aspects, as shown in FIGS. 20-21, a coating 251 can be disposed over the first major surface 203 (e.g., first surface area 223 and third surface area 233), for example, by dispensing a first liquid 2003 from a container 2001 (e.g., conduit, flexible tube, micropipette, or syringe) over the first major surface 203 that can be cured to form the coating 251. In even further aspects, the first liquid 2003 may comprise a coating precursor, a solvent, particles, nanoparticles, and/or fibers. In still further aspects, the coating precursor can comprise, without limitation, one or more of a monomer, an accelerator, a curing agent, an epoxy, and/or an acrylate. Curing the first liquid 2003 can comprise heating the first liquid 2003, irradiating the first liquid 2003 with ultraviolet (UV) radiation, and/or waiting a predetermined amount of time (e.g., from about 30 minutes to 24 hours, from about 1 hour to about 8 hours). In aspects, although not shown, the coating 251 can be disposed in the first recess 211 (e.g., fill the first recess 211) without contacting the first major surface 203 (e.g., first surface area 223, third surface area 233), for example, in place of the first polymer-based portion 289 in FIGS. 20-22. In further aspects, as shown in FIGS. 20-22, a second polymer-based portion 299 can be disposed in the second recess 241, for example, by dispensing a second liquid 2103 from a container 2101 (e.g., conduit, flexible tube, micropipette, or syringe) over the second central surface area 243 that can be cured to form the second polymer-based portion 299. Curing the second liquid 2103 can comprise heating the second liquid 2103, irradiating the second liquid 2103 with ultraviolet (UV) radiation, and/or waiting a predetermined amount of time (e.g., from about 30 minutes to 24 hours, from about 1 hour to about 8 hours). In further aspects, as shown in FIG. 22, an adhesive layer 261 can contact the second major surface 205 (e.g., the second surface area 225 and the fourth surface area 235). For example, the adhesive layer 261 can comprise one or more sheets of an adhesive material. In aspects, there can be an integral interface between the one or more sheets comprising the adhesive layer 261, which can reduce (e.g., avoid) optical diffraction and/or optical discontinuities as light travels between the sheets since the one or more sheets can include substantially the same index of refraction. In aspects, although not shown, at least a portion of the adhesive layer can be disposed in the second recess. In aspects, a release liner (see release liner 271 in FIG. 2) or a display device may be disposed on the adhesive layer 261 (e.g., second contact surface 265).

After step 1207, 1209, or 2111, methods can proceed to step 1213, where methods of making the foldable substrate and/or the foldable apparatus can be complete. In aspects, methods of making a foldable substrate and/or a foldable apparatus in accordance with aspects of the disclosure can proceed along steps 1201, 1203, 1205, 1207, 1209, 1211, and 1213 of the flow chart in FIG. 12 sequentially, as discussed above. In aspects, methods can follow arrow 1202 from step 1201 to step 1205, for example, if the foldable substrate 1301 already comprises the initial compressive stress region(s) at the end of step 1201. In aspects, methods can follow arrow 1204 from step 1201 to step 1207, for example, if the foldable substrate already comprises the initial compressive stress region(s) and has the etch mask(s) disposed thereon at the end of step 1201. In aspects, methods can follow arrow 1206 from step 1207 to step 1213, for example, if methods are complete at the end of step 1207. In aspects, methods can follow arrow 1208 from step 1209 to step 1213, for example, if methods are complete at the end of step 1209. Any of the above options may be combined to make a foldable apparatus in accordance with the embodiments of the disclosure.

Figure 35:
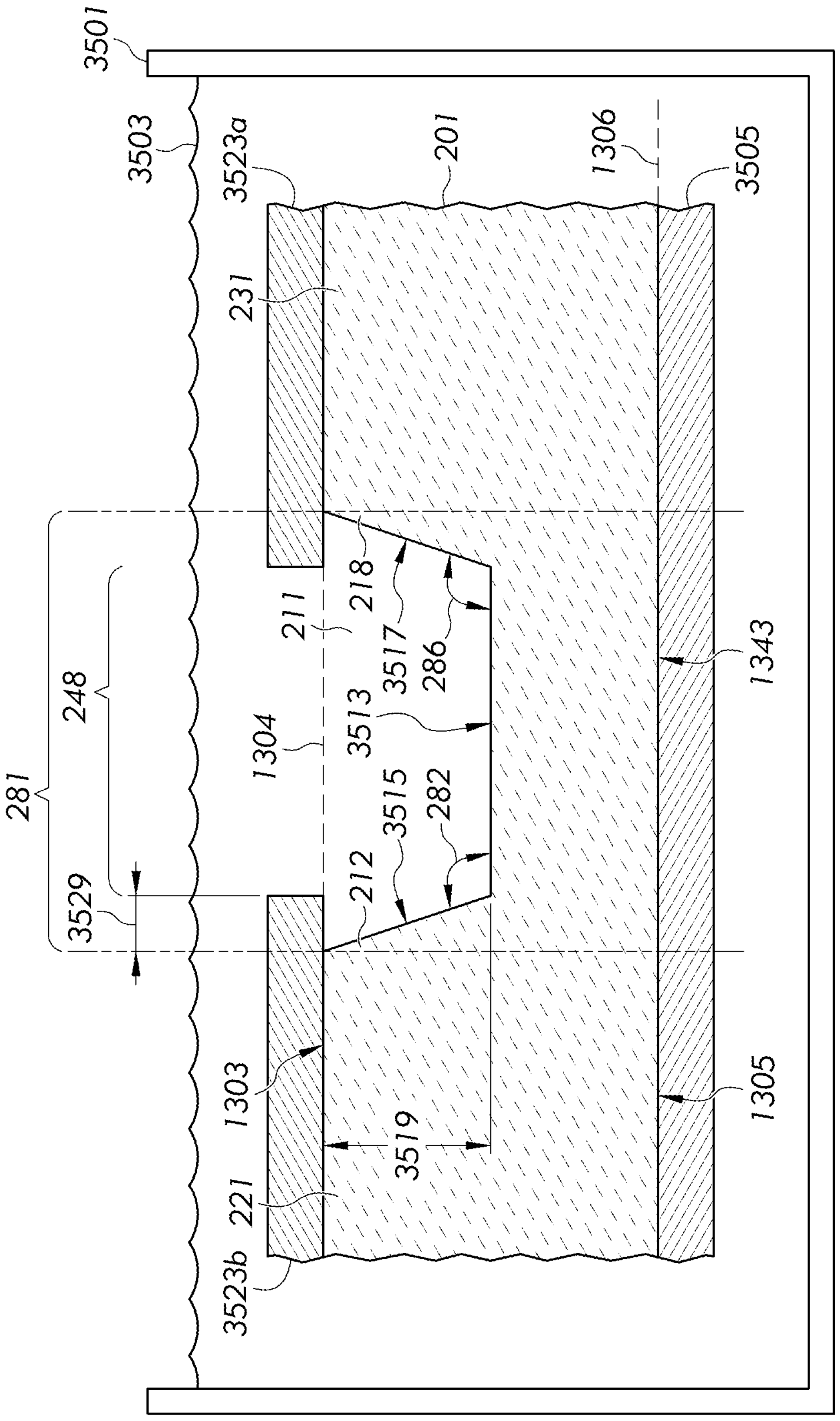
FIGS. 35-36 schematically illustrate steps in methods of making a foldable apparatus.
Figure 36:
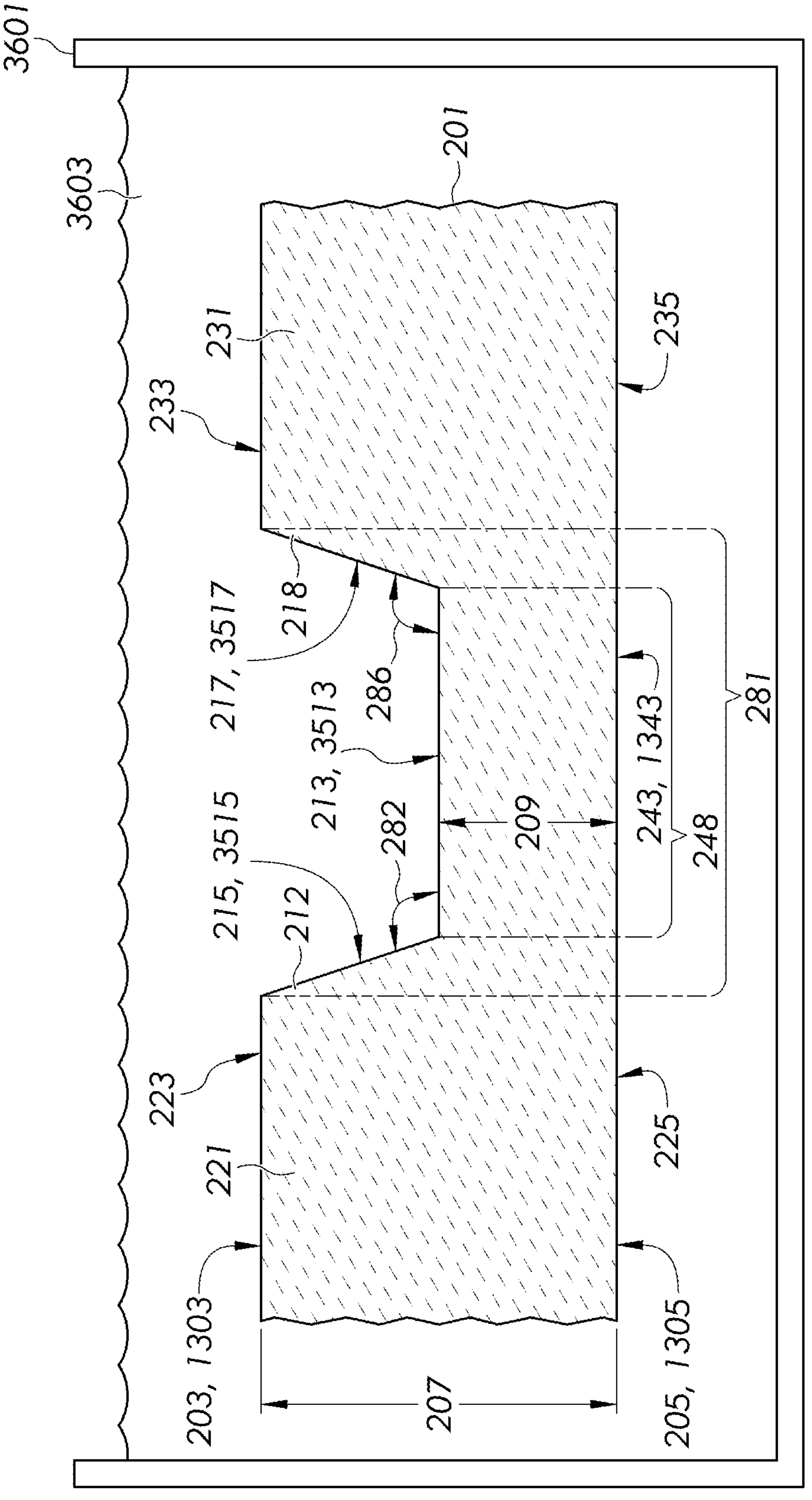

Example aspects of making the foldable apparatus 401, 801, and/or 901 and/or foldable substrate 201 illustrated in FIGS. 4 and 8-9 will now be discussed with reference to the flow chart in FIG. 34 and example method steps illustrated in FIGS. 35-36 and 38-41 and cross-sectional views illustrated in FIG. 37. In a first step 3401 of methods of the disclosure, methods can start with obtaining a foldable substrate 201 or 1301 (see FIG. 13 for foldable substrate 1301 or FIGS. 35-36 for foldable substrate 201). In aspects, the foldable substrate 201 or 1301 may be provided by purchase or otherwise obtaining a substrate or by forming the foldable substrate. In aspects, the foldable substrate 201 or 1301 can comprise a glass-based substrate and/or a ceramic-based substrate. In further aspects, glass-based substrates and/or ceramic-based substrates can be provided by forming them with a variety of ribbon forming processes, for example, slot draw, down-draw, fusion down-draw, up-draw, press roll, redraw, or float. In further aspects, ceramic-based substrates can be provided by heating a glass-based substrate to crystallize one or more ceramic crystals. The foldable substrate 201 or 1301 may comprise an existing first major surface 1303 that can extend along a first plane 1304. The foldable substrate 201 or 1301 may comprise an existing second major surface 1305 that can extend along a second plane 1306. In aspects (e.g., see FIG. 13), in step 3401, the foldable substrate 1301 can comprise an existing first central surface area 1313 that is coplanar with the existing first major surface 1303, for example, the existing first major surface 1303 comprising the existing first central surface area 1313. In aspects, as shown in FIG. 35, in step 3401, the foldable substrate 201 or 1301 can comprise an existing second central surface area 1343 that is coplanar with the existing second major surface 1305, for example, the existing second major surface 1305 comprising the existing second central surface area 1343. A central portion 281 comprises the existing first central surface area 1313 (see FIG. 13) and the existing second central surface area 1343. Alternatively, in aspects, as shown in FIG. 35-36, the central portion 281 can comprise a first central surface area 213 or 3513 recessed from the existing first major surface 1303 at the end of step 3401. In aspects, the foldable substrate 201 or 1301 can be substantially unstrengthened at the end of step 3401. Alternatively, in aspects, the foldable substrate 201 or 1301 can comprise one or more compressive stress regions (e.g., see FIG. 14 and associated discussion above) with the understanding that any initial compressive stress region in the first portion and/or the second portion would be increased through the chemical strengthening in step 3405 discussed below.

After step 3401, as shown in FIG. 35, methods can proceed to step 3403 comprising etching at least the existing first central surface area 1313 (see FIG. 13) to form the first central surface area 3513. In aspects, step 3403 can comprise disposing an etch mask on the foldable substrate 201 or 1301 without covering the entire existing first central surface area 1313. In aspects, as shown in FIG. 35, a first portion **3523*b* can be disposed on the first portion 221 (e.g., contacting the existing first major surface 1303 in the first portion 221). In further aspects, as shown in FIG. 35, the first portion 1503*b* can extend for a length 3529 into the central portion 281 (relative to the dimensions of the resulting foldable substrate 201), which can allow for the predetermined dimension of the resulting foldable substrate, for example, by accounting for undercutting during etching. In aspects, as shown in FIG. 35, a second portion 3523*a* can be disposed on the second portion 231 (e.g., contacting the existing first major surface 1303 in the second portion 231). In further aspects, as shown in FIG. 35, the second portion 3523*a* can extend into the central portion 281, for example, for a length equal to the length 3529. In aspects, as shown in FIG. 35, a third portion 3505 can be disposed on the existing second major surface 1305 (e.g., first portion 221, the second portion 231, and/or the central portion 281, contacting the existing second major surface 1305). In further aspects, as shown, the third portion 3505 can cover (e.g., be disposed on) the entire existing second major surface 1305. In aspects, the etch mask (e.g., first portion 3523*b*, second portion 3523*a*, third portion 3505) can comprise a polymer (e.g., acid-resistant polymer), or an inorganic material, for example, one or more of the materials discussed above with reference to FIG. 15**.

As shown by comparing FIG. 13 with FIG. 35, step 3403 comprises etching the existing first central surface area 1313 (see FIG. 13) by contacting the existing first central surface area 1313 with an etchant 3503 to form a first central surface area 3513. For example, the foldable substrate 201 or 1301 can be immersed in an etchant bath 3501 containing the etchant 3503. In further aspects, the etchant 3503 can comprise one or more acids (e.g., HCl, HF, $H_2SO_4$, $HNO_3$). In aspects, the etchant 3503 can undercut the first portion **3523*b* and/or the second portion 3523*a* of the etch mask, for example by the length 3529 (see FIG. 35). Step 3403 can form the first central surface area 3513 that can be recessed from the first plane 1304 by the first distance 3519. In aspects, as shown in FIGS. 35-36, step 3403 can further form the first transition region 212 comprising the first transition surface area 3515 or 215 and/or the second transition region 218 comprising the third transition surface area 3517 or 217. In further aspects, as shown, an angle between the first transition surface area 3515 or 215 and the first central surface area 3513 can be substantially equal to the first average angle 282, and/or an angle between the third transition surface area 3517 or 217 and the first central surface area 213 can be substantially equal to the third average angle 286. In aspects, as shown, a minimum distance between the portions of the etch mask (e.g., between the first portion 3523*b* and the second portion 3523*a*, corresponding to the central region 248) can be less than the width of the central portion 281** due to undercutting.

After forming the first central surface area 3513, as shown in FIGS. 35-36, step 3403 can further comprise removing the one or more etch masks. In aspects, removing the etch mask(s) can be done using a tool (e.g., grinding, sweeping, scraping, pushing, etc.), washing the foldable substrate (e.g., using a detergent solution, using an alkaline solution), or a combination thereof.

Figure 37:
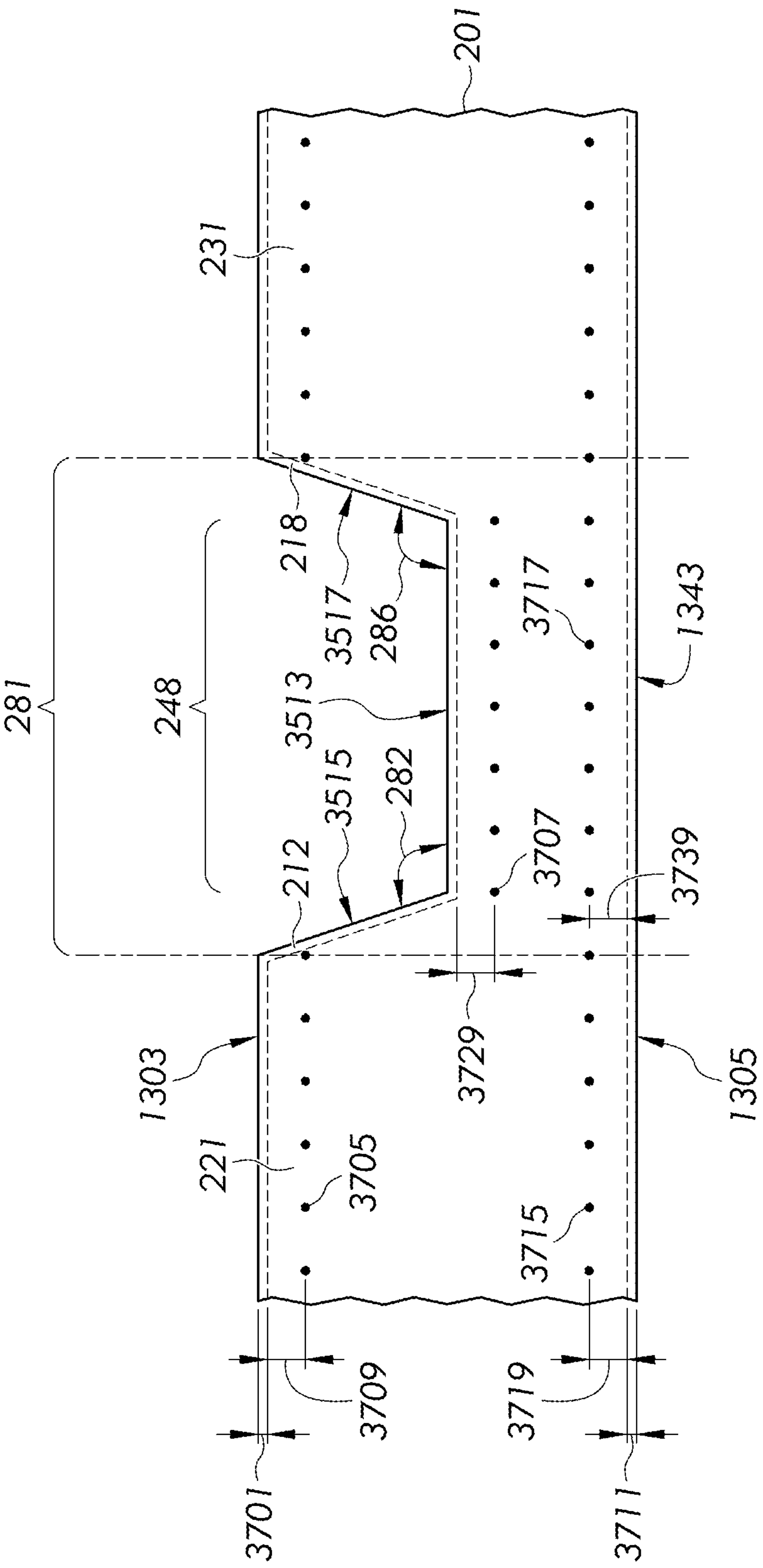
FIG. 37 is a cross-sectional view of a foldable apparatus after the step shown in FIG. 35 or 36 and/or before the step shown in FIG. 38.

After step 3401 or 3403 or 3413 (discussed below), as shown in FIGS. 36-37, methods can proceed to step 3405 comprising chemically strengthening the foldable substrate 201. In aspects, as shown, step 3405 can comprise contacting the foldable substrate 201 with a molten salt solution 3603 for a period of time. In further aspects, as shown, step 3405 can comprise immersing the foldable substrate 201 in a molten salt bath 3601 containing the molten salt solution 3603. The molten salt solution 3603 contains from greater than 0.5 wt % to less than about 1.5 wt % of a lithium salt. In aspects, the molten salt solution 3603 can comprise the lithium salt in an amount of about 0.5 wt % or more, about 0.6 wt % or more, about 0.75 wt % or more, about 0.9 wt % or more, about 1 wt % or more, about 1.5 wt % or less, about 1.3 wt % or less, about 1.25 wt % or less, about 1.2 wt % or less, or about 1.1 wt % or less, or about 1 wt % or less. In aspects, the molten salt solution 3603 can comprise the lithium salt from about 0.5 wt % to about 1.5 wt %, from about 0.6 wt % to about 1.3 wt %, from about 0.75 wt % to about 1.25 wt %, from about 0.8 wt % to about 1.2 wt %, from about 1 wt % to about 1.2 wt %, from about 1 wt % to about 1.1 wt %, or any range or subrange therebetween. In aspects, the molten salt solution 3603 can comprise potassium ions in an amount of about 70 wt % or more, about 80 wt % or more, about 85 wt % or more, about 90 wt % or more, about 95 wt % or more, about 97 wt % or more, about 98 wt % or more, about 99 wt % or more, about 99.5 wt % or more, about 99.25 wt % or less, about 99.2 wt % or less, about 99 wt % or less, about 98.8 or less, about 98.5 wt % or less, about 98.2 wt % or less, about 98 wt % or less, about 97.8 wt % or less, about 97.5 wt % or less, about 97.2 wt % or less, about 97 wt % or less, about 96.8 wt % or less, about 96.5 wt % or less, about 96.2 wt % or less, about 96 wt % or less, about 95 wt % or less. In aspects, the molten salt solution 3603 can comprise potassium ions from about 70 wt % to about 99.5 wt %, from about 80 wt % to about 99.25 wt %, from about 80 wt % to about 99.2 wt %, from about 85 wt % to about 99 wt %, from about 90 wt % to about 98.8 wt %, from about 90 wt % to about 98.5 wt %, from about 95 wt % to about 98.2 wt %, from about 95 wt % to about 98 wt %, from about 95 wt % to about 97.8 wt %, from about 97 wt % to about 97.5 wt %, from about 97 wt % to about 97.2 wt %, or any range or subrange therebetween. In aspects, the molten salt solution 3603 can optionally comprise a sodium salt in an amount from greater than 0 wt %, about 1 wt % or more, about 2 wt % or more, about 3 wt % or more, about 29.5 wt % or less, about 29.25 wt % or less, about 29.2 wt % or less, about 29 wt % or less, about 28.8 wt % or less, about 28.5 wt % or less, about 28.2 wt % or less, about 28 wt % or less, about 25 wt % or less, about 20 wt % or less, about 15 wt % or less, about 10 wt % or less, or about 5 wt % or less. In aspects, the molten salt solution 3603 can optionally comprise a sodium salt in an amount ranging from greater than 0 wt % to about 29.5 wt %, from greater than 0 wt % to about 29.25 wt %, from greater than 0 wt % to about 29.2 wt %, from about 1 wt % to about 29 wt %, from about 1 wt % to about 28.8 wt %, from about 2 wt % to about 28.5 wt %, from about 2 wt % to about 28.2 wt %, from about 3 wt % to about 28 wt %, from about 3 wt % to about 25 wt % from about 4 wt % to about 20 wt % or less, from about 4 wt % to about 15 wt %, from about 5 wt % to about 10 wt %, or any range or subrange therebetween. In aspects, the molten salt solution 3603 can optionally comprise silicic acid in an amount from greater than 0 wt % to about 0.1 wt % or more, about 0.2 wt % or more, about 0.3 wt % or more, about 0.4 wt % or more, about 1 wt % or less, about 0.9 wt % or less, about 0.8 wt % or less, about 0.7 wt % or less, or about 0.6 wt % or less. In aspects, the molten salt solution 3603 can optionally comprise silicic acid in an amount in a range from greater than 0 wt % to 1 wt %, from about 0.1 wt % to about 0.9 wt %, from about 0.2 wt % to about 0.8 wt %, from about 0.3 wt % to about 0.7 wt %, from about 0.4 wt % to about 0.6 wt %, or any range or subrange therebetween. An exemplary aspect of an anion for the lithium salt, potassium salt, and/or sodium salt is nitrate, although other anions (as discussed above for the first molten salt solution) can be used in other aspects. Alternatively, a total concentration of a potassium salt, cesium salt, francium salt, and rubidium salt can be within one or more of the ranges discussed above for the potassium salt.

In aspects, the molten salt solution 3603 can be maintained at a temperature of about 380° C. or more, about 390° C. about 400° C. or more, about 410° C. or more, about 430° C. or less, about 420° C. or less, about 410° C. or less, about 400° C. or less, or about 39° C. or less. In aspects, the molten salt solution 3603 can be maintained at a temperature in a range from about 380° C. to about 430° C., from about 390° C. to about 420° C., from about 400° C. to about 410° C., or any range or subrange therebetween. In aspects, the period of time can be about 3 minutes or more, about 4 minutes or more, about 5 minutes or more, about 6 minutes or more, about 8 minutes or more, about 10 minutes or more, about 15 minutes or more, about 30 minutes or more, about 2 hours or less, about 1.5 hours or less, about 1 hour or less, about 30 minutes or less, about 20 minutes or less, about 10 minutes or less, about 8 minutes or less, or about 6 minutes or less. In aspects, the period of time can range from about 3 minutes to about 2 hours, from about 3 minutes to about 1.5 hours, from about 4 minutes to about 1 hour, from about 4 minutes to about 30 minutes, from about 5 minutes to about 20 minutes, from about 5 minutes to about 20 minutes, from about 6 minutes to about 10 minutes, or any range or subrange therebetween. In aspects, to obtain a predetermined level of chemical strengthening (e.g., depth of compression and/or depth of layer), the period of time may be determined as a function of the central thickness (i.e., between the first central surface area 3513 or 213 and the existing second central surface area 1343). Without wishing to be bound by theory, the time required to achieve a predetermined level of chemical strengthening scales with the square of the thickness of the article being chemically strengthened. In further aspects, the period of time can be the central thickness (in μm) squared time a factor that is about 0.003 minutes per micrometers squared (min/μm$^2$) or more, about 0.004 min/μm$^2$ or more, about 0.005 min/μm$^2$ or more, about 0.007 min/μm$^2$ or less, about 0.006 min/μm$^2$ or less, or about 0.005 min/μm$^2$ or less. In further aspects, the period of time can be within, as a multiple of the central thickness (in μm) squared, in a range from about 0.003 min/μm$^2$ to about 0.007 min/μm$^2$, from about 0.004 min/μm$^2$ to about 0.006 min/μm$^2$, from about 0.005 min/μm$^2$ to about 0.006 min/μm$^2$, or any range or subrange therebetween.

At the end of step 3405, as shown in FIG. 37, the compressive stress region(s) extending from the existing first major surface 1303 to about the first depth of compression 3709 (as indicated by solid dots 3705). At the end of step 3405 or at the end of step 3407 (discussed below), the first compressive stress region in the first portion 221 can extend to the first depth of compression 3709 and/or the third compressive stress region in the second portion 231 can extend to the first depth of compression 3709. At the end of step 3405, the compressive stress region(s) extending from the existing second major surface 1305 can be about the second depth of compression 3719 (as indicated by solid dots 3715). At the end of step 3405 or at the end of step 3407 (discussed below), the second compressive stress region in the first portion 221 can extend to the second depth of compression 3719 and/or the fourth compressive stress region in the second portion 231 can extend to the second depth of compression 3719. At the end of step 3405, a first central compressive stress region (as indicated by solid dots 3707) in the central portion 281 extending from the first central surface area 3513 can extend to the first central depth of compression 3729, and/or a second central compressive stress region (as indicated by solid dots 3717) in the central portion 281 extending from the existing second central surface area 1343 can extend to the second central depth of compression 3739. In aspects, as shown, the first depth of compression 3709 can be substantially equal to the second depth of compression 3719, and/or the first central depth of compression 3729 can be substantially equal to the second central depth of compression 3739. In aspects, as shown, the first depth of compression 3709 can be substantially equal to the second depth of compression 3729, and/or the second depth of compression 3719 can be substantially equal to the second central depth of compression 3739. However, it is to be understood that the central depths of compression are limited based on the requirement that the net compressive and tensile stresses in the central portion sum to 0. Consequently, at low depth of compression and/or depth of layer (e.g., of potassium), the depths of compression may be substantially equal, but at higher depths of layer (e.g., of potassium), the depths of compression in the central portion will be less than the depths of compression in the first portion and second portion.

Figure 34:
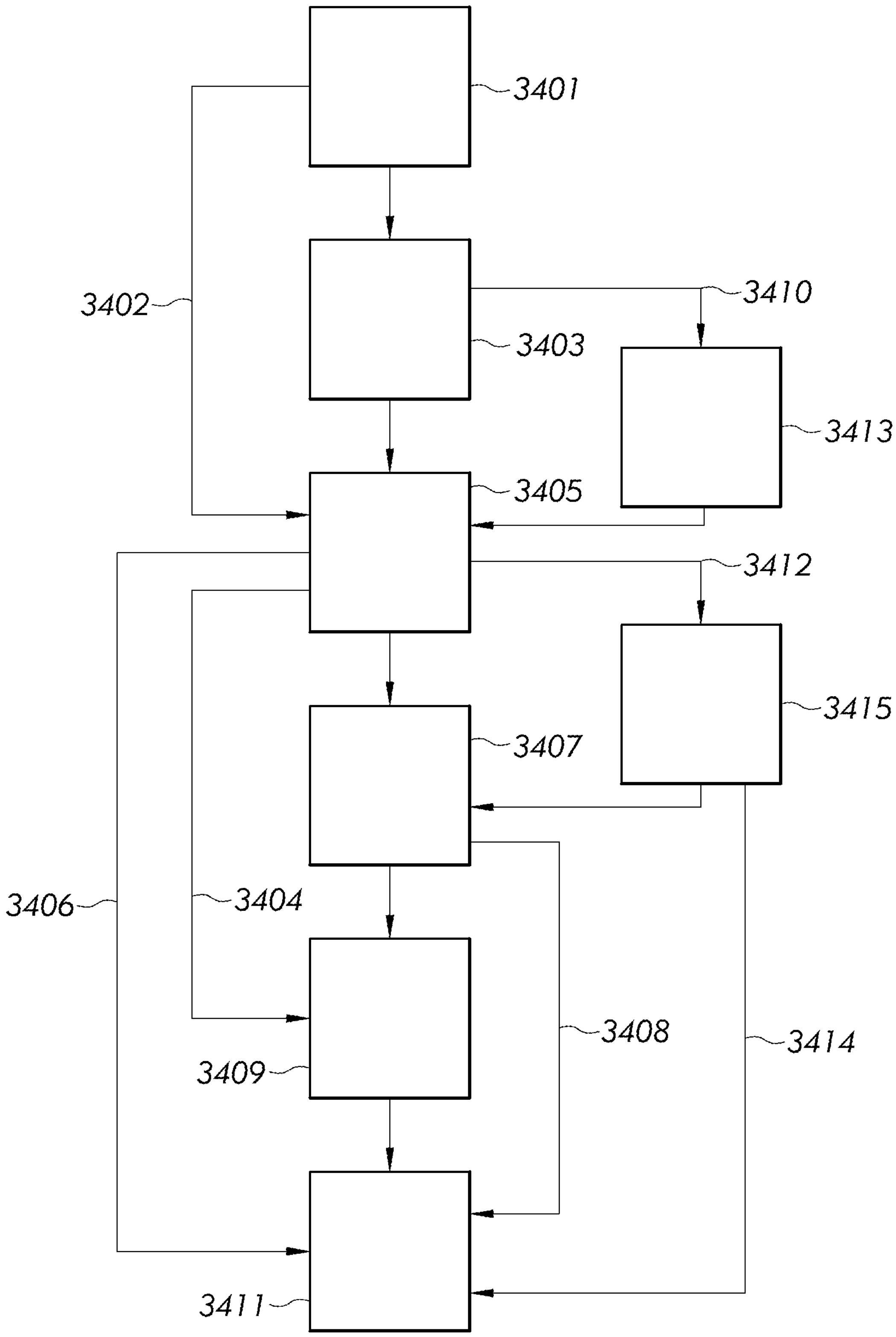
FIG. 34 is a flow chart illustrating example methods making foldable apparatus in accordance with aspects of the disclosure.

In aspects, as shown in the flow chart in FIG. 34, after step 3403 but before step 3405, methods can follow arrow 3410 to step 3413 comprising initially strengthening the foldable substrate, for example, by immersing the foldable substrate in an initial molten salt solution for an initial period of time at an initial temperature. The arrangement of step 3413 can look substantially the same and/or identical to that shown in FIG. 36 for step 3405. In further aspects, the initial temperature can be within or more of the ranges discussed above for the temperature of the molten salt solution in step 3405. The initial period of time can be within one or more of the ranges discussed above for the period of time in step 3405. Alternatively, the initial period of time can be about 1 minute or more, about 2 minutes or more, about 3 minutes or more, about 4 minutes or more, about 5 minutes or more, about 30 minutes or less, about 15 minutes or less, about 10 minutes or less, about 7 minutes or less, about 5 minutes or less, about 4 minutes or less, or about 3 minutes or less, for example, in a range from about 1 minute to about 30 minutes, from about 1 minute to about 15 minutes, from about 2 minutes to about 10 minutes, from about 2 minutes to about 7 minutes, from about 3 minutes to about 5 minutes, or any range or subrange therebetween. In aspects, the composition of the initial molten salt solution can be within one or more of the ranges for the composition of the molten salt solution discussed above in step 3405. In aspects, the amount of the lithium salt in the initial salt solution (in step 3413) can be less than the amount of lithium salt in the molten salt solution (in step 3405).

In aspects, as shown in the flow chart in FIG. 34, after step 3405, methods can follow arrow 3412 to step 3415 comprising further strengthening the foldable substrate, for example, by immersing the foldable substrate in an additional molten salt solution for an additional period of time at an additional temperature. The arrangement of step 3415 can look substantially the same and/or identical to that shown in FIG. 36 for step 3405. In further aspects, the additional temperature can be within one or more of the ranges discussed above for the temperature of the molten salt solution in step 3405. The additional period of time can be within one or more of the ranges discussed above for the initial period of time in step 3413. In aspects, the composition of the additional molten salt solution can be within one or more of the ranges for the composition of the molten salt solution discussed above in step 3405. In aspects, the amount of the lithium salt in the additional salt solution (in step 3415) can be greater than the amount of lithium salt in the molten salt solution (in step 3405).

As shown in FIG. 37, a first surface layer 3701 and/or a second surface layer 3711 can be removed in step 3407 (discussed below). In aspects, the first surface layer 3701 can be substantially uniform across the existing first major surface 1303, the first transition surface area 215 or 3515, the third transition surface area 217 or 3517, and/or the first central surface area 3513 or 213. In aspects, the second surface layer 3711 can be substantially uniform across the existing second major surface 1305 (e.g., including the existing second central surface area 1343). In further aspects, the second surface layer 3711 can be substantially equal to the first surface layer 3701. After step 3407, the foldable substrate can correspond to the foldable substrate shown in FIG. 4.

Figure 38:
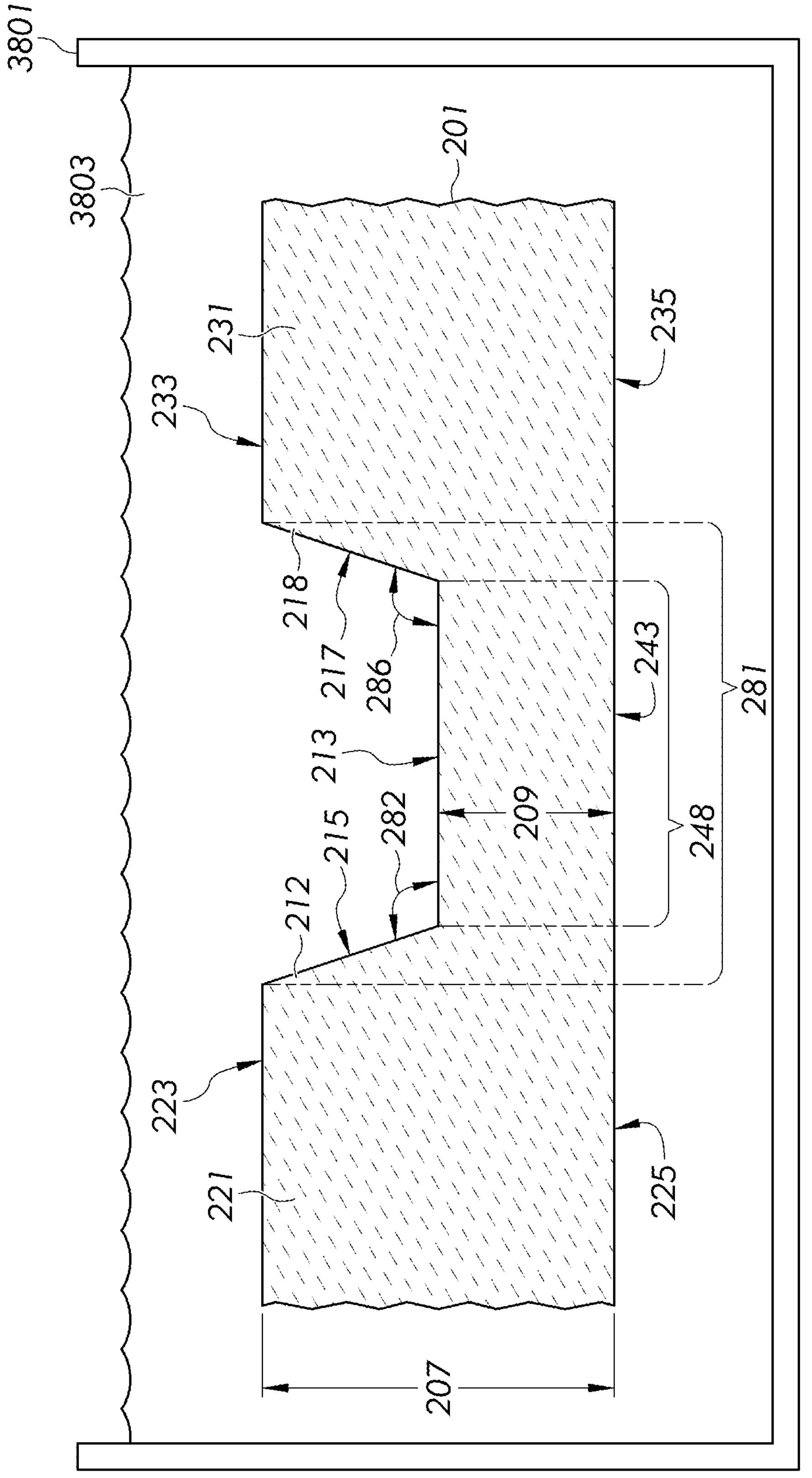
FIGS. 38-41 schematically illustrates a step in methods of making a foldable apparatus.

After step 3405 or 3415, as shown in FIG. 38, methods can proceed to step 3407 comprising etching a uniform thickness substantially uniformly from the foldable substrate 201. In aspects, as shown, step 3407 can comprise contacting the foldable substrate 201 with an etchant 3803. In further aspects, as shown, step 3407 can comprise immersing the foldable substrate 201 in an etchant bath 3801 containing the etchant 3803. In aspects, the etchant 1903 can be the same as the etchant 1603 or 1903 discussed above with reference to step 1205 or 1209. In aspects, the thickness removed substantially uniformly from the foldable substrate 201 in step 3407 can be within one or more of the ranges discussed above with reference to step 1209. Etching the substrate in step 3407 (after the further chemically strengthening the foldable substrate in step 3405, 3413, and/or 3415) can remove flaws near or at the surface of the foldable substrate 201, which can increase a strength (e.g., pen drop height) and/or flexibility (e.g., ability to achieve a particular parallel plate distance) of the foldable substrate 201. In aspects, as shown, at the end of step 3407, the etching can produce a foldable substrate with the substrate thickness 207 and the central thickness 209. In aspects, as shown, at the end of step 3407, the etching can form the first surface area 223, the second surface area 225, the third surface area 233, the fourth surface area 235, the first central surface area 213, and/or the second central surface area 243 with the properties discussed above with reference to FIG. 4.

Figures 39, 40, 41:
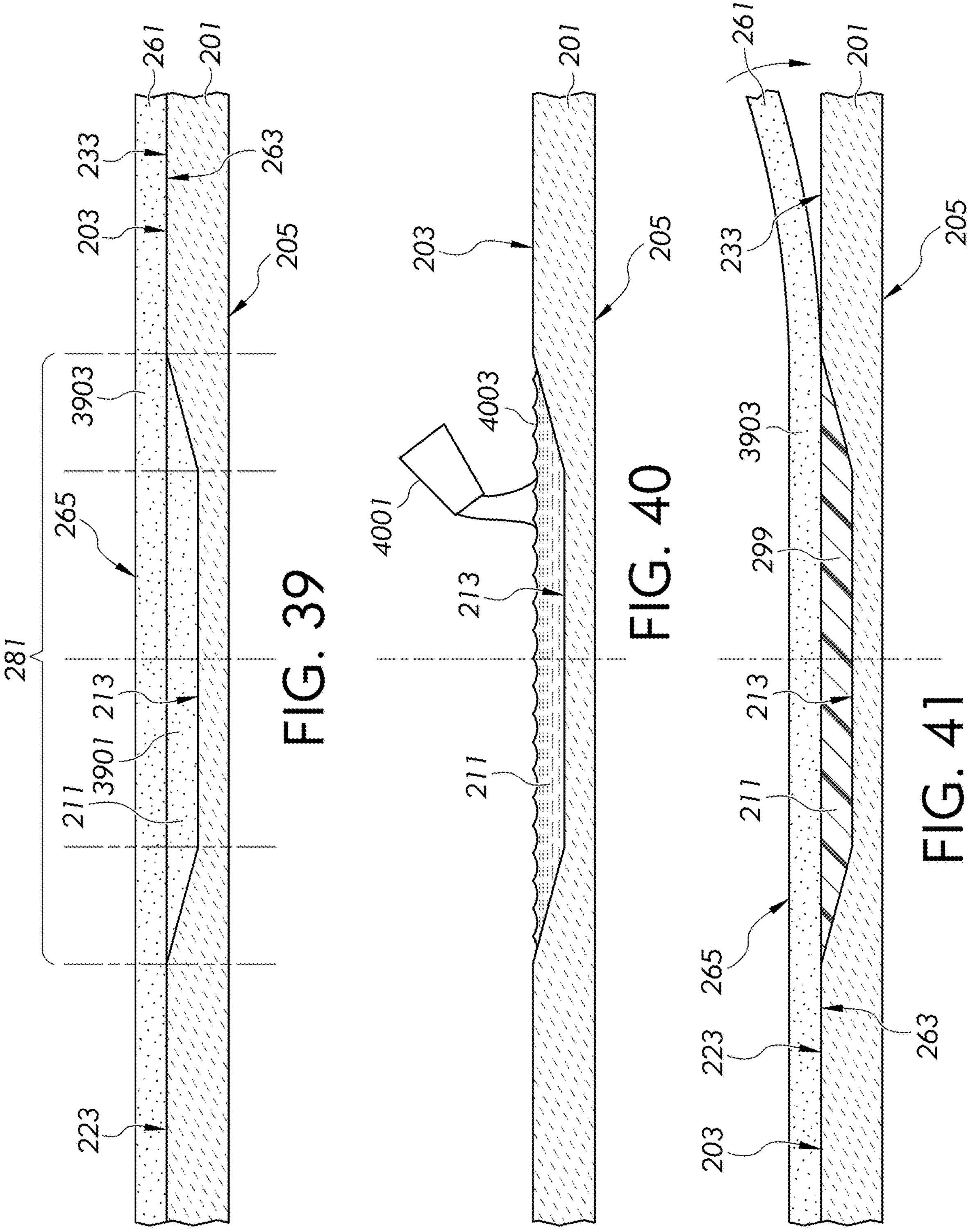
Figure 42:
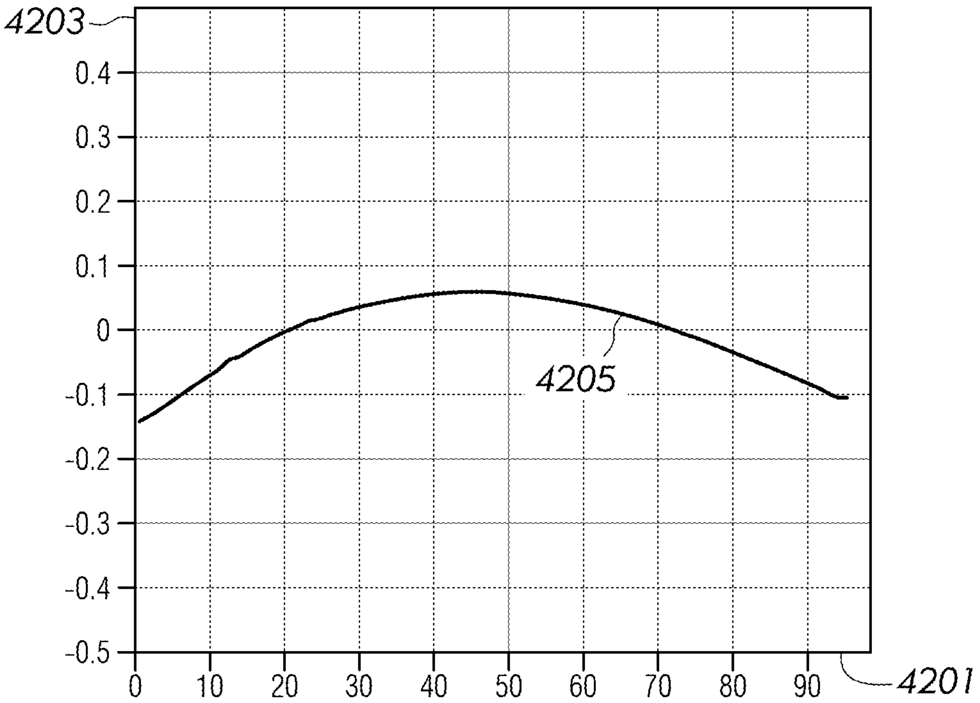
FIGS. 42-45 schematically illustrate surface profiles of foldable apparatus described in the Examples.
Figure 43:
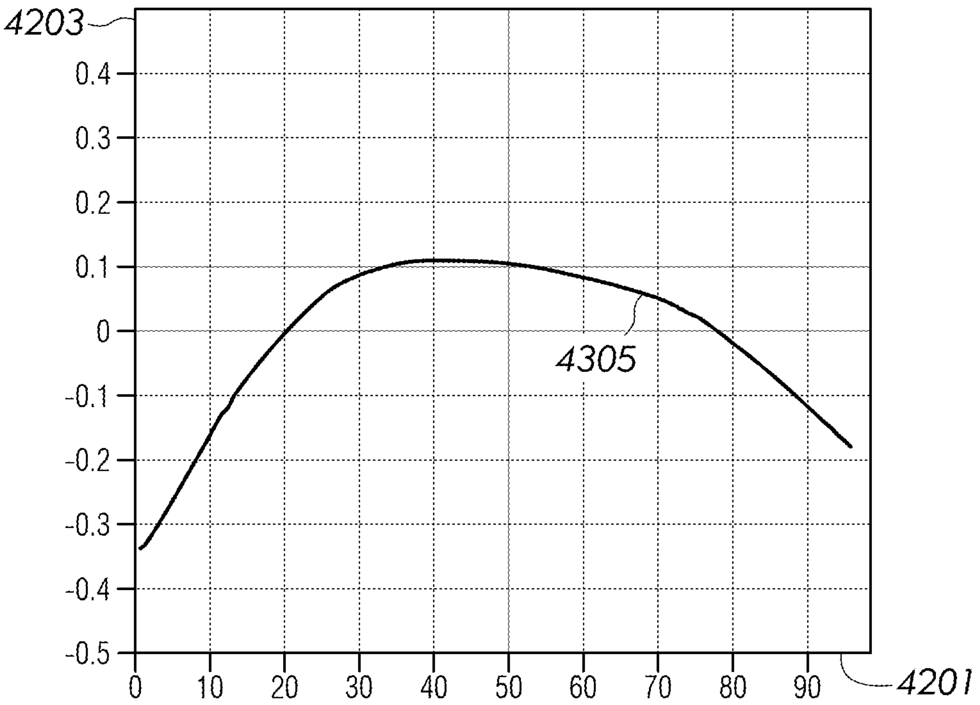
Figure 44:
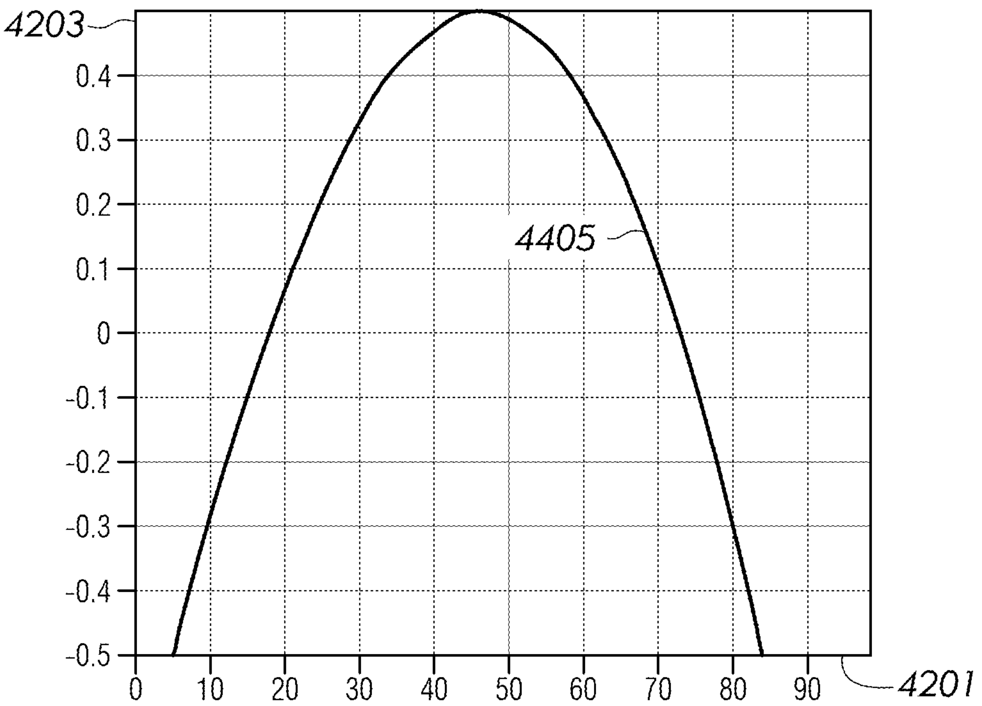
Figure 45:
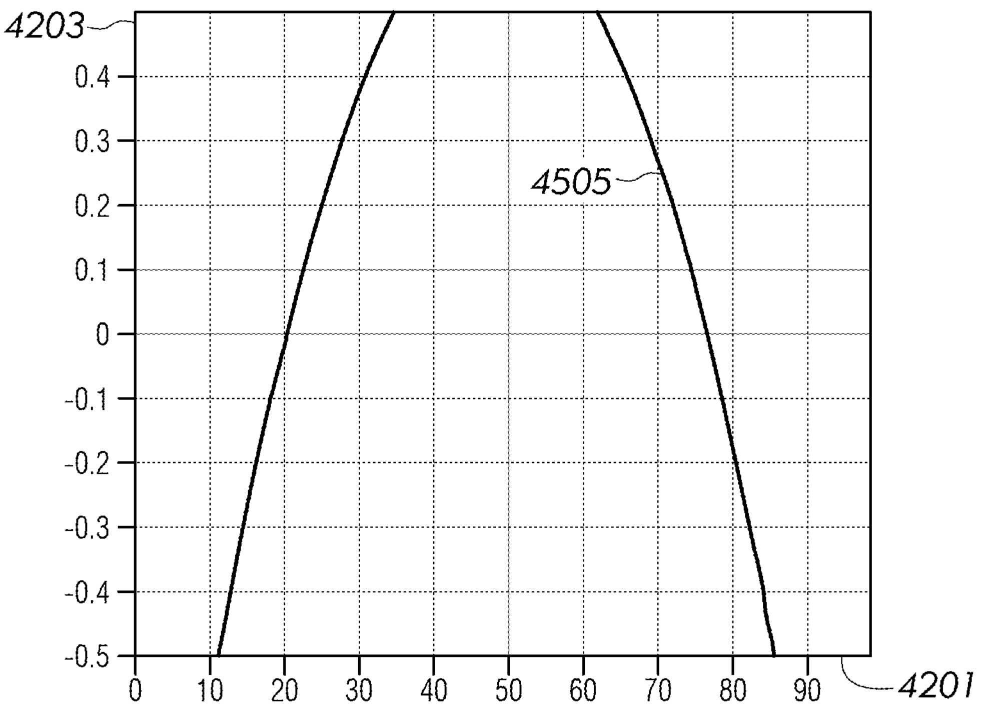

After step 3407, as shown in FIGS. 39-41, methods can proceed to step 3409 comprising assembling a foldable apparatus comprising the foldable substrate. In aspects, as shown in FIGS. 39-41, step 3407 can comprise assembling the foldable apparatus by disposing a polymer-based portion (e.g., second polymer-based portion 299) and/or an adhesive layer 261 (e.g., sheets 3901 and 3903) over the foldable substrate 201. In further aspects, as shown in FIG. 41, the second polymer-based portion 299 can be disposed in the first recess 211 and/or over the first central surface area 213. In further aspects, as shown in FIGS. 40-41, the second polymer-based portion can be disposed over the first central surface area 213, for example, by dispensing a first liquid 4003 from a container 4001 (e.g., conduit, flexible tube, micropipette, or syringe) into the first recess 211 that can be cured to form the second polymer-based portion 299. In even further aspects, the first liquid 4003 may comprise one or more of a monomer, an accelerator, a curing agent, an epoxy, and/or an acrylate. Curing the first liquid 4003 can comprise heating the first liquid 4003, irradiating the first liquid 4003 with ultraviolet (UV) radiation, and/or waiting a predetermined amount of time (e.g., from about 30 minutes to 24 hours, from about 1 hour to about 8 hours). In aspects, as shown in FIGS. 39 and 41 the adhesive layer 261 can be disposed over the first major surface 203 and/or the first central surface area 213 and/or contact the first major surface 203. In further aspects, as shown, the adhesive layer 261 can comprise one or more sheets 3901 and/or 3903 of an adhesive material (e.g., already cured sheet(s)) that can be disposed over the foldable substrate 201. In aspects, there can be an integral interface between the one or more sheets comprising the adhesive layer 261, which can reduce (e.g., avoid) optical diffraction and/or optical discontinuities as light travels between the sheets since the one or more sheets can include substantially the same index of refraction. In aspects, a release liner (see release liner 271 in FIG. 4) or a display device may be disposed on the adhesive layer 261 (e.g., second contact surface 265).

After step 3405, 3407, 3409, or 3415, methods can proceed to step 3411, where methods of making the foldable substrate and/or the foldable apparatus can be complete. In aspects, methods of making a foldable substrate and/or a foldable apparatus in accordance with aspects of the disclosure can proceed along steps 3401, 3403, 3405, 3407, 3409, and 3411 of the flow chart in FIG. 34 sequentially, as discussed above. In aspects, methods can follow arrow 3402 from step 3401 to step 3405, for example, if the foldable substrate 1301 already comprises the first recess at the end of step 3401. In aspects, methods can follow arrow 3404 from step 3405 to step 3409, for example, if the foldable substrate 201 is not to be etched in step 3407. In aspects, methods can follow arrow 3406 from step 3405 to step 3411, for example, if methods are complete at the end of step 3405. In aspects, methods can follow arrow 3408 from step 3407 to step 3411, for example, if methods are complete at the end of step 3407. In aspects, methods can follow arrow 3410 from step 3403 to step 3413, for example, if there is to be more than one chemical strengthening step (e.g., steps 3413 and 3405). In aspects, methods can follow arrow 3412 from step 3405 to step 3415, for example, if there is to be more than one chemical strengthening step (e.g., steps 3405 and 3415). In aspects, methods can follow arrow 3414 from step 3415 to step 3411, for example, if methods are complete at the end of step 3415. Any of the above options may be combined to make a foldable apparatus in accordance with the embodiments of the disclosure.

Examples

Various aspects will be further clarified by the following examples. Examples A-Z and YY-ZZ and Comparative Examples AA-DD comprise a glass-based substrate (Composition 1 having a nominal composition in mol % of: 68.95 $SiO_2$; 10.3 $Al_2O_3$; 15.2 $Na_2O$; 5.36 MgO; and 0.17 $SnO_2$) with dimensions of 100 mm by 70 mm in a direction perpendicular to the substrate thickness.

Examples A-F were processed in accordance with the methods discussed above with reference to the flow chart in FIG. 12 to form a foldable substrate resembling the foldable substrate 201 shown in FIG. 3. For Examples A-F and Comparative Example AA comprised foldable substrates with a uniform substrate thickness of about 100 μm that was chemically strengthened in a first molten salt solution comprising 99.5 wt % $KNO_3$ and 0.5 wt % silicic acid maintained at 420° C. for 35 minutes. Then, a central portion with a width of 14 mm (extending for the entire 70 mm width) was etched equally from the first major surface and the second major surface to obtain a central thickness of 30 μm followed by further chemically strengthening the foldable substrate with a second molten salt solution maintained at 410° C. for 5 minutes. The amount of lithium salt ($LiNO_3$) is presented in Table 1 with the second molten salt solution further comprising 0.5 wt % silicic acid with the balance as $KNO_3$. The "--" entries of Examples E-F mean that the warp was not measured.

Examples G-Z and YY-ZZ were processed in accordance with the methods discussed above with reference to the flow chart in FIG. 34 to form a foldable substrate resembling the foldable substrate 201 shown in FIG. 4. For Examples G-Z and YY-ZZ and Comparative Examples BB-DD comprised foldable substrates with a uniform substrate thickness of about 100 μm that was etched to form a single recess with a depth of 32 μm (i.e., 68 μm central thickness). and a central width stated in Table 3. Then, the foldable substrate was chemically strengthened with a molten salt solution comprising the amount of lithium salt (as $LiNO_3$) stated in Tables 3-5 with the balance as potassium salt (as $KNO_3$) and then 0.5 wt % silicic acid added by superaddition. The foldable substrate was immersed in the molten salt solution maintained at the temperature stated in Table 3 for the period of time stated in Table 3. The "**" entries of Example ZZ mean that reliable values could not be obtained due to large variations in the samples Example ZZ. The total thickness variation (TTV) was measured for Examples S-Y using the method described above (i.e., measuring the surface profiles for the first central surface area and the second central surface area using SpecGAGE3D and then the minimum distance and maximum distance between these surface profiles in the thickness direction are calculated with the absolute value of that difference being reported as TTV. TTV was not measured for Examples G-R, Z, and YY-ZZ and Comparative Examples BB-DD.

TABLE 1

Properties of Examples A-F and Comparative Example AA

| Example | Li salt (wt %) | Warp (μm) |
|---|---|---|
| AA | 0.00 | Buckled |
| A | 0.02 | 340 |
| B | 0.04 | 198 |
| C | 0.06 | 530 |
| D | 0.08 | 685 |
| E | 0.05 | — |
| F | 0.50 | — |

FIGS. 23-27 depict surface profiles of the first central surface area of Comparative Example AA and Examples A-D, respectively, where the surface profile of the midline (i.e., midway between the first portion and the second portion) is measured using the SpecGAGE3D (available from Irsa Vision) deflectometer, as described above. In FIGS. 23-27, the horizontal axis 2301 is a distance along the midline in mm, and the vertical axis 2303 is a measured deflection in mm. Surface profiles 2305, 2405, 2505, 2605, and 2705 correspond to the as-measured surface profiles extracted from the SpecGAGE3D corresponding to the midline midway between the first portion and the second portion.

Comparative Example AA was buckled with an oscillating surface profile (surface profile 2305) with multiple maxima and minima in the surface profile. In contrast, the surface profile (surface profiles 2405, 2505, 2605, and 2705) of Examples A-D have a single extremum. The warp was taken as the largest difference in height (vertical axis) of the surface profile along width along the midline excluding the measurements within 1 mm of the edge of the profile. As shown in Table 1, Examples B-C exhibited the lowest warp of the non-buckled examples (e.g., about 600 μm or less). Relative to Examples B-C, Examples A and D exhibited increased saddle warp. Consequently, including small amounts of lithium salt in the second molten salt bath can unexpectedly reduce the incidence of buckling, for example, by decreasing an amount of chemical strengthening-induced strain on the central portion.

Figure 28:
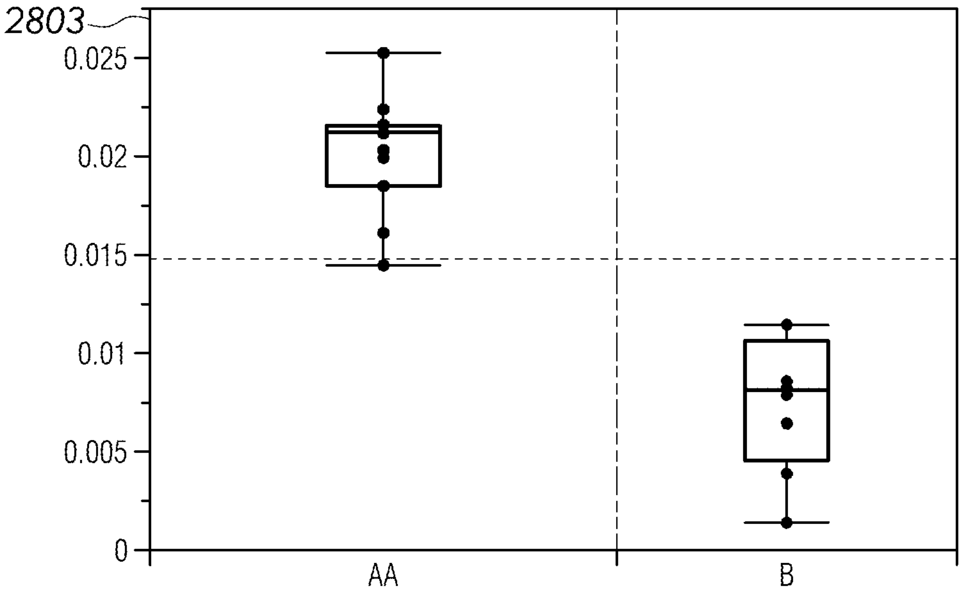
FIG. 28 shows average gradients for foldable apparatus described in the Examples.

FIG. 28 represents the distribution of average gradients between extrema as a box-and-whisker plot for Comparative Example AA and Example B. The vertical axis 2803 is the average gradient in mm/mm. As discussed above, the gradient measurements that are averaged to calculate the average gradient are taken between adjacent extrema (e.g., a local maximum and adjacent local minimum), and all pairs of adjacent extrema are used in calculating the average gradient. As shown, buckled Comparative Example AA comprised a median value of the average gradient of about 0.021 mm/mm with an inner quartile range from about 0.018 mm/mm to about 0.022 mm/mm and all samples having an average gradient of more than 0.014 mm/mm. In contrast, non-buckled Example B comprised a median value of the average gradient of about 0.076 mm/mm with an inner quartile range from about 0.004 mm/mm to about 0.01 and all samples having an average gradient of less than 0.12 mm/mm. Consequently, the distributions of the average gradient for Comparative Example AA and Example B do not overlap nor do their inner quartile ranges. As such, the average gradient can be used to distinguish between buckled and non-buckled samples. Providing an average gradient of about 0.015 mm/mm or less can correspond to a non-buckled central portion and decreased visibility of the central portion, for example, by reducing differences in reflectivity between portions of the central portion from a predetermined viewing angle.

Figure 29:
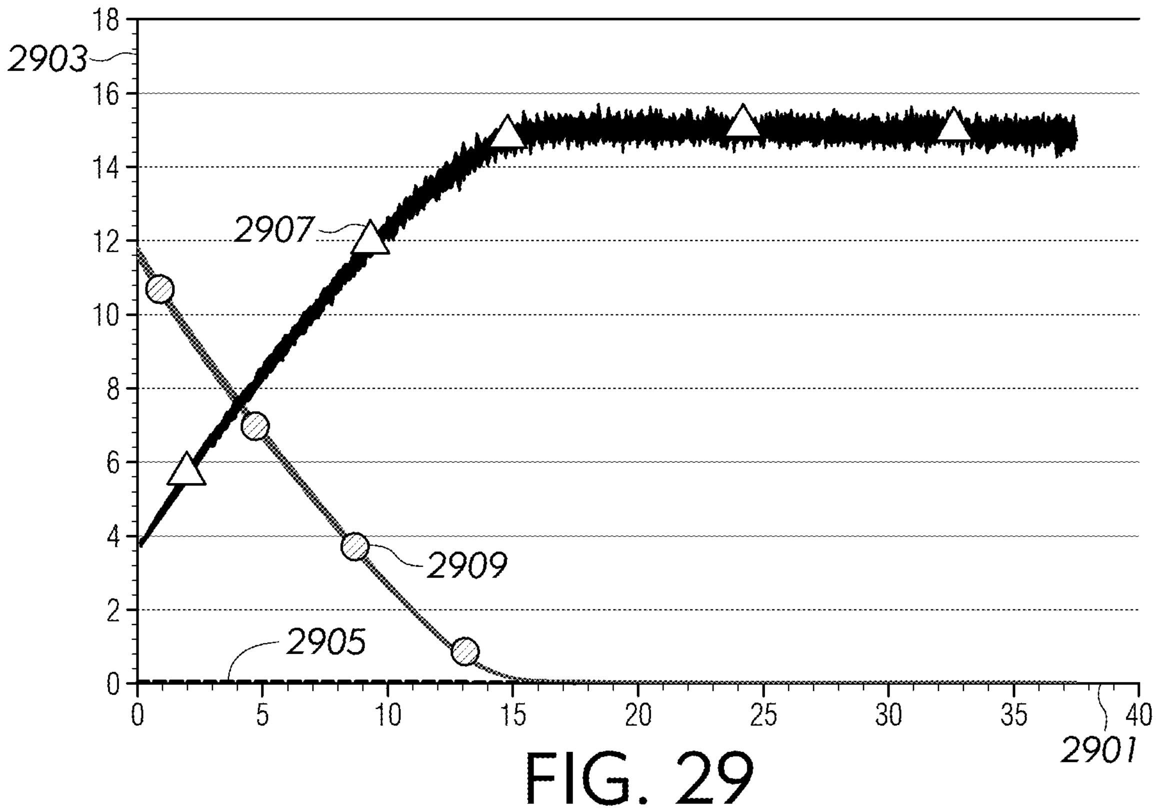
FIGS. 29-33 schematically illustrates concentration profiles from glow discharge optical emission spectroscopy (GDOES) of foldable apparatus.
Figure 30:
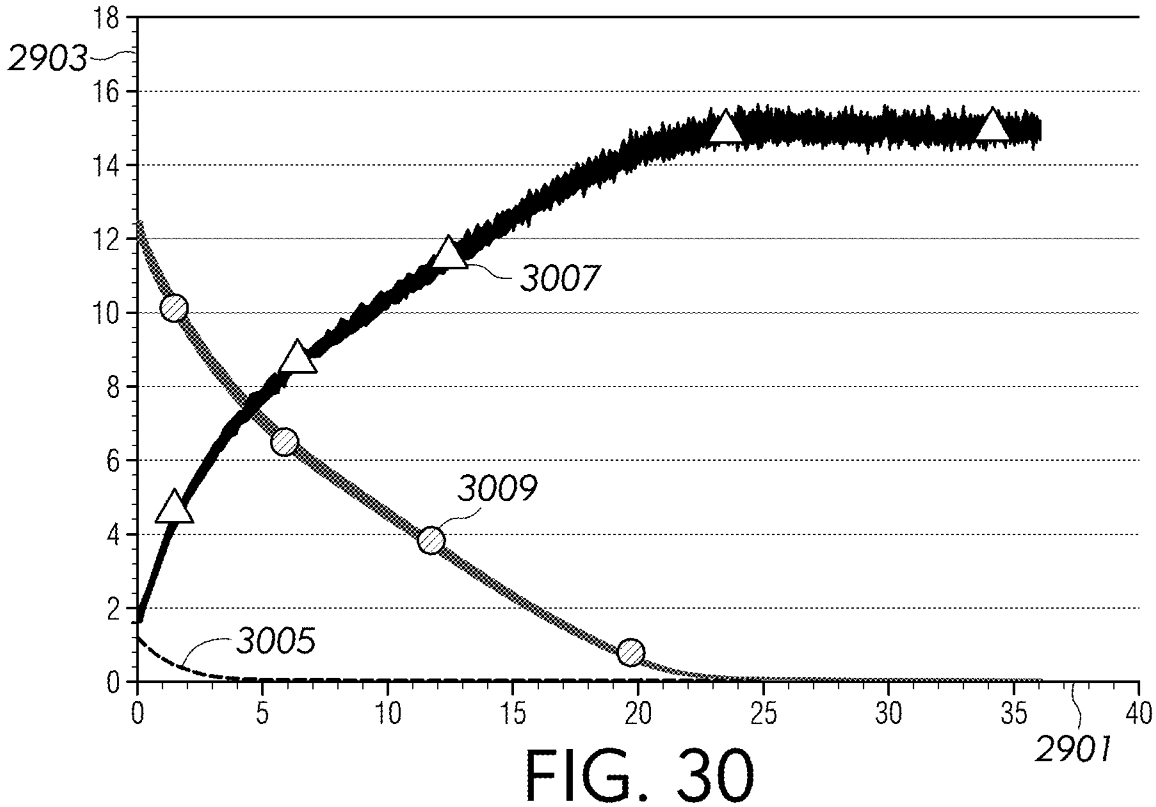
Figure 31:
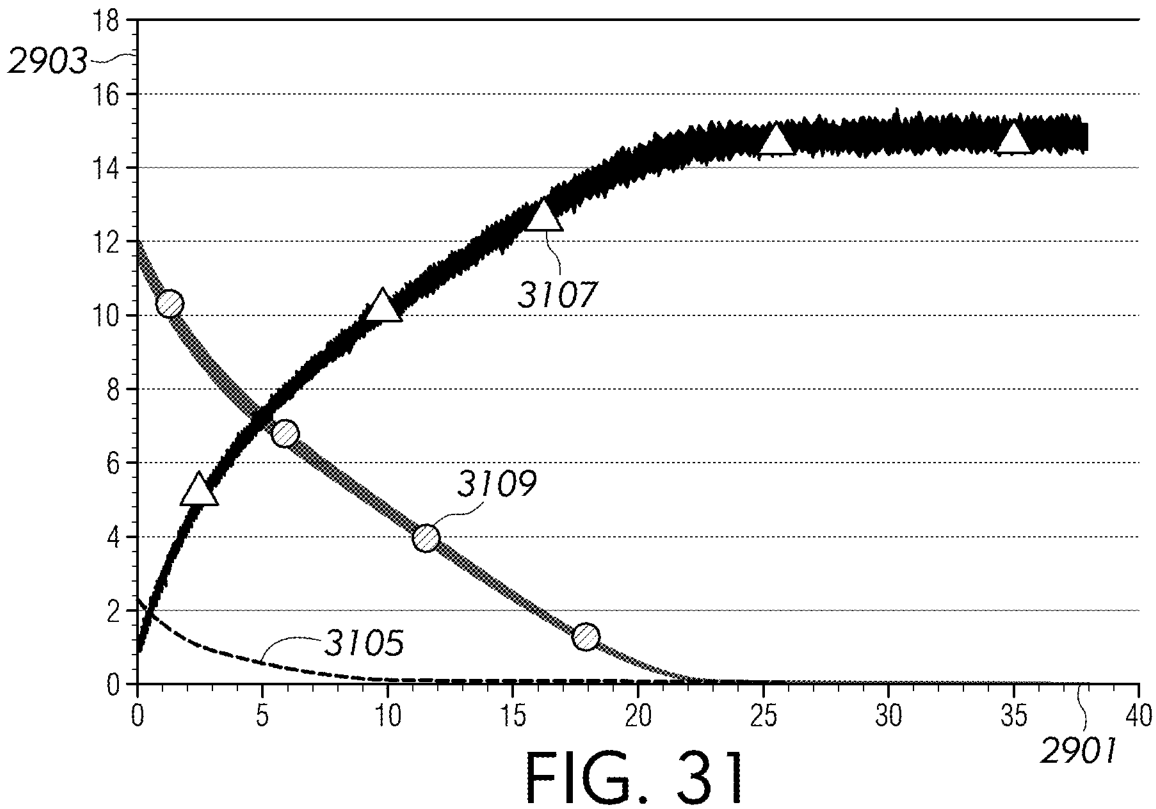

FIGS. 29-31 correspond to concentration profiles of alkali metal oxides in Comparative Example AA and Examples E-F, respectively, as measured using GDOES in the first portion (i.e., comprising the substrate thickness) of the foldable substrate. In FIGS. 29-31, the horizontal axis 2901 corresponds to a distance from the first major surface in μm, and the vertical axis 2903 is the concentration of the alkali metal oxide in mol %. Curves 2905, 3005, and 3105 correspond to the concentration of $Li_2O$. Curves 2907, 3007, and 3107 correspond to the concentration of $Na_2O$. Curves 2909, 3009, and 3109 correspond to the concentration of $K_2O$. Features of the concentration profiles for Comparative Example AA and Examples B and E-F are presented in Table 2.

TABLE 2

Properties of Examples B and E-F and Comparative Example AA

| Example | AA | B | E | F |
|---|---|---|---|---|
| Li salt (wt %) | 0.00 | 0.04 | 0.05 | 0.50 |
| Surface $Li_2O$ (mol %) | 0 | 0.8 | 1.2 | 2.4 |
| Surface $Na_2O$ (mol %) | 3.8 | 2.8 | 1.6 | 0.8 |
| Surface $K_2O$ (mol %) | 11.8 | 10.8 | 12.4 | 12.0 |
| Depth of $Li_2O$ (μm) | 0 | 4 | 4 | 10 |
| Depth of $K_2O$ (μm) | 15 | 16 | 23 | 22 |
| Surface K/Na | 3.11 | 3.86 | 7.75 | 15 |
| Surface K/Li | — | 13.5 | 10.3 | 5 |
| Total K/Li | — | 126 | 178 | 36 |

Curve 2905 shows no $Li_2O$ at the surface since no lithium salt was used in either the first molten salt bath or the second molten salt bath for Example AA. Curve 3005 shows a surface concentration of $Li_2O$ of 1.2 mol % (elevated 1.2 mol % relative to a concentration of $Li_2O$ at the midpoint) that is elevated for about 4 μm. Curve 3105 shows a higher surface concentration of $Li_2O$ (2.4 mol %) than curve 3005, which is consistent with the increased amount of lithium salt in the second molten salt solution for Example F relative to Example E. Since Example D demonstrated increased saddle warp, it is believed that the increased $Li_2O$ in Example F (from the increased lithium salt in the second salt bath) relative to Examples D-E would not provide the unexpectedly beneficial effects observed for Examples B-C (since the second molten salt bath had more lithium salt for Example F than Example D, which in turn had more lithium than Examples B-C, and Example D exhibited more warp (e.g., saddle warp) than Examples B-C; in contrast, the second molten salt bath for Example E had an amount of lithium salt between that of Examples B-C, which leads to the expectation that Example E will exhibit similar warp to Examples B-C). However, it is believed that Example E would provide the unexpectedly beneficial effects observed for Examples B-C given the similar amount of lithium salt used in the second molten salt bath. Consequently, a difference between the surface concentration of $Li_2O$ and the concentration of $Li_2O$ at the midpoint of less than 2.4 mol % (e.g., about 2 mol % or less) and/or a surface concentration of $Li_2O$ of less than 2.4 mol % (e.g., about 2 mol % or less) may reduce an incidence of buckling and/or saddle warp, for example, by decreasing an amount of chemical strengthening-induced strain on the central portion.

Curves 2907, 3007, and 3107 show a relatively depleted concentration of $Na_2O$ at the surface relative to the concentration of $Na_2O$ at the midpoint. Specifically, the surface concentration of $Na_2O$ decreases as the concentration of lithium salt in the second molten salt bath (and the surface concentration of $Li_2O$) increases, which suggests that a portion of the sodium near the surface is exchanged for lithium from the second molten salt bath. As discussed above, this reverse ion exchange can decrease an amount of chemical strengthening-induced strain on the central portion.

Curves 2909, 3009, and 3109 show surface concentrations of $K_2O$ that are elevated relative to the concentration of $K_2O$ at the midpoint, for example, by from about 11.8 mol % to about 12.4 mol %, which corresponds to a surface concentration of $K_2O$ from about 11.8 mol % to about 12.4 mol %. Relative to Comparative Example AA and Example F, Example E unexpectedly has a greater surface concentration of $K_2O$ and the concentration of $K_2O$ is elevated to a greater depth. As shown in Table 2, the concentration of $K_2O$ at the surface is greater than the concentration of $Na_2O$ at the surface. For example, a ratio of $K_2O$ to $Na_2O$ at the surface is about 3.9 in Example B and is about 7.8 in Example E. Likewise, the concentration of $K_2O$ at the surface is greater than the concentration of $Li_2O$ at the surface. For example, a ratio of $K_2O$ to $Li_2O$ at the surface is about 13.5 in Example B and about 10.3 in Example E.

Figure 32:
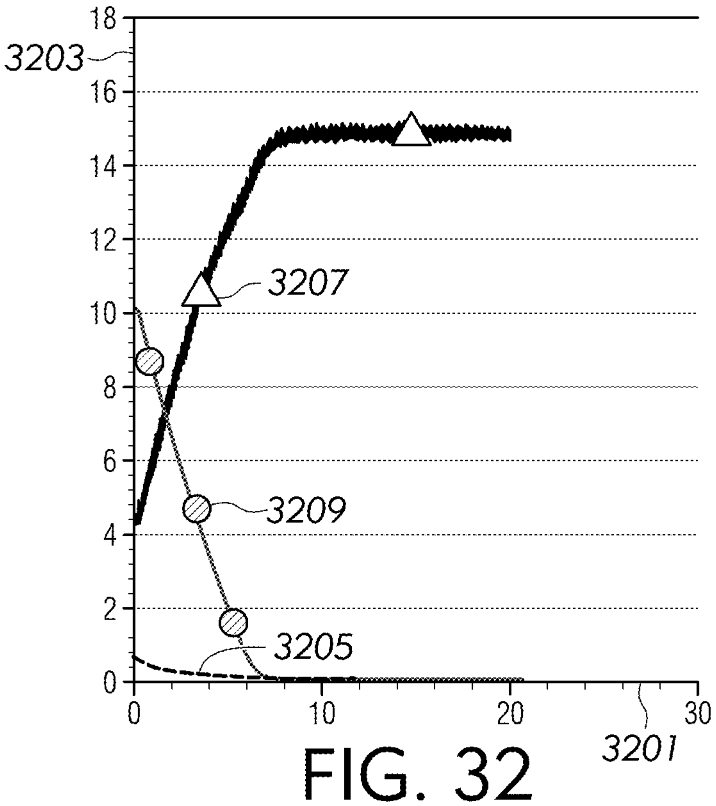
Figure 33:
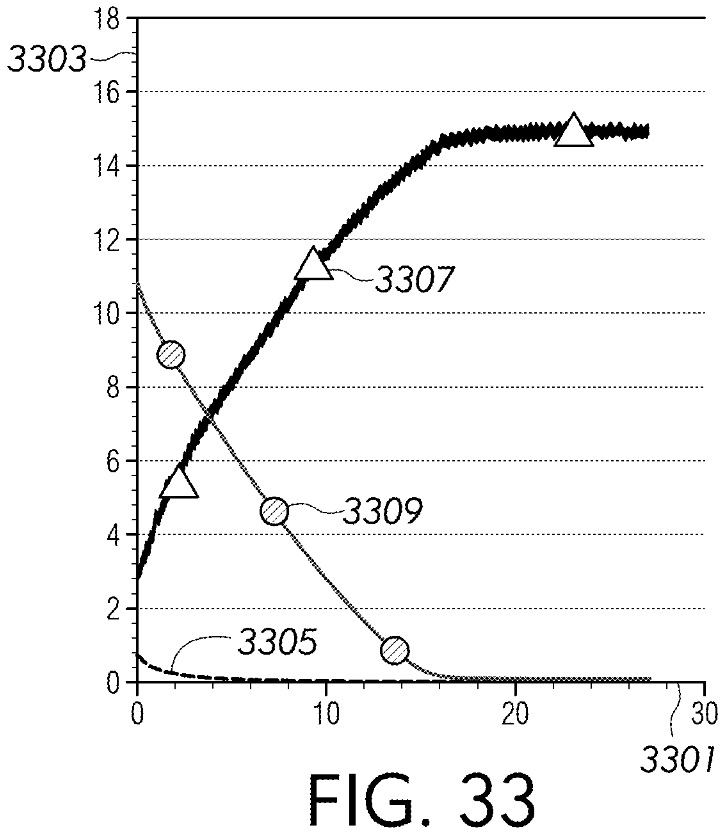

FIGS. 32-33 correspond to concentration profiles of alkali metal oxides in Example B. Specifically, FIG. 32 corresponds to the concentration profiles of alkali metal oxides measured in the central portion (i.e., comprising the central thickness) using GDOES, where the horizontal axis 3201 is a distance from the first central surface area in μm and the vertical axis 3203 is the concentration in mol %. FIG. 33 corresponds to the concentration profiles of alkali metal oxides measured in the first portion (i.e., comprising the central thickness) using GDOES, where the horizontal axis 3301 is a distance from the first major surface in μm and the vertical axis 3303 is the concentration in mol %. The properties of the alkali metal oxide concentration profiles shown in FIG. 33 are presented in Table 2.

The surface concentration of $Li_2O$ and the depth that the concentration of $Li_2O$ is elevated in the central portion (curve 3205) is about the same as the corresponding features in the first portion (curve 3305). The surface concentration of $Na_2O$ in the central portion (curve 3207) is higher than the concentration of $Na_2O$ in the first portion (curve 3307). This is consistent with explanation in the previous paragraph since the concentration of $Na_2O$ at the first central surface area before treatment with the second molten salt solution would not be noticeably depleted relative to the concentration of $Na_2O$ at the central midpoint unlike for the first portion, where the surface concentration of $Na_2O$ would already be depleted relative to the concentration at the midpoint as a result of ion exchange with the first molten salt solution.

The surface concentration of $K_2O$ in the central portion (curve 3209) is lower and elevated for a shorter distance relative to the corresponding features in the first portion (curve 3309). Again, this can be explained by the concentration of the alkali metal ions in the central portion being substantially uniform before treatment with the second molten salt bath while as the concentration of $K_2O$ was already elevated at the first major surface as a result of ion exchange with the first molten salt solution. For example B, the depth that the concentration of $K_2O$ is elevated in the first portion, as a percentage of the substrate thickness, is about 16% while the depth that the concentration of $K_2O$ is elevated in the central portion, as a percentage of the central thickness, is about 20%. As discussed above, the relative properties of the ion concentration and/or compressive stress regions in the first portion compared to the central portion can be adjusted, for example, by changing the conditions (e.g., temperature, time) of the first molten salt solution treatment and/or the second molten salt solution treatment.

As shown in Table 2, a ratio of the surface concentration of $K_2O$ to the surface concentration of $Na_2O$ for Examples B and E is from 3.2 to 10 (e.g., from 3.3 to 9, from 3.5 to 8). A ratio of the surface concentration of $K_2O$ to the surface concentration of $Li_2O$ for Examples B and E is from 8 to 20 (e.g., from 9 to 15). The total amount of $K_2O$ and the total amount of $Li_2O$ in the first portion is calculated by integrating the corresponding curve from GDOES over half of the thickness. A ratio of the total amount of $K_2O$ to the total amount of $Li_2O$ for Examples B and E is from 100 to 300 (e.g., from 120 to 200).

The properties of Examples F-Z and YY-ZZ and Comparative Examples BB-DD are reported in Table 3. As discussed above, the Examples and Comparative Examples in Table 3 and FIGS. 42-45 have a single recess (resembling the foldable substrate shown in FIG. 4) unlike the Examples discussed above in Tables 1-2. Specifically, Examples F-Z and YY-ZZ and Comparative Examples BB-DD comprised a substrate thickness of 100 μm and a 32 μm deep recess (i.e., 68 μm central thickness). The conditions for the single chemical strengthening step and the central width of the foldable substrate are reported in Table 3. The resulting warp, TTV, and average gradient are reported in Table 3. Comparative Examples BB-DD have a warp of 0.5 mm or more and are considered buckled with an average gradient greater than 0.3 mm/mm. Generally, the warp and gradient decreased as the lithium salt concentration was increased from 0 wt % to at least 0.8 wt % (or 1 wt %). Examples H-K were considered buckled with an average gradient greater than 0.3 mm/mm and had a warp greater than 0.4 mm. A substantial decrease in the average gradient is observed in Example Q-W (for 0.5 wt % to 1 wt % Li salt) with values of 0.11 mm/mm or less compared to Examples M-Q (for 0.3 wt % Li salt or 0.5 wt % Li salt at 395° C.) with an average gradient of about 60% or more or even 100% or more (e.g., 0.18 mm/mm or more or about 0.2 m/mm or more) than the higher wt % Li salt Examples. At the same time, higher Li salt amounts in Examples Y-Z and YY-ZZ (2 wt % to 5 wt % Li salt) are considered buckled with an average gradient of greater than 0.3 mm/mm and with warp greater than 2 mm. Example X (1.5 wt % Li salt) represents a transition from the lower gradient and lower warp of Examples Q-W and the buckled Examples Y-Z and YY-ZZ with Example X having an average gradient less than 0.3 mm/mm. Consequently, unexpected benefits of non-buckled samples and low warp can be obtained for Examples P-X or P-W, corresponding to a Li salt wt % from 0.5 wt % to 1.5 wt % or from 0.5 wt % to 1 wt % (e.g., see the ranges discussed above for the wt % of Li salt in step 3405).

TABLE 3

Properties of Examples F-Z and YY-ZZ and Comparative Examples BB-DD

| Example | Li salt (wt %) | Temp (° C.) | Time (min) | Width (mm) | Warp (mm) | TTV (μm) | Average Gradient (mm/mm) |
|---|---|---|---|---|---|---|---|
| BB | 0 | 395 | 8.67 | 14 | 0.55 | — | 0.42 |
| CC | 0 | 410 | 5 | 14 | 0.5 | — | 0.39 |
| DD | 0 | 410 | 5 | 20 | 0.8 | — | 0.38 |
| G | 0.05 | 395 | 8.67 | 14 | 0.3 | — | 0.26 |
| H | 0.05 | 410 | 5 | 14 | 0.45 | — | 0.35 |
| I | 0.05 | 410 | 5 | 20 | 0.75 | — | 0.33 |
| J | 0.1 | 395 | 8.67 | 14 | 0.6 | — | 0.34 |
| K | 0.1 | 410 | 5 | 14 | 0.5 | — | 0.33 |
| L | 0.1 | 410 | 5 | 20 | 0.55 | — | 0.21 |
| M | 0.3 | 395 | 8.67 | 14 | 0.45 | — | 0.22 |
| N | 0.3 | 410 | 5 | 14 | 0.4 | — | 0.2 |
| O | 0.3 | 410 | 5 | 20 | 0.55 | — | 0.18 |
| P | 0.5 | 395 | 8.67 | 14 | 0.6 | — | 0.23 |
| Q | 0.5 | 410 | 5 | 14 | 0.3 | — | 0.11 |
| R | 0.5 | 410 | 5 | 20 | 0.35 | — | 0.09 |
| S | 0.8 | 410 | 8.67 | 14 | 0.31 | 3.9 | 0.05 |
| T | 1 | 395 | 8.67 | 14 | 0.36 | 3.5 | 0.07 |
| U | 1 | 410 | 5 | 14 | 0.29 | 5.5 | 0.03 |
| V | 1 | 410 | 5 | 20 | 0.25 | 3.9 | 0.05 |
| W | 1 | 410 | 5 | 14 | 0.60 | 3.4 | 0.08 |
| X | 1.5 | 410 | 5 | 14 | 1.7 | 3.6 | 0.29 |
| Y | 2 | 410 | 5 | 14 | 2.25 | 3.4 | 0.39 |
| Z | 5 | 395 | 8.67 | 14 | 2.4 | — | 0.68 |
| YY | 5 | 410 | 5 | 14 | 2.5 | — | 0.70 |
| ZZ | 5 | 410 | 5 | 20 | ** | — | ** |

FIGS. 42-45 depict surface profiles of the first central surface area of Examples S, W, X, and Y, respectively, where the surface profile of the midline (i.e., midway between the first portion and the second portion) is measured using the SpecGAGE3D (available from Irsa Vision) deflectometer, as described above. In FIGS. 42-45, the horizontal axis 4201 is a distance along the midline in mm, and the vertical axis 4203 is a measured deflection in mm. Surface profiles 4205, 4305, 4405, and 4505 correspond to the as-measured surface profiles extracted from the SpecGAGE3D corresponding to the midline midway between the first portion and the second portion.

Surface profiles 4205 and 4305 (Examples S and W treated with 0.8 wt % and 1 wt % Li salt, respectively) comprise low to moderate warp with warp less than 1 mm (e.g., 0.6 mm or less). Surface profile 4405 (Example X treated with 1.5 wt % Li salt) has increased warp (1.7 mm). Consequently, it is expected that warp less than 1 mm can be achieved using an Li salt concentration less than 1.5 wt % (e.g., about 1.2 wt % or less). Surface profile 4505 (Examples Y treated with 2 wt %) exhibits extreme saddle warp greater than 2 mm, which does not even fit on the same scale as the other curves.

The compressive stress and depth of layer (as measured using the FSM-6000) is reported for Examples H, K, N, Q, S, U, X, Y, and YY and Comparative Example CC in Table 4 and FIGS. 46-51. As discussed above, the Examples and Comparative Examples in Table 4 have a single recess (resembling the foldable substrate shown in FIG. 4). The compressive stress decreases as the wt % of the Li salt increased, which is expected as the smaller Li ions (relative to Na and K ions) decrease compressive stress. For Examples Q, S, U, and X, a compressive stress greater than 500 MPa (e.g., from about 500 MPa to about 700 MPa, from about 530 MPa to about 660 MPa). Likewise, the depth of compression decreases as the wt % of the Li salt increases (at least from 0 wt % to 0.5 wt %). However, the depth of layer appears to plateau at about 5.2 μm (e.g., Examples X-Y). Consequently, sufficient compressive stress and depth of layer can be achieved even with 0.5 wt % to 1.5 wt % Li salt.

TABLE 4

| Properties of Examples H, K, N, Q, S, U, X, Y, and YY and Comparative Example CC | | | | | | | | | | |
|---|---|---|---|---|---|---|---|---|---|---|
| Example | CC | H | K | N | Q | S | U | X | Y | YY |
| Li salt (wt %) | 0.00 | 0.05 | 0.1 | 0.3 | 0.5 | 0.8 | 1 | 1.5 | 2 | 5 |
| Compressive Stress (MPa) | 895 | 830 | 795 | 705 | 660 | 585 | 555 | 535 | 505 | 365 |
| Depth of Layer (μm) | 5.53 | 5.32 | 5.35 | 5.27 | 5.21 | 5.41 | 5.41 | 5.20 | 5.20 | 5.26 |

Figure 46:
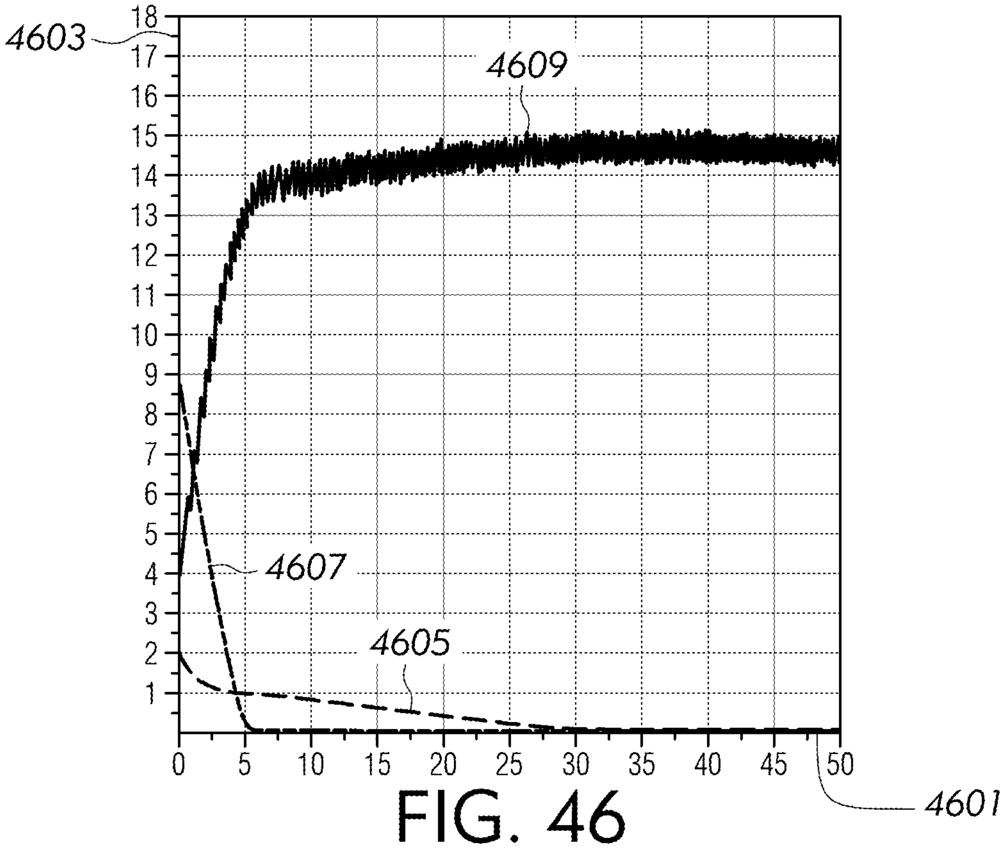
FIGS. 46-51 schematically illustrates concentration profiles from glow discharge optical emission spectroscopy (GDOES) of foldable apparatus.
Figure 47:
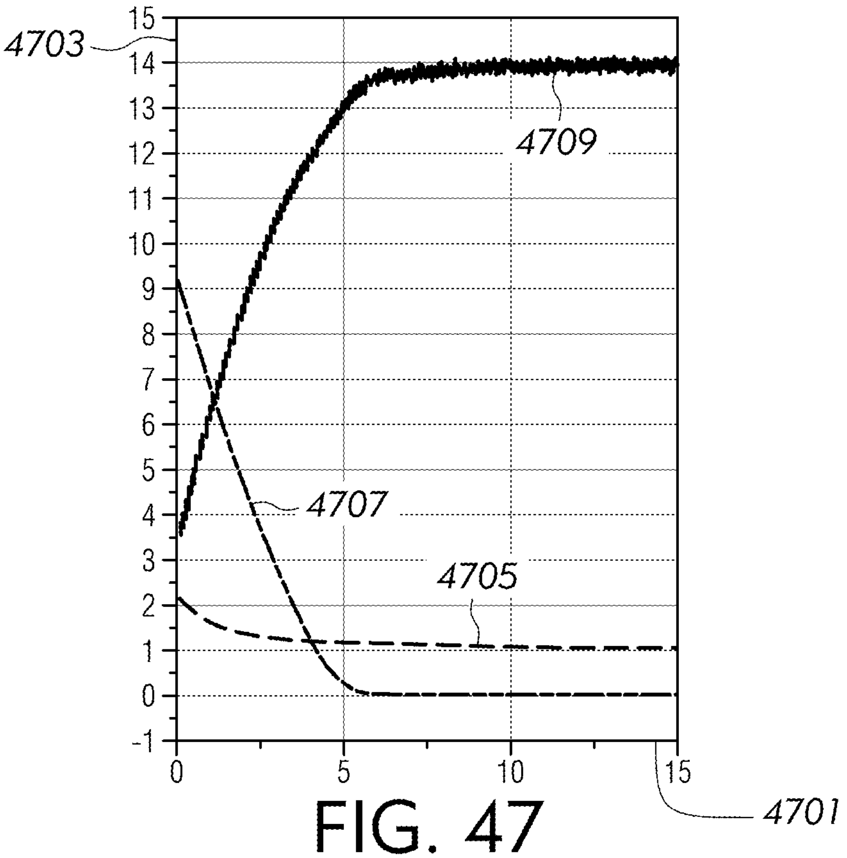
Figure 48:
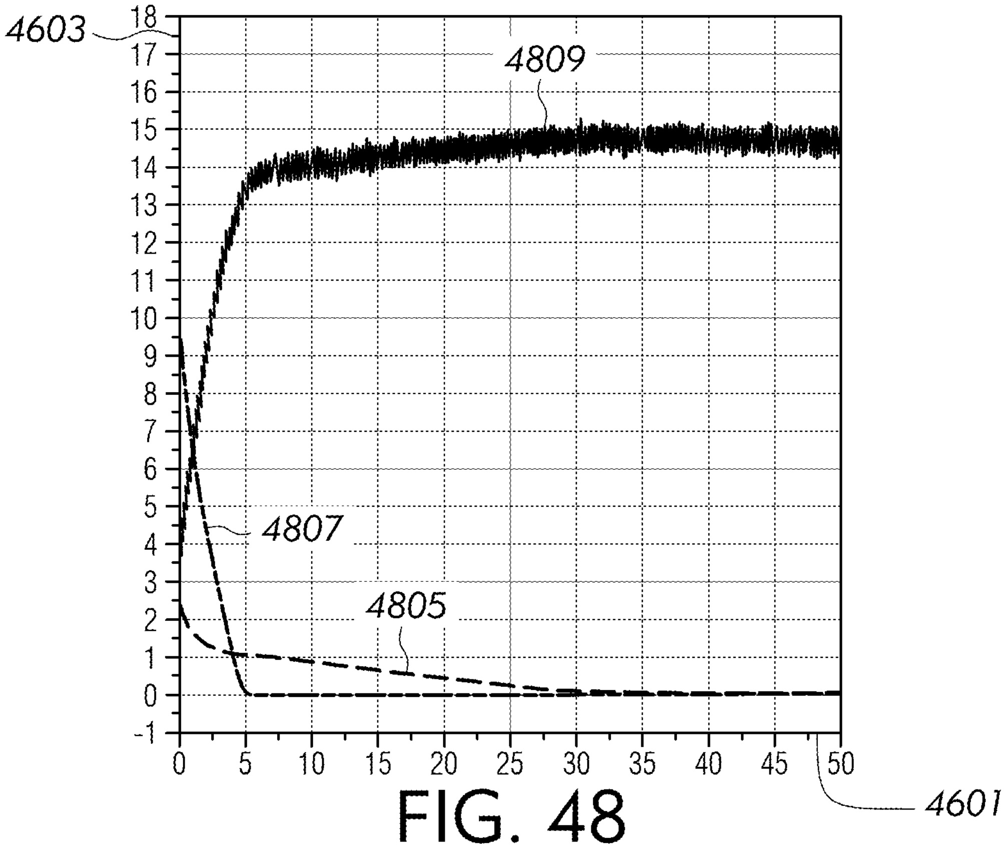
Figure 49:
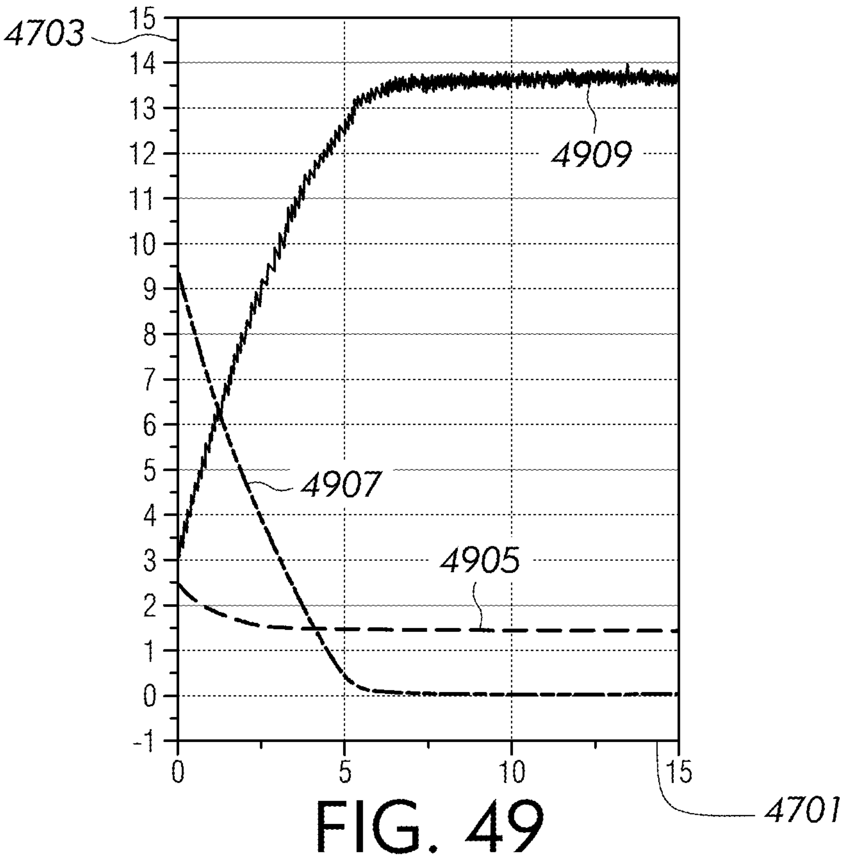
Figure 50:
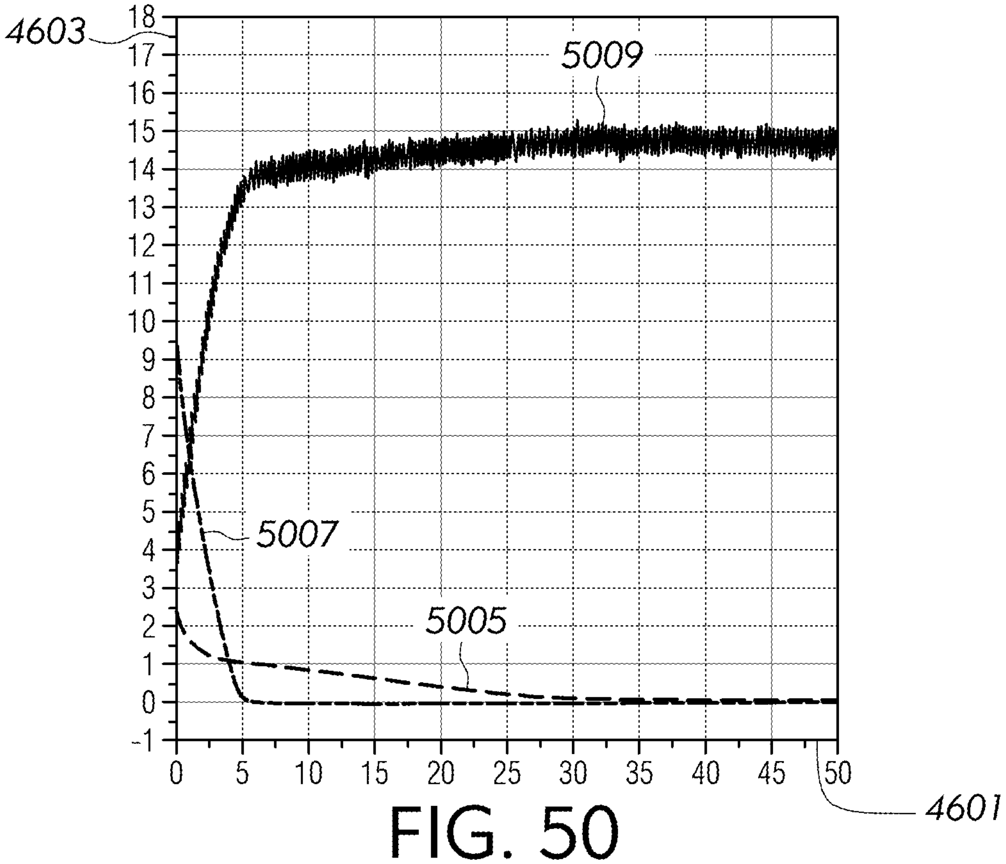
Figure 51:
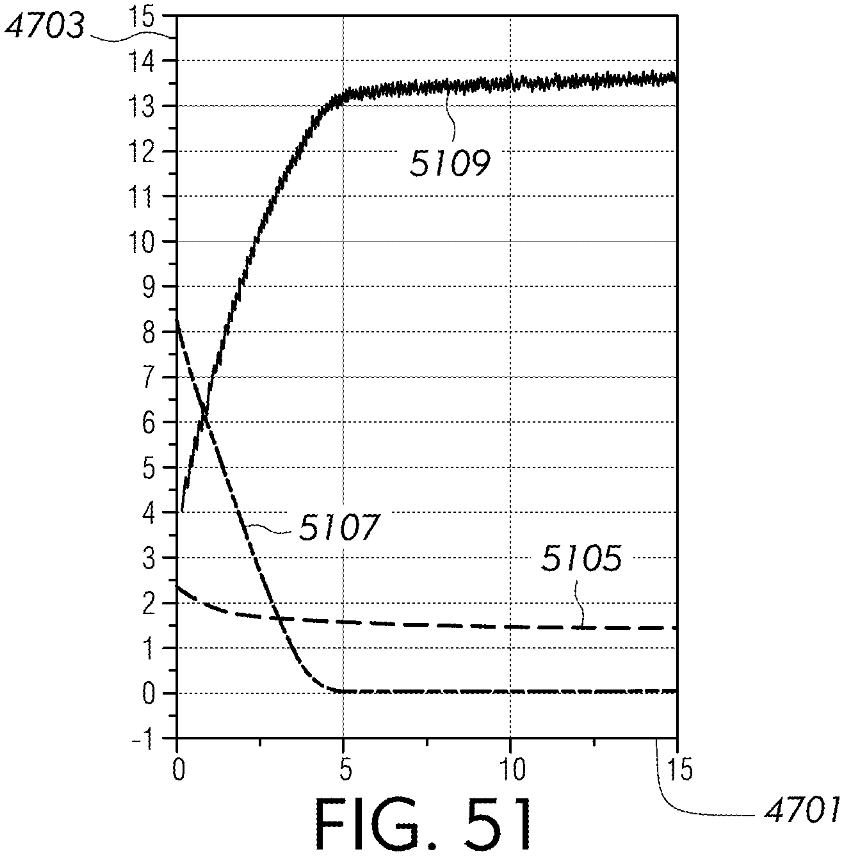

FIGS. 46-47 correspond to concentration profiles of alkali metal oxides in Example S (0.8 wt % Li salt) in the first portion (comprising the substrate thickness) and the central portion (comprising the central thickness), respectively. FIGS. 48-49 correspond to concentration profiles of alkali metal oxides in Example U (comprising 1 wt % Li salt) in the first portion (comprising the substrate thickness) and the central portion (comprising the central thickness), respectively. FIGS. 50-51 correspond to concentration profiles of alkali metal oxides in Example X (comprising 1.5 wt % Li salt) in the first portion (comprising the substrate thickness) and the central portion (comprising the central thickness), respectively. In FIGS. 46, 48, and 50, the horizontal axis 4601 corresponds to a distance from the first major surface in μm, and the vertical axis 4603 is the concentration of the alkali metal oxide in mol %. In FIGS. 47, 49, and 51, the horizontal axis 4701 corresponds to a distance from the first major surface in μm, and the vertical axis 4703 is the concentration of the alkali metal oxide in mol %. Curves 4605, 4605, 4705, 4805, 4905, 5005, and 5105 correspond to the concentration of $Li_2O$. Curves 4609, 4709, 4809, 4909, 5009, and 5109 correspond to the concentration of $Na_2O$. Curves 4607, 4707, 4807, 4907, 5007, and 5107 correspond to the concentration of $K_2O$. Features of the concentration profiles for Examples S, U, and X are presented in Table 5.

TABLE 5

| Properties of First Portion and Central Portion (Hinge) in Examples S, U, and X | | | | | | |
|---|---|---|---|---|---|---|
| | Example | | | | | |
| | S (First) | S (Central) | U (First) | U (Central) | X (First) | X (Central) |
| Li salt (wt %) | 0.8 | 0.8 | 1.0 | 1.0 | 1.5 | 1.5 |
| DOL Li (μm) | 30 | 6 | 30 | 9 | 33 | 7 |
| DOL Na (μm) | 28 | 7 | 20 | 8 | 30 | 5 |
| DOL K (μm) | 8.8 | 9.2 | 9.2 | 9.2 | 8 | 8.2 |
| Surface Li (mol %) | 2.0 | 2.15 | 2.3 | 2.4 | 2.2 | 2.35 |
| Surface Na (mol %) | 3.9 | 3.65 | 3.65 | 3.1 | 4.45 | 4.05 |
| Surface K (mol %) | 8.7 | 9.15 | 9.35 | 9.35 | 8.05 | 8.25 |
| Surface K/Na | 2.25 | 2.5 | 2.55 | 3.0 | 1.8 | 2.05 |
| Surface K/Li | 4.4 | 4.25 | 4.05 | 3.9 | 3.7 | 3.55 |
| Total K/Li | 182 | 195 | 177 | 203 | 183 | 200 |

Examples S, U, and X correspond to foldable substrates treated with 0.8 wt %, 1.0 wt %, and 1.5 wt % Li salt that have the unexpectedly low average gradient and warp, as discussed above. As discussed above, the Examples and Comparative Examples in Table 5 and FIGS. 46-51 have a single recess (resembling the foldable substrate shown in FIG. 4). The surface concentration of $Li_2O$ in the first portion (at the first major surface) for curves 4605, 4805, and 5005 range from 1 mol % to 3 mol %, from 2 mol % to 2.5 mol % (e.g., from 2 mol % to 2.3 mol %). Since the concentration of $Li_2O$ at the midpoint is 0 for these examples, the surface concentration is greater than the concentration at the midpoint by this same amount. The surface concentration in the central portion (at the first central surface area) for curves 4705, 4905, and 5105 is from 1 mol % to 3 mol %, from 2 mol % to 2.5 mol % (e.g., from 2.15 mol % to 2.4 mol %). Unlike for the first portion, the concentration of $Li_2O$ in the central portion is non-zero, which indicates that the lithium ions were able to be exchanged throughout the entire central thickness of the central portion. For curve 4705, the concentration of $Li_2O$ at the central midpoint is about 1 mol % while the concentration of $Li_2O$ at the central midpoint in curves 4905 and 5105 is greater (e.g., about 1.5 mol %). Consequently, the $Li_2O$ concentration at the first central surface area is greater than the $Li_2O$ concentration at the central midpoint by from about 1 mol % to about 1.5 mol %. Consequently, a difference between the surface concentration of $Li_2O$ and the midpoint concentration from about 1 mol % to about 3 mol % (e.g., from 2 mol % to 2.5 mol %, from 2 mol % to 2.3 mol %) in the first portion may reduce an incidence of buckling and/or saddle warp, for example, by decreasing an amount of chemical strengthening-induced strain on the central portion; and/or a difference between the surface concentration of $Li_2O$ and the central midpoint concentration from about 1 mol % to about 2 mol % (e.g., from 1 mol % to 1.5 mol %) in the central portion may reduce an incidence of buckling and/or saddle warp, for example, by decreasing an amount of chemical strengthening-induced strain on the central portion.

Curves 4609, 4809, and 5009 show a relatively depleted concentration of $Na_2O$ at the surface in the first portion relative to the concentration of $Na_2O$ at the midpoint. Curves 4709, 4909, and 5109 show a relatively depleted concentration of $Na_2O$ at the surface in the central portion relative to the concentration of $Na_2O$ at the central midpoint. Specifically, the surface concentration of $Na_2O$ decreases as the concentration of lithium salt in the molten salt bath (and the surface concentration of $Li_2O$) increases for Examples S and U, which suggests that a portion of the sodium near the surface is exchanged for lithium from the second molten salt bath. It is unclear why the $Na_2O$ at the surface in the first portion is greater for Example X than Example U. As discussed above, this reverse ion exchange can decrease an amount of chemical strengthening-induced strain on the central portion.

Curves 4607, 4807, and 5007 show surface concentrations of $K_2O$ at the surface in the first portion that are elevated relative to the concentration of $K_2O$ at the midpoint, for example, by from about 8 mol % to about 10 mol %. Curves 4707, 4907, and 5107 show surface concentrations of $K_2O$ at the surface in the central portion that are elevated relative to the concentration of $K_2O$ at the central midpoint, for example, by from about 8 mol % to about 10 mol.

As shown in Table 5, a ratio of the surface concentration of $K_2O$ to the surface concentration of $Na_2O$ is from 1 to 20 (e.g., from 1.5 to 3). A ratio of the surface concentration of $K_2O$ to the surface concentration of $Li_2O$ is from 2 to 10 or from 3 to 5 (e.g., from 3.5 to 4.5). As discussed above, the total amount of $K_2O$ and the total amount of $Li_2O$ in a portion is calculated by integrating the corresponding curve from GDOES over half the thickness. A ratio of the total amount of $K_2O$ to the total amount of $Li_2O$ in the first portion or in the central portion is from 100 to 300 (e.g., from 170 to 200).

The above observations can be combined to provide foldable apparatus comprising foldable substrates, foldable substrates, and methods of making foldable apparatus and foldable substrates comprising foldable substrates that comprise a first portion, a second portion, and a central portion positioned therebetween. The substrate and/or the portions can comprise glass-based and/or ceramic-based portions, which can provide good dimensional stability, reduced incidence of mechanical instabilities, good impact resistance, and/or good puncture resistance. The portions can comprise glass-based and/or ceramic-based portions comprising one or more compressive stress regions, which can further provide increased impact resistance and/or increased puncture resistance. By providing a substrate comprising a glass-based and/or ceramic-based substrate, the substrate can also provide increased impact resistance and/or puncture resistance while simultaneously facilitating good folding performance. In aspects, the substrate thickness can be sufficiently large (e.g., from about 50 micrometers (microns or μm) to about 2 millimeters) to further enhance impact resistance and puncture resistance. Providing foldable substrates comprising a central portion comprising a central thickness that is less than a substrate thickness (e.g., first thickness of the first portion and/or second thickness of the second portion) (e.g., by about 10 μm or more) can enable a small parallel plate distance (e.g., about 10 millimeters or less) based on the reduced thickness in the central portion, which can enable the foldability and/or rollability of the foldable substrate and/or foldable apparatus.

In aspects, the foldable apparatus and/or foldable substrates can comprise one or more recesses, for example, a first central surface area recessed from a first major surface by a first distance and/or a second central surface area recessed from a second major surface by a second distance. Providing a first recess opposite a second recess can provide the central thickness that is less than a substrate thickness. Further, providing a first recess opposite a second recess can reduce a maximum bend-induced strain of the foldable apparatus, for example, between a central portion and a first portion and/or second portion since the central portion comprising the central thickness can be closer to a neutral axis of the foldable apparatus and/or foldable substrates than if only a single recess was provided. Additionally, providing the first distance substantially equal to the second distance can reduce the incidence of mechanical instabilities in the central portion, for example, because the foldable substrate is symmetric about a plane comprising a midpoint in the substrate thickness and the central thickness. Alternatively, providing at least one recess on only one side of the foldable substrate can provide a smooth major surface that, for example, can be facing the user and/or provide a uniform tactile sensation. Likewise, providing at least one recess on only one side of the foldable substrate can be manufactured with only a single chemically strengthening process, reducing processing time, space, materials, and cost as well as potentially increasing throughput.

The present disclosure unexpectedly demonstrates that an incidence of buckling and/or saddle warp can be reduced by providing a surface concentration of $Li_2O$ (e.g., as an absolute mol % and/or an amount that the surface concentration is elevated relative to a concentration at the midpoint) from about 0.2 mol % to about 2 mol %, for example, by treating the foldable substrate with a molten salt solution comprising from about 0.02 wt % to about 0.08 wt % of a lithium salt (e.g., for a foldable substrate with a first recess and a second recess opposite the first recess) or with a molten salt solution comprising from about 0.5 wt % to about 1.5 wt % (e.g., from about 0.75 wt % to about 1.25 wt %) of a lithium salt) (e.g., for a foldable substrate with a recess on only one side). The lithium (e.g., lithium salt, lithium oxide) can reduce a mismatch between a chemical strengthening induced expansion strain of the portions of the foldable substrate. Exchanging sodium or potassium (or larger alkali metals) in the foldable substrate with the smaller lithium from the molten salt bath ("reverse ion exchange") can counteract (e.g., decrease) an amount of chemical strengthening induced expansion caused by the simultaneous "forward ion exchange" of smaller ions (e.g., sodium) in the foldable substrate with larger ions (e.g., potassium, cesium, francium, rubidium) in the final molten salt bath. As demonstrated in the Examples discussed below, including a small amount (e.g., from about 0.02 wt % to about 0.08 wt % or from about 0.5 wt % to about 1.5 wt % depending on the geometry of the foldable substrate, as described herein) of a lithium salt in a final molten salt bath unexpectedly reduces an incidence of buckling and/or warp of the foldable substrate (e.g., central portion). However, providing larger amounts of lithium salt may cause large saddle warp, for example, by chemical strengthening induced contraction from the reverse ion exchange of lithium into the foldable substrate generating a different mismatch in chemical strengthening induced expansion strain of portions of the foldable substrate. Providing a high (e.g., about 5 mol % or more) concentration of $K_2O$ (e.g., as an absolute mol % and/or an amount that the surface concentration is elevated relative to a concentration at the midpoint) can provide a large (e.g., about 500 MPa) surface compressive stress that can enable increased fracture resistance.

The foldable substrate can function as a rollable substrate with a central width greater than a second width. Providing a second width of the second portion of about 15% or less of the length of the foldable substrate can provide sufficient width to handle the ends of the foldable substrate during processing, to secure the foldable substrate and/or foldable apparatus as part of an electronic device, and/or to maximize an amount of the foldable substrate and/or foldable apparatus that can be part of a display portion visible to the user. Providing a central portion from about 15% to about 50% of the length of the foldable substrate can enable a display portion of the foldable apparatus to be adjusted as a portion of the rollable substrate is moved into and/or out of view of a user without unnecessarily expanding a size of the corresponding apparatus when in a fully rolled configuration. Providing a first width of the first portion of about 35% or more of the length of the foldable substrate can provide a large display portion visible to the user while ensuring that substantially all of the rest of the foldable substrate (e.g., central portion and second portion) can be within a footprint of the first portion.

Directional terms as used herein—for example, up, down, right, left, front, back, top, bottom—are made only with reference to the figures as drawn and are not intended to imply absolute orientation.

It will be appreciated that the various disclosed aspects may involve features, elements, or steps that are described in connection with that aspect. It will also be appreciated that a feature, element, or step, although described in relation to one aspect, may be interchanged or combined with alternate aspects in various non-illustrated combinations or permutations.

It is also to be understood that, as used herein the terms "the," "a," or "an," mean "at least one," and should not be limited to "only one" unless explicitly indicated to the contrary. For example, reference to "a component" comprises aspects having two or more such components unless the context clearly indicates otherwise. Likewise, a "plurality" is intended to denote "more than one."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Ranges can be expressed herein as from "about" one particular value, and/or to "about" another particular value. When such a range is expressed, aspects include from the one particular value and/or to the other particular value. Similarly, when values are expressed as approximations, by use of the antecedent "about," it will be understood that the particular value forms another aspect. Whether or not a numerical value or endpoint of a range in the specification recites "about," the numerical value or endpoint of a range is intended to include two aspects: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In aspects, "substantially similar" may denote values within about 10% of each other, for example, within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

While various features, elements, or steps of particular aspects may be disclosed using the transitional phrase "comprising," it is to be understood that alternative aspects, including those that may be described using the transitional phrases "consisting of" or "consisting essentially of," are implied. Thus, for example, implied alternative aspects to an apparatus that comprises A+B+C include aspects where an apparatus consists of A+B+C and aspects where an apparatus consists essentially of A+B+C. As used herein, the terms "comprising" and "including", and variations thereof shall be construed as synonymous and open-ended unless otherwise indicated.

The above aspects, and the features of those aspects, are exemplary and can be provided alone or in any combination with any one or more features of other aspects provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of the aspects herein provided they come within the scope of the appended claims and their equivalents.

What is claimed is:

1. A foldable substrate comprising:

a first major surface;

a second major surface disposed opposite the first major surface;

a first portion comprising a substrate thickness extending between the first major surface and the second major surface;

a second portion comprising the substrate thickness;

a central portion positioned between the first portion and the second portion, the central portion comprising a central thickness defined between a first central surface area and a second central surface area opposite the first central surface area, a first central compressive stress region extending to a first central depth of compression from the first central surface area, a second central compressive stress region extending to a second central depth of compression from the second central surface area, wherein:

the foldable substrate comprises a glass-based material;

the first central surface area is recessed from the first major surface by a first distance, the central thickness is less than the substrate thickness;

the central portion comprises a central midpoint disposed midway between the first central surface area and the second central surface area, a concentration profile of lithium oxide in the central portion as a function of depth is elevated relative to the concentration of lithium oxide at the central midpoint over a second distance that is at least 5% of the central thickness, and a total concentration of potassium oxide, rubidium oxide, cesium oxide, and francium oxide at the first central surface area is greater than a total concentration of potassium oxide, rubidium oxide, cesium oxide, and francium oxide at the central midpoint by from about 5 mol % to about 15 mol %.

2. The foldable apparatus of claim 1, wherein a surface profile of the first central surface area has an average gradient of 0.018 mm/mm or less.

3. The foldable substrate of claim 1, wherein a surface profile of the first central surface area along a midline midway between the first portion and the second portion exhibits a warp of 1 millimeter or less.

4. The foldable substrate of claim 1, where the glass-based material comprises:

$SiO_2$ in a range from about 40 mol % to about 80%;

$Al_2O_3$ in a range from about 5 mol % to about 30 mol %;

$B_2O_3$ in a range from 0 mol % to about 10 mol %;

$ZrO_2$ in a range from 0 mol % to about 5 mol %;

$P_2O_5$ in a range from 0 mol % to about 15 mol %;

$TiO_2$ in a range from 0 mol % to about 2 mol %;

$R_2O$ in a range from 0 mol % to about 20 mol %, wherein $R_2O$ comprises $Li_2O$, $Na_2O$, $K_2O$, $Rb_2O$, and $Cs_2O$; and RO in a range from 0 mol % to about 15 mol %, wherein RO comprises MgO, CaO, SrO, BaO, and ZnO.

5. The foldable substrate of claim 4, wherein the foldable substrate is formed from a glass-based substrate that contains lithium prior to any ion exchange treatments.

6. The foldable substrate of claim 4, wherein the foldable substrate is formed from a glass-based substrate that is free of lithium prior to any ion exchange treatments.

7. The foldable substrate of claim 6, wherein lithium ions are disposed throughout an entirety of the central thickness of the central portion.

8. The foldable substrate of claim 1, wherein the total concentration of potassium oxide, rubidium oxide, cesium oxide, and francium oxide at the first major surface is greater than a concentration of sodium oxide at the first major surface.

9. The foldable substrate of claim 8, wherein a difference between a surface concentration of $Li_2O$ at the first central surface area and a concentration of $Li_2O$ at the midpoint is from about 1 mol % to about 3 mol %.

10. The foldable substrate of claim 8, further comprising a ratio of a total amount of $K_2O$ to a total amount of $Li_2O$ that is in range from about 100 to about 300.

11. The foldable substrate of claim 1, wherein a concentration of lithium oxide at the first central surface area is 3 mol % or less.

12. The foldable substrate of claim 11, wherein a concentration of lithium oxide at the first major surface in the first portion is from about 0.8 mol % to about 3 mol %.

13. The foldable apparatus of claim 1, wherein a concentration profile of the lithium oxide in the first portion is elevated relative to the concentration of lithium oxide at the midpoint at a depth from the first major surface of about 5% of the substrate thickness.

14. The foldable apparatus of claim 1, wherein a concentration profile of the lithium oxide in the first portion is elevated relative to the concentration of lithium oxide at the midpoint at a depth from the first major surface that is in a range from about 3 micrometers to about 15 micrometers.

15. The foldable apparatus of claim 1, wherein:

a first maximum compressive stress at the first major surface is about 400 MPa or more;

the substrate thickness is from about 50 micrometers to about 2 millimeters; and the central thickness is from about 25 micrometers to about 120 micrometers.

16. The foldable apparatus of claim 15, wherein the central thickness is less than or equal 40% of the substrate thickness.

17. The foldable apparatus of claim 15, wherein:

the substrate thickness is from about 80 micrometers to about 500 micrometers; and the central thickness is from about 60 micrometers to about 120 micrometers.

18. The foldable apparatus of claim 15, wherein the first maximum compressive stress at the first major surface is about 600 MPa or more.

19. The foldable apparatus of claim 15, wherein:

the first portion comprises a first tensile stress region comprising a first maximum tensile stress that is about 20 MPa or more, and the second portion comprises a first tensile stress region comprising a second maximum tensile stress that is about 20 MPa or more.

20. The foldable apparatus of claim 19, wherein the central portion comprises a central tensile stress region that is from about 125 MPa to about 375 MPa.

* * * * *